United States Patent
Park et al.

(10) Patent No.: US 11,905,448 B2
(45) Date of Patent: Feb. 20, 2024

(54) LIQUID-CRYSTAL MEDIUM COMPRISING POLYMERIZABLE COMPOUNDS

(71) Applicant: MERCK PATENT GMBH, Darmstadt (DE)

(72) Inventors: Hye-Ryung Park, Pyeongtaek (KR); Eun-Kyu Lee, Pyeongtaek (KR); Yen-Kai Huang, Shanghai (CN)

(73) Assignee: MERCK PATENT GMBH, Darmstadt (DE)

(*) Notice: Subject to any disclaimer, the term of this patent is extended or adjusted under 35 U.S.C. 154(b) by 0 days.

(21) Appl. No.: 17/970,015

(22) Filed: Oct. 20, 2022

(65) Prior Publication Data

US 2023/0159825 A1   May 25, 2023

(30) Foreign Application Priority Data

Oct. 22, 2021 (EP) ..................... 21204105

(51) Int. Cl.
| | | |
|---|---|---|
| *G02F 1/1333* | (2006.01) | |
| *C09K 19/34* | (2006.01) | |
| *G02F 1/137* | (2006.01) | |
| *C09K 19/54* | (2006.01) | |

(52) U.S. Cl.
CPC ........ *C09K 19/3491* (2013.01); *C09K 19/542* (2013.01); *G02F 1/13712* (2021.01); *C09K 2019/548* (2013.01)

(58) Field of Classification Search
CPC .............. C09K 19/3491; C09K 19/542; C09K 2019/548; C09K 2019/0444; C09K 2019/0448; C09K 2019/3804; G02F 1/13712; G02F 1/1333
See application file for complete search history.

(56) References Cited

U.S. PATENT DOCUMENTS

| | | | |
|---|---|---|---|
| 10,442,992 B2* | 10/2019 | Saito | ............... C09K 19/10 |
| 10,982,145 B2* | 4/2021 | Xing | ............... G02F 1/137 |
| 11,370,969 B2* | 6/2022 | Engel | ............... C09K 19/3048 |
| 2022/0251448 A1 | 8/2022 | Lietzau et al. | |

FOREIGN PATENT DOCUMENTS

| | | |
|---|---|---|
| WO | 2020245084 A1 | 12/2020 |
| WO | 2022088915 A1 | 5/2022 |

OTHER PUBLICATIONS

Extended European search report dated Mar. 27, 2023 in corresponding EP 22202377.2 (pp. 1-6).

\* cited by examiner

*Primary Examiner* — Geraldina Visconti

(74) *Attorney, Agent, or Firm* — Millen, White, Zelano & Branigan, P.C.; Brion P. Heaney

(57) ABSTRACT

The present invention relates to a liquid-crystal (LC) medium comprising polymerizable compounds, to its use for optical, electro-optical and electronic purposes, in particular in LC displays, especially in LC displays of the PSA (polymer sustained alignment) or SA (self-aligning) mode, to an LC display of the PSA or SA mode comprising the LC medium, and to a process of manufacturing the LC display.

22 Claims, No Drawings

LIQUID-CRYSTAL MEDIUM COMPRISING POLYMERIZABLE COMPOUNDS

The present invention relates to a liquid-crystal (LC) medium comprising polymerizable compounds, to its use for optical, electro-optical and electronic purposes, in particular in LC displays, especially in LC displays of the PSA (polymer sustained alignment) or SA (self-aligning) mode, to an LC display of the PSA or SA mode comprising the LC medium, and to a process of manufacturing the LC display.

The popularity of 8K and gaming monitors leads to an increased need for LC display (LCD) panels having higher refresh rates and thus for LC media having faster response times. Many of these LCD panels are using polymer stabilized (PS) or polymer sustained alignment modes (PSA) modes, like the PS-VA (vertically aligned), PS-IPS (in-plane switching) or PS-FFS (fringe-field switching) mode or modes derived therefrom, or self-aligned (SA) modes like SA-VA which are polymer stabilized.

In the PS or PSA mode a small amount, typically from 0.1 to 1% of one or more polymerizable mesogenic compounds, also known as RMs (reactive mesogens), is added to the LC medium. After filling the LC medium into the display the RMs are then polymerized in situ by UV photopolymerization, while a voltage is applied to the electrodes of the display. Thereby a small tilt angle is generated in the LC molecules of the LC medium, which is stabilized by the polymerized RMs. The UV polymerization process, also referred to as "PSA process", is usually carried out in two steps, a first UV exposure step ("UV1 step"), with application of a voltage, to generate the tilt angle, and a second UV exposure step ("UV2 step"), without application of a voltage, to complete polymerization of the RMs.

In the SA-VA mode the alignment layers are omitted in the display. Instead, a small amount, typically 0.1 to 2.5%, of a self alignment (SA) additive is added to the LC medium, which induces the desired alignment, for example homeotropic or planar alignment, in situ by a self assembling mechanism. The SA additive usually contains an organic, mesogenic core group and attached thereto one or more polar anchor groups, for example hydroxy, carboxy, amino or thiol groups, which are capable of interacting with the substrate surface, causing the additives on the substrate surface to align and induce the desired alignment also in the LC molecules. The SA additive may also contain one or more polymerizable groups that can be polymerised under similar conditions as the RMs used in the PSA process. The LC medium may in addition to the SA additive also contain one or more RMs.

One method to reduce the response times in LC media for the PSA mode is for example by using compounds with an alkenyl group as components of the LC host mixture. However, this may lead to a decrease of the reliability of the mixture when being exposed to the UV light need to polymerize the RMs additives, which is believed to be caused by a reaction of the alkenyl compound with the polyimide of the alignment layer, which is especially problematic when using shorter UV wavelengths of less than 320 nm. Therefore there is a tendency to use longer UV wavelengths for the PSA process.

Another method to reduce the response time in LC media for the PSA mode is by adjusting the cell gap towards higher/lower cell gaps. This may require the use of highly polar LC compounds, in particular having a high dielectric constant perpendicular to the director (EL). However, these compounds can have a negative effect on the reliability of the LC medium. It is therefore essential to find the correct balance between sufficient polarity of the LC medium on the one hand and high reliability of the LC medium on the other hand, in order to enable variation of the cell gap and thereby reduction of the response times.

Therefore, there is a need for polymerizable LC media for use in PSA or SA displays, which enable a high specific resistance at the same time as a large working-temperature range, short response times, even at low temperatures, and a low threshold voltage, a low tilt angle, a high tilt stability, a multiplicity of grey shades, high contrast and a broad viewing angle, have high reliability and high values for the VHR after UV exposure, and, in case of the polymerizable compounds, have low melting points and a high solubility in the LC host mixtures and enable polymerization even at longer UV wavelengths. In displays for mobile applications, it is especially desired to have available LC media that show low threshold voltage and high birefringence.

The present invention is based on the object of providing novel suitable materials, in particular RMs and LC media comprising the same, for use in PSA or SA displays, which do not have the disadvantages indicated above or do so to a reduced extent.

In particular, the invention is based on the object of LC media comprising RMs for use in PSA or SA displays, which enable very high specific resistance values, high VHR values, high reliability, low threshold voltages, short response times, high birefringence, show good UV absorption also at longer UV wavelengths, preferably in the range from 340 to 380 nm, enable quick and complete polymerization of the RMs, allow the generation of a low tilt angle, preferably as quickly as possible, enable a high stability of the tilt angle even after longer time and/or after UV exposure, reduce or prevent the occurrence of "image sticking" and "ODF mura" in the display, and in case of the RMs polymerize as rapidly and completely as possible and show a high solubility in the LC media which are typically used as host mixtures in PSA or SA displays.

A further object of the invention is to provide LC media for use in PSA displays wherein the RMs exhibit both fast polymerization speed and good reliability parameters, like high VHR or tilt stability.

A further object of the invention is the provision of novel LC media containing RMs, in particular for optical, electro-optical and electronic applications, and of suitable processes and intermediates for the preparation thereof.

It was found that one or more of these objects could be achieved by providing LC media as disclosed and claimed hereinafter.

The invention thus relates to an LC medium having negative dielectric anisotropy and comprising one or more polymerizable compounds, one or more compounds of formula IA, and one or more compounds of formula IB

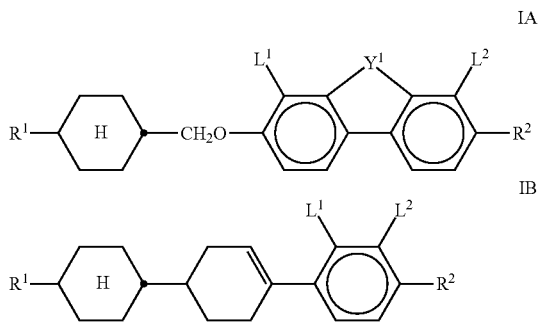

in which the individual radicals, on each occurrence identically or differently, and each, independently of one another, have the following meaning:

$R^1$, $R^2$ straight chain, branched or cyclic alkyl having 1 to 25 C atoms, wherein one or more non-adjacent $CH_2$- groups are optionally replaced by —O—, —S—, —CO—, —CO—O—, —O—CO—, —O—CO—O—, $CR^o=CR^{oo}$—, —C≡C—,

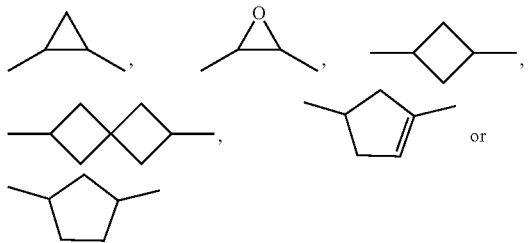

in such a manner that O- and/or S-atoms are not directly connected with each other, and wherein one or more H atoms are each optionally replaced by F or Cl, preferably alkyl or alkoxy having 1 to 6 C atoms, $R^o$, $R^{oo}$ H or alkyl having 1 to 12 C atoms, $L^1$, $L^2$ F or Cl, preferably F.

The invention further relates to the use of the LC medium as described above and below in LC displays of the PSA or SA mode.

The invention furthermore relates to a process for preparing an LC medium as described above and below, comprising the steps of mixing one or more polymerizable compounds with one or more compounds of formulae IA and IB and optionally with further LC compounds and/or additives.

The invention furthermore relates to an LC display comprising an LC medium according to the invention as described above and below, which is a PSA or SA display, preferably a PS-VA, PS-IPS, PS-FFS or SA-VA display.

The invention furthermore relates to an LC display comprising an LC medium as described above and below wherein the polymerizable compounds are present in polymerized form, which is preferably a PSA or SA display, very preferably a PS-VA, PS-IPS, PS-FFS or SA-VA display.

The invention furthermore relates to an LC display of the PSA type comprising two substrates, at least one which is transparent to light, an electrode provided on each substrate or two electrodes provided on only one of the substrates, and located between the substrates a layer of an LC medium as described above and below, wherein the polymerizable compounds are polymerized between the substrates of the display by UV photopolymerization.

The invention furthermore relates to a process for manufacturing an LC display as described above and below, comprising the steps of filling or otherwise providing an LC medium as described above and below between the substrates of the display, and polymerizing the polymerizable compounds, preferably while a voltage is applied to the electrodes of the display.

The invention furthermore relates to a process for manufacturing an LC display as described above and below, wherein irradiation of the polymerizable compounds is carried out using a UV-LED lamp.

The LC media according to the present invention show one or more of the following advantageous properties when used in PSA displays:

high transmittance,
high contrast ratio,
reduced image sticking,
reduced ODF mura,
reduced rotational viscosity,
high reliability and high VHR value after UV exposure and/or heat treatment,
fast response times,
a favourably low ratio of rotational viscosity to the splay elastic constant $\gamma_1/K_1$, which contributes to improved switching behaviour especially at low driving voltages and is useful to enable energy-saving displays
a low threshold voltage which is useful to enable energy-saving displays,
good UV-photopolymerization even when using UV light sources with low radiation intensity and/or long UV emission wavelengths, such as UV LED lamps or green UV lamps, which allows minimization of production cost and energy saving,
fast polymerization leading to minimal residues of RM after the UV-process,
good tilt stability.

An alkenyl group in the compounds of formula IA, IB, II or other components of the LC medium as disclosed below is not considered to be within the meaning of the term "polymerizable group" as used herein. The conditions for the polymerization of the polymerizable compounds of the LC medium are preferably selected such that alkenyl substituents do not participate in the polymerization reaction. Preferably the LC media disclosed and claimed in the present application do not contain an additive that initiates or enhances the participation of the alkenyl group in a polymerization reaction.

Unless stated otherwise, the polymerizable compounds and the compounds of formula II are preferably selected from achiral compounds.

As used herein, the expression "UV light having a wavelength of" followed by a given range of wavelengths (in nm), or by a given lower or upper wavelength limit (in nm), means that the UV emission spectrum of the respective radiation source has an emission peak, which is preferably the highest peak in the respective spectrum, in the given wavelength range or above the given lower wavelength limit or below the given upper wavelength limit and/or that the UV absorption spectrum of the respective chemical compound has a long or short wavelength tail that extends into the given wavelength range or above the given lower wavelength limit or below the given upper wavelength limit.

As used herein, the term "substantially transmissive" means that the filter transmits a substantial part, preferably at least 50% of the intensity, of incident light of the desired wavelength(s). As used herein, the term "substantially blocking" means that the filter does not transmit a substantial part, preferably at least 50% of the intensity, of incident light of the undesired wavelengths. As used herein, the term "desired (undesired) wavelength" e.g. in case of a band pass filter means the wavelengths inside (outside) the given range of λ, and in case of a cut-off filter means the wavelengths above (below) the given value of λ.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display), and will be understood to be inclusive of "pretilt" and "pretilt angle". The tilt angle here denotes the average angle (<90°) between the longitudinal molecular axes of the LC molecules (LC director) and the surface of the plane-parallel outer plates which form the LC cell. A low absolute value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

An SA-VA display according to the present invention will be of the polymer stabilised mode as it contains, or is manufactured by use of, an LC medium containing RMs like those described below. Consequently as used herein, the term "SA-VA display" when referring to a display according to the present invention will be understood to refer to a polymer stabilised SA-VA display even if not explicitly mentioned.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

Above and below,

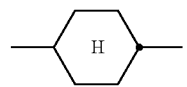

denotes a trans-1,4-cyclohexylene ring, and

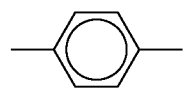

denotes a 1,4-phenylene ring.

In a group

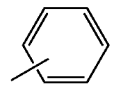

the single bond shown between the two ring atoms can be attached to any free position of the benzene ring.

If in the formulae shown above and below a group $R^{1-12}$, $R^Q$, R or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If in the formulae shown above and below a group $R^{1-12}$, $R^Q$, R or L denotes an alkyl radical wherein one or more $CH_2$ groups are replaced by S, this may be straight-chain or branched. It is preferably straight-chain, has 1, 2, 3, 4, 5, 6 or 7 C atoms and accordingly preferably denotes thiomethyl, thioethyl, thiopropyl, thiobutyl, thiopentyl, thiohexyl or thioheptyl.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxa-decyl.

If in the formulae shown above and below a group $R^{1-12}$, $R^Q$, R or L denotes an alkoxy or oxaalkyl group it may also contain one or more additional oxygen atoms, provided that oxygen atoms are not linked directly to one another.

In another preferred embodiment, one or more of $R^{1-12}$, $R^Q$, R or L are selected from the group consisting of

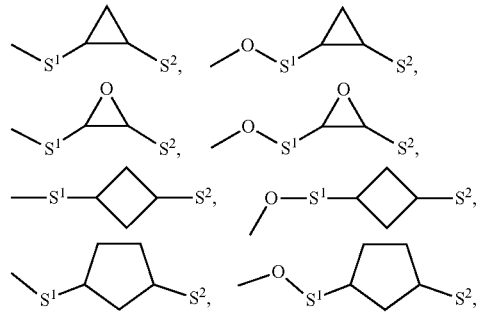

-continued

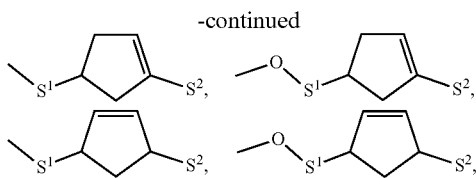

—S$^1$—F, —O—S$^1$—F, —O—S$_1$—O—S$_2$, wherein S$^1$ is C$_{1-12}$-alkylene or C$_{2-12}$-alkenylene and S$^2$ is H, C$_{1-12}$-alkyl or C$_{2-12}$-alkenyl, and very preferably are selected from the group consisting of

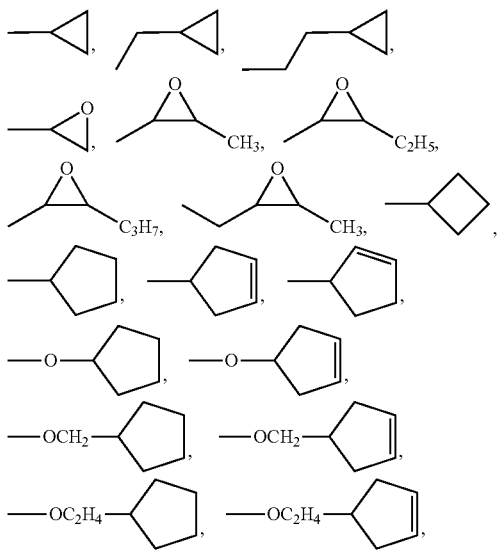

—OCH$_2$OCH$_3$, —O(CH$_2$)$_2$OCH$_3$, —O(CH$_2$)$_3$OCH$_3$, —O(CH$_2$)$_4$OCH$_3$, —O(CH$_2$)$_2$F, —O(CH$_2$)$_3$F, —O(CH$_2$)$_4$F.

If in the formulae shown above and below a group R$^{1-12}$, R$^Q$, R or L denotes an alkyl radical in which one CH$_2$ group has been replaced by —CH═CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If in the formulae shown above and below a group R$^{1-12}$, R$^Q$, R or L denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Halogen is preferably F or Cl, very preferably F.

The group —CR$^0$═CR$^{00}$— is preferably —CH═CH—.

—CO—, —C(═O)— and —C(O)— denote a carbonyl group, i.e.

Preferred substituents L, are, for example, F, Cl, Br, I, —CN, —NO$_2$, —NCO, —NCS, —OCN, —SCN, —C(═O)N(R$^x$)$_2$, —C(═O)Y$^1$, —C(═O)R$^x$, —N(R$^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or C, optionally substituted silyl having 1 to 20 Si atoms, or optionally substituted aryl having 6 to 25, preferably 6 to 15, C atoms, wherein R$^x$ denotes H, F, Cl, CN, or straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and Y$^1$ denotes halogen.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

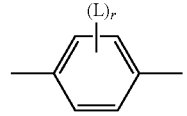

is preferably

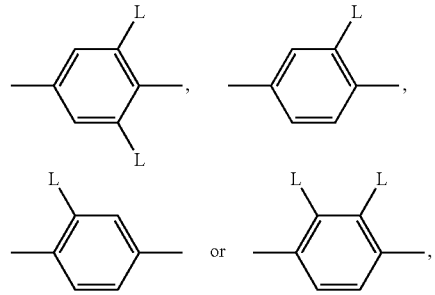

in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C═C double bond or —C≡C— triple bond, and groups which are suitable for polymerization with ring opening, such as, for example, oxetane or epoxide groups.

Preferred groups P are selected from the group consisting of CH$_2$═CW$^1$—CO—O—, CH$_2$═CW$^1$—CO—,

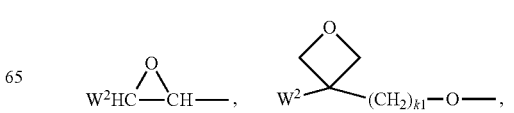

-continued

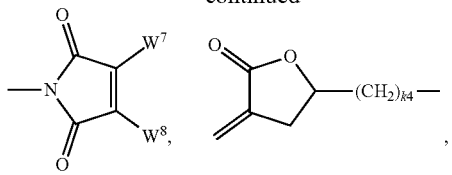

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}-Phe-(O)_{k2}-$, $CH_2=CH-(CO)_{k1}-Phe-(O)_{k2}-$, $Phe-CH=CH-$, $HOOC-$, $OCN-$ and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2=CW^1-CO-O-$, $CH_2=CW^1-CO-$,

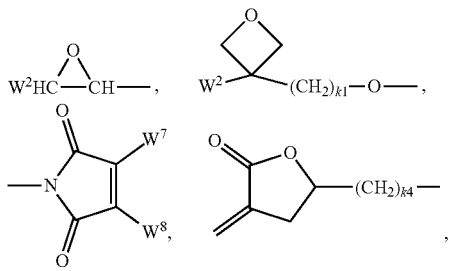

$CH_2=CW^2-O-$, $CH_2=CW^2-$, $CW^1=CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}-Phe-(O)_{k2}-$, $CH_2=CH-(CO)_{k1}-Phe-(O)_{k2}-$, $Phe-CH=CH-$ and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, W4, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

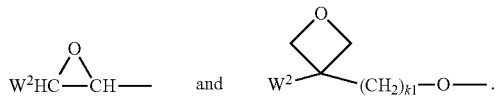

Further preferred polymerizable groups P are selected from the group consisting of vinyloxy, acrylate, methacrylate, fluoroacrylate, chloroacrylate, oxetane and epoxide, most preferably from acrylate and methacrylate.

Very preferably all polymerizable groups in the polymerizable compound have the same meaning.

If the spacer group Sp is different from a single bond, it is preferably of the formula Sp"-X", so that the respective radical P-Sp- conforms to the formula P-Sp"-X"—, wherein
Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, $-N(R^0)-$, $-Si(R^0R^{00})-$, —CO—, —CO—O—, —O—CO—, —O—CO—O—, —S—CO—, —CO—S—, $-N(R^{00})-CO-O-$, $-O-CO-N(R^0)-$, $-N(R^0)-CO-N(R^{00})-$, —CH=CH— or —C≡C— in such a way that O and/or S atoms are not linked directly to one another,
X" denotes —O—, —S—, —CO—, —CO—O—, —O—CO—, —O—CO—O—, $-CO-N(R^0)-$, $-N(R^0)-CO-$, $-N(R^0)-CO-N(R^{00})-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, —CH=N—, —N=CH—, —N=N—, $-CH=CR^0-$, $-CY^2=CY^3-$, —C≡C—, —CH=CH—CO—O—, —O—CO—CH=CH— or a single bond,
$R^0$ and $R^{00}$ each, independently of one another, denote H or alkyl having 1 to 20 C atoms, and
$Y^2$ and $Y^3$ each, independently of one another, denote H, F, Cl or CN.
X" is preferably —O—, —S—, —CO—, —COO—, —OCO—, —O—COO—, $-CO-NR^0-$, $-NR^0-CO-$, $-NR^0-CO-NR^{00}-$ or a single bond.
Typical spacer groups Sp and -Sp"-X"— are, for example, $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^0R^{00}-O)_{p1}-$, in which p1 is an integer from 1 to 12, q1 is an integer from 1 to 3, and $R^0$ and $R^{00}$ have the meanings indicated above.

Particularly preferred groups Sp and -Sp"-X"— are $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

In a preferred embodiment of the invention the polymerizable compounds contain a spacer group Sp that is substituted by one or more polymerizable groups P, so that the group Sp-P corresponds to Sp(P)s, with s being ≥2 (branched polymerizable groups).

Preferred polymerizable compounds according to this preferred embodiment are those wherein s is 2, i.e. compounds which contain a group Sp(P)$_2$. Very preferred polymerizable compounds according to this preferred embodiment contain a group selected from the following formulae:

| | |
|---|---|
| —X-alkyl-CHPP | S1 |
| —X-alkyl-CH((CH$_2$)$_{aa}$P)((CH$_2$)$_{bb}$P) | S2 |
| —X—N((CH$_2$)$_{aa}$P)((CH$_2$)$_{bb}$P) | S3 |
| —X-alkyl-CHP—CH$_2$—CH$_2$P | S4 |
| —X-alkyl-C(CH$_2$P)(CH$_2$P)—C$_{aa}$H$_{2aa+1}$ | S5 |
| —X-alkyl-CHP—CH$_2$P | S6 |
| —X-alkyl-CPP—C$_{aa}$H$_{2aa+1}$ | S7 |
| —X-alkyl-CHPCHP—C$_{aa}$H$_{2aa+1}$ | S8 | in which P is as defined in formula M,
alkyl denotes a single bond or straight-chain or branched alkylene having 1 to 12 C atoms which is unsubstituted or mono- or polysubstituted by F, Cl or CN and in which one or more non-adjacent CH$_2$ groups may each, independently of one another, be replaced by —C(R$^0$)=C(R$^0$)—, —C≡C—, —N(R$^0$)—, —O—, —S—, —CO—, —CO—O—, —O—CO—, —O—CO—O— in such a way that O and/or S atoms are not linked directly to one another, where R$^0$ has the meaning indicated above,
aa and bb each, independently of one another, denote 0, 1, 2, 3, 4, 5 or 6,
X has one of the meanings indicated for X", and is preferably O, CO, SO$_2$, O—CO—, CO—O or a single bond.

Preferred spacer groups Sp(P)$_2$ are selected from formulae S1, S2 and S3.

Very preferred spacer groups Sp(P)$_2$ are selected from the following subformulae:

| | |
|---|---|
| —CHPP | S1a |
| —O—CHPP | S1b |
| —CH$_2$—CHPP | S1c |
| —OCH$_2$—CHPP | S1d |
| —CH(CH$_2$—P)(CH$_2$—P) | S2a |
| —OCH(CH$_2$—P)(CH$_2$—P) | S2b |
| —CH$_2$—CH(CH$_2$—P)(CH$_2$—P) | S2c |
| —OCH$_2$—CH(CH$_2$—P)(CH$_2$—P) | S2d |
| —CO—NH((CH$_2$)$_2$P)((CH$_2$)$_2$P) | S3a |

P is preferably selected from the group consisting of vinyloxy, acrylate, methacrylate, fluoroacrylate, chloroacrylate, oxetane and epoxide, very preferably from acrylate and methacrylate, most preferably from methacrylate.

Further preferably all polymerizable groups P that are present in the same compound have the same meaning, and very preferably denote acrylate or methacrylate, most preferably methacrylate.

Sp preferably denotes a single bond or —(CH$_2$)$_{p1}$—, —(CH$_2$)$_{p2}$—CH=CH—(CH$_2$)$_{p3}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, preferably 2 or 3, p2 and p3 are independently of each other 0, 1, 2 or 3 and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Further preferably at least one group Sp is a single bond.

Further preferably at least one group Sp is different from a single bond, and is preferably selected from —(CH$_2$)$_{p1}$—, —(CH$_2$)$_{p2}$—CH=CH—(CH$_2$)$_{p3}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, preferably 2 or 3, p2 and p3 are independently of each other 0, 1, 2 or 3 and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Very preferably Sp is different from a single bond, and is selected from —(CH$_2$)$_2$—, —(CH$_2$)$_3$—, —(CH$_2$)$_4$—, —O—(CH$_2$)$_2$—, —O—(CH$_2$)$_3$—, —O—CO—(CH$_2$)$_2$ and —CO—O—(CH$_2$)$_2$—, wherein the O atom or the CO group is attached to the benzene ring.

Preferred compounds of formula IA are selected from the group consisting of the formulae IA-1 to IA-10:

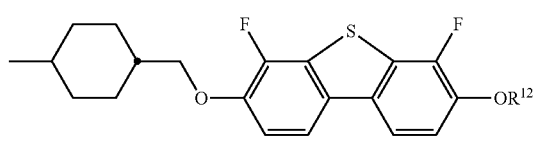

IA-1

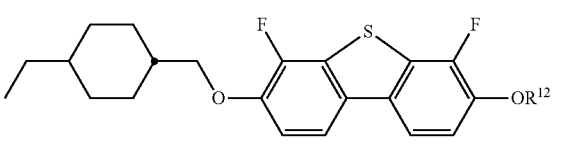

IA-2

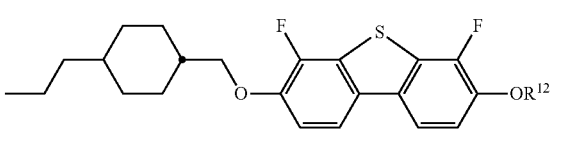

IA-3

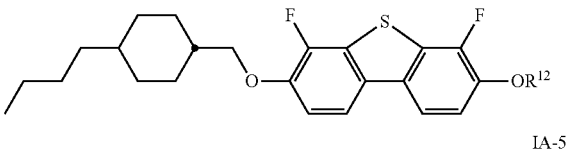

IA-4

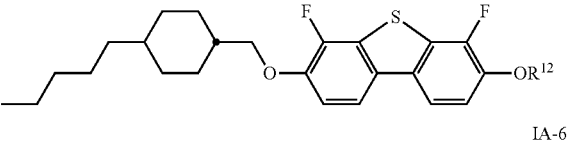

IA-5

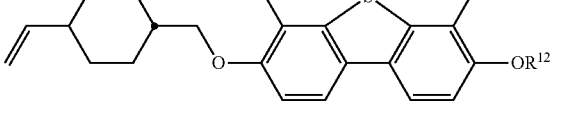

IA-6

-continued

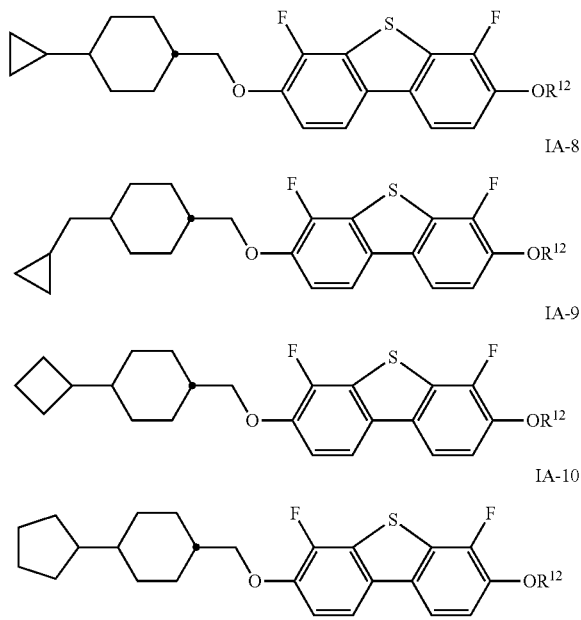

in which R¹² denotes alkyl having 1 to 7 C-atoms, preferably ethyl, n-propyl or n-butyl, or alternatively cyclopropylmethyl, cyclobutylmethyl or cyclopentylmethyl.

Preferred compounds of formula IA are selected from the group consisting of formulae IA-1, IA-2, IA-3, IA4 and IA5, very preferably from formulae IA-2 and IA-3, most preferably from formula IA-2, and wherein in all of the aforementioned formulae R¹² is preferably ethyl, n-propyl or n-butyl, very preferably n-butyl.

Preferably the LC medium contains 1, 2 or 3 compounds of formula IA or its subformulae.

Preferably the total proportion of the compounds of formula IA and its subformulae in the LC medium is from 2 to 20%, very preferably from 3 to 14% by weight, most preferably from 4 to 10% by weight.

Preferred compounds of formula IB are selected from the group consisting of the following subformulae:

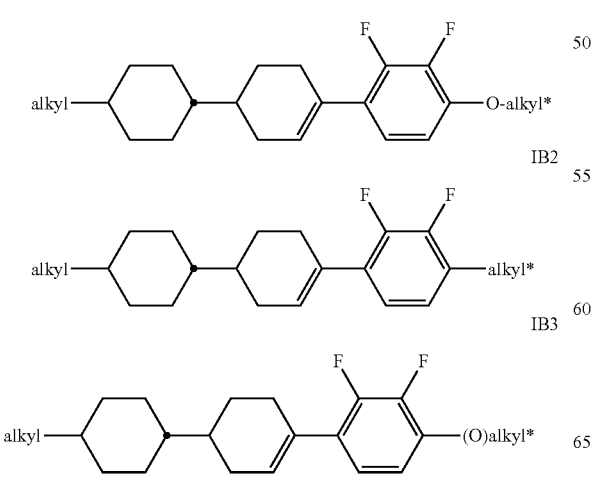

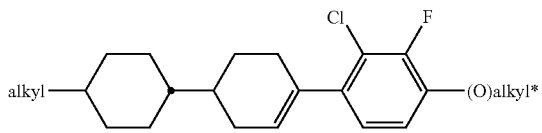

in which alkyl and alkyl* independently of each other denote a straight-chain alkyl radical having 1-6 C atoms, preferably ethyl, n-propyl or n-butyl, and (O) denotes an oxygen atom or a single bond, preferably an oxygen atom.

Very preferred are compounds of formula IB1 and IB2, most preferred are compounds of formula IB1, especially those wherein alkyl denotes ethyl, n-propyl or n-butyl, preferably n-propyl, (O) denotes an oxygen atom, and alkyl* denotes ethyl, n-propyl or n-butyl, preferably ethyl.

Preferably the LC medium contains 1, 2 or 3, very preferably 1, compounds of formula IB or its subformulae.

Preferably the total proportion of the compounds of formula IB and its subformulae in the LC medium is from 0.5 to 5%, very preferably from 0.5 to 2% by weight, most preferably from 0.5 to 1.5% by weight.

Further preferred embodiments of the LC medium according to the present invention are listed below, including any combination thereof:

The LC medium contains one or more compounds of formula II

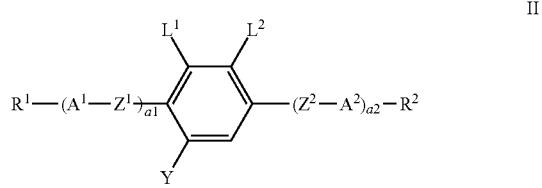

wherein the individual radicals, independently of each other and on each occurrence identically or differently, have the following meanings R¹ and R² straight chain, branched or cyclic alkyl having 1 to 25 C atoms, wherein one or more non-adjacent CH₂-groups are optionally replaced by —O—, —S—, —CO—, —CO—O—, —O—CO—, —O—CO—O—, CR⁰=CR⁰⁰—, —C≡C—,

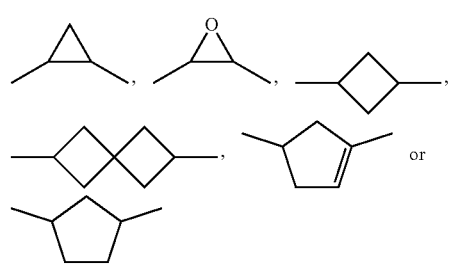

in such a manner that O- and/or S-atoms are not directly connected with each other, and wherein one or more H atoms are each optionally replaced by F or Cl, preferably alkyl or alkoxy having 1 to 6 C atoms, $R^O$, $R^{OO}$ H or alkyl having 1 to 12 C atoms, $A^1$ and $A^2$ a group selected from the following formulae

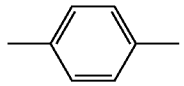 A1

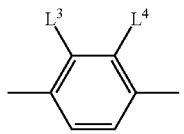 A2

 A3

 A4

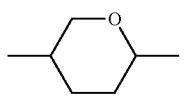 A5

 A6

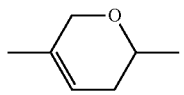 A7

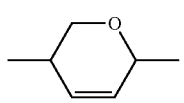 A8

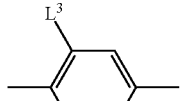 A9

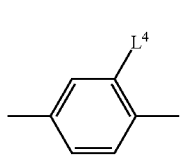 A10

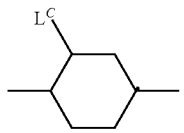 A11

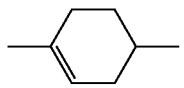 A12

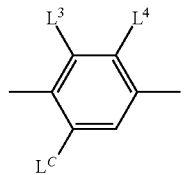 A13

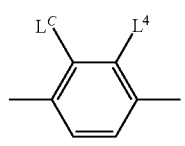 A14

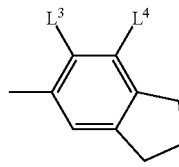 A15

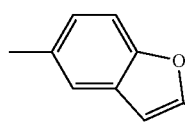 A16 preferably from formulae A1, A2, A3, A4, A5, A6, A9 and A10, very preferably from formulae A1, A2, A3, A4, A5, A9 and A10, $Z^1$ and $Z^2$ —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^1$, $L^2$, $L^3$ and $L^4$ F, Cl, $OCF_3$, $CF_3$, $CH_3$, $CH_2F$ or $CHF_2$, preferably F or Cl, very preferably F, Y H, F, Cl, $CF_3$, $CHF_2$ or $CH_3$, preferably H or $CH_3$, very preferably H, $L^C$ $CH_3$ or $OCH_3$, preferably $CH_3$, a1 1 or 2, a2 0 or 1.

Preferably the LC medium contains one or more compounds of formula II selected from the group consisting of compounds of the formulae IIA, IIB, IIC and IID

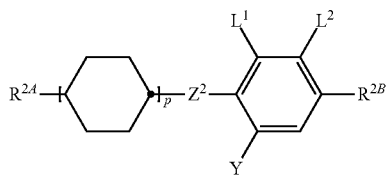 IIA

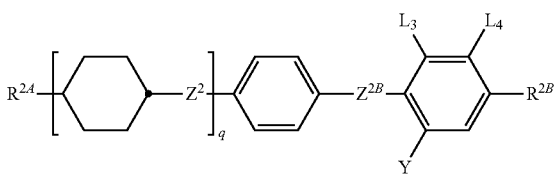 IIB

-continued

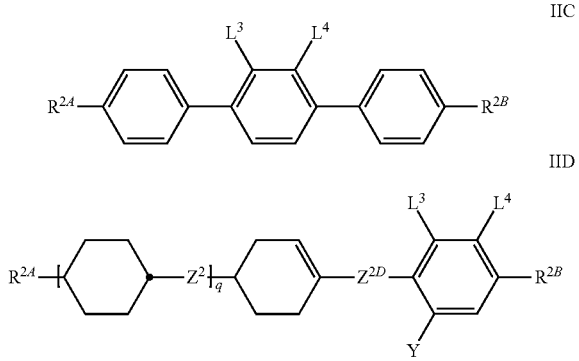
IIC

IID in which
R$^{2A}$ and R$^{2B}$ each, independently of one another, denote H, an alkyl or alkenyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

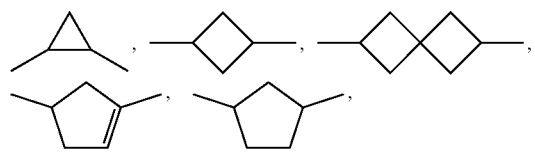

—C≡C—, —CF$_2$O—, —OCF$_2$—, —OC—O— or —O—CO— in such a way that O atoms are not linked directly to one another,
L$^1$ to L$^4$ each, independently of one another, denote F, Cl, CF$_3$ or CHF$_2$,
Y denotes H, F, Cl, CF$_3$, CHF$_2$ or CH$_3$, preferably H or CH$_3$, particularly preferably H,
Z$^2$, Z$^{2B}$ and Z$^{2D}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—,
p denotes 0, 1 or 2, and
q on each occurrence, identically or differently, denotes 0 or 1.

Preferred compounds of the formulae IIA, IIB, IIC and IID are those wherein R$^{2B}$ denotes an alkyl or alkoxy radical having up to 15 C atoms, and very preferably denotes (O)C$_v$H$_{2v+1}$ wherein (O) is an oxygen atom or a single bond and v is 1, 2, 3, 4, 5 or 6.

Further preferred compounds of the formulae IIA, IIB, IIC and IID are those wherein R$^{2A}$ or R$^{2B}$ denotes or contains cycloalkyl or cycloalkoxy radical, preferably selected from the group consisting of

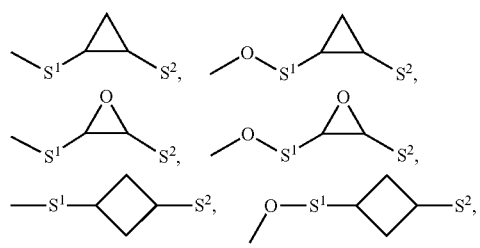

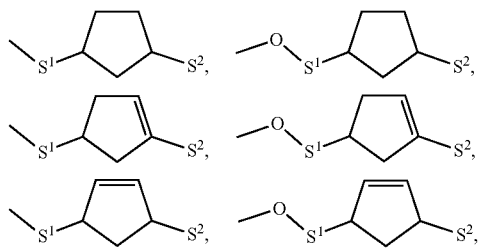

wherein S$^1$ is C$_{1-5}$-alkylene or C$_{2-5}$-alkenylene and S$^2$ is H, C$_{1-7}$-alkyl or C$_{2-7}$-alkenyl, and very preferably selected from the group consisting of

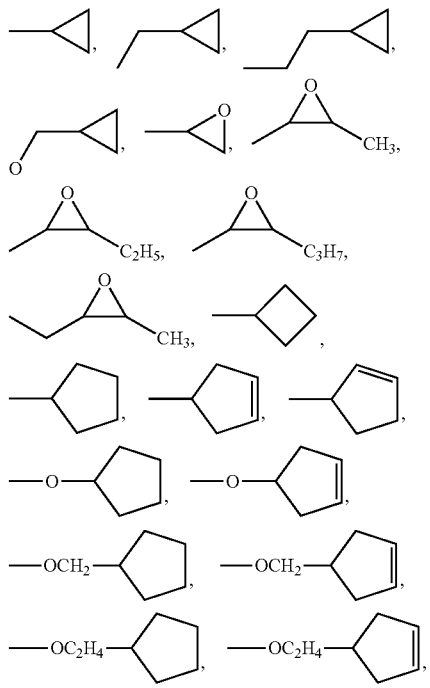

Further preferred compounds of the formulae IIA, IIB, IIC and IID are indicated below:

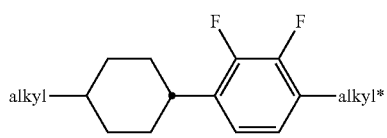
IIA-1

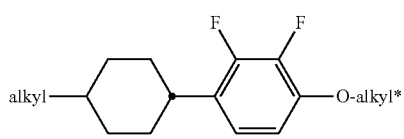
IIA-2

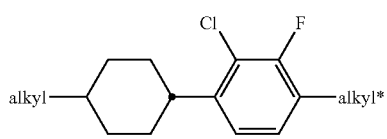
IIA-3

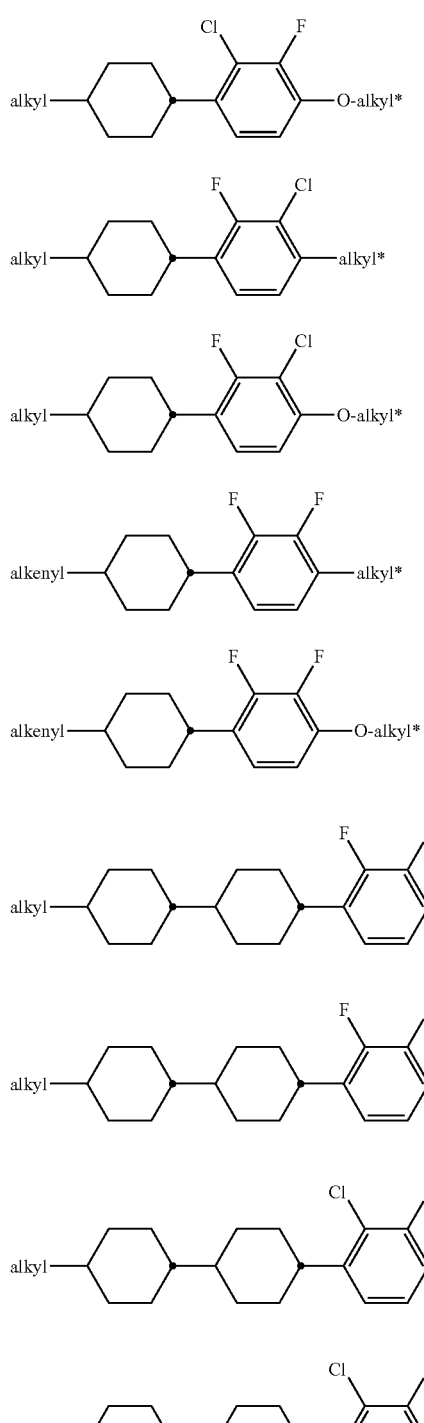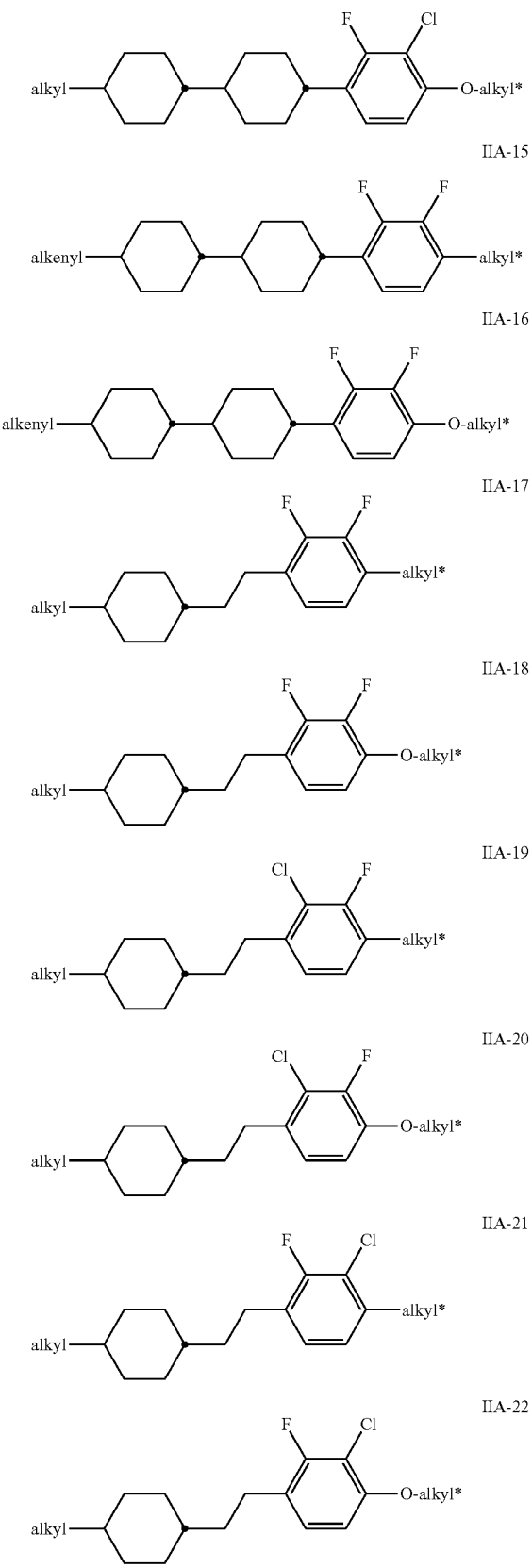

-continued
IIA-23
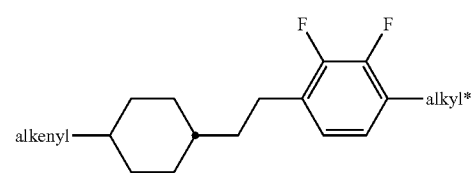
IIA-24
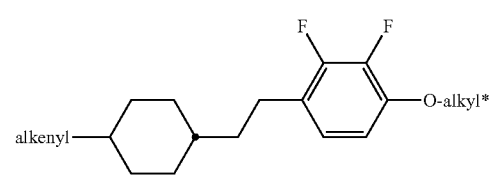
IIA-25
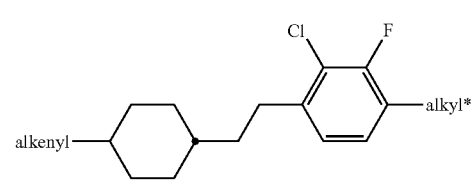
IIA-26
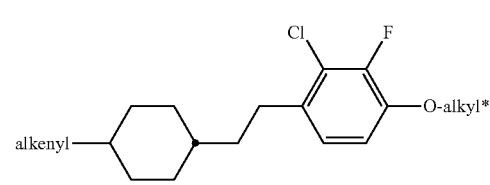
IIA-27
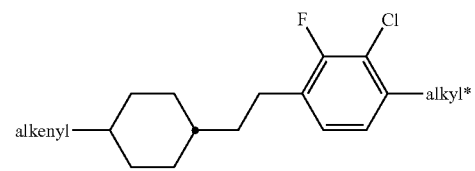
IIA-28
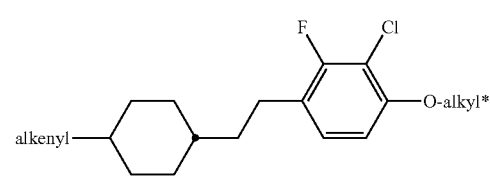
IIA-29
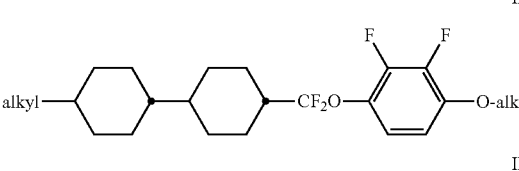
IIA-30
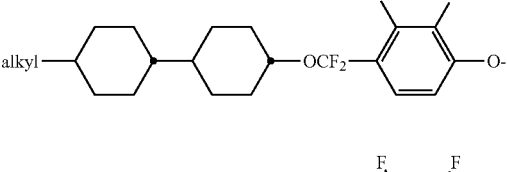
IIA-31
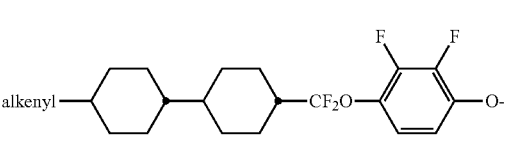
-continued
IIA-32
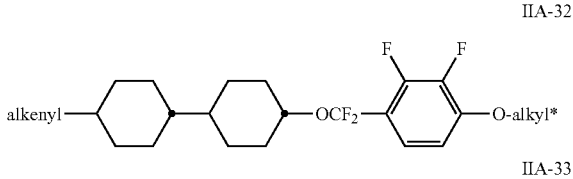
IIA-33
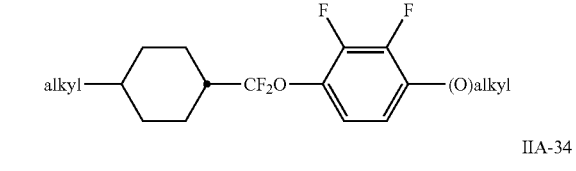
IIA-34
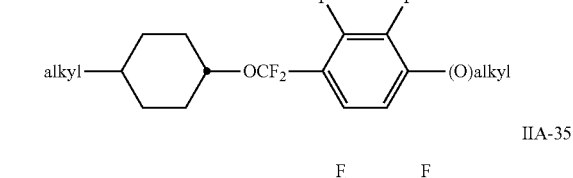
IIA-35
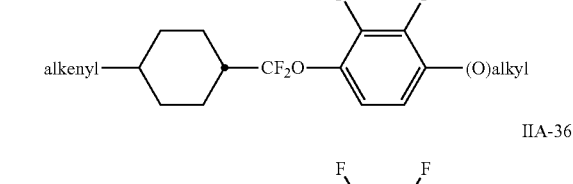
IIA-36
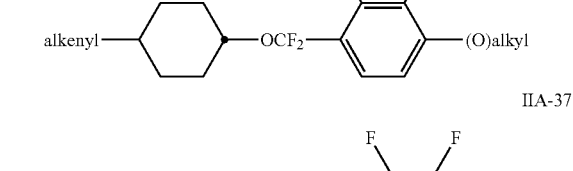
IIA-37
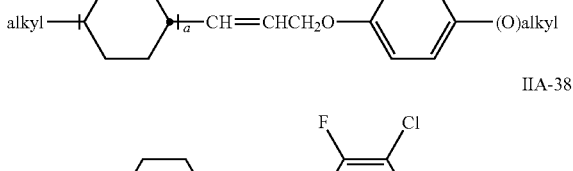
IIA-38
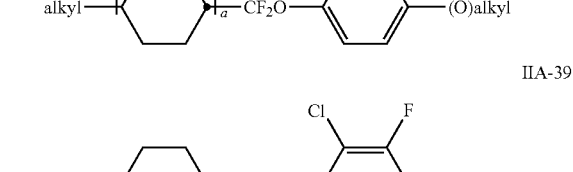
IIA-39
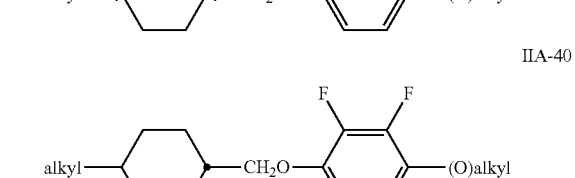
IIA-40
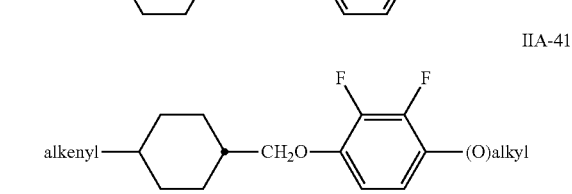
IIA-41

IIA-42
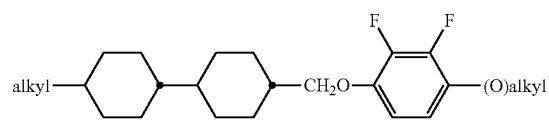
IIA-43
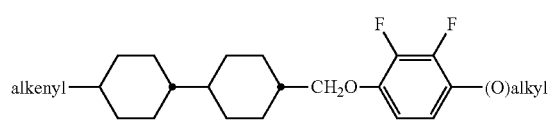
IIA-44
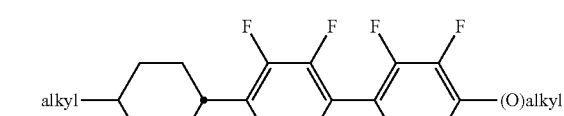
IIA-45
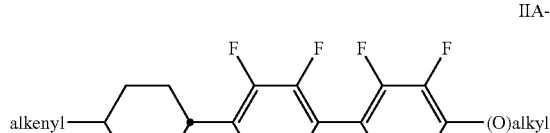
IIA-46
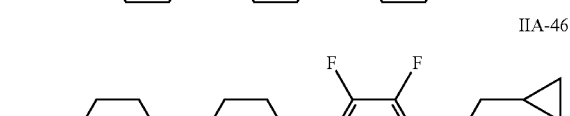
IIB-1
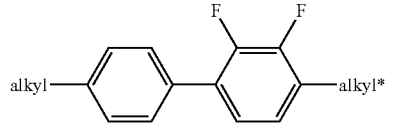
IIB-2
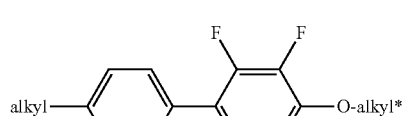
IIB-3
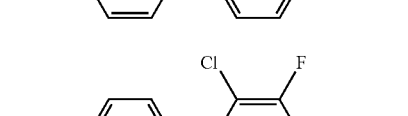
IIB-4
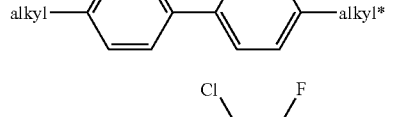
IIB-5
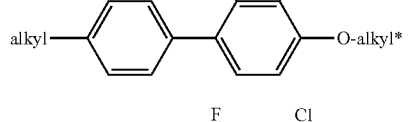
IIB-6
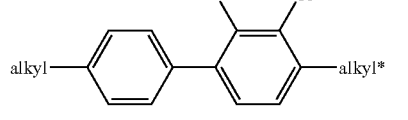
IIB-7
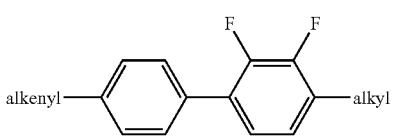
IIB-8
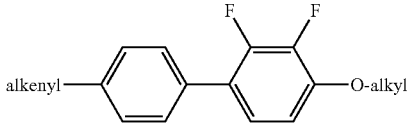
IIB-9
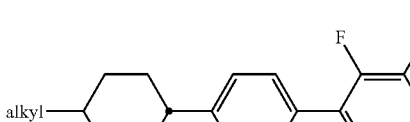
IIB-10
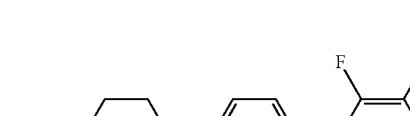
IIB-11
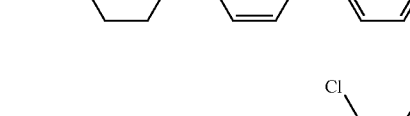
IIB-12
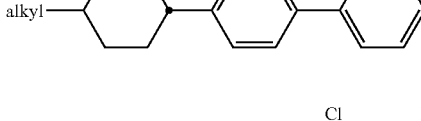
IIB-13
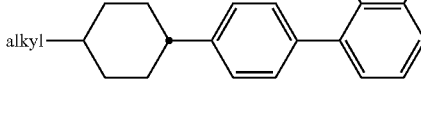
IIB-14
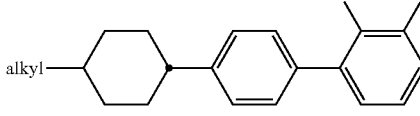
IIB-15
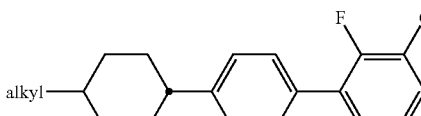
IIB-16
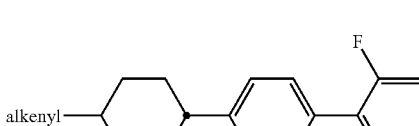
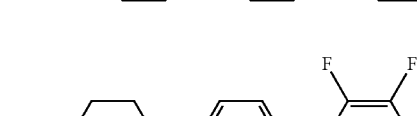

IIB-17
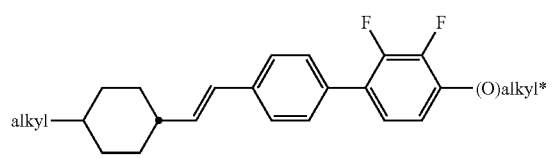

IIB-18
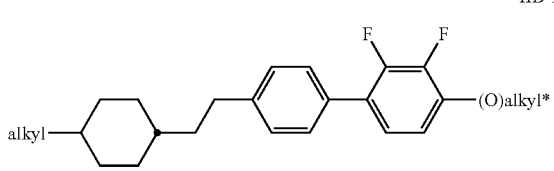

IIB-19
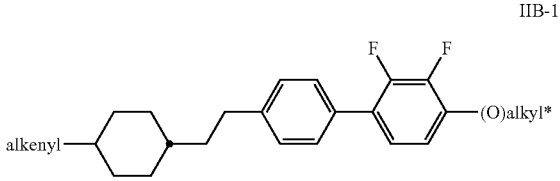

IIB-20
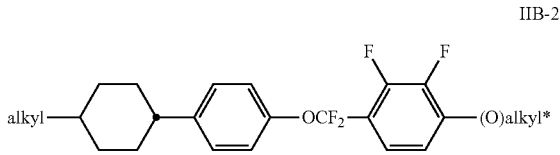

IIB-21
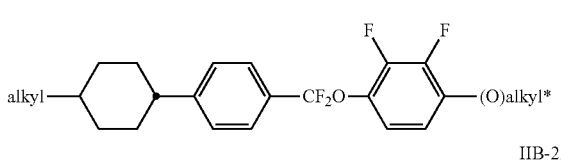

IIB-22
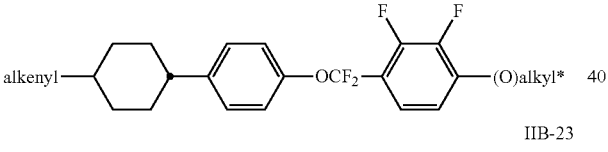

IIB-23
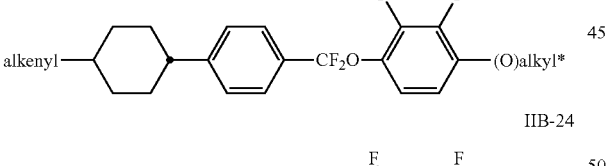

IIB-24
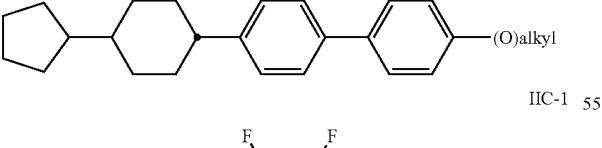

IIC-1
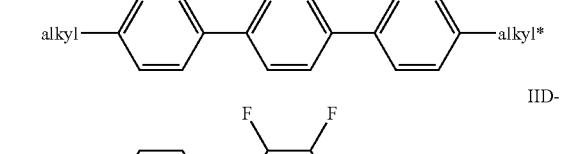

IID-1
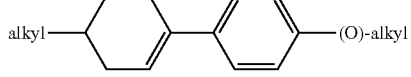

IID-2
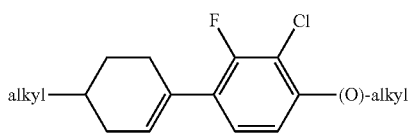

IID-3
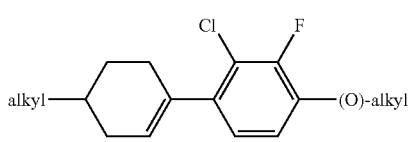

in which the parameter a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred LC media according to the invention comprise one or more compounds of the formulae IIA-2, IIA-8, IIA-10, IIA-16, II-18, IIA-40, IIA-41, IIA-42, IIA-43, IIB-2, IIB-10, IIB-16, IlC-1, and IID-4.

The proportion of compounds of the formulae IIA and/or IIB in the mixture as a whole is preferably at least 20% by weight.

In another preferred embodiment the LC medium comprises one or more compounds of formula III which are different from formula IA:

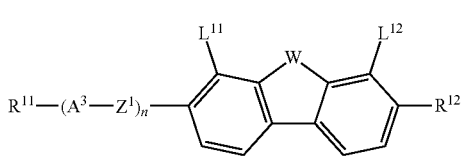

in which
$R^{11}$ and $R^{12}$ each, independently of one another, denote H, an alkyl or alkoxy radical having 1 to 15 C atoms, where one or more $CH_2$ groups in these radicals may each be replaced, independently of one another, by

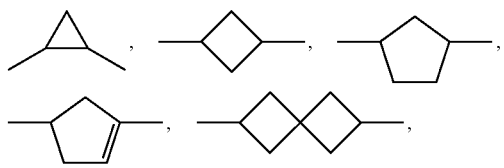

$-C\equiv C-$, $-CF_2O-$, $-OCF_2-$, $-CH=CH-$, by $-O-$, $-CO-O-$ or $-O-CO-$ in such a way that O atoms are not linked directly to one another, and in which, in addition, one or more H atoms may be replaced by halogen, $A^3$ on each occurrence, independently of one another, denotes a) 1,4-cyclohexenylene or 1,4-cyclohexylene radical, in which one or two non-adjacent $CH_2$ groups may be replaced by $-O-$ or $-S-$, b) a 1,4-phenylene radical, in which one or two CH groups may be replaced by N, or c) a radical selected from the group consisting of spiro [3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, preferably 0 or 1, $Z^1$ on each occurrence independently of one another denotes —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, and $L^{11}$ and $L^{12}$ each, independently of one another, denote F, Cl, CF$_3$ or CHF$_2$, preferably H or F, most preferably F, and W denotes O or S.

In a preferred embodiment of the present invention the LC medium comprises one or more compounds of the formula III-1 and/or III-2

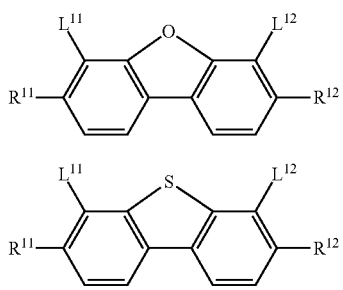

in which the occurring groups have the same meanings as given under formula III above and preferably $R^{11}$ and $R^{12}$ each, independently of one another, an alkyl, alkenyl or alkoxy radical having up to 15 C atoms, more preferably one or both of them denote an alkoxy radical and $L^{11}$ and $L^{12}$ each preferably denote F.

In another preferred embodiment the LC medium comprises one or more compounds of the formula III-1 selected from the group of compounds of formulae III-1-1 to III-1-10, preferably of formula III-1-6,

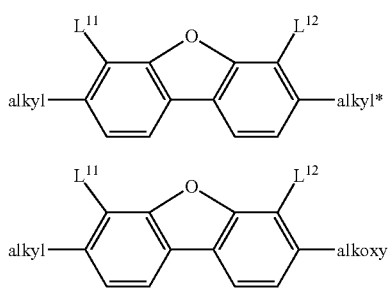

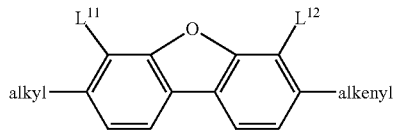

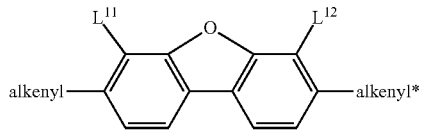

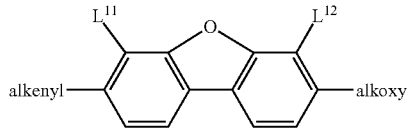

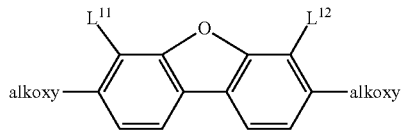

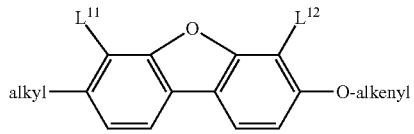

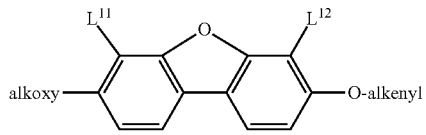

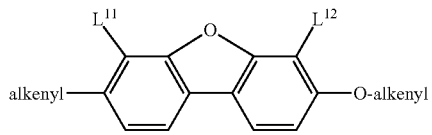

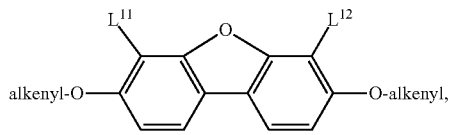

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

In another preferred embodiment the LC medium comprises one or more compounds of the formula III-2 selected from the group of compounds of formulae III-2-1 to III-2-10, preferably of formula III-2-6,

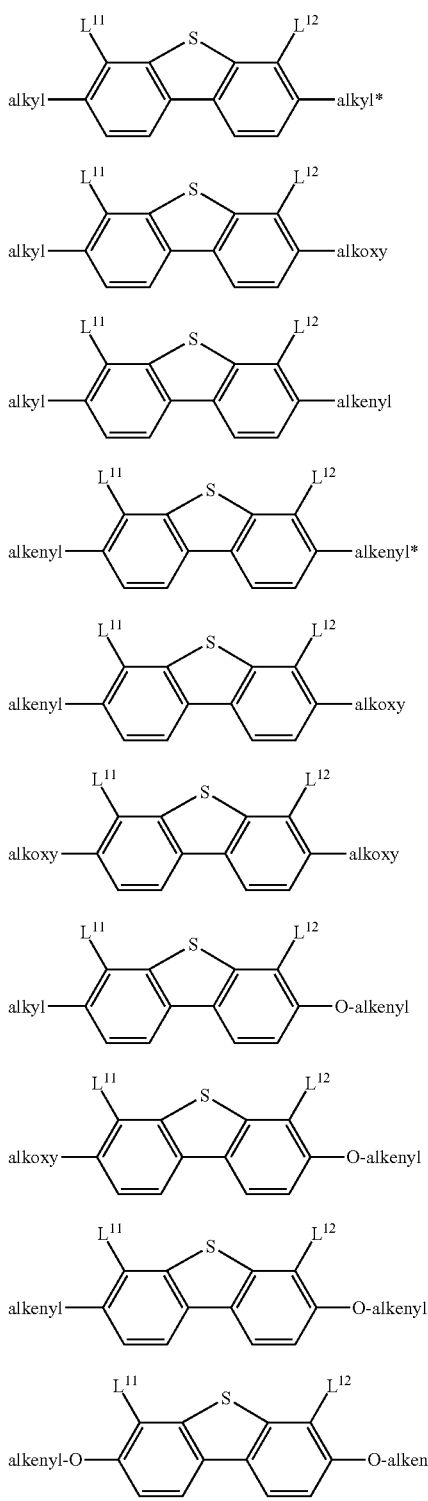

III-2-1
III-2-2
III-2-3
III-2-4
III-2-5
III-2-6
III-2-7
III-2-8
III-2-9
III-2-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl, preferably both F.

In another preferred embodiment of the present invention the LC medium comprises one or more compounds of the formula III-3-1 and/or III-3-2

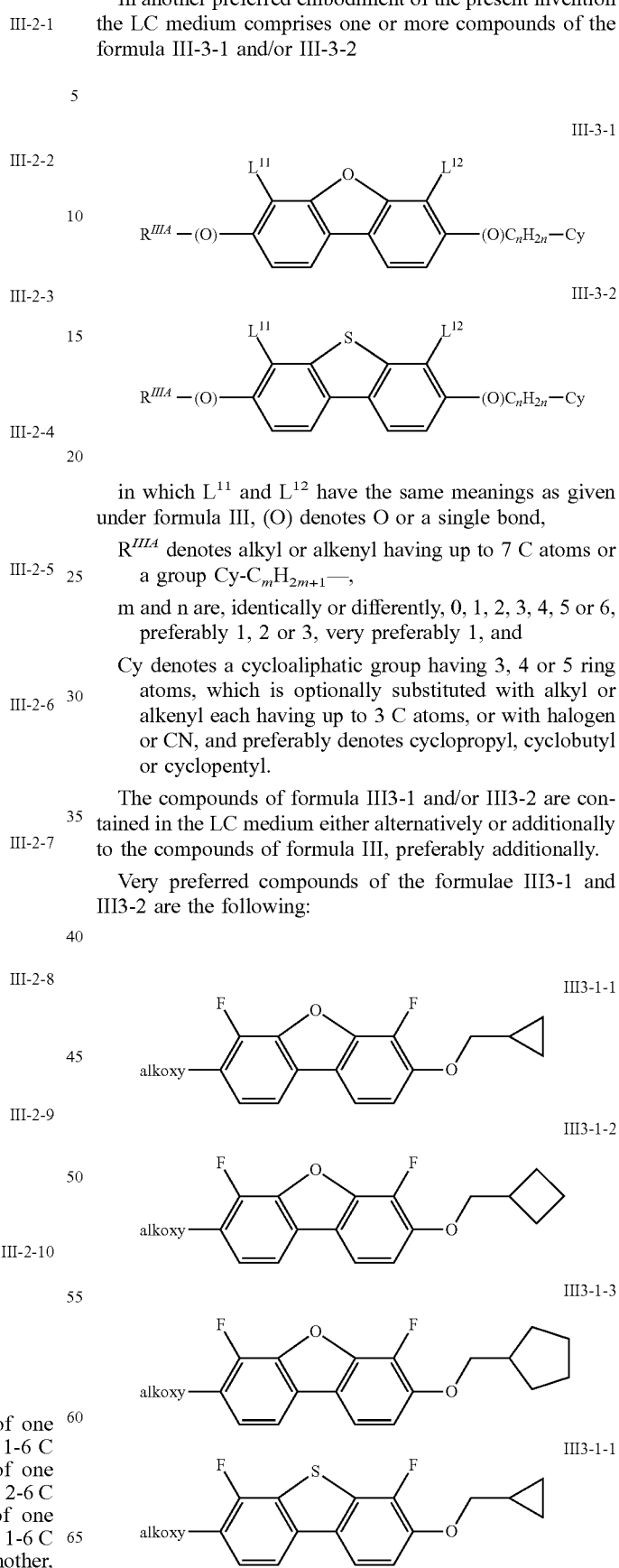

in which $L^{11}$ and $L^{12}$ have the same meanings as given under formula III, (O) denotes O or a single bond, $R^{IIIA}$ denotes alkyl or alkenyl having up to 7 C atoms or a group $Cy\text{-}C_mH_{2m+1}\text{—}$, m and n are, identically or differently, 0, 1, 2, 3, 4, 5 or 6, preferably 1, 2 or 3, very preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula III3-1 and/or III3-2 are contained in the LC medium either alternatively or additionally to the compounds of formula III, preferably additionally.

Very preferred compounds of the formulae III3-1 and III3-2 are the following:

III3-1-2
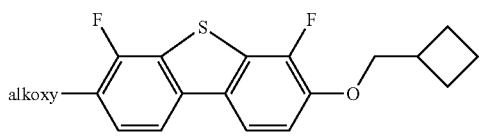

III3-1-3
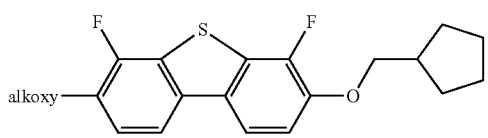

in which alkoxy denotes a straight-chain alkoxy radical having 1-6 C atoms.

In another preferred embodiment of the present invention, the LC medium comprises one or more compounds of the formulae III-4 to III-6, preferably of formula III-5, III-4
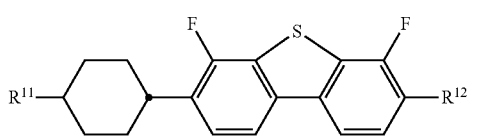

III-5
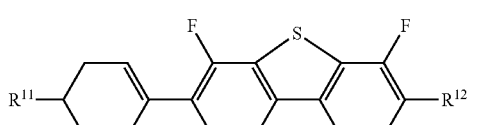

III-6
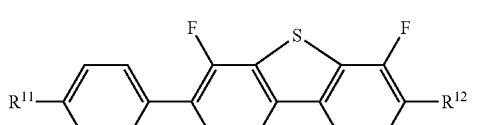

in which the parameters have the meanings given above, $R^{11}$ preferably denotes straight-chain alkyl and $R^{12}$ preferably denotes alkoxy, each having 1 to 7 C atoms.

In another preferred embodiment the LC medium comprises one or more compounds of the formula I selected from the group of compounds of formulae III-7 to III-9, preferably of formula III-8, III-7
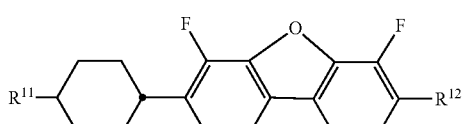

III-8
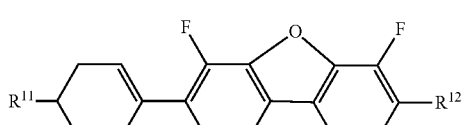

III-9
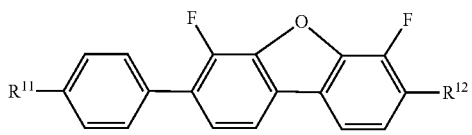

in which the parameters have the meanings given above, $R^{11}$ preferably denotes straight-chain alkyl and $R^{12}$ preferably denotes alkoxy each having 1 to 7 C atoms.

In a preferred embodiment, the medium comprises one or more compounds of the formula IV, IV
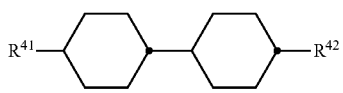

in which
$R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and
$R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4, IV-1
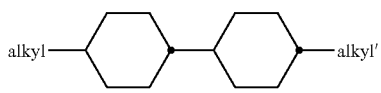

IV-2
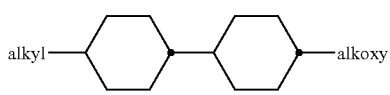

IV-3
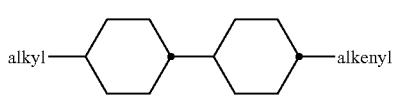

IV-4
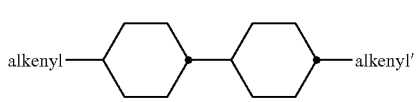

in which
alkyl and alkyl', independently of one another, denote alkyl having 1 to 7 C atoms, preferably having 2 to 5 C atoms,
alkenyl denotes an alkenyl radical having 2 to 5 C atoms, preferably having 2 to 4 C atoms, particularly preferably 2 C atoms,
alkenyl' denotes an alkenyl radical having 2 to 5 C atoms, preferably having 2 to 4 C atoms, particularly preferably having 2 to 3 C atoms, and
alkoxy denotes alkoxy having 1 to 5 C atoms, preferably having 2 to 4 C atoms.

Preferably, the LC medium comprises one or more compounds selected from the compounds of the formulae IV-1-1 to IV-1-4

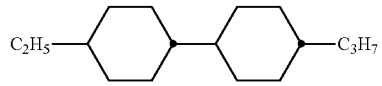
IV-1-1

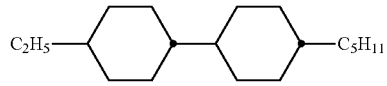
IV-1-2

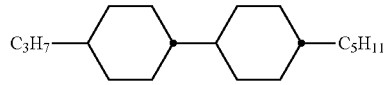
IV-1-3

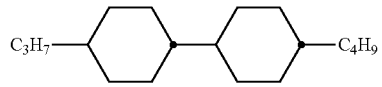
IV-1-4

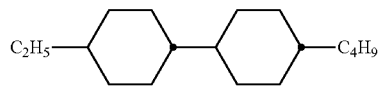
IV-1-5

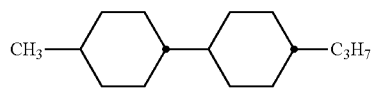
IV-1-6

Very preferably, the LC medium according to the invention comprises one or more compounds of the formulae IV-2-1 and/or IV-2-2

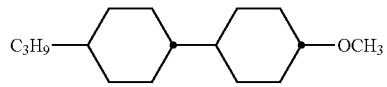
IV-2-1

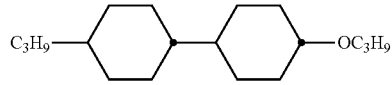
IV-2-2

Very preferably, the LC medium according to the invention comprises a compound of formula IV-3, in particular selected from the compounds of the formulae IV-3-1 to IV-3-4

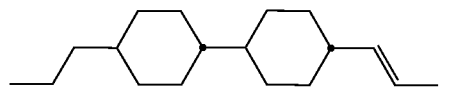
IV-3-1

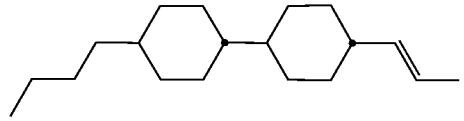
IV-3-2

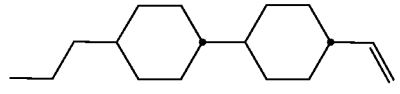
IV-3-3

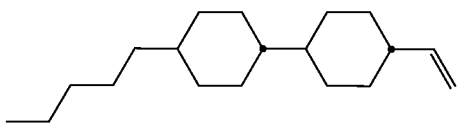
IV-3-4

Very preferably, the LC medium according to the invention comprises a compound of formula IV-4, in particular selected from the compounds of the formulae IV-4-1 and IV-4-2

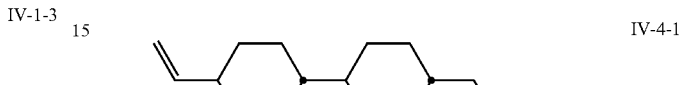
IV-4-1

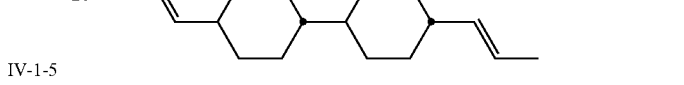
IV-4-2

The LC medium preferably additionally comprises one or more compounds of the formula IVa,

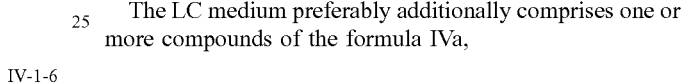
IVa in which
$R^{41}$ and $R^{42}$ each, independently of one another, denote a straight-chain alkyl, alkoxy, alkenyl, alkoxyalkyl or alkoxy radical having up to 12 C atoms, and

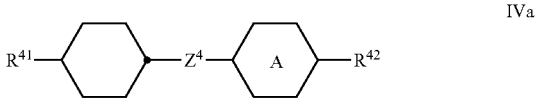

denotes

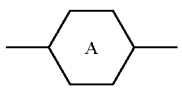,

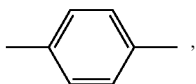,

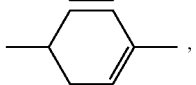,

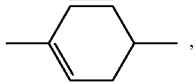 or 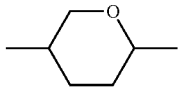, $Z^4$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_8$— or —CF=CF—.

Preferred compounds of the formula Va are indicated below:

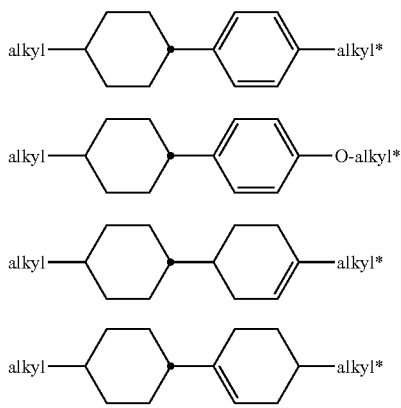

IVa-1
IVa-2
IVa-3
IVa-4 in which alkyl and alkyl* each, independently of one another, denote a straight-chain alkyl radical having 1 to 6 C atoms.

The LC medium according to the invention preferably comprises at least one compound of the formula IVa-1 and/or formula IVa-2.

The proportion of compounds of the formula Va in the mixture as a whole is preferably at least 5% by weight Preferably, the LC medium comprises one or more compounds of formula IVb-1 to IVb-3

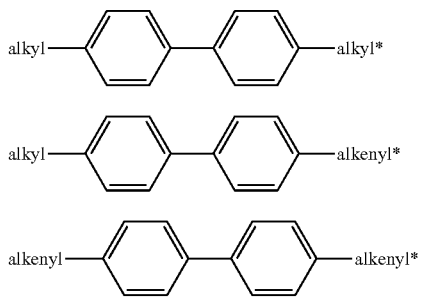

IVb-1
IVb-2
IVb-3 in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

The proportion of the biphenyls of the formulae IV-1 to IV-3 in the mixture as a whole is preferably at least 3% by weight, in particular ≥5% by weight.

Of the compounds of the formulae IVb-1 to IVb-3, the compounds of the formula IVb-2 are particularly preferred.

Particularly preferred biphenyls are

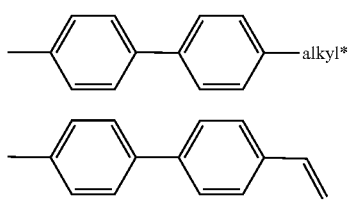

IVb-1-1
IVb-2-1

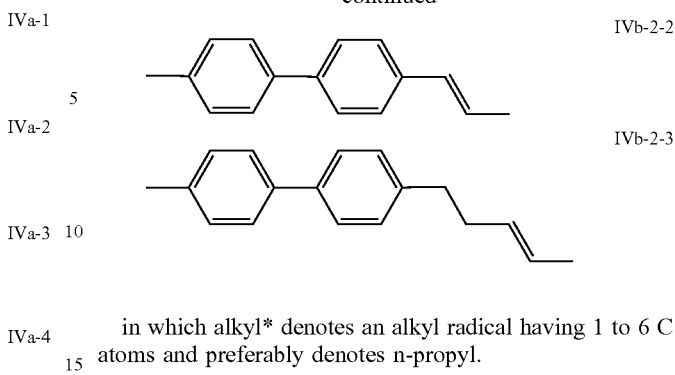

IVb-2-2
IVb-2-3 in which alkyl* denotes an alkyl radical having 1 to 6 C atoms and preferably denotes n-propyl.

The LC medium according to the invention particularly preferably comprises one or more compounds of the formulae IVb-1-1 and/or IVb-2-3.

In a preferred embodiment, the LC medium comprises one or more compounds of formula V

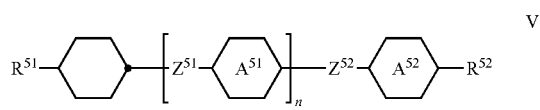

V in which
$R^{51}$ and $R^{52}$ independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

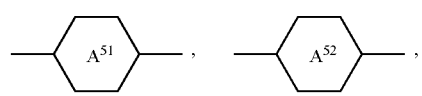

identically or differently, denote

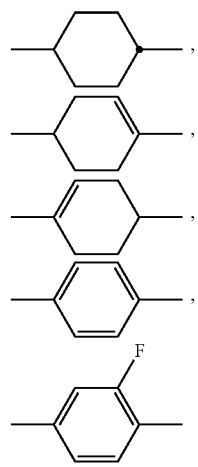

or

-continued

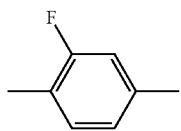

in which

preferably denotes

$Z^{51}$, $Z^{52}$ each, independently of one another, denote —CH$_2$—CH$_2$—, —CH$_2$—O—, —CH=CH—, —C≡C—, —COO— or a single bond, preferably —CH$_2$—CH$_2$—, —CH$_2$—O— or a single bond and particularly preferably a single bond, and
n is 1 or 2.

The compounds of formula V are preferably selected from the compounds of the formulae V-1 to V-16:

V-1
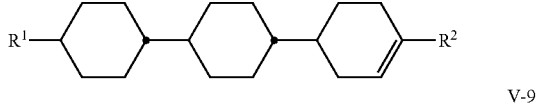

V-2
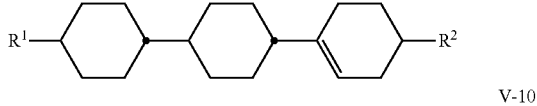

V-3
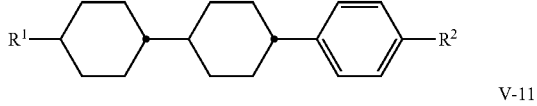

V-4
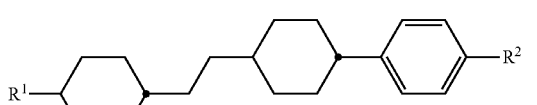

V-5
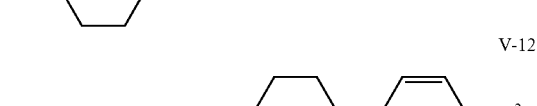

V-6
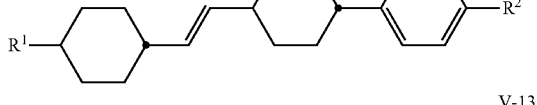

V-7
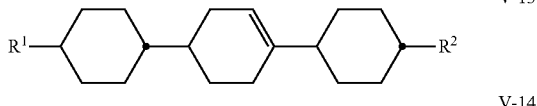

V-8
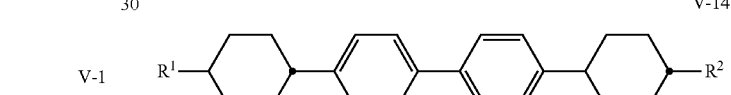

V-9

V-10
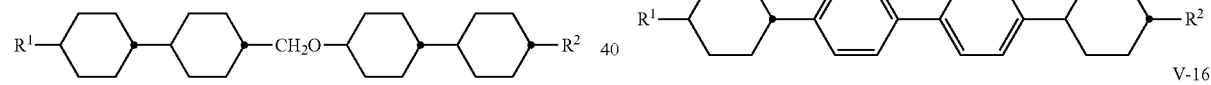

V-11

V-12
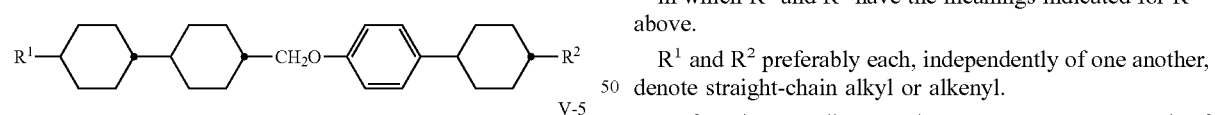

V-13
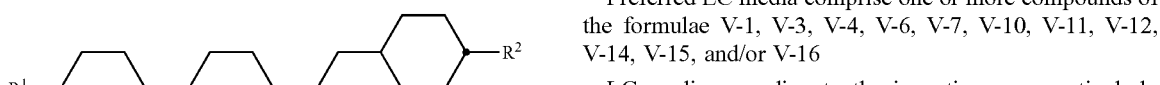

V-14
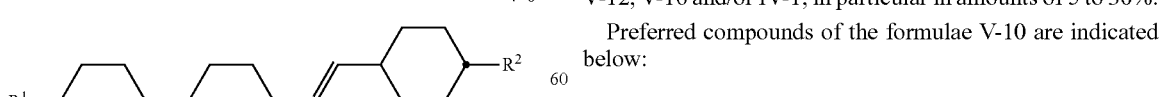

V-15
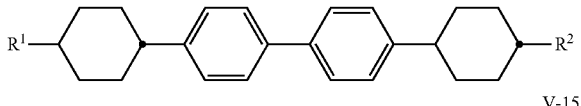

V-16
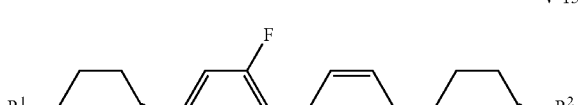

in which $R^1$ and $R^2$ have the meanings indicated for $R^{2A}$ above.

$R^1$ and $R^2$ preferably each, independently of one another, denote straight-chain alkyl or alkenyl.

Preferred LC media comprise one or more compounds of the formulae V-1, V-3, V-4, V-6, V-7, V-10, V-11, V-12, V-14, V-15, and/or V-16

LC media according to the invention very particularly preferably comprise the compounds of the formula V-10, V-12, V-16 and/or IV-1, in particular in amounts of 5 to 30%.

Preferred compounds of the formulae V-10 are indicated below:

V-10a
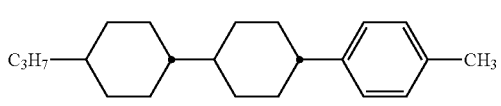

V-10b

V-10c

The LC medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Very particularly preferred LC media comprise compounds V-10a and IV-1-1:

V-10a

IV-1-1

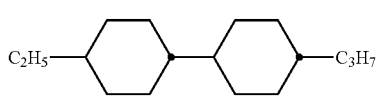

The compounds V-10a and IV-1-1 are preferably present in the mixture in a concentration of 15 to 35%, particularly preferably 15 to 25% and especially preferably 18 to 22%, based on the mixture as a whole.

Very particularly preferred LC media comprise the compounds V-10b and IV-1-1:

V-10b

IV-1-1

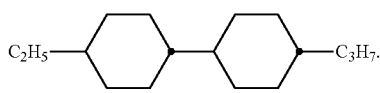

The compounds V-10b and IV-1-1 are preferably present in the mixture in a concentration of 15 to 35%, particularly preferably 15 to 25% and especially preferably 18 to 22%, based on the mixture as a whole.

Very particularly preferred LC media comprise the following three compounds:

V-10a

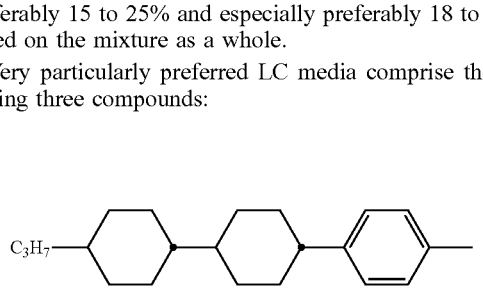

V-10b

IV-1-1

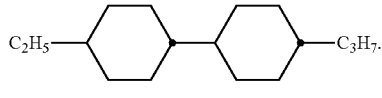

The compounds V-10a, V-10b and IV-1-1 are preferably present in the mixture in a concentration of 15 to 35%, particularly preferably 15 to 25% and especially preferably 18 to 22%, based on the mixture as a whole.

Preferred LC media comprise at least one compound selected from the group of the compounds

V-6

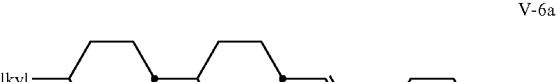

V-7

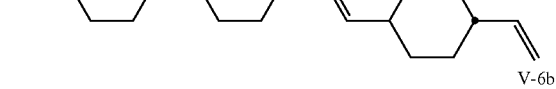

IV-1

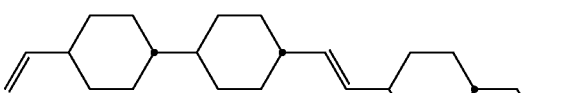

in which $R^{41}$ and $R^{42}$, and $R^{51}$ and $R^{52}$ have the meanings indicated above. Preferably in the compounds V-6, V-7 and IV-1, $R^{41}$ and $R^{51}$ denotes alkyl or alkenyl having 1 to 6 or 2 to 6 C atoms, respectively, and $R^{42}$ and $R^{52}$ denotes alkenyl having 2 to 6 C atoms.

Preferred LC media comprise at least one compound of the formulae V-6a, V-6b, V-7a, V-7b, IV-4-1, IV-4-2, IV-3a and IV-3b:

V-6a

V-6b

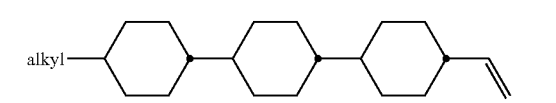

V-7a

V-7b

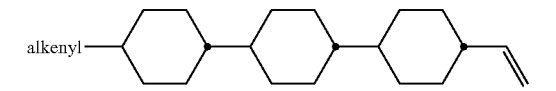

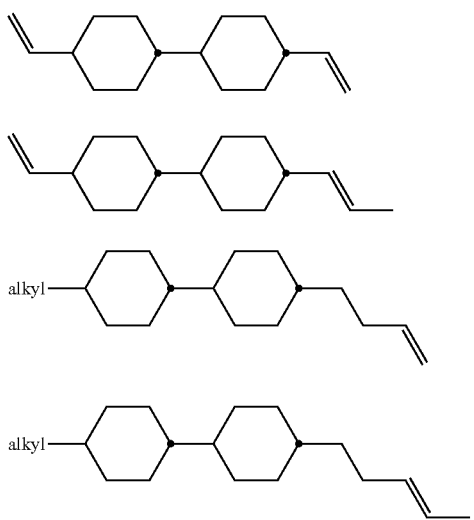

IV-4-1
IV-4-2
IV-3a
IV-3b in which alkyl denotes an alkyl radical having 1 to 6 C atoms and alkenyl denotes an alkenyl radical having 2 to 6 C atoms.

The compounds of the formulae V-6a, V-6b, V-7a, V-7b, IV-4-1, IV-4-2, IV-3a and IV-3b are preferably present in the LC media according to the invention in amounts of 1 to 40% by weight, preferably 5 to 35% by weight and very particularly preferably 10 to 30% by weight.

In a preferred embodiment of the present invention the LC medium additionally comprises one or more compounds of the formulae VI-1 to VI-9

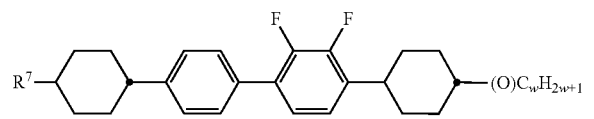

VI-1

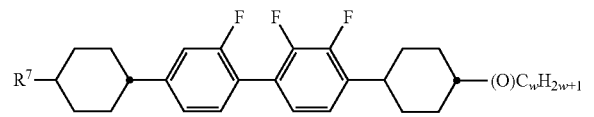

VI-2

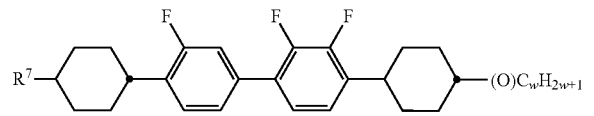

VI-3

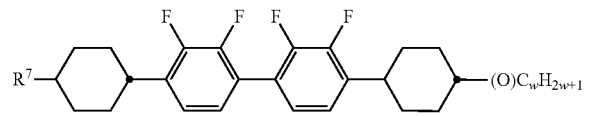

VI-4

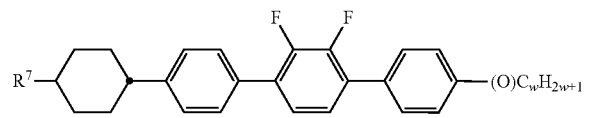

VI-5

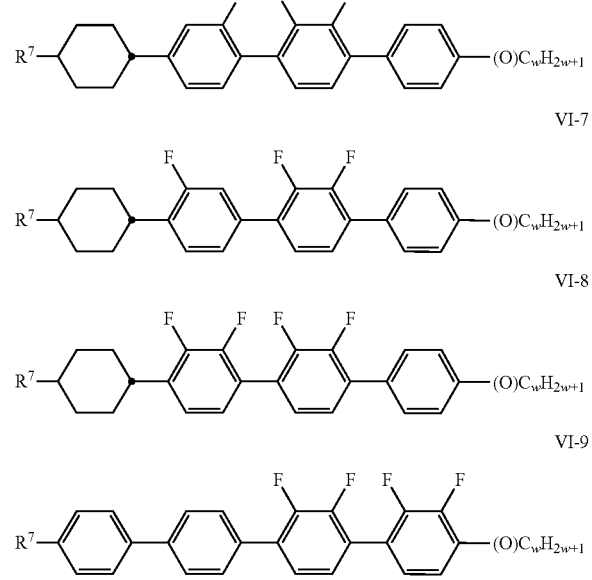

VI-6
VI-7
VI-8
VI-9 in which $R^7$ each, independently of one another, have one of the meanings indicated for $R^{2A}$ in formula IIA, and w and x each, independently of one another, denote 1 to 6.

Particular preference is given to LC media comprising at least one compound of the formula V-9.

In a preferred embodiment of the present invention the LC medium additionally comprises one or more compounds of the formulae VII-1 to VII-25,

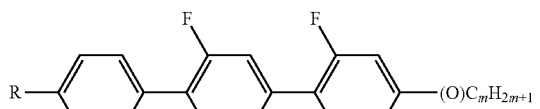

VII-1

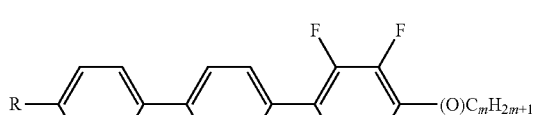

VII-2

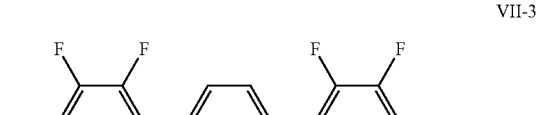

VII-3

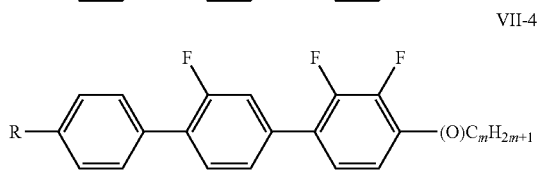

VII-4

VII-5
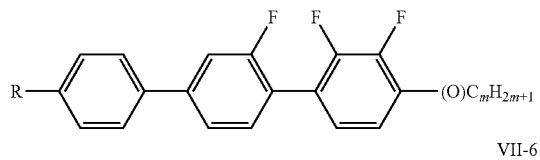
VII-6
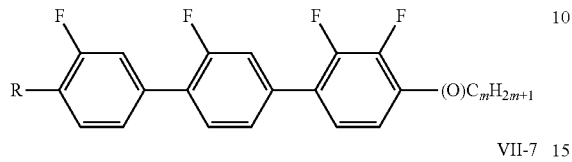
VII-7
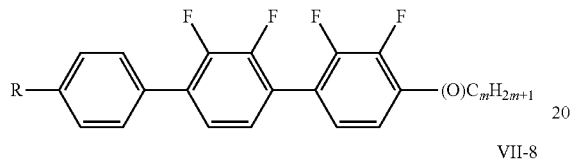
VII-8
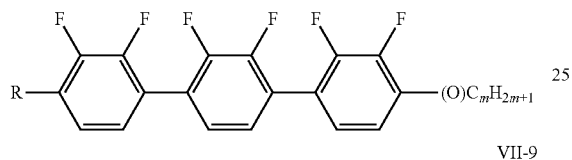
VII-9
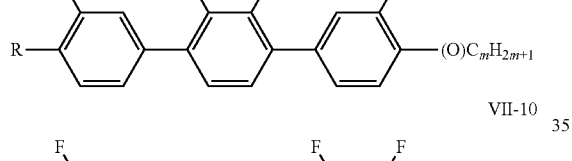
VII-10
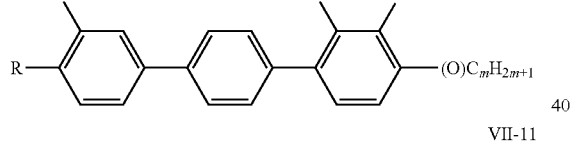
VII-11
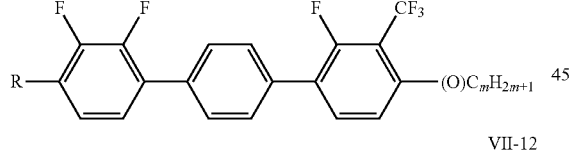
VII-12
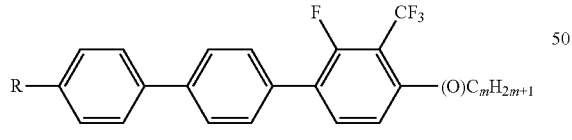
VII-13
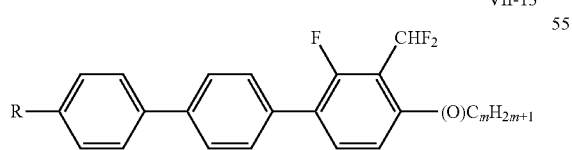
VII-14
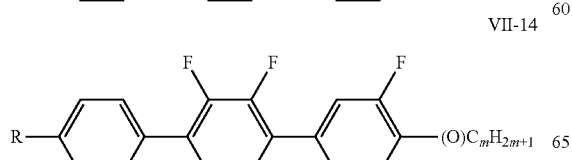
VII-15
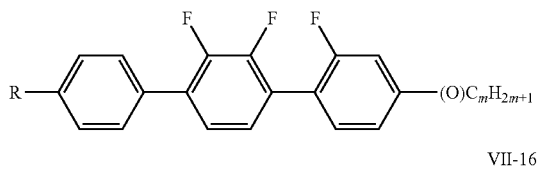
VII-16
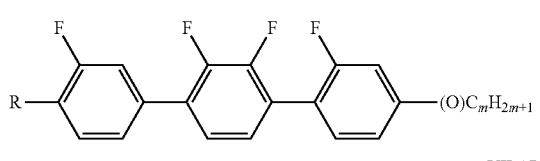
VII-17
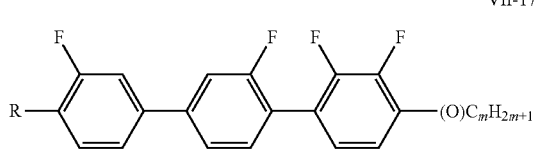
VII-18
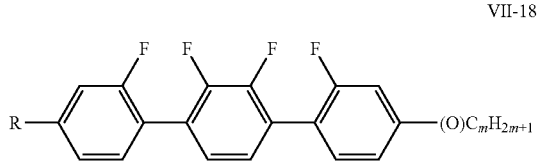
VII-19
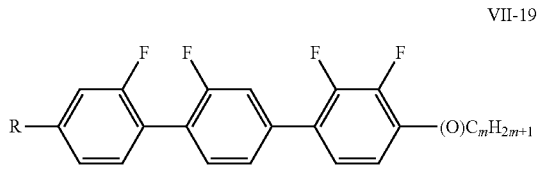
VII-20
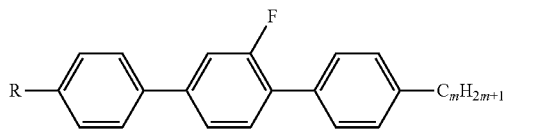
VII-21
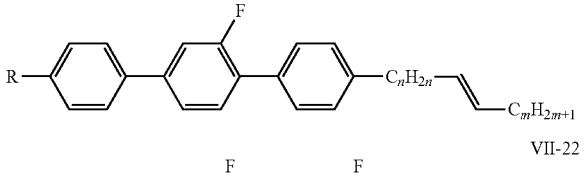
VII-22
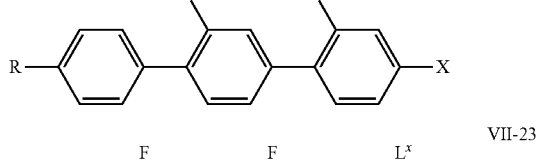
VII-23
VII-24
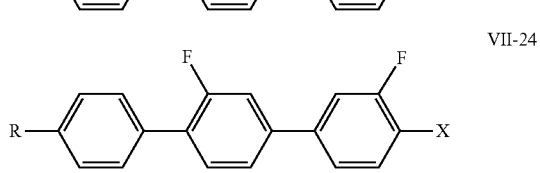

VII-25

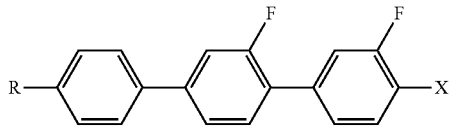

in which

R denotes a straight-chain alkyl or alkoxy radical having 1 to 6 C atoms, (O) denotes —O— or a single bond, X denotes F, Cl, OCF$_3$ or OCHF$_2$, L$^x$ denotes H or F, m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

X preferably denotes F or OCH$_3$, very preferably F.

The LC medium according to the invention preferably comprises the terphenyls of the formulae VII-1 to VII-25 in amounts of 2 to 30% by weight, in particular 5 to 20% by weight.

Particular preference is given to compounds of the formulae VII-1, VII-2, VII-4, VII-20, VII-21, and VII-22 wherein X denotes F. In these compounds, R preferably denotes alkyl, furthermore alkoxy, each having 1 to 5 C atoms. In the compounds of the formula VII-20, R preferably denotes alkyl or alkenyl, in particular alkyl. In the compounds of the formula VII-21, R preferably denotes alkyl. In the compounds of the formulae VII-22 to VII-25, X preferably denotes F.

The terphenyls of formula VII-1 to VII-25 are preferably employed in the LC media according to the invention if the Δn value of the mixture is to be ≥0.1. Preferred LC media comprise 2 to 20% by weight of one or more terphenyl compounds selected from the group of the compounds of formulae VII-1 to VII-25.

Further preferred embodiments are listed below:

a) LC medium comprising at least one compound of the formulae Z-1 to Z-7,

Z-1
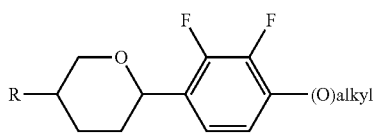

Z-2
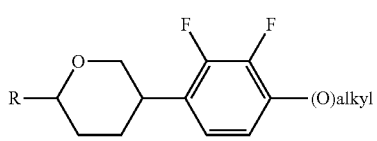

Z-3
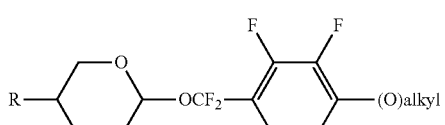

Z-4
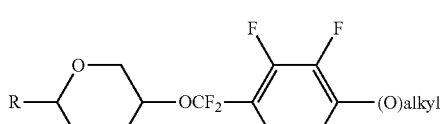

Z-5
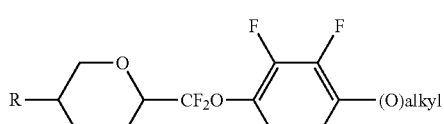

Z-6
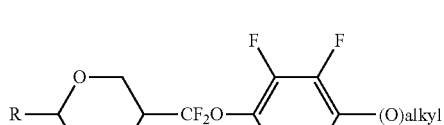

Z-7
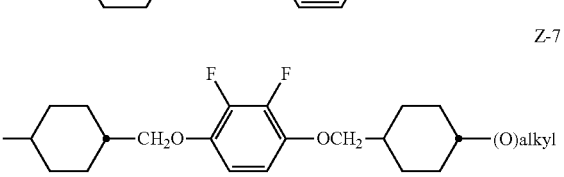

in which R, (O) and alkyl have the meanings indicated above for formula III.

b) Preferred LC media according to the invention comprise one or more substances which contain a tetrahydronaphthyl or naphthyl unit, such as, for example, the compounds of the formulae N-1 to N-5, N-1
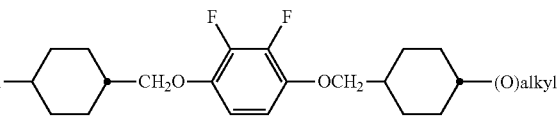

N-2
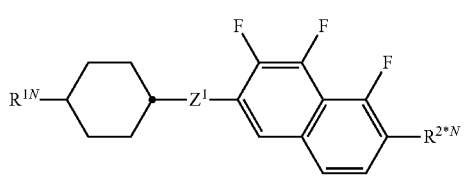

N-3
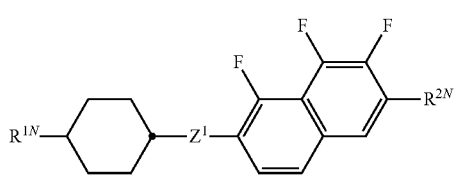

N-4
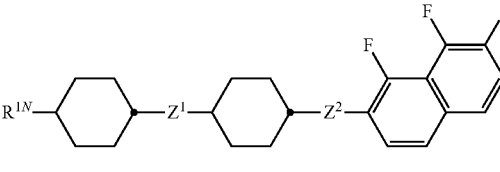

N-5
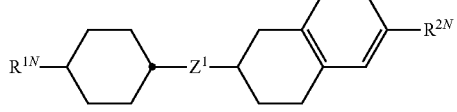

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

c) Preferred LC media comprise one or more compounds selected from the group of the difluorodibenzochroman compounds of the formula BC, chromans of the formula CR, and fluorinated phenanthrenes of the formulae PH-1 and PH-2,

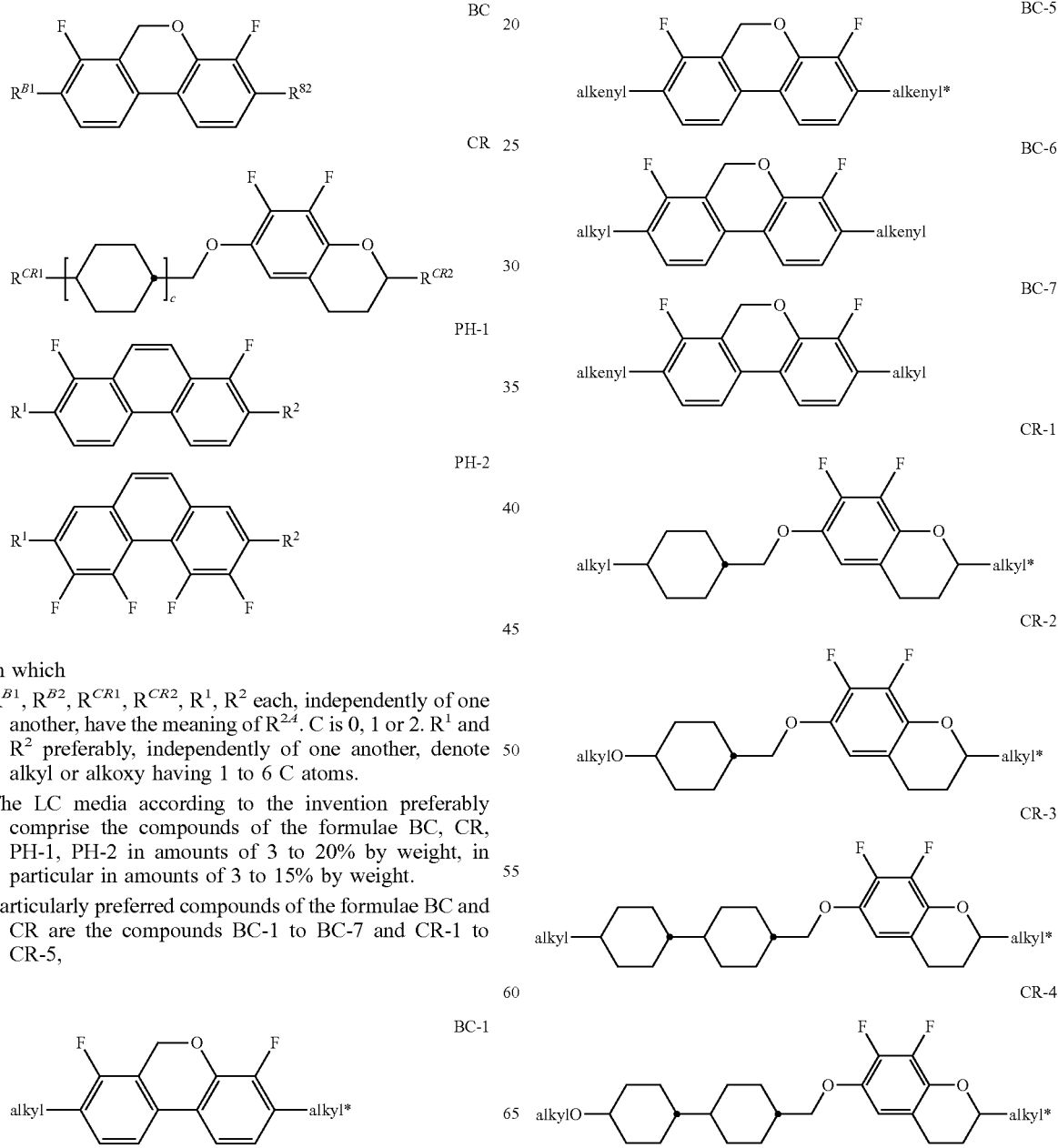

in which $R^{B1}$, $R^{B2}$, $R^{CR1}$, $R^{CR2}$, $R^1$, $R^2$ each, independently of one another, have the meaning of $R^{2A}$. C is 0, 1 or 2. $R^1$ and $R^2$ preferably, independently of one another, denote alkyl or alkoxy having 1 to 6 C atoms.

The LC media according to the invention preferably comprise the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

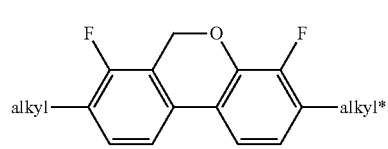

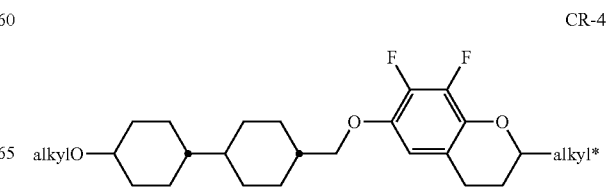

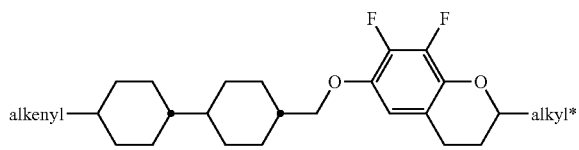
CR-5 in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

Very particular preference is given to LC media comprising one, two or three compounds of the formula BC-2, BF-1 and/or BF-2.

d) Preferred LC media comprise one or more indane compounds of the formula In,

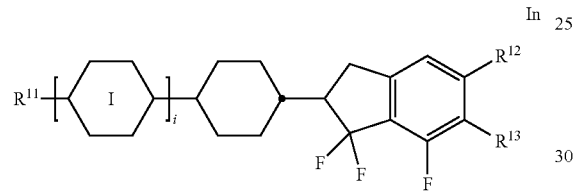
In in which
$R^{11}$, $R^{12}$, $R^{13}$ each, independently of one another, denote a straight-chain alkyl, alkoxy, alkoxyalkyl or alkenyl radical having 1 to 6 C atoms,
$R^{12}$ and $R^{13}$ additionally denote halogen, preferably F,

denotes

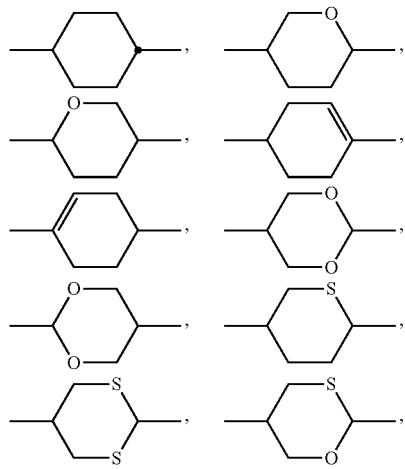

i denotes 0, 1 or 2.

Preferred compounds of the formula In are the compounds of the formulae In-1 to In-16 indicated below:

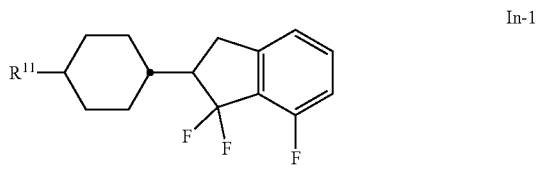
In-1

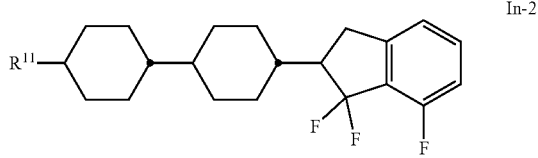
In-2

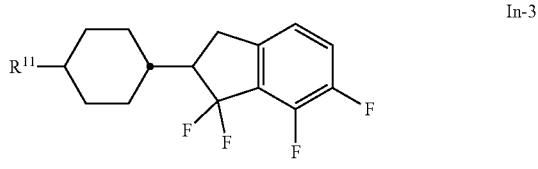
In-3

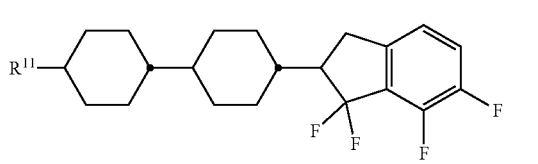
In-4

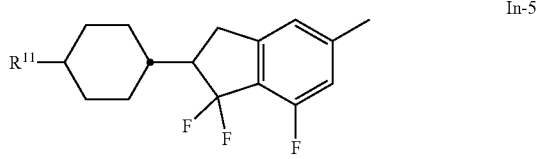
In-5

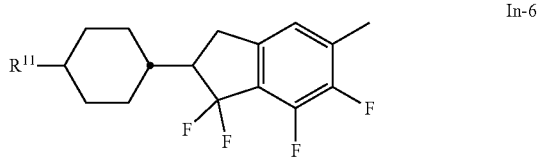
In-6

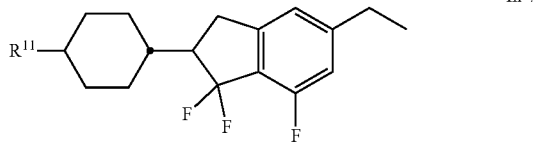
In-7

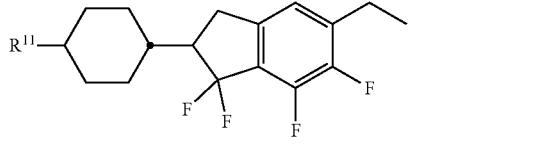
In-8

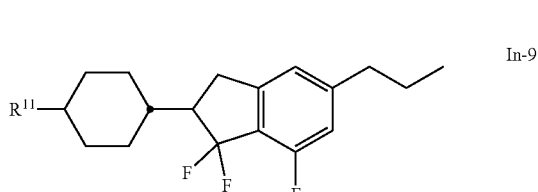
In-9

-continued

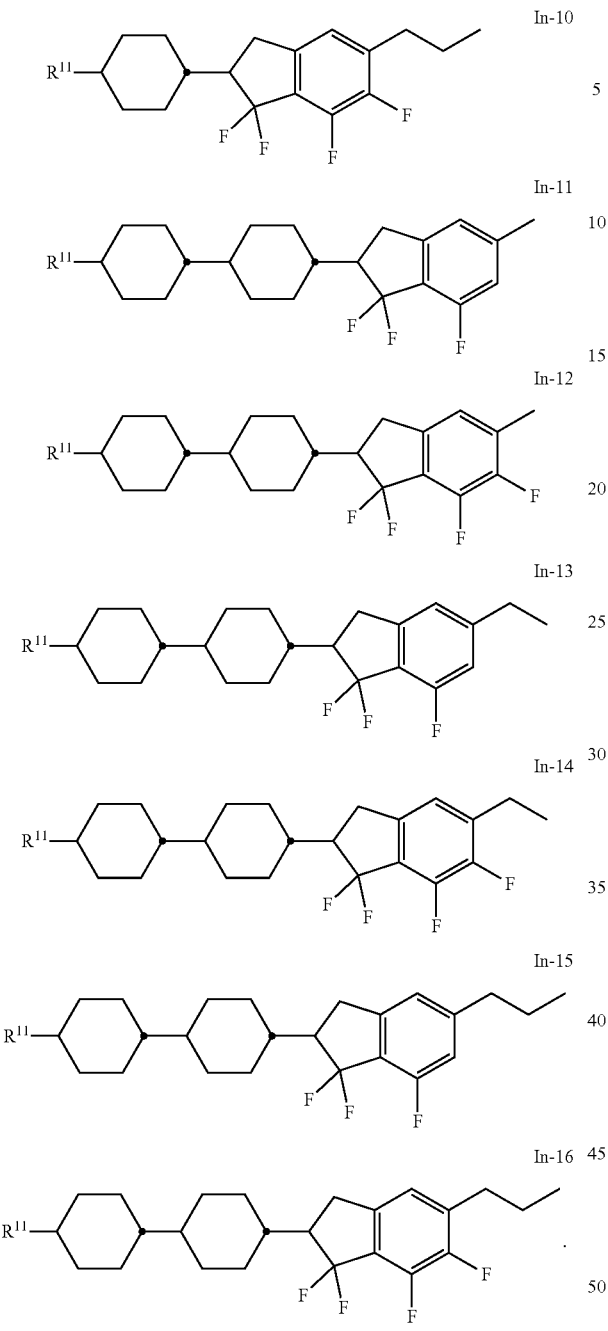

Particular preference is given to the compounds of the formulae In-1, In-2, In-3 and In-4.

The compounds of the formula In and the sub-formulae In-1 to In-16 are preferably employed in the LC media according to the invention in concentrations ≥5% by weight, in particular 5 to 30% by weight and very particularly preferably 5 to 25% by weight.

e) Preferred LC media additionally comprise one or more compounds of the formulae L-1 to L-5,

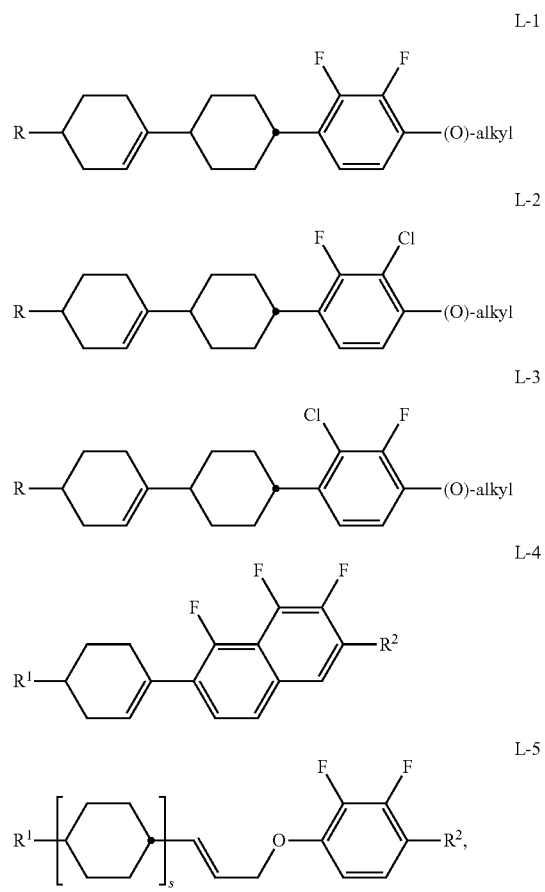

in which

R and $R^1$ each, independently of one another, have the meanings indicated for $R^{2A}$ in formula IIA above, and alkyl denotes an alkyl radical having 1 to 6 C atoms. The parameter s denotes 1 or 2.

The compounds of the formulae L-1 to L-5 are preferably employed in concentrations of 5 to 50% by weight, in particular 5 to 40% by weight and very particularly preferably 10 to 40% by weight.

f) Preferred LC media additionally comprise one or more compounds of formula IIA-Y

in which $R^{11}$ and $R^{12}$ have one of the meanings given for $R^{2A}$ in formula IA above, and $L^1$ and $L^2$, identically or differently, denote F or Cl.

Preferred compounds of the formula IIA-Y are selected from the group consisting of the following subformulae

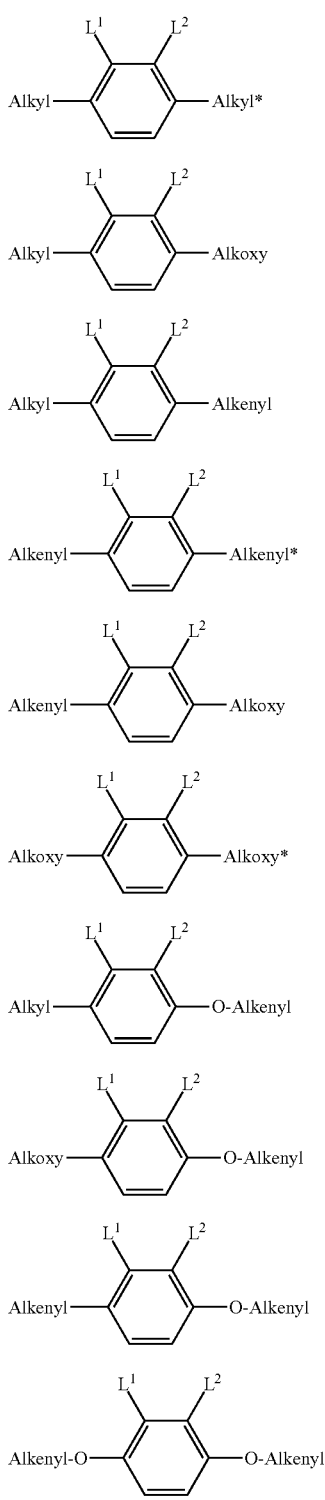

| | |
|---|---|
| Alkyl—⌬—Alkyl* (L¹,L²) | IIA-Y1 |
| Alkyl—⌬—Alkoxy | IIA-Y2 |
| Alkyl—⌬—Alkenyl | IIA-Y3 |
| Alkenyl—⌬—Alkenyl* | IIA-Y4 |
| Alkenyl—⌬—Alkoxy | IIA-Y5 |
| Alkoxy—⌬—Alkoxy* | IIA-Y6 |
| Alkyl—⌬—O-Alkenyl | IIA-Y7 |
| Alkoxy—⌬—O-Alkenyl | IIA-Y8 |
| Alkenyl—⌬—O-Alkenyl | IIA-Y9 |
| Alkenyl-O—⌬—O-Alkenyl | IIA-Y10 | in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote CH₂═CH—, CH₂═CHCH₂CH₂—, CH₃—CH═CH—, CH₃—CH₂—CH═CH—, CH₃—(CH₂)₂—CH═CH—, CH₃—(CH₂)₃—CH═CH— or CH₃—CH═CH—(CH₂)₂—.

Particularly preferred compounds of the formula IIA-Y are selected from the group consisting of following subformulae:

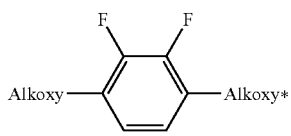

IIA-Y6a

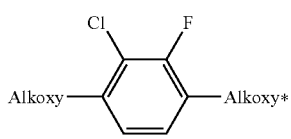

IIA-Y6b in which Alkoxy and Alkoxy* have the meanings defined above and preferably denote methoxy, ethoxy, n-propyloxy, n-butyloxy or n-pentyloxy.

g) LC medium which additionally comprises one or more quaterphenyl compounds selected from the following formula:

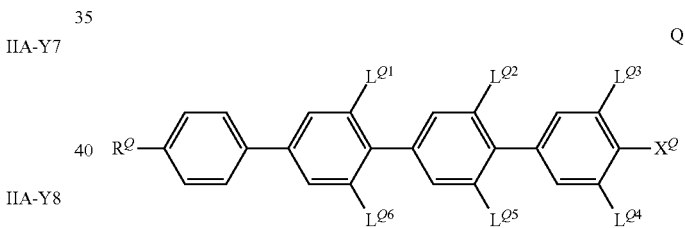

Q wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

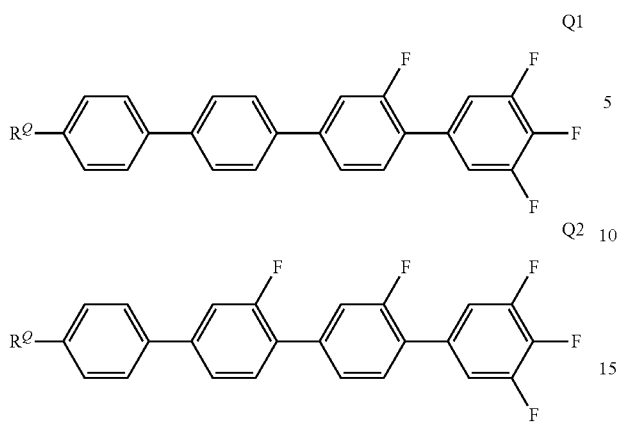

wherein R$^Q$ has one of the meanings of formula Q or one of its preferred meanings given above and below, and is preferably ethyl, n-propyl or n-butyl.

Especially preferred are compounds of formula Q1, in particular those wherein R$^Q$ is n-propyl.

Preferably the proportion of compounds of formula Q in the LC host mixture is from >0 to ≤5% by weight, very preferably from 0.05 to 2% by weight, more preferably from 0.1 to 1% by weight, most preferably from 0.1 to 0.8% by weight.

Preferably the LC medium contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_\parallel$ and $\varepsilon_\perp$, and in particular enables to achieve a high value of the dielectric constant $\varepsilon_\parallel$ while keeping the dielectric anisotropy $\Delta\varepsilon$ constant, thereby reducing the kick-back voltage and reducing image sticking.

The LC media according to the invention preferably comprise one or more compounds of formula IA or its subformulae, preferably of formula IA1 or IA2, preferably in a concentration in the range from 2 to 20%, very preferably from 3 to 14% by weight, most preferably from 4 to 10%, one or more compounds of formula IB or its subformulae, preferably of formula IB1 or IB2, preferably in a concentration in the range of from 0.5 to 5%, very preferably from 0.5 to 2%, and/or one or more compounds of formulae IIA and IIB, preferably in a total concentration in the range of from 30% to 45%;

and/or one or more compounds of formula IV, preferably in a total concentration in the range of from 35% to 60%, more preferably from 40% to 55%, particularly preferably from 45% to 50%;

and/or one or more compounds of formula IIA and IIB and III-2, preferably in a total concentration in the range of from 30% to 65%, more preferably from 35% to 60%, particularly preferably from 40 to 55%.

In particular, the medium comprises one or more compounds CY-n-Om, in particular CY-3-O4, CY-5-O4 and/or CY-3-O2, preferably in a total concentration in the range of from 5% to 30%, preferably 10% to 20%;

one or more compounds PY-n-Om, in particular PY-1-O2, PY-2-O2 and/or PY-3-O2, preferably in a total concentration in the range of from 5% to 40%, preferably 10% to 30%;

and/or

CPY-n-Om, in particular CPY-2-O2, CPY-3-O2 and/or CPY-5-O2, preferably in concentrations >5%, in particular 7% to 20%, based on the mixture as a whole, and/or one or more compounds CCY-n-Om, preferably CCY-4-O2, CCY-3-O2, CCY-3-O3, CCY-3-O1 and/or CCY-5-O2, preferably in concentrations >3%, in particular 5 to 15%, based on the mixture as a whole;

and/or

CPY-n-Om and CY-n-Om, preferably in concentrations of 10 to 80%, based on the mixture as a whole, and/or CPY-n-Om and PY-n-Om, preferably CPY-2-O2 and/or CPY-3-O2 and PY-3-O2 or PY-1-O2, preferably in concentrations of 5 to 20%, more preferably 10 to 15% to based on the mixture as a whole, and/or the compound(s) of the formula CC-3-V1 and/or CC-4-V1, in a total concentration in the range of from 5 to 40%, more preferably from 15% to 35%, particularly preferably from 20% to 30%, and/or one or more compounds of formula B-nO—Om and/or B(S)-nO—Om, in particular the compound B(S)-2O—O5, preferably in a concentration in the range of from 2 to 10%, and the compound CC-3-V1 in a total concentration in the range of from 10 to 30%, preferably 15 to 20%.

and/or 0.1% to 3% of the compound PPGU-3-F.

It is advantageous for the liquid-crystalline medium according to the invention to preferably have a nematic phase from ≤−20° C. to ≥70° C., particularly preferably from ≤−30° C. to ≥80° C., very particularly preferably from ≤−40° C. to ≥90° C.

The medium according to the invention has a clearing temperature of 70° C. or more, preferably of 74° C. or more.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 mm$^2 \cdot$s$^{-1}$ at 20° C.

The mixture is nematic at a temperature of −20° C. or less, preferably at −30° C. or less, very preferably at −40° C. or less.

The values of the birefringence Δn in the liquid-crystal mixture are generally between 0.07 and 0.16, preferably between 0.08 and 0.15, very preferably between 0.09 and 0.14.

In a preferred embodiment of the present invention, the medium has a birefringence in the range of from 0.090 to 0.110, preferably from 0.095 to 0.108, in particular from 0.102 to 0.107.

In another preferred embodiment, the medium according to the invention has a birefringence of 0.120 or more, preferably in the range of from 0.125 to 0.145, more preferably from 0.130 to 0.140.

The liquid-crystal mixture according to the invention has a dielectric anisotropy Δε of −1.5 to −8.0, preferably of −2.0 to −4.0, in particular −2.5 to −3.6, The rotational viscosity γ$_1$ at 20° C. is preferably ≤120 mPa·s, in particular ≤105 mPa·s.

In a preferred embodiment, the rotational viscosity γ$_1$ at 20° C. is ≤100 mPa·s, in particular ≤95 mPa·s.

The liquid-crystal media according to the invention have relatively low values for the threshold voltage (V$_0$). They are preferably in the range from 1.7 V to 3.0 V, particularly preferably ≤2.7 V and very particularly preferably ≤2.5 V.

For the present invention, the term "threshold voltage" relates to the capacitive threshold (V$_0$), also called the Fredericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The LC media according to the invention are suitable for all VA-TFT (vertical alignment-thin film transistor) applications, such as, for example, VAN (vertically aligned nematic), MVA (multidomain VA), (S)-PVA (super patterned VA), ASV (advanced super view, or axially symmetric VA), PSA (polymer sustained VA) and PS-VA (polymer stabilized VA). They are furthermore suitable for IPS (in-plane switching) and FFS (fringe field switching) applications having negative Δε.

The nematic LC media in the displays according to the invention generally comprise two components A and B, which themselves consist of one or more individual compounds.

Component A has significantly negative dielectric anisotropy and gives the nematic phase a dielectric anisotropy of ≤−0.5. Besides one or more compounds of the formula IA and IB, it preferably comprises the compounds of the formulae IIA, IIB and/or IIC, furthermore one or more compounds of the formula IV-1.

The proportion of component A is preferably between 45 and 100%, in particular between 60 and 85%.

For component A, one (or more) individual compound(s) which has (have) a value of Δε≤−0.8 is (are) preferably selected. This value must be more negative, the smaller the proportion A in the mixture as a whole.

Component B has pronounced nematogeneity and a flow viscosity of not greater than 30 mm$^2 \cdot$s$^{-1}$, preferably not greater than 25 mm$^2 \cdot$s$^{-1}$, at 20° C.

A multiplicity of suitable materials is known to the person skilled in the art from the literature. Particular preference is given to compounds of the formula O-17.

Particularly preferred individual compounds in component B are extremely low-viscosity nematic liquid crystals having a flow viscosity of not greater than 18 mm$^2 \cdot$s$^{-1}$, preferably not greater than 12 mm$^2 \cdot$s$^{-1}$, at 20° C.

Component B is monotropically or enantiotropically nematic, has no smectic phases and is able to prevent the occurrence of smectic phases down to very low temperatures in LC media. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of ≤20% by weight, based on the mixture as a whole.

Besides one or more compounds of the formula IA and IB, the medium preferably comprises 4 to 15, in particular 5 to 12, and particularly preferably <10, compounds of the formulae IIA, IIB and/or IIC and optionally one or more compounds of the formula IV-1

Besides compounds of the formula IA and IB and the compounds of the formulae IIA, IIB and/or IIC and optionally IV-1, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds which are suitable as constituents of liquid-crystal phases of this type can be characterised by the formula IV

    IV in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH=CH— —N(O)=N—
—CH=CQ- —CH=N(O)—
—C≡C— —CH$_2$—CH$_2$—
—CO—O— —CH$_2$—O—
—CO—S— —CH$_2$—S—
—CH=N— —COO-Phe-COO—
—CF$_2$O— —CF=CF—
—OCF$_2$— —OCH$_2$—
—(CH$_2$)$_4$— —(CH$_2$)$_3$O— or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

The LC medium has preferably a nematic LC phase.

Preferably the LC medium comprises one or more polymerizable compounds selected from formula M

$$R^a—B^1—(Z^b—B^2)_m—R^b \quad M$$

in which the individual radicals, on each occurrence identically or differently, and each, independently of one another, have the following meaning:

$R^a$ and $R^b$ P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another,
by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerizable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula M are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which $B^1$ and $B^2$ each, independently of one another, denote 1,4-phenylene, 1,3-phenylene, naphthalene-1,4-diyl or naphthalene-2,6-diyl.

Very preferred compounds of formula M are selected from the following formulae:

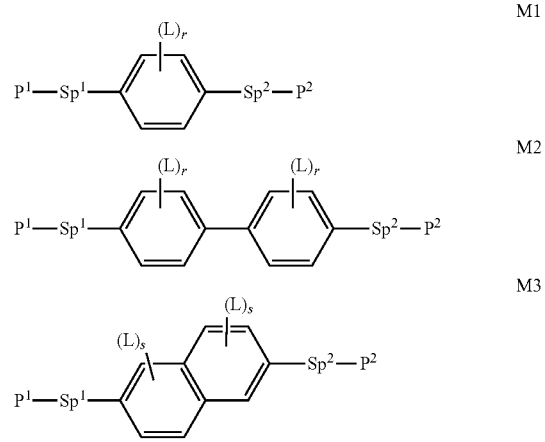

-continued
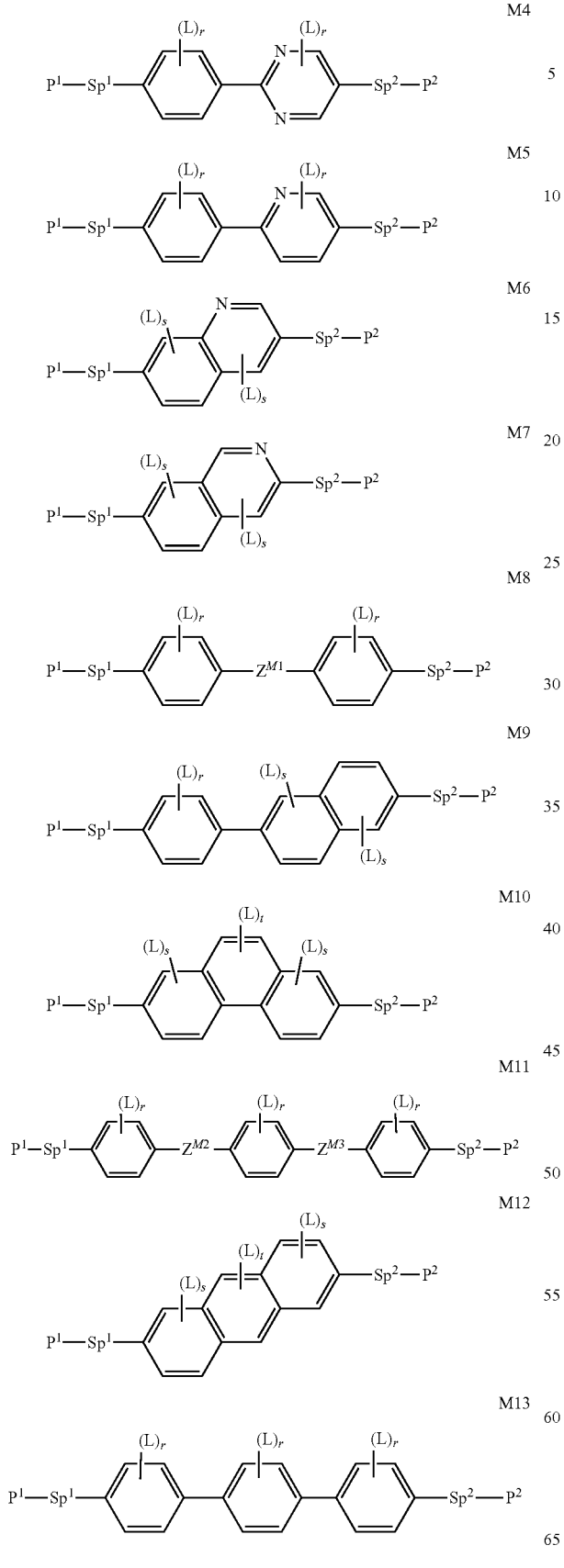
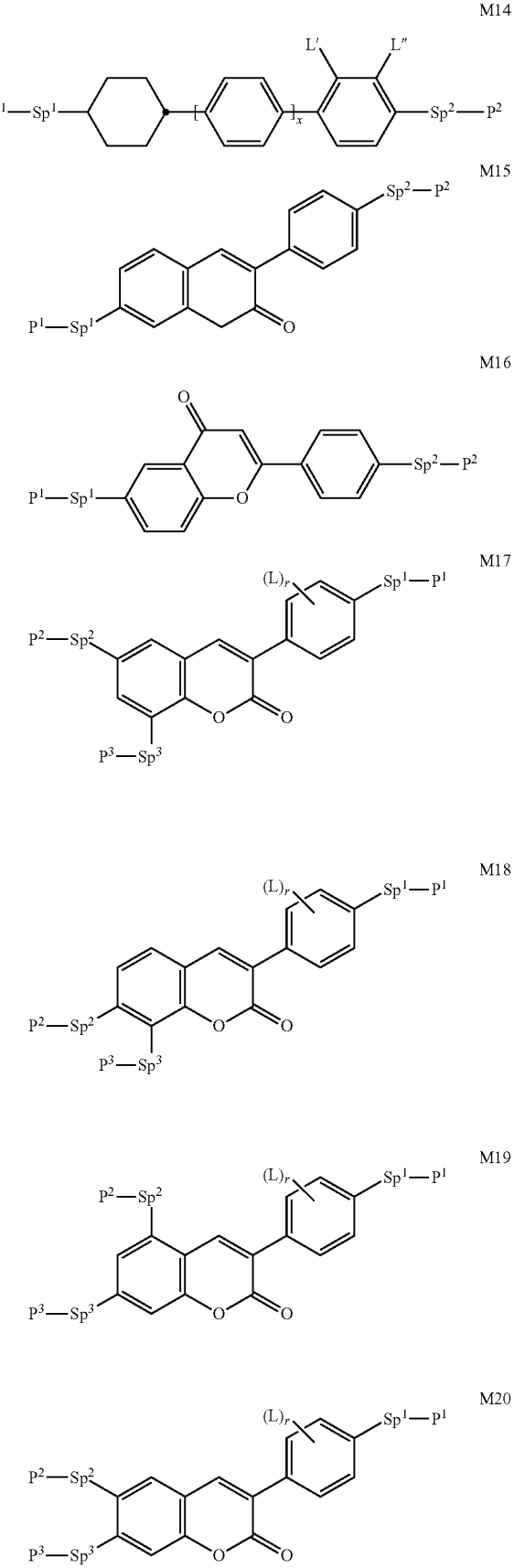

M21
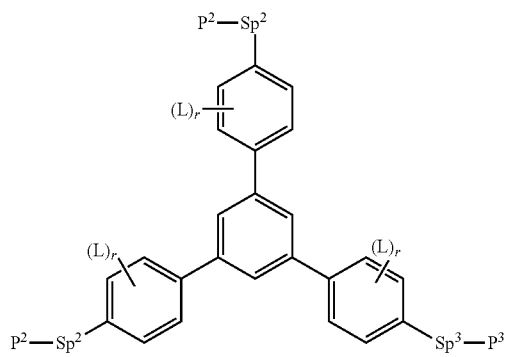

M22
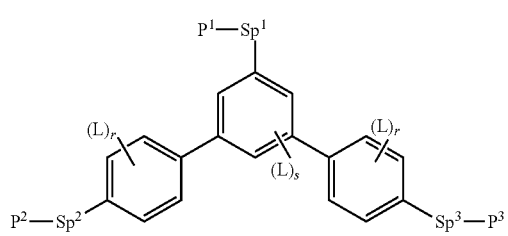

M23
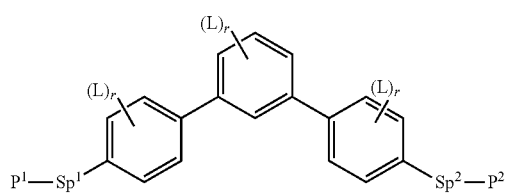

M24
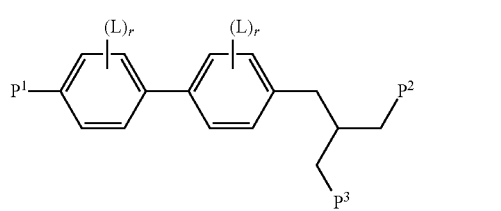

M25
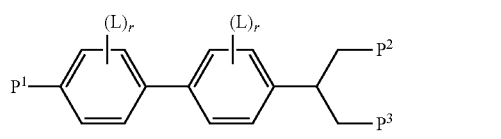

M26
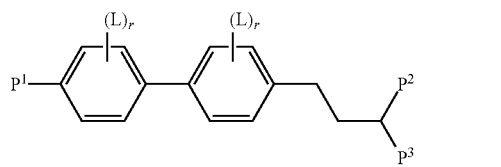

M27
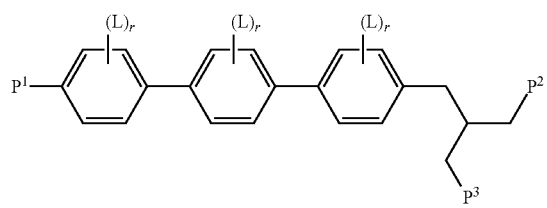

M28
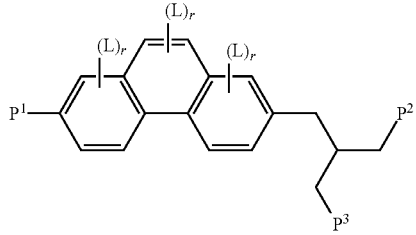

M29
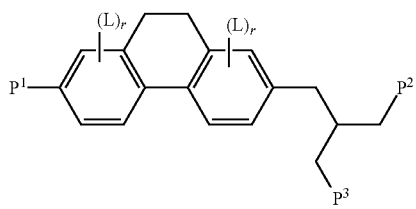

M30
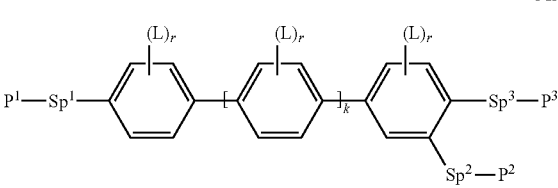

M31
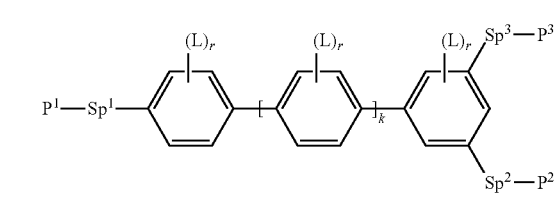

M32
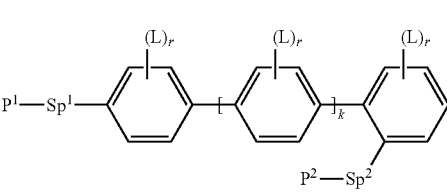

M33
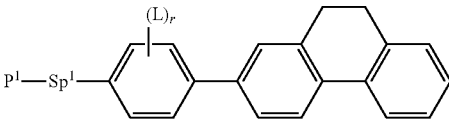

in which the individual radicals, on each occurrence identically or differently, and each, independently of one another, have the following meaning:

$P^1$, $P^2$, $P^3$ a polymerizable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, $R^{aa}$ H, F, Cl, CN or straight-chain or branched alkyl having 1 to 25 C atoms, in which, in addition, one or more non-adjacent CH$_2$ groups may each be replaced, independently of one another, by —C(R$^0$)═C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), and wherein R$^{aa}$ does not denote or contain a group P$^1$, P$^2$ or P$^3$, R$^0$, R$^{00}$ H or alkyl having 1 to 12 C atoms, R$^y$ and R$^z$ H, F, CH$_3$ or CF$_3$, X$^1$, X$^2$, X$^3$ —CO—O—, —O—CO— or a single bond, Z$^{M1}$ —O—, —CO—, —C(R$^y$R$^z$)— or —CF$_2$CF$_2$—, Z$^{M2}$, Z$^{M3}$ —CO—O—, —O—CO—, —CH$_2$O—, —OCH$_2$—, —CF$_2$O—, —OCF$_2$— or —(CH$_2$)$_n$—, where n is 2, 3 or 4, L F, Cl, CN or straight-chain or branched, optionally mono- or polyfluorinated alkyl, alkoxy, thioalkyl, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, s 0, 1, 2 or 3, t 0, 1 or 2, x 0 or 1.

Very preferred are compounds of formulae M2, M13 and M33, especially directive compounds containing exactly two polymerizable groups P$^1$ and P$^2$.

Further preferred are compounds selected from formulae M17 to M32, in particular from formulae M20, M22, M24, M27, M30 and M32, especially trireactive compounds containing exactly three polymerizable groups P$^1$, P$^2$ and P$^3$.

In the compounds of formulae M1 to M33 the group

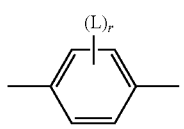

is preferably

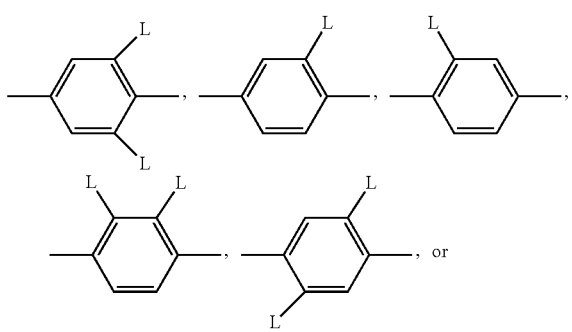

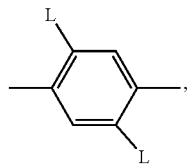

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, —CH═CH$_2$, C(CH$_3$)═CH$_2$, SCH$_3$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, —CH═CH$_2$, C(CH$_3$)═CH$_2$, SCH$_3$, OCH$_3$, COCH$_3$, OCF$_3$ or P-Sp-, more preferably F, Cl, CH$_3$, —CH═CH$_2$, C(CH$_3$)═CH$_2$, SCH$_3$, OCH$_3$, COCH$_3$ or OCF$_3$, most preferably F, SCH$_3$ or OCH$_3$.

Preferred compounds of formulae M1 to M33 are those wherein P$^1$, P$^2$ and P$^3$ denote an acrylate, methacrylate, oxetane or epoxy group, very preferably an acrylate or methacrylate group, most preferably a methacrylate group.

Further preferred compounds of formulae M1 to M33 are those wherein Sp$^1$, Sp$^2$ and Sp$^3$ are a single bond.

Further preferred compounds of formulae M1 to M33 are those wherein one of Sp$^1$, Sp$^2$ and Sp$^3$ is a single bond and another one of Sp$^1$, Sp$^2$ and Sp$^3$ is different from a single bond.

Further preferred compounds of formulae M1 to M33 are those wherein those groups Sp$^1$, Sp$^2$ and Sp$^3$ that are different from a single bond denote —(CH$_2$)$_{s1}$—X"—, wherein s1 is an integer from 1 to 6, preferably 2, 3, 4 or 5, and X" is X" is the linkage to the benzene ring and is —O—, —O—CO—, —CO—O, —O—CO—O— or a single bond.

Further preferred compounds of formula M are selected from Table D, especially selected from the group consisting of formulae RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-92, RM-102, RM-103, RM-109, RM-116, RM-117, RM-120, RM-121, RM-122, RM-139, RM-142, RM-153, RM-155, RM-158, RM-159, RM-162, RM-163 and RM-164 to RM-176.

Particularly preferred are LC media comprising one, two or three polymerizable compounds of formula M.

Further preferred are LC media comprising two or more direactive polymerizable compounds of formula M, preferably selected from formulae M1 to M16 and M33, very preferably selected from formulae M2, M13 and M33.

Further preferred are LC media comprising one or more direactive polymerizable compounds of formula M, preferably selected from formulae M1 to M16 and M33, very preferably from formulae M2, M13 and M33, and one or more trireactive polymerizable compounds of formula M, preferably selected from formulae M17 to M32, very preferably from formulae M20, M22, M24, M27, M30 and M32.

Further preferred are LC media comprising one or more polymerizable compounds of formula M wherein at least one r is not 0, or at least one of s and t is not 0, very preferably selected from formulae M2, M13, M22, M24, M27, M30, M32 and M33, and wherein L is selected from the preferred groups shown above, most preferably from F, OCH$_3$ and SCH$_3$.

Further preferred are LC media comprising one or more polymerizable compounds which show absorption in the wavelength range from 320 to 380 nm, preferably selected from formula M, very preferably from formulae M1 to M33.

Further preferred are LC media comprising one or more polymerizable compounds selected from Table D. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122 and RM-145 to RM-152, RM-162, RM-163 and RM-164 to RM-176 are particularly preferred.

Further preferred compounds of formulae M1 to M33 are those selected from Table D below, especially those selected from the group consisting of formulae RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-92, RM-102, RM-103, RM-109, RM-116, RM-117, RM-120, RM-121, RM-122, RM-139, RM-140, RM-142, RM-143, RM-150, RM-152, RM-153, RM155 and RM-156, RM-162, RM-163 and RM-164 to RM-176.

Particular preference is given to LC media comprising one, two or three polymerizable compounds selected from formula M or formulae M1 to M33.

The combination of compounds of the preferred embodiments mentioned above with the polymerized compounds described above and below causes low threshold voltages, low rotational viscosities and very good low-temperature stabilities in the LC media according to the invention at the same time as constantly high clearing points and high HR values, and allows the rapid establishment of a particularly low tilt angle (i.e. a large tilt) in PSA displays. In particular, the LC media exhibit significantly shortened response times, in particular also the grey-shade response times, in PSA displays compared with the LC media from the prior art.

For use in PSA displays the total proportion of the polymerizable compounds, like those of formula M or M1 to M33, in the LC medium is preferably from 0.01 to 2.0%, very preferably from 0.1 to 1.0%, most preferably from 0.2 to 0.8%.

For use in SA-VA displays the total proportion of the polymerizable compounds, like those of formula M or M1 to M33, in the LC medium is preferably from >0 to <3%, very preferably from >0 to <2%, more preferably from 0.05 to 2.0, most preferably from 0.05 to 1.0%.

The compounds of the formulae M and its subformulae can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

The invention furthermore relates to an LC medium or LC display as described above, wherein the polymerizable compounds, like those of formula M and its subformulae, are present in polymerized form.

Optionally one or more polymerization initiators are added to the LC medium. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If a polymerization initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such as, for example, lower material costs and in particular less contamination of the LC medium by possible residual amounts of the initiator or degradation products thereof. The polymerization can thus also be carried out without the addition of an initiator. In a preferred embodiment, the LC medium thus does not contain a polymerization initiator.

The the LC medium may also comprise one or more stabilisers in order to prevent undesired spontaneous polymerization of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerizable component (component A), is preferably 10-50,000 ppm, particularly preferably 50-5,000 ppm.

In a preferred embodiment the LC media contain one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

In another preferred embodiment of the present invention the LC media contain one or more further stabilisers, preferably selected from the the group consisting of the following formulae

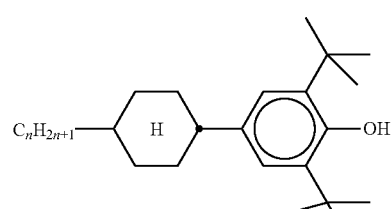

S1

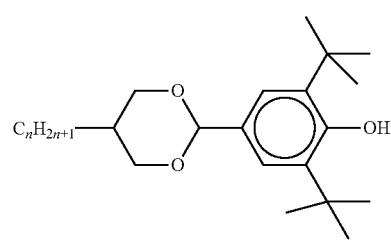

S2

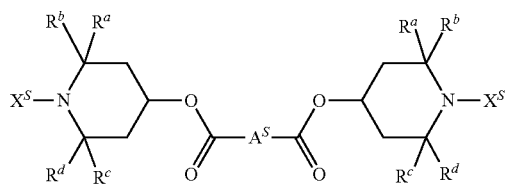

S3 wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, $CH_3$, OH or O., $A^S$ straight-chain, branched or cyclic alkylene with 1 to 20 C atoms which is optionally substituted, n an integer from 1 to 6, preferably 3.

Preferred stabilisers of formula S3 are selected from formula S3A

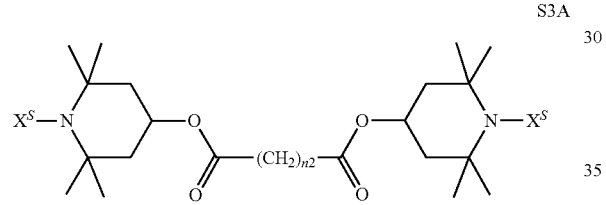

S3A wherein n2 is an integer from 1 to 12, and wherein one or more H atoms in the group $(CH_2)_{n2}$ are optionally replaced by methyl, ethyl, propyl, butyl, pentyl or hexyl.

Very preferred stabilisers are selected from the group consisting of the following formulae

S1-1

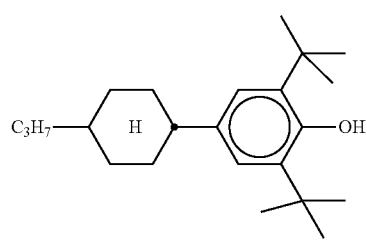

S2-1

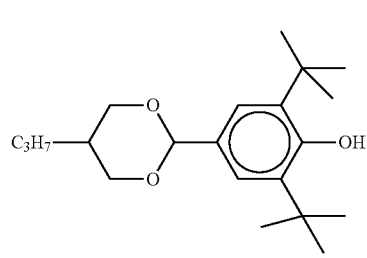

S3-1

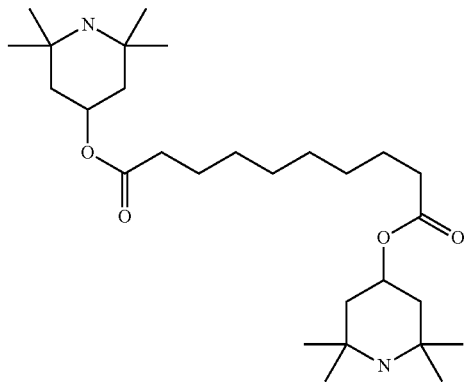

S3-2

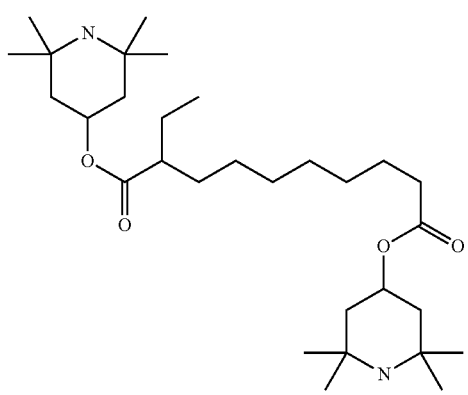

S3-3

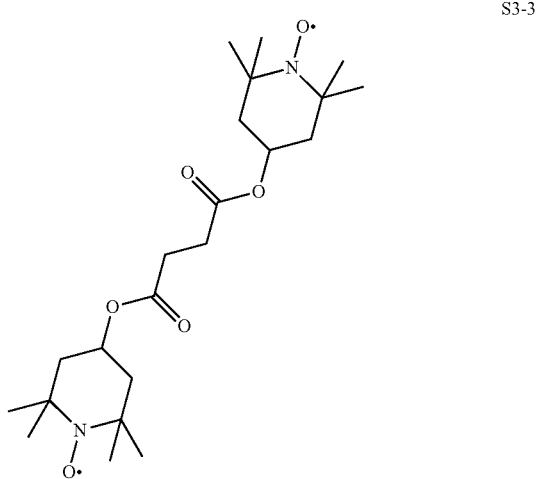

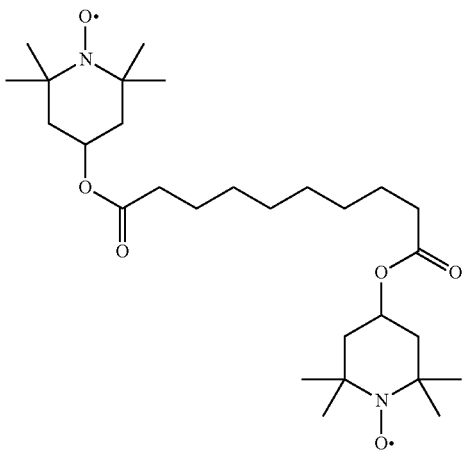

S3-4

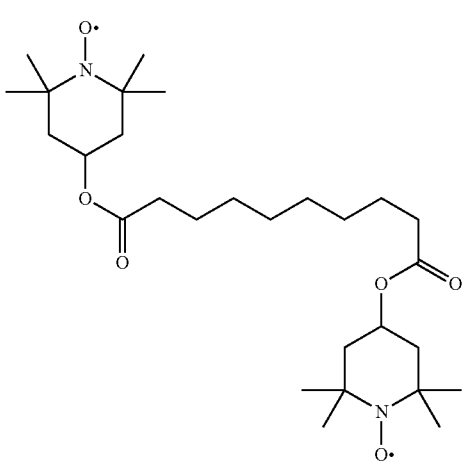

S3-5

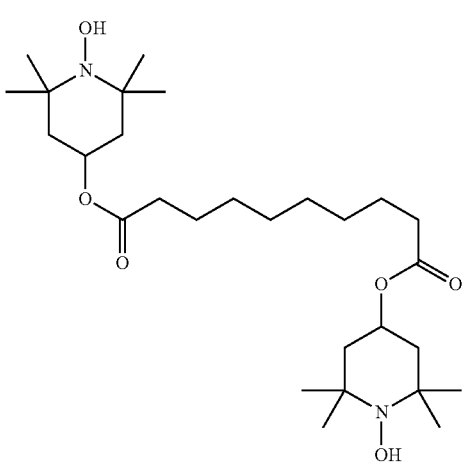

S3-6

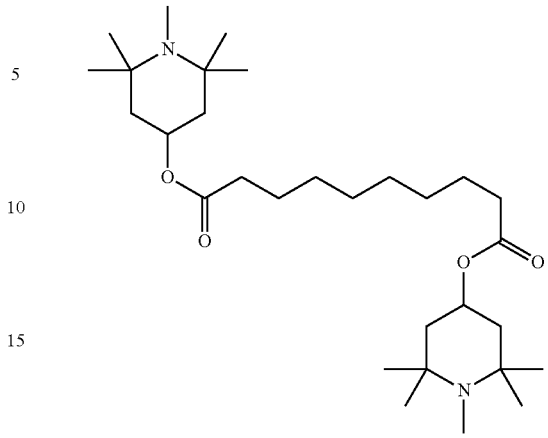

S3-7

In a preferred embodiment the liquid-crystalline medium comprises one or more stabilisers selected from the group consisting of formulae S1-1, S2-1, S3-1, S3-1 and S3-3.

In a preferred embodiment the liquid-crystalline medium comprises one or more stabilisers selected from Table C below.

Preferably the proportion of stabilisers, like those of formula S1-S3, in the liquid-crystalline medium is from 10 to 500 ppm, very preferably from 20 to 100 ppm.

In another preferred embodiment the LC medium according to the present invention contains a self alignment (SA) additive, preferably in a concentration of 0.1 to 2.5%.

In another preferred embodiment the LC medium according to the present invention contains a self alignment (SA) additive, preferably in a concentration of 0.1 to 2.5%.

In a preferred embodiment the SA-VA display according to the present invention does not contain a polyimide alignment layer. In another preferred embodiment the SA-VA display according to preferred embodiment contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerized in the LC medium under similar conditions as applied for the RMs in the PSA process.

Suitable SA additives to induce homeotropic alignment, especially for use in SA-VA mode displays, are disclosed for example in US 2013/0182202 A1, US 2014/0838581 A1, US 2015/0166890 A1 and US 2015/0252265 A1.

In another preferred embodiment an LC medium or a polymer stabilised SA-VA display according to the present invention contains one or more self alignment additives selected from Table E below.

In another preferred embodiment the LC medium according to the present invention contains one or more SA additives, preferably selected from Table E, in a concentration from 0.1 to 5%, very preferably from 0.2 to 3%, most preferably from 0.2 to 1.5%.

The invention furthermore relates to an LC display comprising an LC medium according to the invention as described above and below, which is a preferably a PSA or SA display, very preferably a PS-VA, PS-IPS, PS-FFS or SA-VA display.

The invention furthermore relates to an LC display comprising an LC medium as described above and below wherein the polymerizable compounds are present in polymerized form, which is preferably a PSA or SA display, very preferably a PS-VA, PS-IPS, PS-FFS or SA-VA display.

For the production of PSA or polymer stabilised SA displays, the polymerizable compounds contained in the LC medium are polymerized by in-situ polymerization in the LC medium between the substrates of the LC display, preferably while a voltage is applied to the electrodes.

The structure of the displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:
  a first substrate including a pixel electrode defining pixel areas, the pixel electrode being connected to a switching element disposed in each pixel area and optionally including a micro-slit pattern, and optionally a first alignment layer disposed on the pixel electrode,
  a second substrate including a common electrode layer, which may be disposed on the entire portion of the second substrate facing the first substrate, and optionally a second alignment layer,
  an LC layer disposed between the first and second substrates and including an LC medium as described above and below, wherein the polymerizable compounds may also be present in polymerized form.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerizable component of the LC medium is then polymerized for example by UV photopolymerization. The polymerization can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerization the polymerizable compounds form a copolymer, which causes a certain tilt angle of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. It is also possible firstly to carry out the polymerization, optionally while applying a voltage, in a first step in order to produce a tilt angle, and subsequently, in a second polymerization step without an applied voltage, to polymerize or crosslink the compounds which have not reacted in the first step ("end curing").

Suitable and preferred polymerization methods are, for example, thermal or photopolymerization, preferably photopolymerization, in particular UV induced photopolymerization, which can be achieved by exposure of the polymerizable compounds to UV radiation.

The polymerizable compounds of formula M and its subformulae do in particular show good UV absorption in, and are therefore especially suitable for, a process of preparing a PSA display including one or more of the following features or any combination thereof:
  the polymerizable medium is exposed to UV light in the display in a 2-step process, including a first UV exposure step ("UV1 step"), with application of a voltage, to generate the tilt angle, and a second UV exposure step ("UV2 step"), without application of a voltage, to complete polymerization,
  the polymerizable medium is exposed to UV light in the display generated by an UV-LED lamp, preferably at least in the UV2 step, more preferably both in the UV1 and UV2 step,
  the polymerizable medium is exposed to UV light in the display generated by an energy-saving UV lamp (also known as "green UV lamps"). These lamps are characterized by a relative low intensity ($1/100$-$1/10$ of a conventional UV1 lamp) in their absorption spectra from 300-380 nm, and are preferably used in the UV2 step, but are optionally also used in the UV1 step when avoiding high intensity is necessary for the process,
  the polymerizable medium is exposed to UV light in the display generated by a UV lamp with a radiation spectrum that is shifted to longer wavelengths, preferably ≥340 nm, more preferably from 350 to <370 nm, very preferably from 355 to 368 nm, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features or any combination thereof:
  the polymerizable LC medium is irradiated by UV light in a 2-step process, including a first UV exposure step ("UV1 step"), with application of a voltage, to generate the tilt angle, and a second UV exposure step ("UV2 step"), without application of a voltage, to complete polymerization,
  the polymerizable LC medium is irradiated by UV light generated by a UV lamp having an intensity of from 0.5 mW/cm$^2$ to 10 mW/cm$^2$ in the wavelength range from 300-380 nm, preferably in the UV2 step, and optionally also in the UV1 step, the polymerizable LC medium is irradiated by UV light having a wavelength of ≥340 nm, and preferably ≤420 nm, very preferably in the range from 340 to 380 nm, more preferably in the range from 350 to <370 nm, most preferably in the range from 355 to 368 nm, the polymerizable LC medium is irradiated by UV light while a voltage is applied to the electrodes of the display, irradiation by UV light is carried out using a UV-LED lamp.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV irradiation can be carried out using a cut-off filter being substantially transmissive for wavelengths λ>340 nm.

Preferably UV irradiation is carried out using a UV-LED lamp.

The use of UV-LED lamps, which have with only one narrow emission peak, in the PSA process provides several advantages, like for example a more effective optical energy transfer to the polymerizable compounds in the LC medium, depending on the choice of the suitable polymerizable compounds that shows absorption at the emission wavelength of the LED lamp. This allows to reduce the UV intensity and/or the UV irradiation time, thus enabling a reduced tact time and savings in energy and production costs. Another advantage is that the narrow emission spectrum of the lamp allows an easier selection of the appropriate wavelength for photopolymerization.

Very preferably the UV light source is an UV-LED lamp emitting a wavelength in the range from 340 to 400 nm, more preferably in the range from 340 to 380 nm. UV-LED lamps emitting UV light with a wavelength of 365 nm are especially preferred.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

The LC medium according to the present invention may additionally comprise one or more further components or additives, preferably selected from the list including but not limited to co-monomers, chiral dopants, polymerization initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Table A below.

TABLE A

In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.

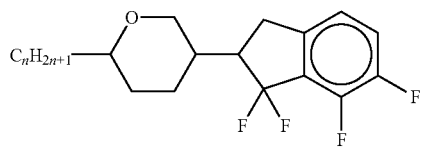

AIK-n-F

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
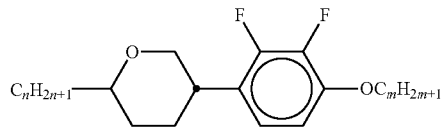
AIY-n-Om
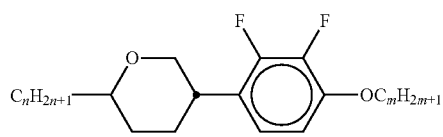
AY-n-Om
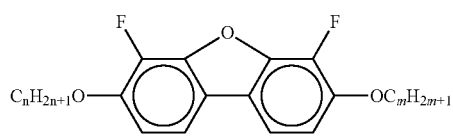
B-nO-Om
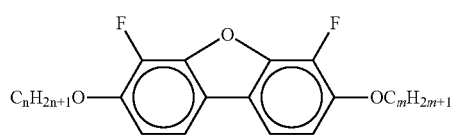
B-n-Om
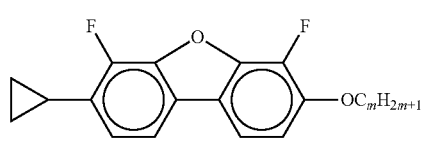
B-cpr-Om
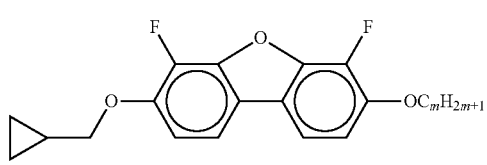
B-cpr1O-Om
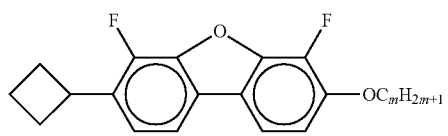
B-4Cy-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
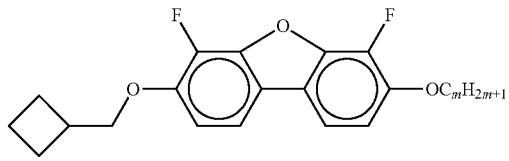
B-4Cy1O-Om
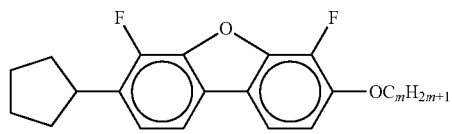
B-cp-Om
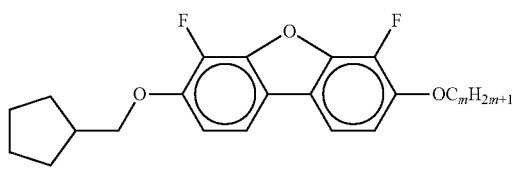
B-cp1O-Om
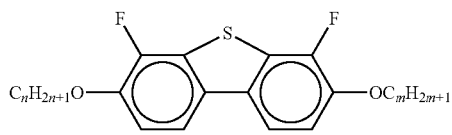
B(S)-nO-Om
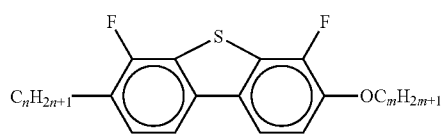
B(S)-n-Om
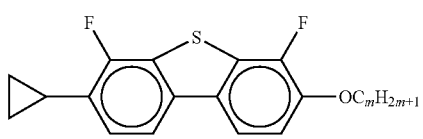
B(S)-cpr-Om
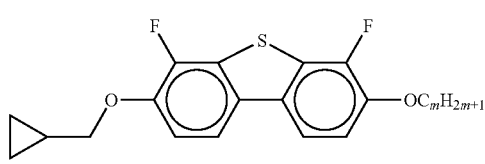
B(S)cpr1O-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
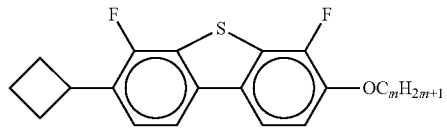
B(S)-4Cy-Om
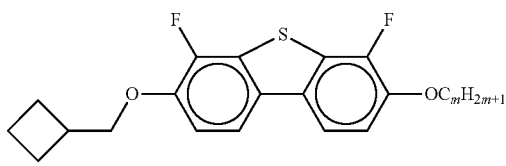
B(S)-4Cy1O-Om
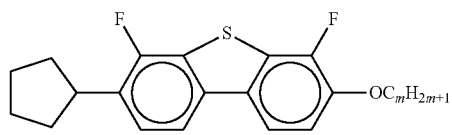
B(S)-cp-Om
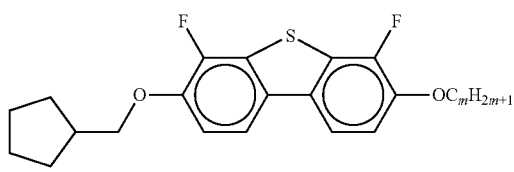
B(S)-cp1O-Om
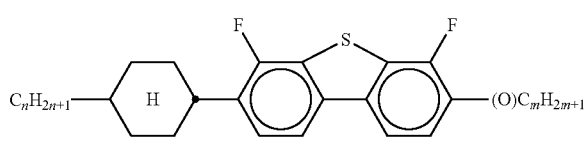
CB(S)-n-(O)m
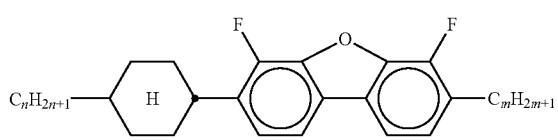
CB-n-m
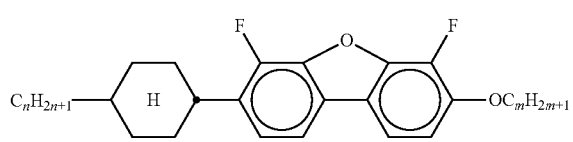
CB-n-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
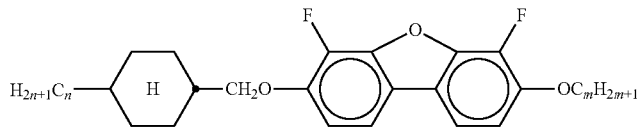
COB-n-Om
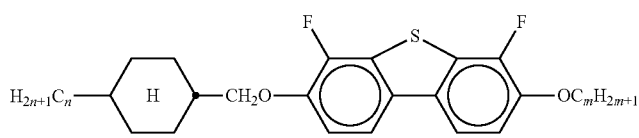
COB(S)-n-Om
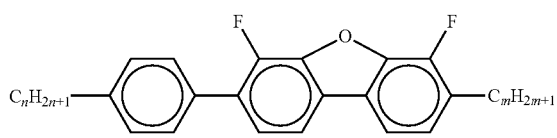
PB-n-m
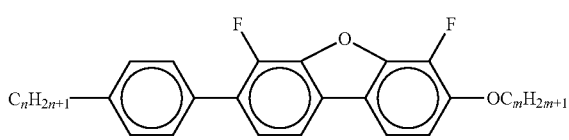
PB-n-Om
BCH-nm
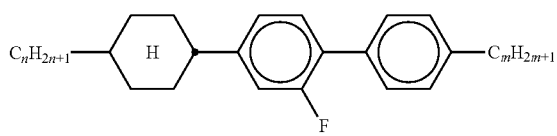
BCH-nmF
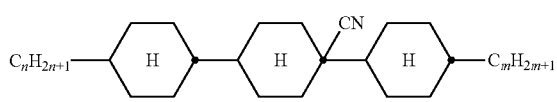
BCN-nm
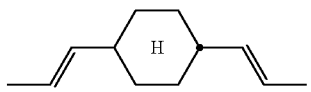
C-1V-V1

TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
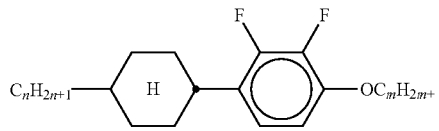
CY-n-Om
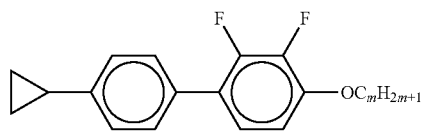
CYcpr-Om
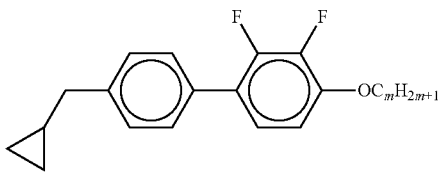
CY-cpr1-Om
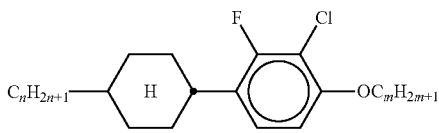
CY(F,Cl)-n-Om
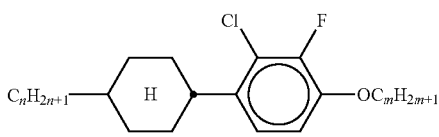
CY(Cl,F)-n-Om
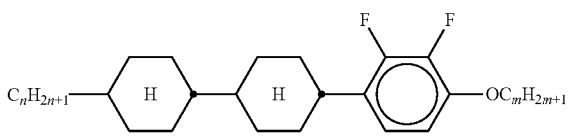
CCY-n-Om
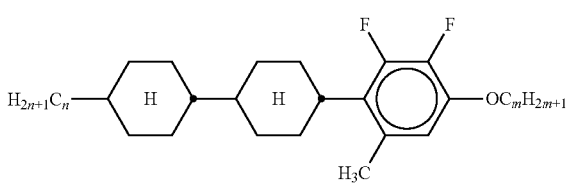
CC1Y-n-Om

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
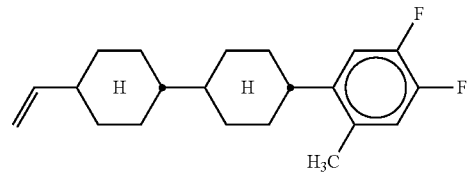
CC1G-V-F
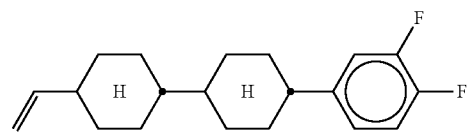
CCG-V-F
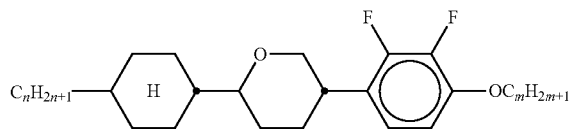
CAIY-n-Om
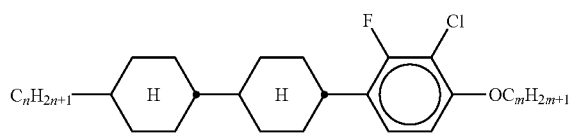
CCY(F,Cl)-n-Om
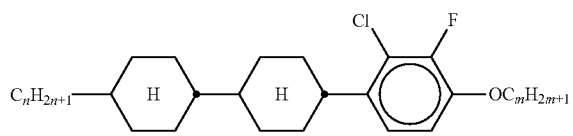
CCY(Cl,F)-n-Om
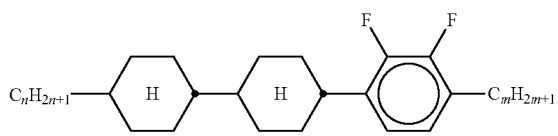
CCY-n-m
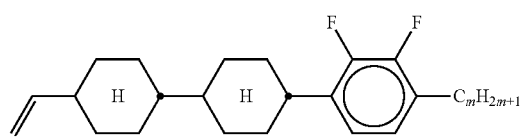
CCY-V-m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
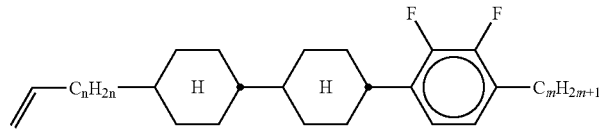
CCY-Vn-m
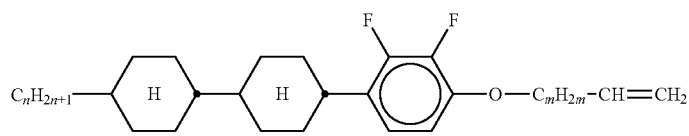
CCY-n-OmV
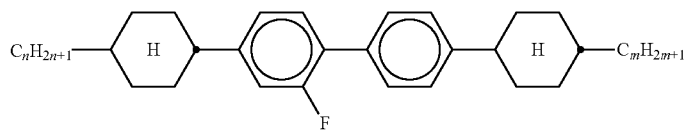
CBC-nmF
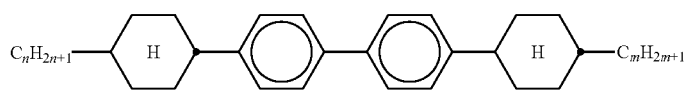
CBC-nm
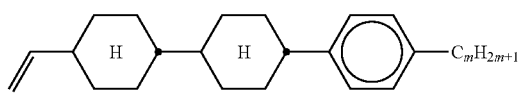
CCP-V-m
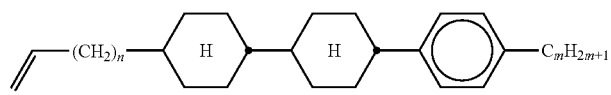
CCP-Vn-m
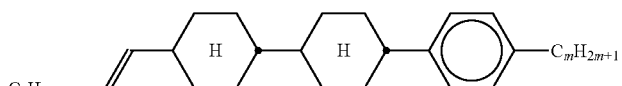
CCP-nV-m
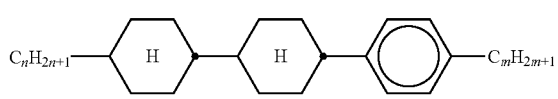
CCP-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
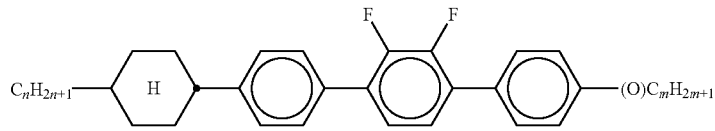
CPYP-n-(O)m
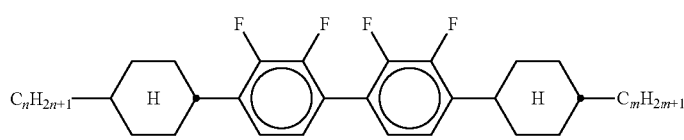
CYYC-n-m
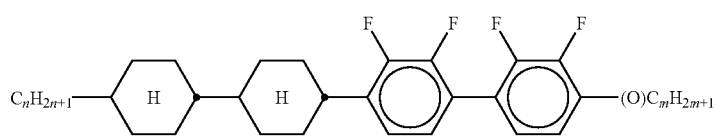
CCYY-n-(O)m
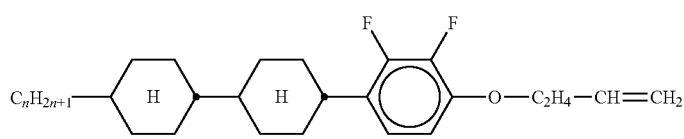
CCY-n-O2V
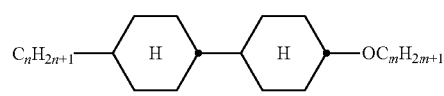
CCH-nOm, CC-n-Om
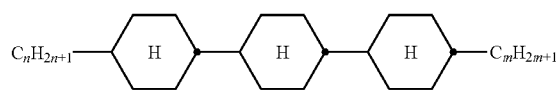
CCC-n-m
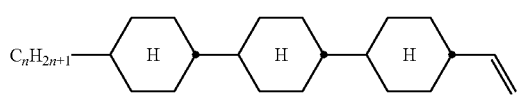
CCC-n-V
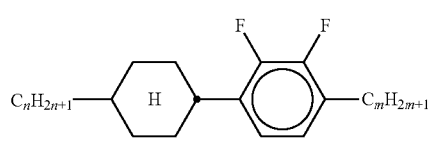
CY-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
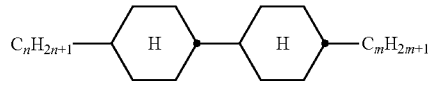
CCH-nm, CC-n-m
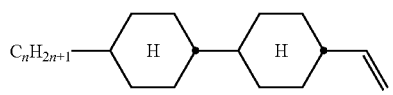
CC-n-V
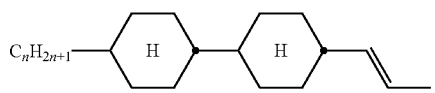
CC-n-V1
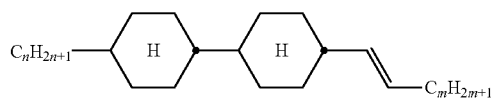
CC-n-Vm
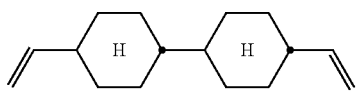
CC-V-V
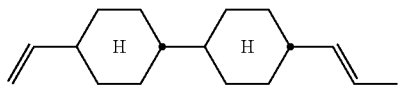
CC-V-V1
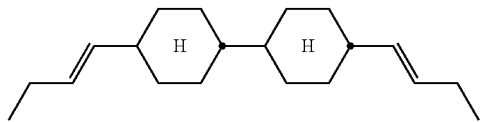
CC-2V-V2
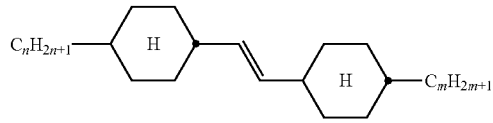
CVC-n-m
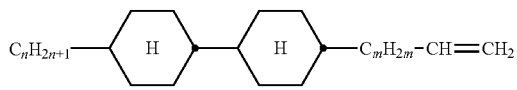
CC-n-mV TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
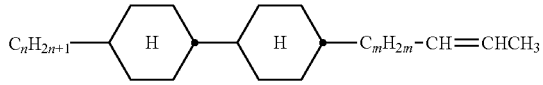
CC-n-mV1
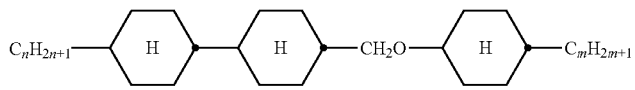
CCOC-n-m
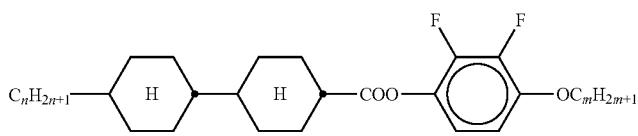
CP-nOmFF
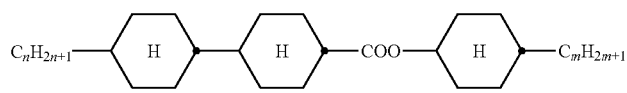
CH-nm
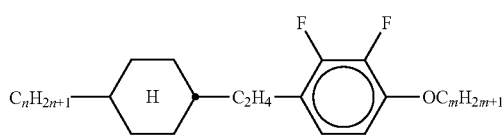
CEY-n-Om
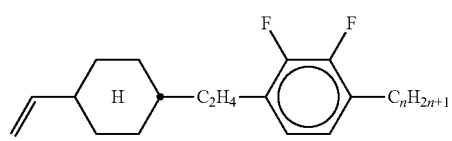
CEY-V-n
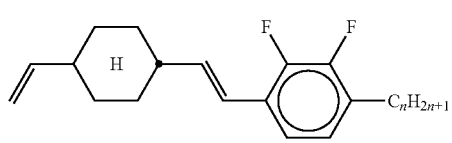
CVY-V-n
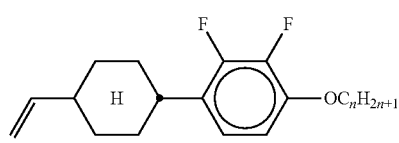
CY-V-On TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
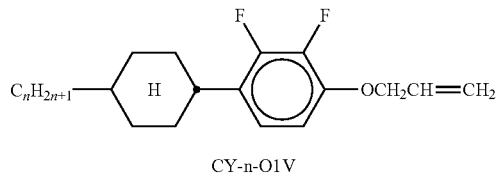
CY-n-O1V
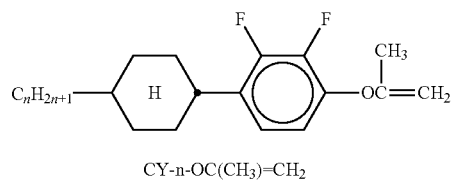
CY-n-OC(CH3)=CH2
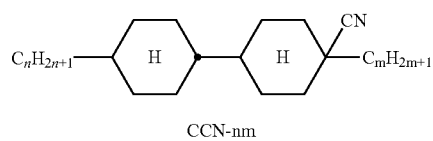
CCN-nm
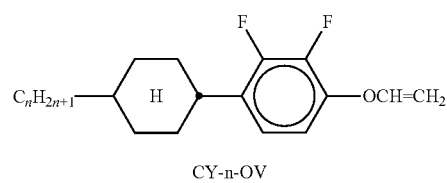
CY-n-OV
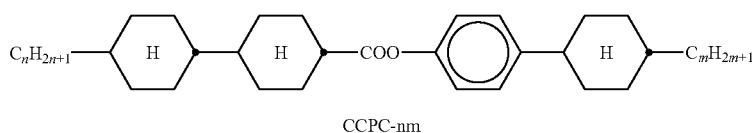
CCPC-nm
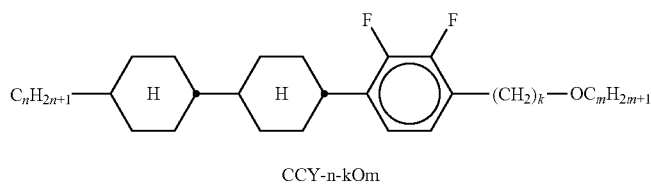
CCY-n-kOm
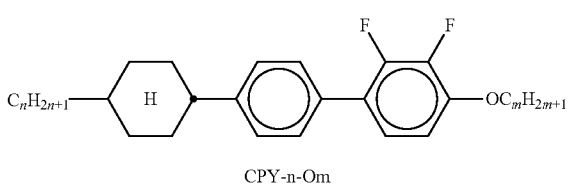
CPY-n-Om
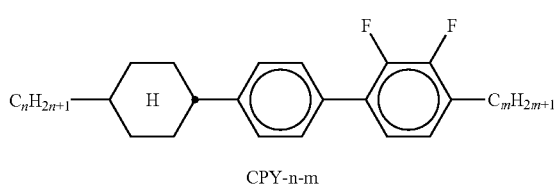
CPY-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
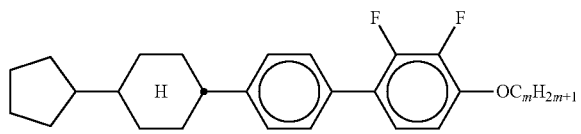
CPY-cp-Om
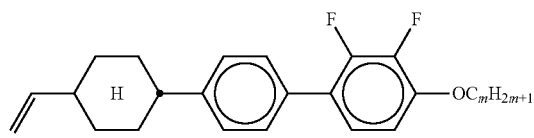
CPY-V-Om
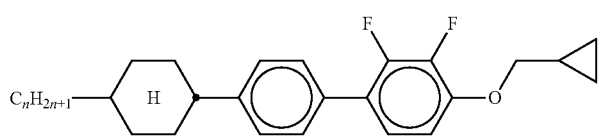
CPY-n-O1cpr
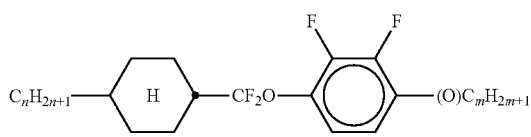
CQY-n-(O)m
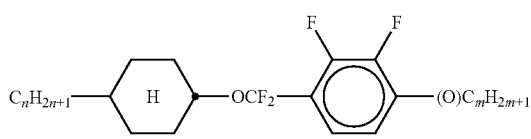
CQIY-n-(O)m
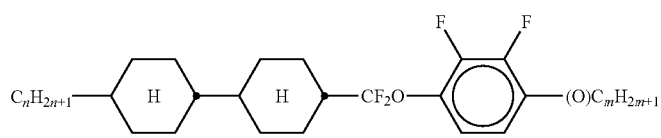
CCQY-n-(O)m
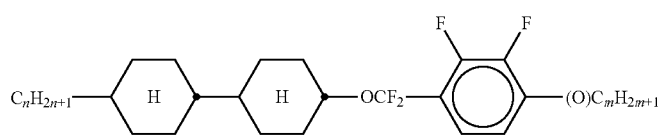
CCQIY-n-(O)m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
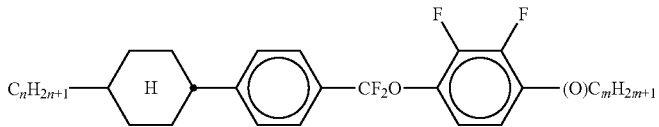
CPQY-n-(O)m
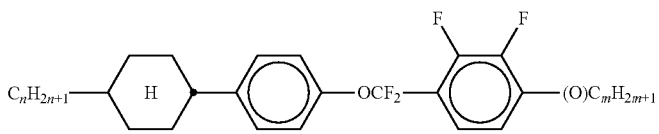
CPQIY-n-(O)m
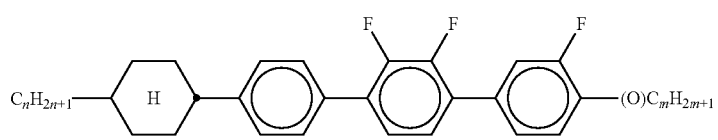
CPYG-n-(O)m
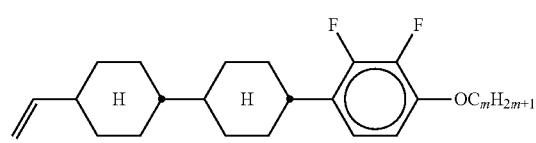
CCY-V-Om
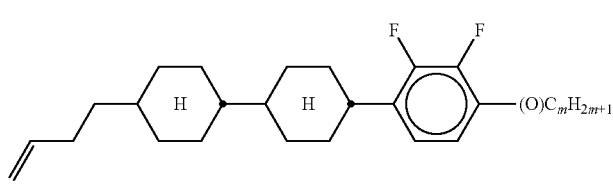
CCY-V2-(O)m
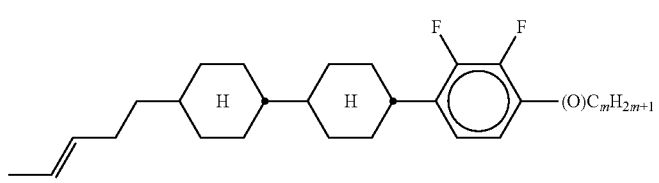
CCY-1V2-(O)m
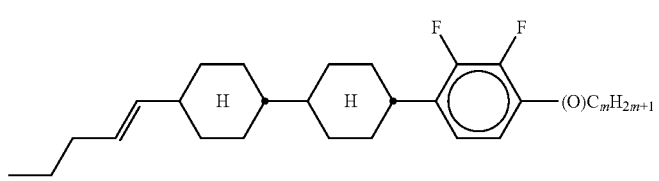
CCY-3V-(O)m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
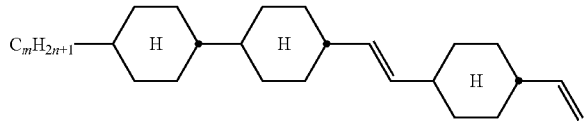
CCVC-n-V
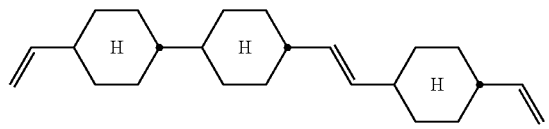
CCVC-V-V
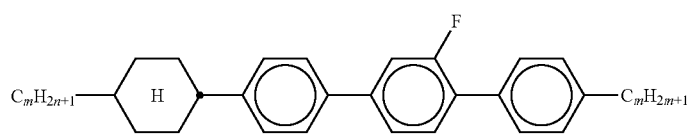
CPGP-n-m
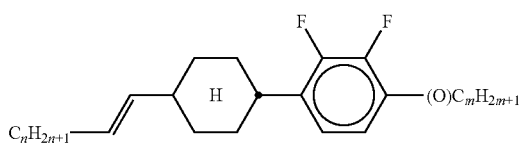
CY-nV-(O)m
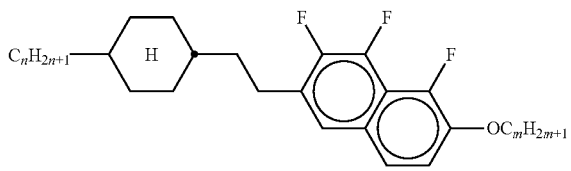
CENaph-n-Om
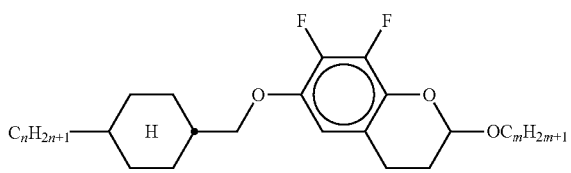
COChrom-n-Om
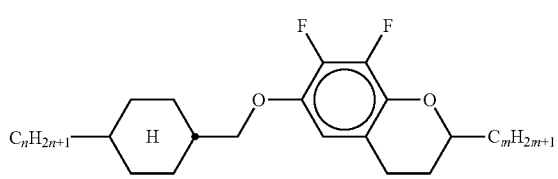
COChrom-n-m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
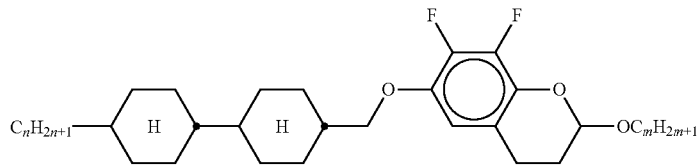
CCOChrom-n-Om
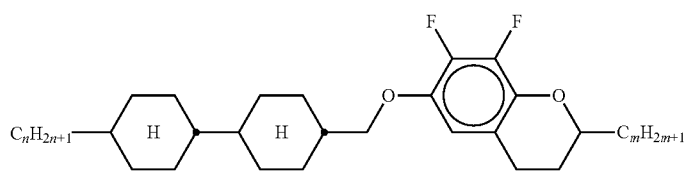
CCOChrom-n-m
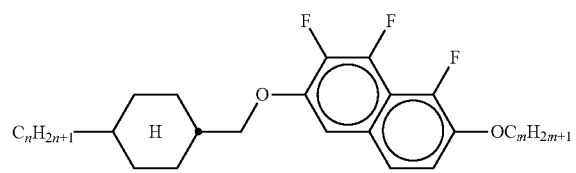
CONaph-n-Om
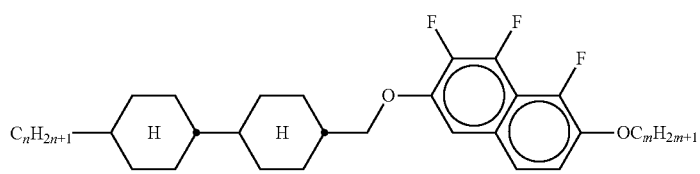
CCONaph-n-Om
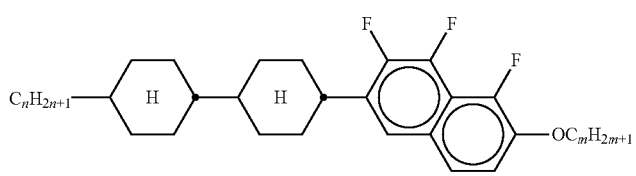
CCNaph-n-Om
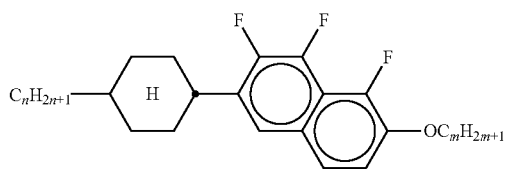
CNaph-n-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
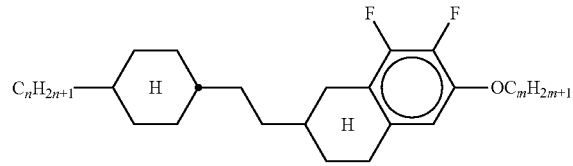
CETNaph-n-Om
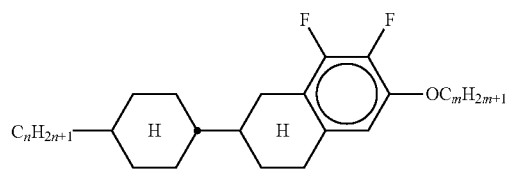
CTNaph-n-Om
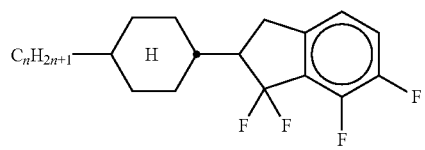
CK-n-F
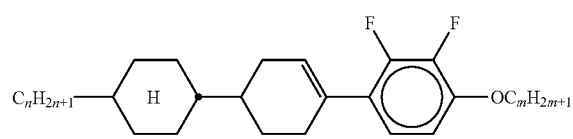
CLY-n-Om
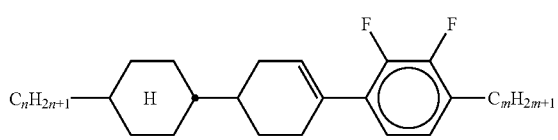
CLY-n-m
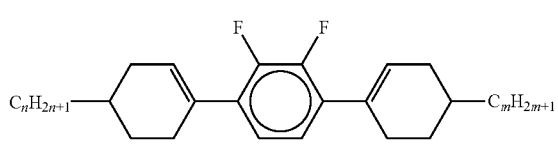
LYLI-n-m
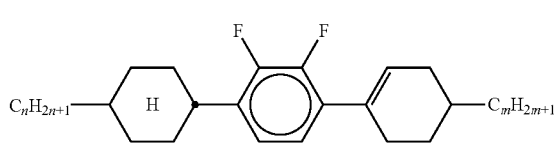
CYLI-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
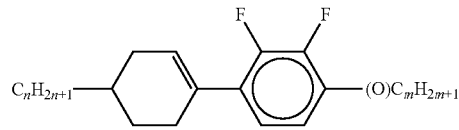
LY-n-(O)m
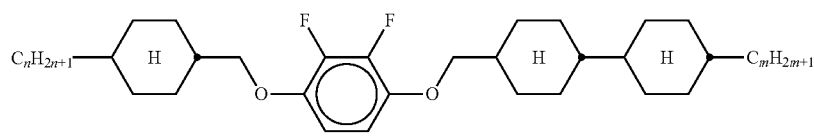
COYOICC-n-m
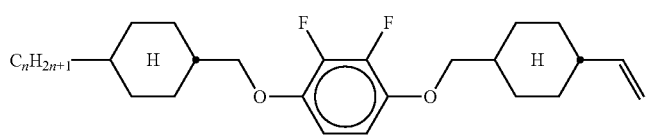
COYOIC-n-V
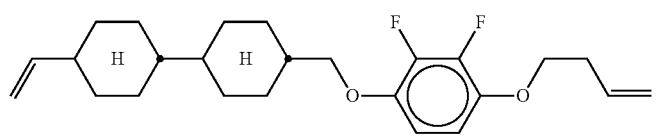
CCOY-V-O2V
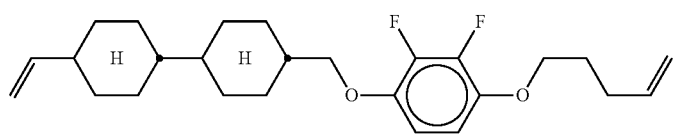
CCOY-V-O3V
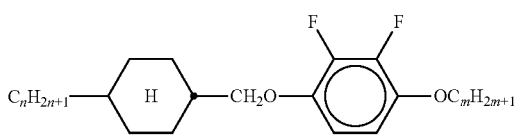
COY-n-Om
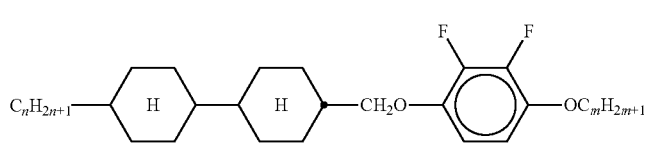
CCOY-n-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
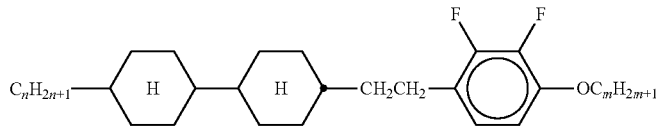
CCEY-n-Om
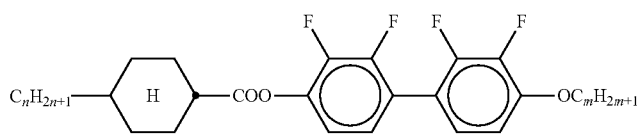
CZYY-n-Om
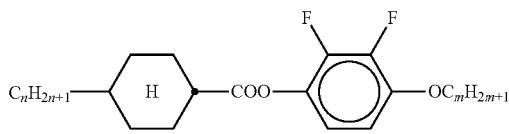
D-nOmFF
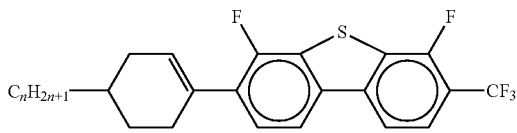
LB(S)-n-T
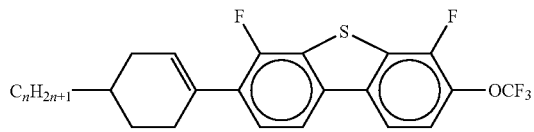
LB(S)-n-OT
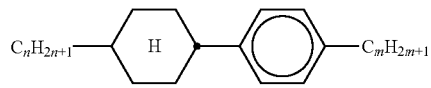
PCH-nm, CP-n-m
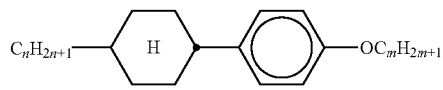
PCH-Onm, CP-n-Om
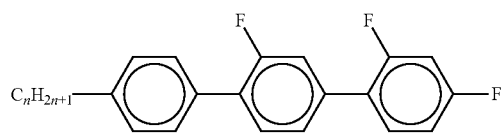
PGIGI-n-F

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
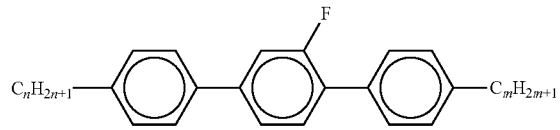
PGP-n-m
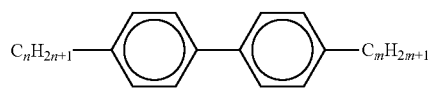
PP-n-m
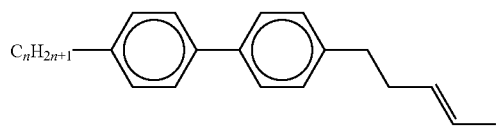
PP-n-2V1
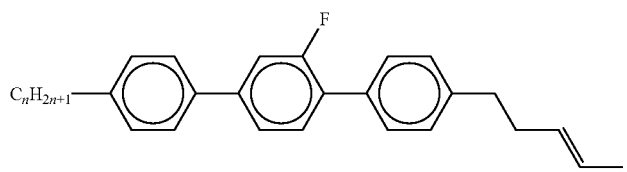
PGP-n-2V1
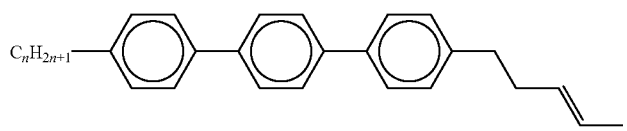
PPP-n-2V1
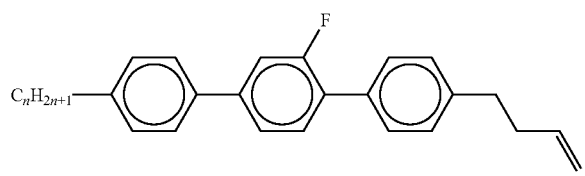
PGP-n-2V
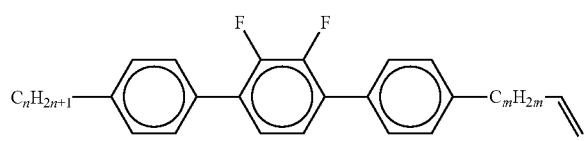
PYP-n-mV TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
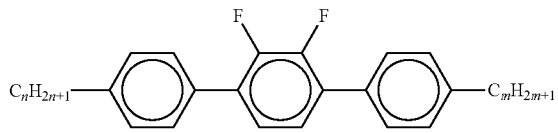
PYP-n-m
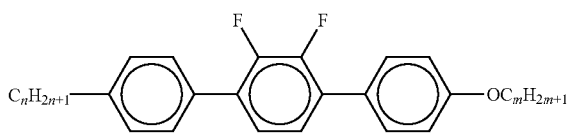
PYP-n-Om
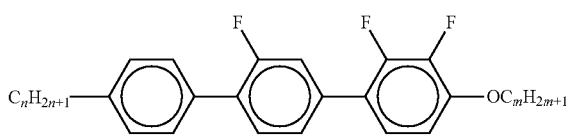
PGIY-n-Om
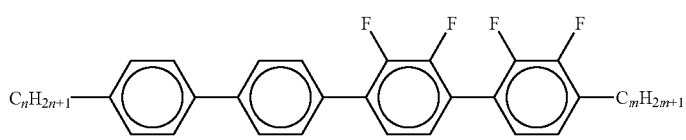
PPYY-n-m
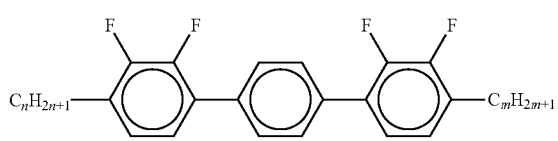
YPY-n-m
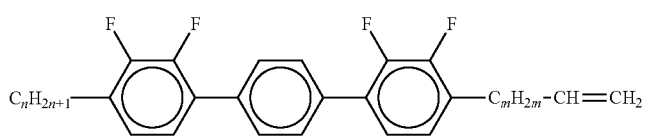
YPY-n-mV
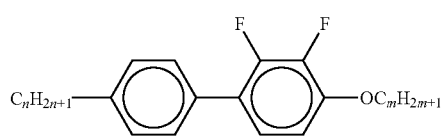
PY-n-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
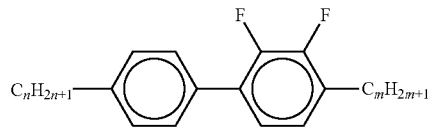
PY-n-m
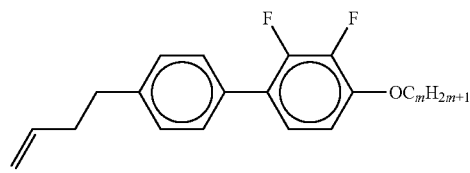
PY-V2-Om
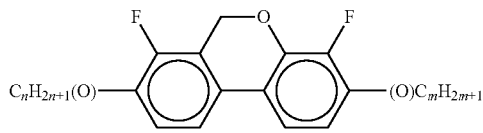
DFDBC-n(O)-(O)m
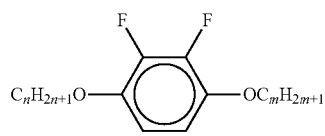
Y-nO-Om
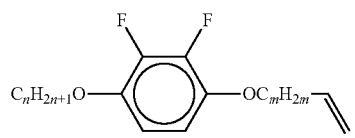
Y-nO-OmV
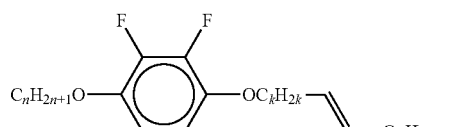
Y-nO-OkVm
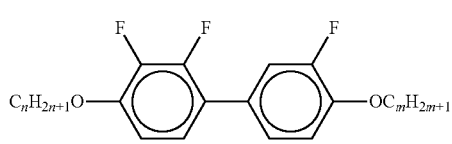
YG-n-Om

TABLE A-continued

In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.

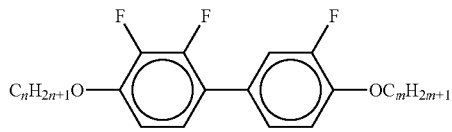

YG-nO-Om

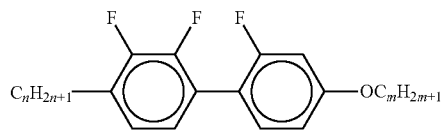

YGI-n-Om

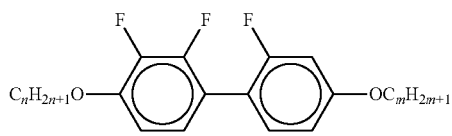

YGI-nO-Om

YY-n-Om

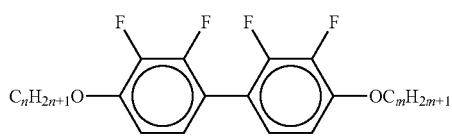

YY-nO-Om

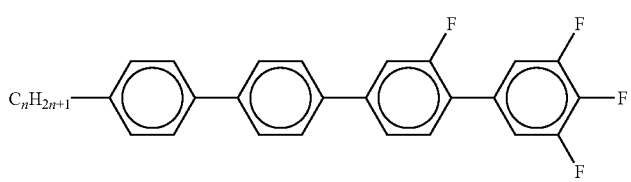

PPGU-n-F

In a preferred embodiment of the present invention, the LC media according to the invention comprise one or more compounds selected from the group consisting of compounds from Table A.

In a first preferred embodiment of the present invention, the LC media according to the invention, especially those with positive dielectric anisotropy, comprise one or more compounds selected from the group consisting of compounds from Table A1.

In a second preferred embodiment of the present invention, the LC media according to the invention, especially those with negative dielectric anisotropy, comprise one or more compounds selected from the group consisting of compounds from Table A2.

TABLE B
Table B shows possible chiral dopants which can be added to the LC media according to the invention.
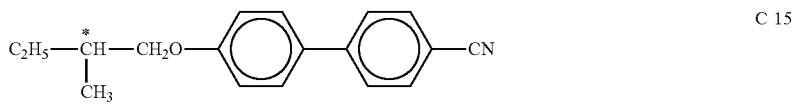
C 15
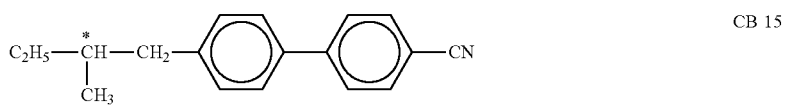
CB 15
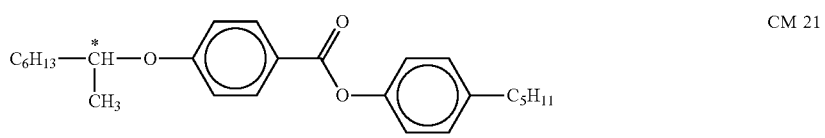
CM 21
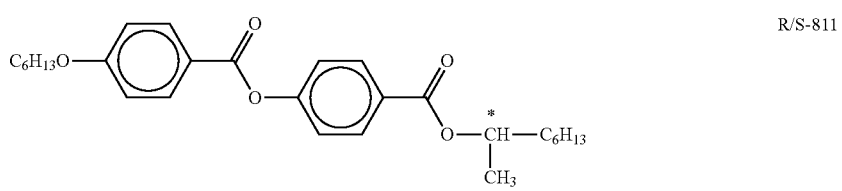
R/S-811
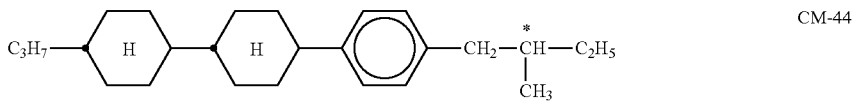
CM-44
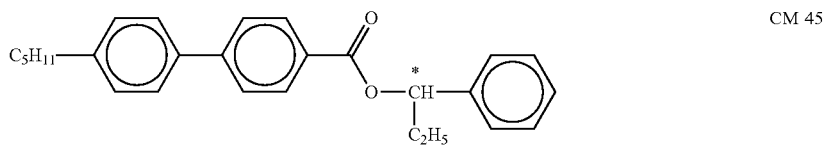
CM 45
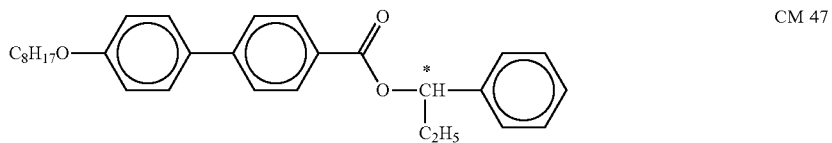
CM 47
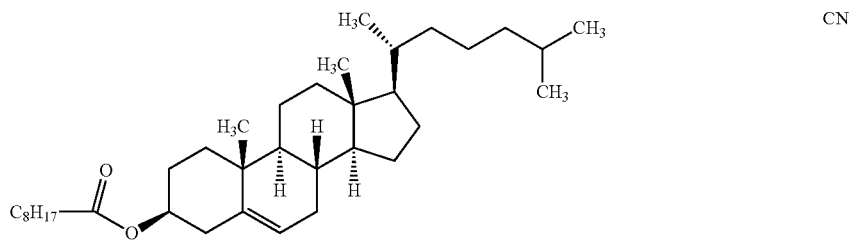
CN
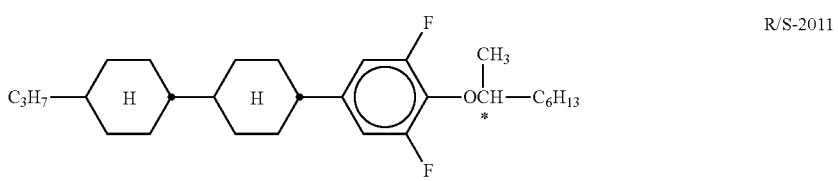
R/S-2011

TABLE B-continued

Table B shows possible chiral dopants which can be added to the LC media according to the invention.

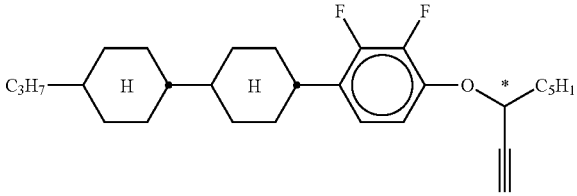

R/S-3011

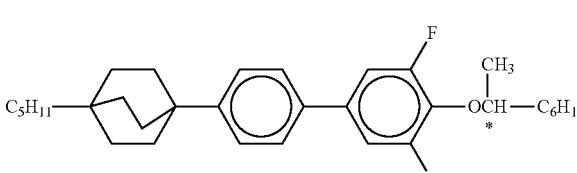

R/S-4011

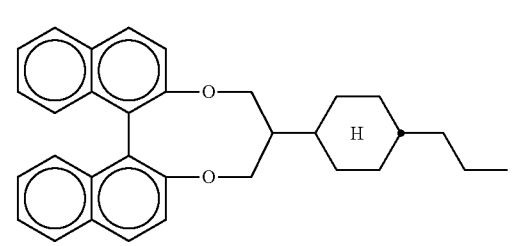

R/S-5011

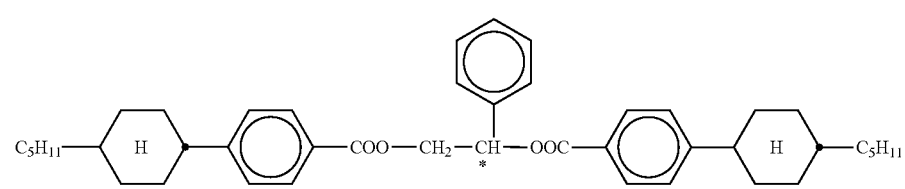

R/S-1011

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

Table C shows possible stabilisers which can be added to the LC media according to the invention. Therein n denotes an integer from 1 to 12, preferably 1, 2, 3, 4, 5, 6, 7 or 8, and terminal methyl groups are not shown.

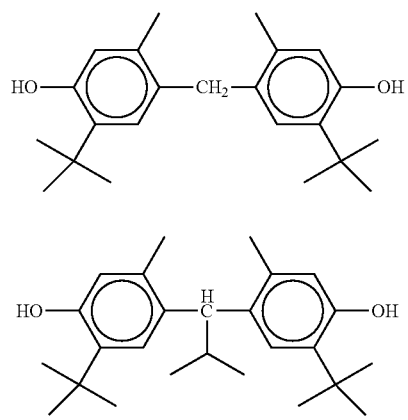

TABLE C-continued
Table C shows possible stabilisers which can be added to the LC media according to the invention. Therein n denotes an integer from 1 to 12, preferably 1,2, 3, 4, 5, 6, 7 or 8, and terminal methyl groups are not shown.
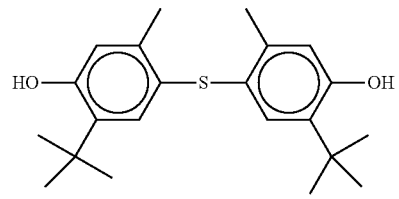
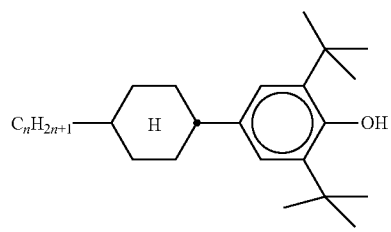
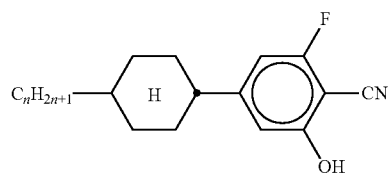
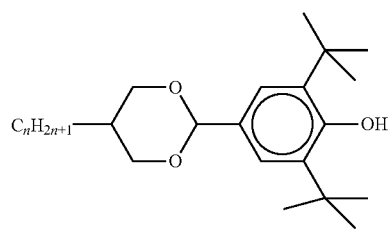
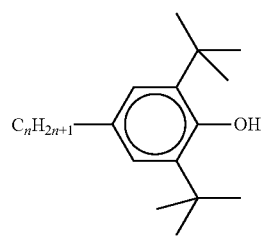
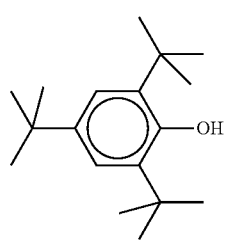

TABLE C-continued
Table C shows possible stabilisers which can be added to the LC media according to the invention. Therein n denotes an integer from 1 to 12, preferably 1,2, 3, 4, 5, 6, 7 or 8, and terminal methyl groups are not shown.
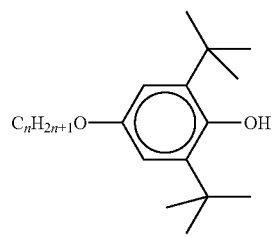
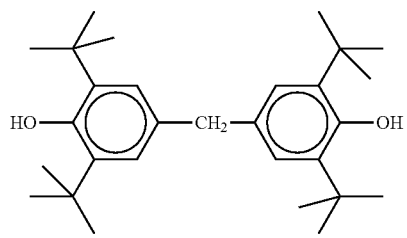
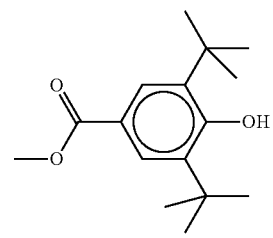
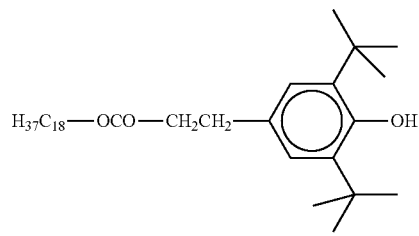
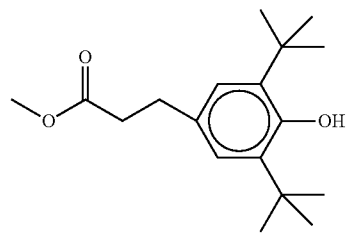
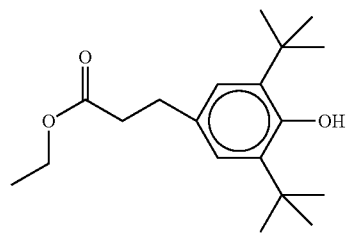

TABLE C-continued
Table C shows possible stabilisers which can be added to the LC media according to the invention. Therein n denotes an integer from 1 to 12, preferably 1, 2, 3, 4, 5, 6, 7 or 8, and terminal methyl groups are not shown.
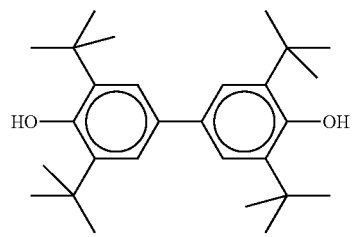
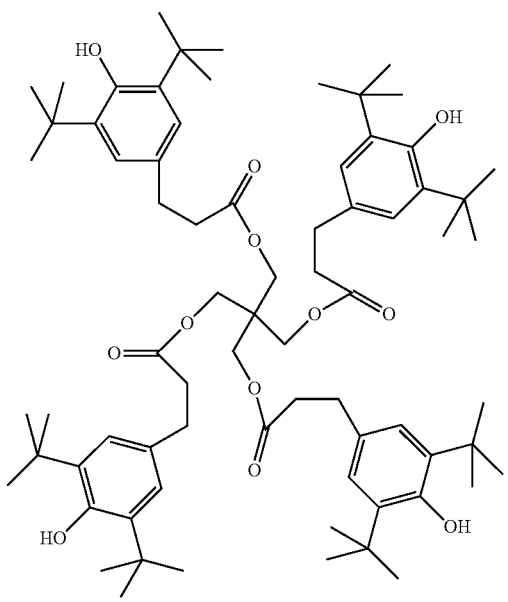 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
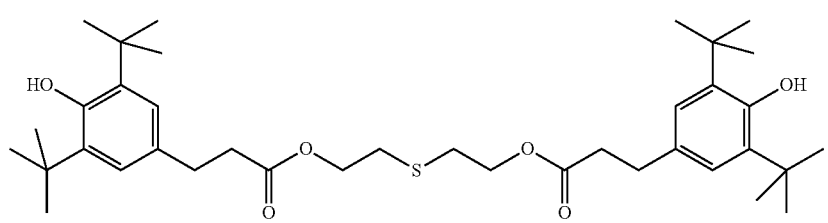 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
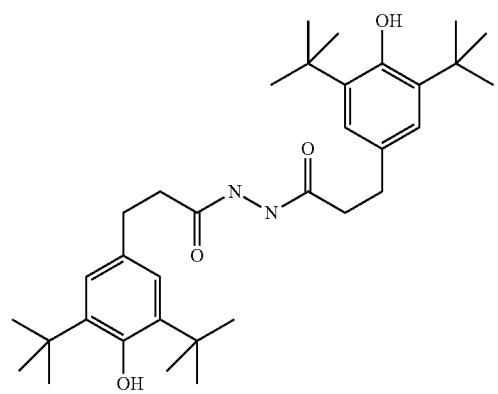 [SMILES: CC(C)(C)c1cc(CCC(=O)NNC(=O)CCc2cc(C(C)(C)C)c(O)c(C(C)(C)C)c2)cc(C(C)(C)C)c1O]

TABLE C-continued
Table C shows possible stabilisers which can be added to the LC media according to the invention. Therein n denotes an integer from 1 to 12, preferably 1,2, 3, 4, 5, 6, 7 or 8, and terminal methyl groups are not shown.
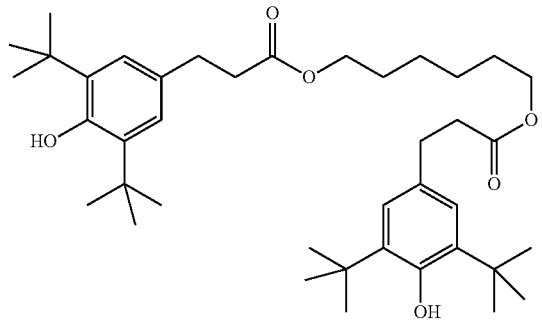 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
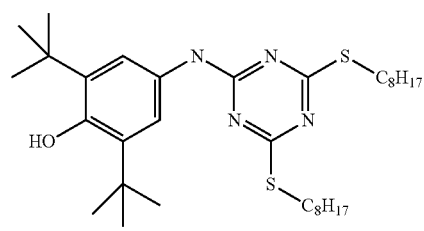
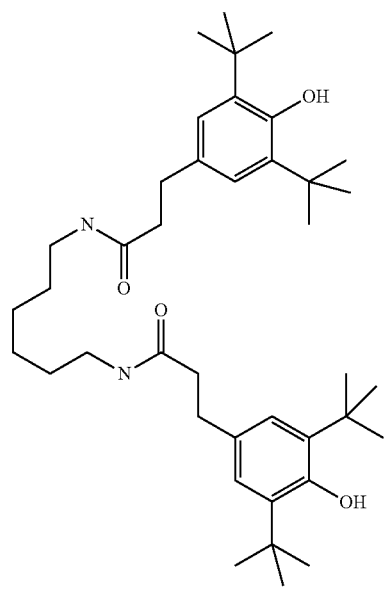 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued
Table C shows possible stabilisers which can be added to the LC media according to the invention. Therein n denotes an integer from 1 to 12, preferably 1,2, 3, 4, 5, 6, 7 or 8, and terminal methyl groups are not shown.
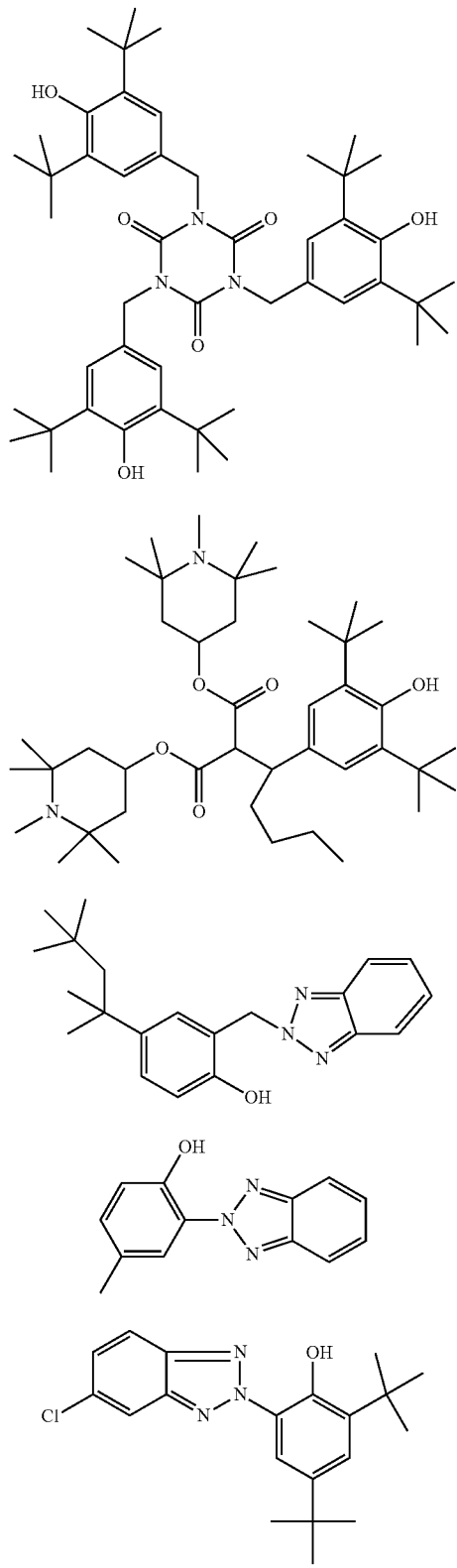

TABLE C-continued
Table C shows possible stabilisers which can be added to the LC media according to the invention. Therein n denotes an integer from 1 to 12, preferably 1, 2, 3, 4, 5, 6, 7 or 8, and terminal methyl groups are not shown.
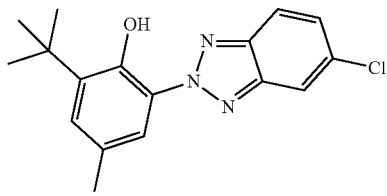 [SMILES: Cc1cc(-n2nc3ccc(Cl)cc3n2)c(O)c(C(C)(C)C)c1]
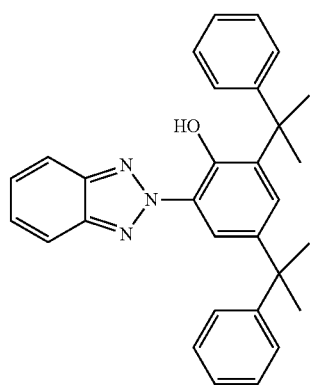 [SMILES: CC(C)(c1ccccc1)c1cc(-n2nc3ccccc3n2)c(O)c(C(C)(C)c2ccccc2)c1]
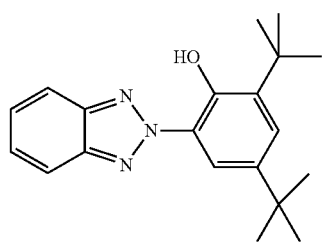 [SMILES: CC(C)(C)c1cc(-n2nc3ccccc3n2)c(O)c(C(C)(C)C)c1]
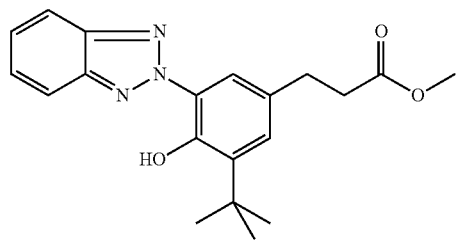 [SMILES: COC(=O)CCc1cc(-n2nc3ccccc3n2)c(O)c(C(C)(C)C)c1]
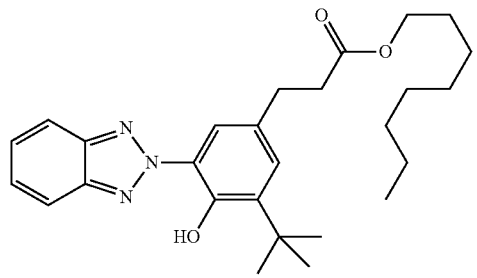 [SMILES: CCCCCCCCOC(=O)CCc1cc(-n2nc3ccccc3n2)c(O)c(C(C)(C)C)c1]

TABLE C-continued
Table C shows possible stabilisers which can be added to the LC media according to the invention. Therein n denotes an integer from 1 to 12, preferably 1,2, 3, 4, 5, 6, 7 or 8, and terminal methyl groups are not shown.
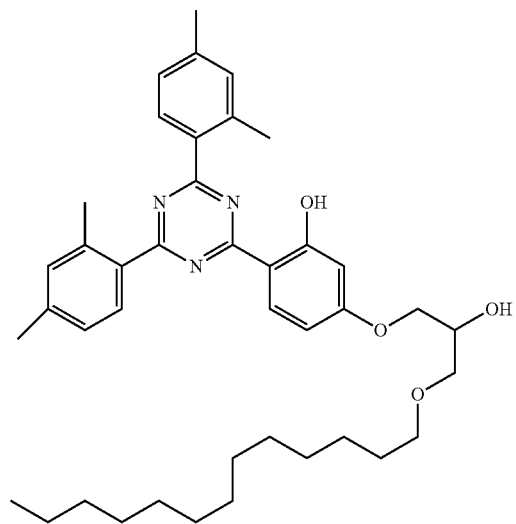 [SMILES: CCCCCCCCCCCCCOCC(O)COc1ccc(-c2nc(-c3ccc(C)cc3C)nc(-c3ccc(C)cc3C)n2)c(O)c1]
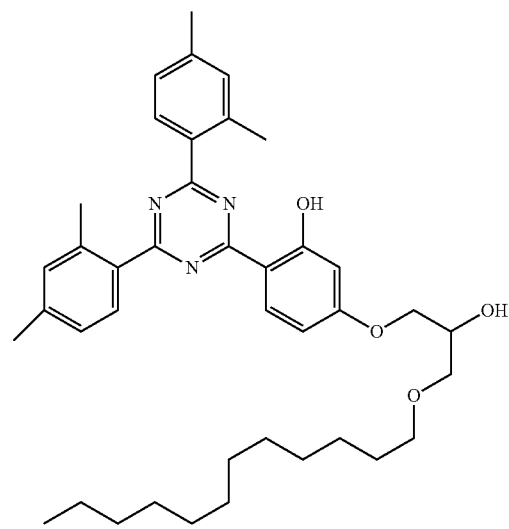 [SMILES: CCCCCCCCCCCCOCC(O)COc1ccc(-c2nc(-c3ccc(C)cc3C)nc(-c3ccc(C)cc3C)n2)c(O)c1]
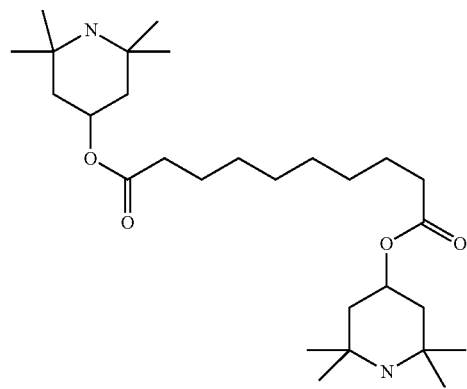

TABLE C-continued
Table C shows possible stabilisers which can be added to the LC media according to the invention. Therein n denotes an integer from 1 to 12, preferably 1,2, 3, 4, 5, 6, 7 or 8, and terminal methyl groups are not shown.
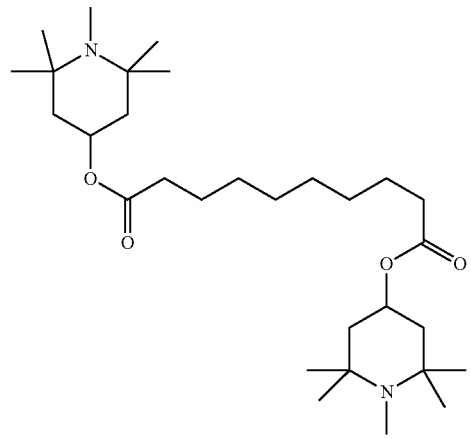
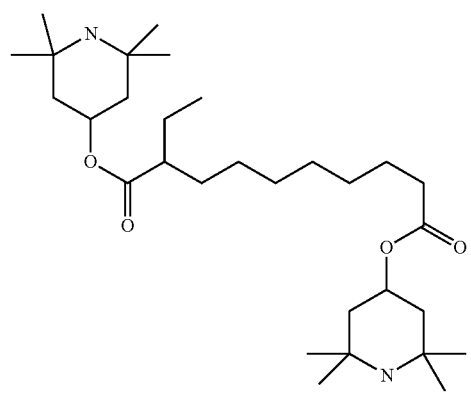
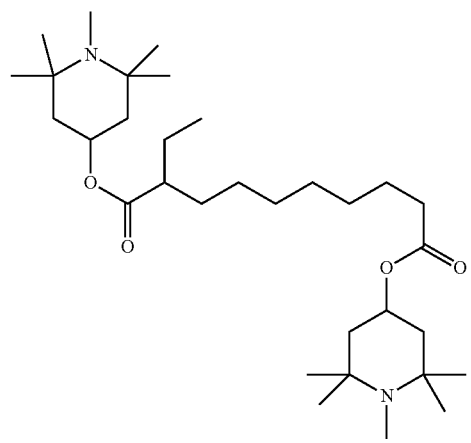

TABLE C-continued
Table C shows possible stabilisers which can be added to the LC media according to the invention. Therein n denotes an integer from 1 to 12, preferably 1, 2, 3, 4, 5, 6, 7 or 8, and terminal methyl groups are not shown.
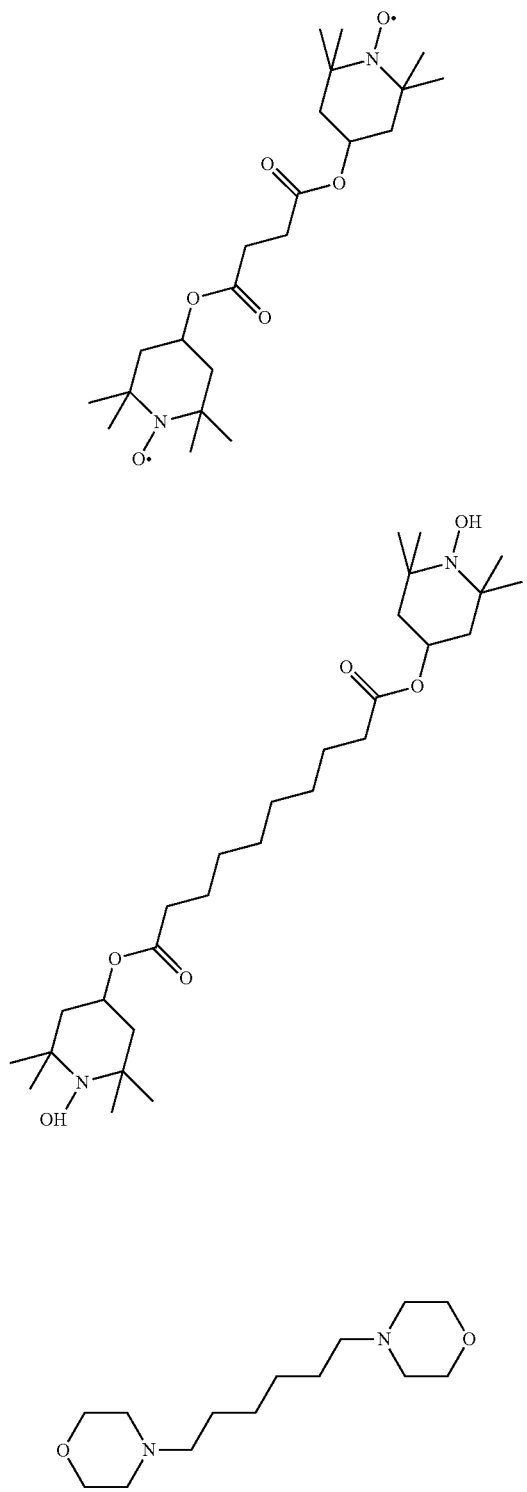

TABLE C-continued
Table C shows possible stabilisers which can be added to the LC media according to the invention. Therein n denotes an integer from 1 to 12, preferably 1,2, 3, 4, 5, 6, 7 or 8, and terminal methyl groups are not shown.
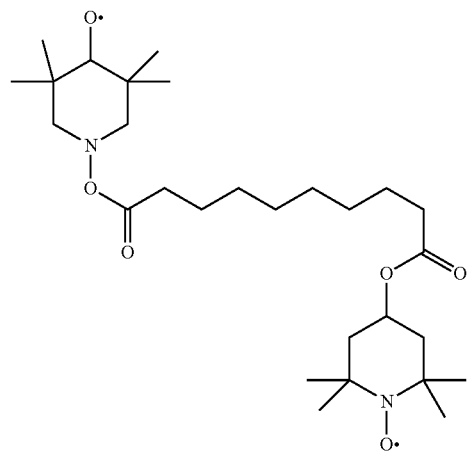
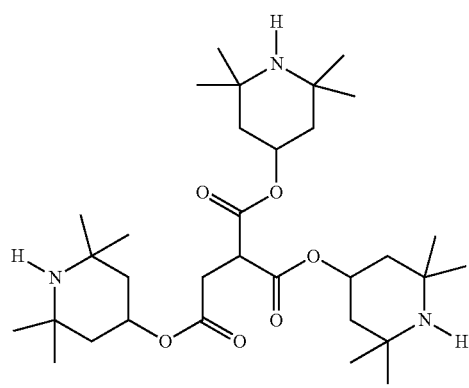
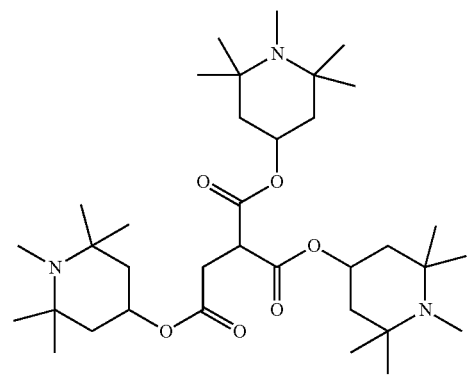

TABLE C-continued
Table C shows possible stabilisers which can be added to the LC media according to the invention. Therein n denotes an integer from 1 to 12, preferably 1,2, 3, 4, 5, 6, 7 or 8, and terminal methyl groups are not shown.
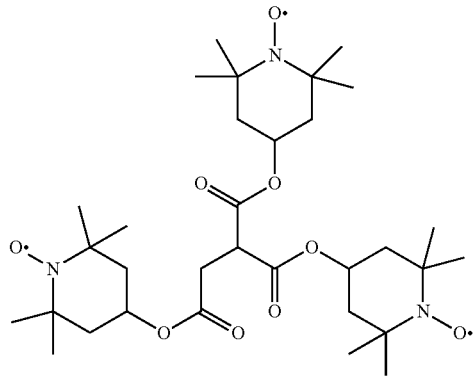
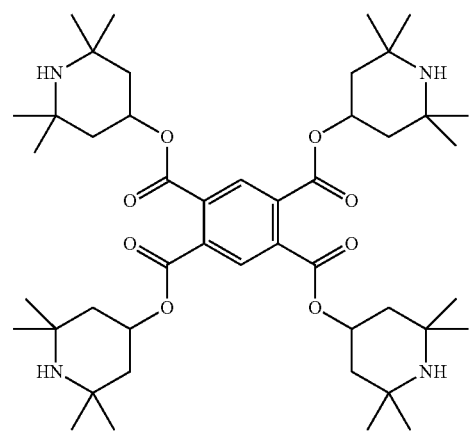
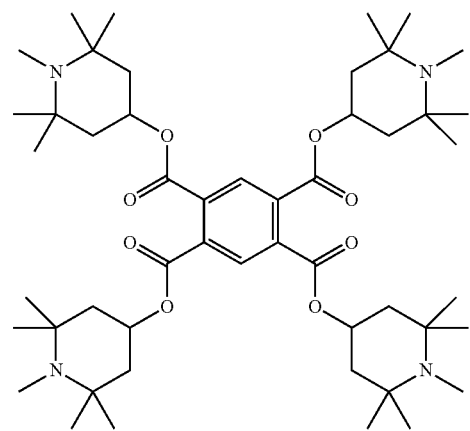

TABLE C-continued

Table C shows possible stabilisers which can be added to the LC media according to the invention. Therein n denotes an integer from 1 to 12, preferably 1,2, 3, 4, 5, 6, 7 or 8, and terminal methyl groups are not shown.

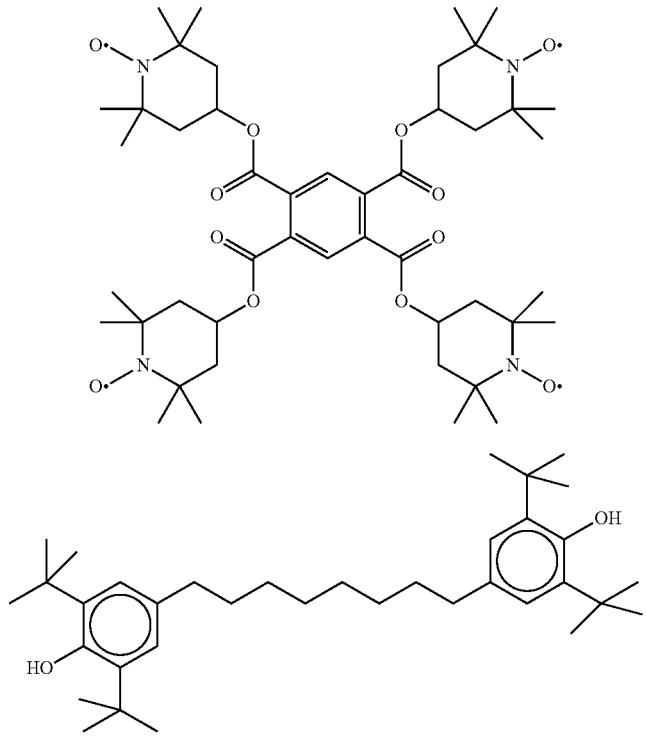

35

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

Table D shows illustrative reactive mesogenic compounds which can be used in the LC media in accordance with the present invention.

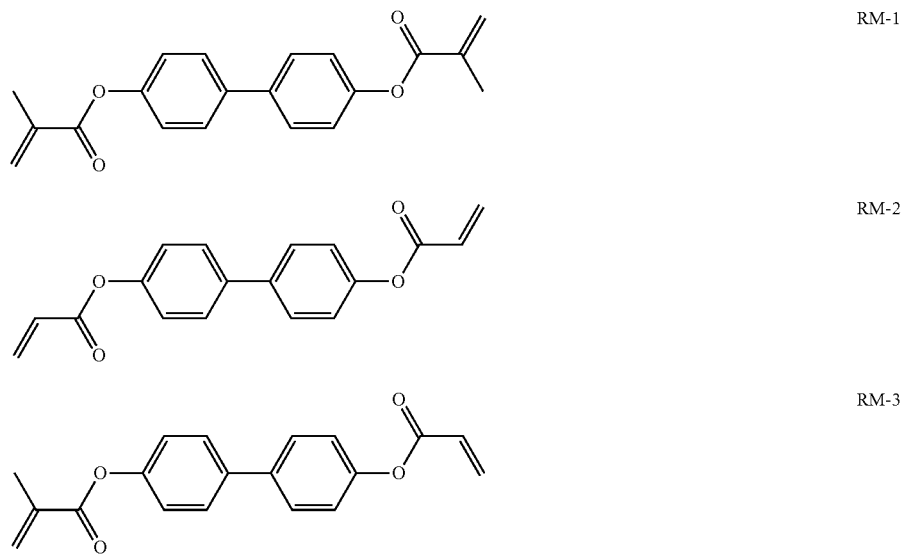

TABLE D-continued
Table D shows illustrative reactive mesogenic compounds which can be used
in the LC media in accordance with the present invention.
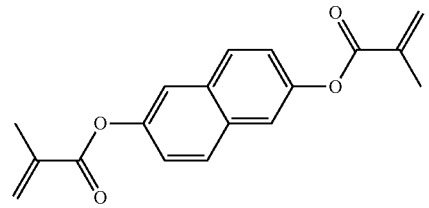 [SMILES: C=C(C)C(=O)Oc1ccc2cc(OC(=O)C(=C)C)ccc2c1]
RM-4
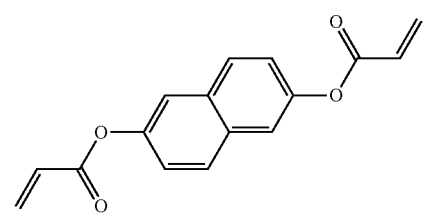 [SMILES: C=CC(=O)Oc1ccc2cc(OC(=O)C=C)ccc2c1]
RM-5
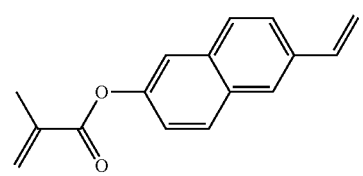 [SMILES: C=Cc1ccc2cc(OC(=O)C(=C)C)ccc2c1]
RM-6
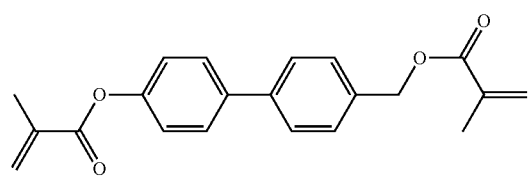 [SMILES: C=C(C)C(=O)OCc1ccc(-c2ccc(OC(=O)C(=C)C)cc2)cc1]
RM-7
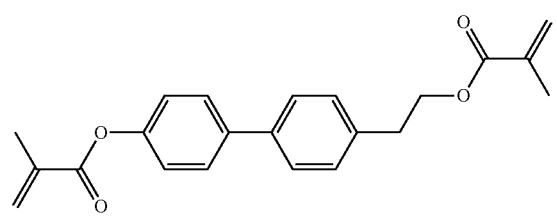 [SMILES: C=C(C)C(=O)OCCc1ccc(-c2ccc(OC(=O)C(=C)C)cc2)cc1]
RM-8
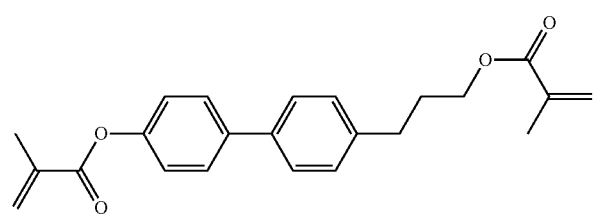 [SMILES: C=C(C)C(=O)OCCCc1ccc(-c2ccc(OC(=O)C(=C)C)cc2)cc1]
RM-9
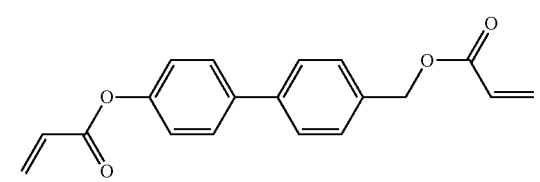 [SMILES: C=CC(=O)OCc1ccc(-c2ccc(OC(=O)C=C)cc2)cc1]
RM-10

TABLE D-continued
Table D shows illustrative reactive mesogenic compounds which can be used
in the LC media in accordance with the present invention.
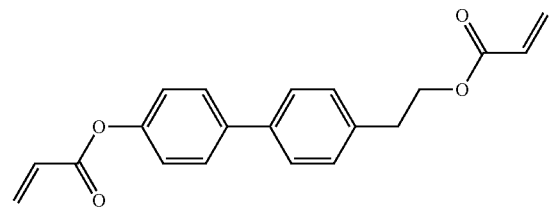 [SMILES: C=CC(=O)OCCc1ccc(-c2ccc(OC(=O)C=C)cc2)cc1] RM-11
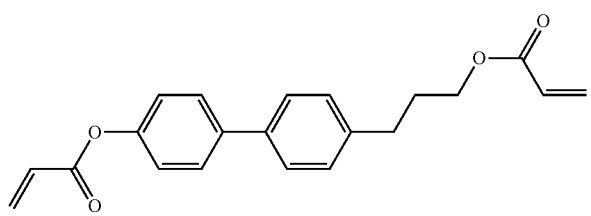 [SMILES: C=CC(=O)OCCCc1ccc(-c2ccc(OC(=O)C=C)cc2)cc1] RM-12
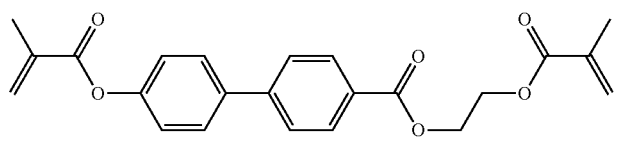 [SMILES: C=C(C)C(=O)OCCOC(=O)c1ccc(-c2ccc(OC(=O)C(=C)C)cc2)cc1] RM-13
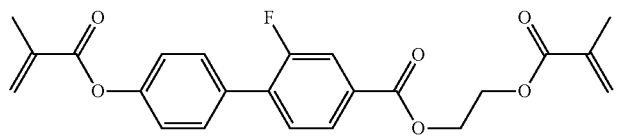 RM-14
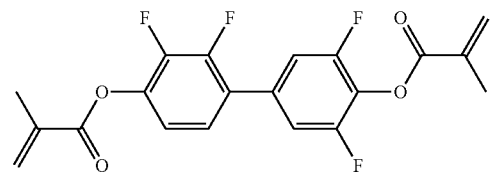 RM-15
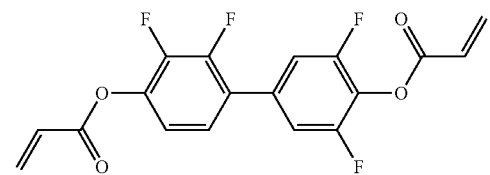 RM-16
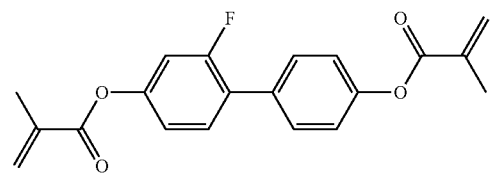 RM-17
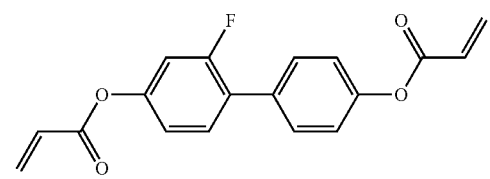 RM-18

TABLE D-continued
Table D shows illustrative reactive mesogenic compounds which can be used in the LC media in accordance with the present invention.
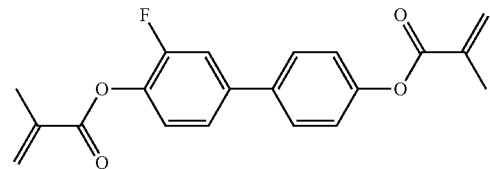 RM-19
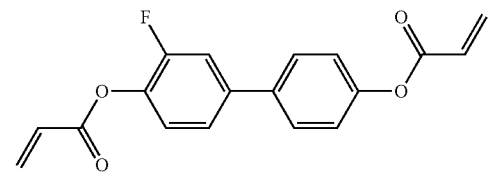 RM-20
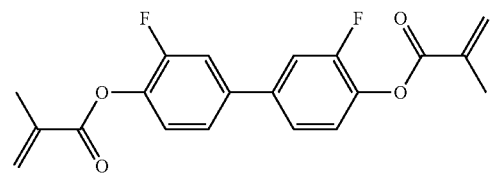 RM-21
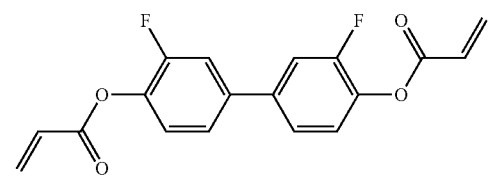 RM-22
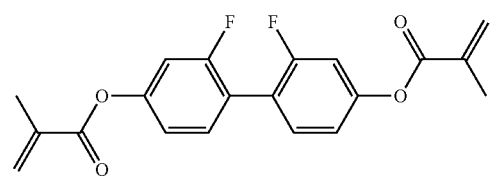 RM-23
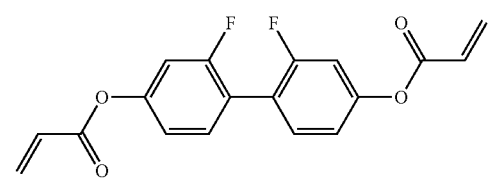 RM-24
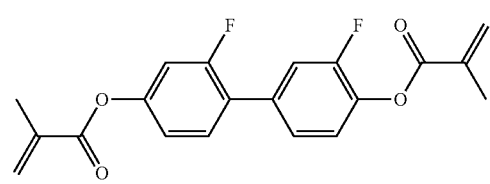 RM-25
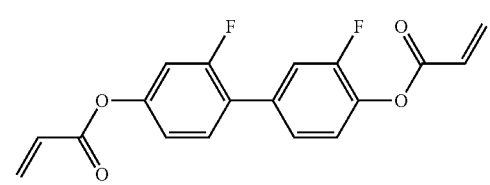 RM-26

TABLE D-continued
Table D shows illustrative reactive mesogenic compounds which can be used in the LC media in accordance with the present invention.
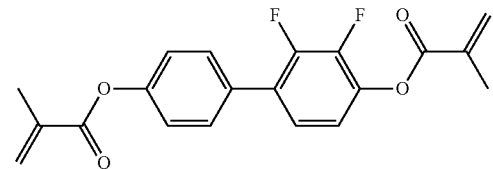 [SMILES: C=C(C)C(=O)Oc1ccc(-c2ccc(OC(=O)C(=C)C)c(F)c2F)cc1]
RM-27
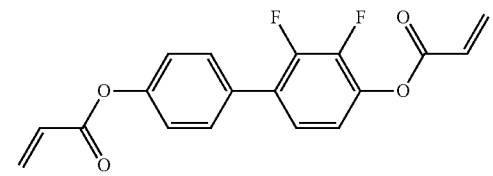 [SMILES: C=CC(=O)Oc1ccc(-c2ccc(OC(=O)C=C)c(F)c2F)cc1]
RM-28
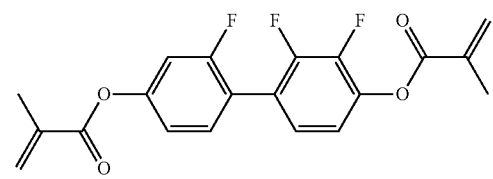 [SMILES: C=C(C)C(=O)Oc1ccc(-c2ccc(OC(=O)C(=C)C)c(F)c2F)c(F)c1]
RM-29
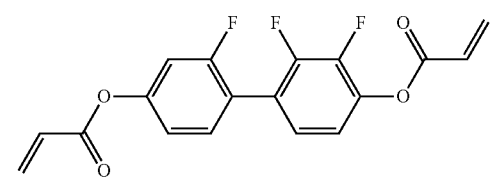
RM-30
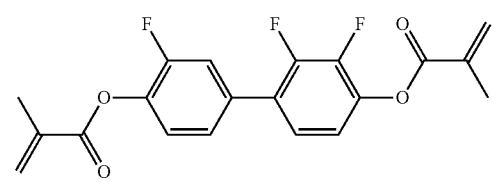 [SMILES: C=C(C)C(=O)Oc1ccc(-c2ccc(OC(=O)C(=C)C)c(F)c2F)cc1F]
RM-31
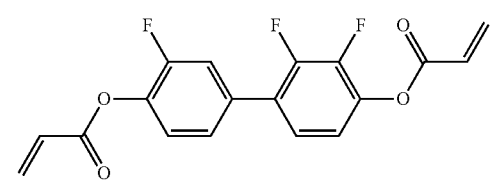 [SMILES: C=CC(=O)Oc1ccc(-c2ccc(OC(=O)C=C)c(F)c2F)cc1F]
RM-32
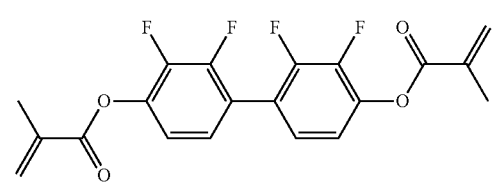 [SMILES: C=C(C)C(=O)Oc1ccc(-c2ccc(OC(=O)C(=C)C)c(F)c2F)c(F)c1F]
RM-33
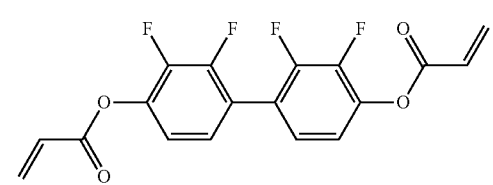 [SMILES: C=CC(=O)Oc1ccc(-c2ccc(OC(=O)C=C)c(F)c2F)c(F)c1F]
RM-34

TABLE D-continued
Table D shows illustrative reactive mesogenic compounds which can be used
in the LC media in accordance with the present invention.
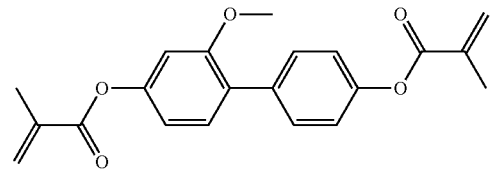 RM-35
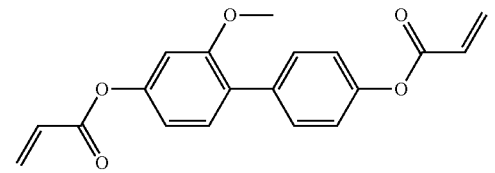 RM-36
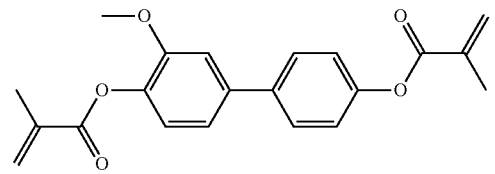 RM-37
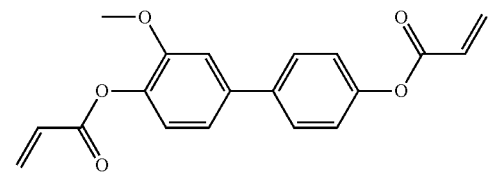 [SMILES: C=CC(=O)Oc1ccc(-c2ccc(OC(=O)C=C)c(OC)c2)cc1] RM-38
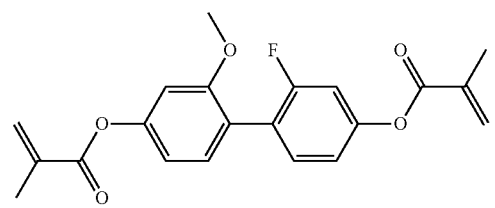 [SMILES: C=C(C)C(=O)Oc1ccc(-c2ccc(OC(=O)C(=C)C)cc2OC)c(F)c1] RM-39
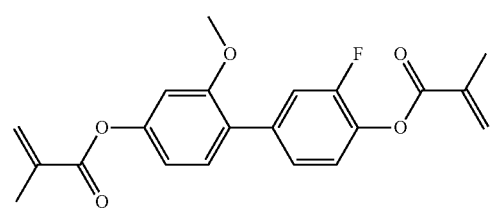 [SMILES: C=C(C)C(=O)Oc1ccc(-c2ccc(OC(=O)C(=C)C)c(F)c2)c(OC)c1] RM-40
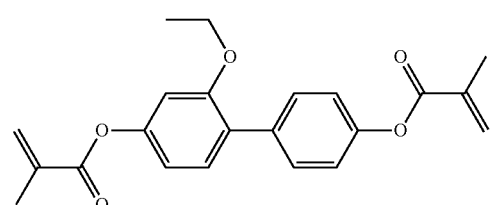 RM-41
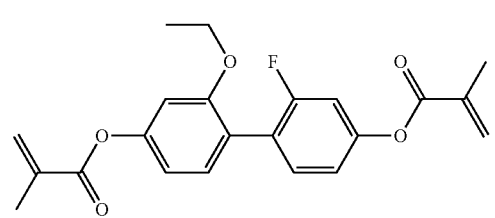 [SMILES: C=C(C)C(=O)Oc1ccc(-c2ccc(OC(=O)C(=C)C)cc2OCC)c(F)c1] RM-42

TABLE D-continued
Table D shows illustrative reactive mesogenic compounds which can be used in the LC media in accordance with the present invention.
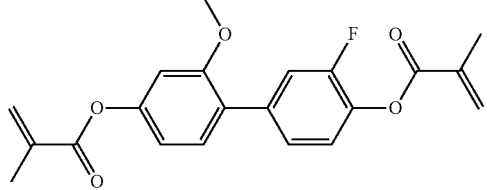 RM-43
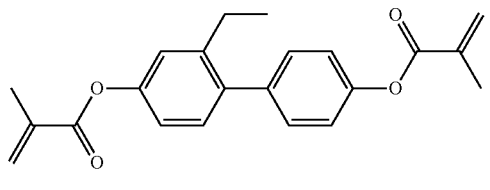 [SMILES: C=C(C)C(=O)Oc1ccc(-c2ccc(OC(=O)C(=C)C)cc2CC)cc1] RM-44
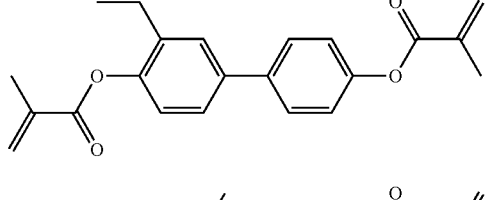 RM-45
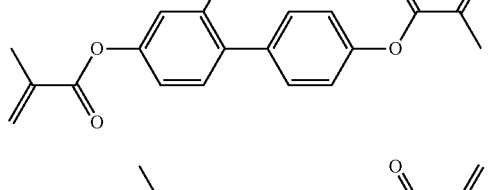 RM-46
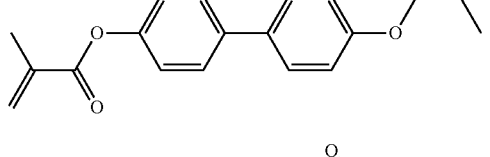 RM-47
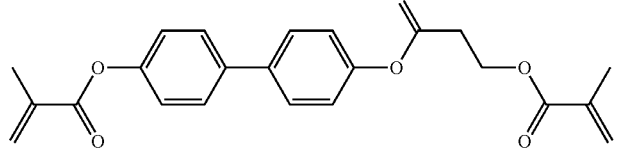 RM-48
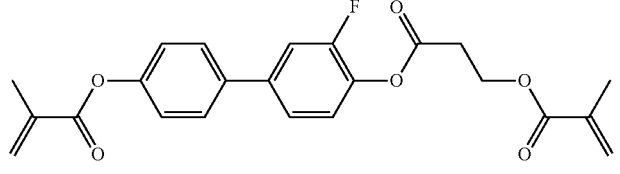 [SMILES: C=C(C)C(=O)OCCC(=O)Oc1ccc(-c2ccc(OC(=O)C(=C)C)cc2)cc1F] RM-49
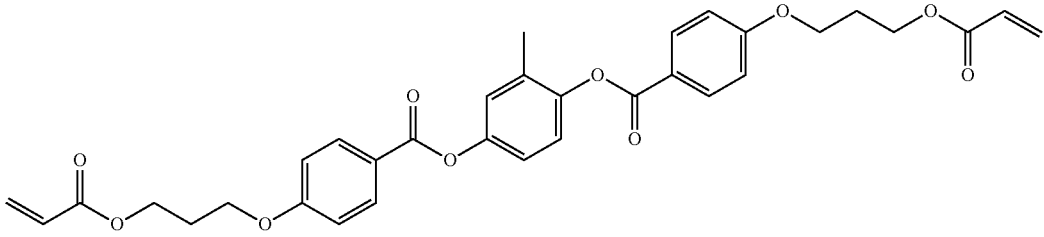 [SMILES: C=CC(=O)OCCCOc1ccc(C(=O)Oc2ccc(OC(=O)c3ccc(OCCCOC(=O)C=C)cc3)c(C)c2)cc1] RM-50

TABLE D-continued
Table D shows illustrative reactive mesogenic compounds which can be used in the LC media in accordance with the present invention.
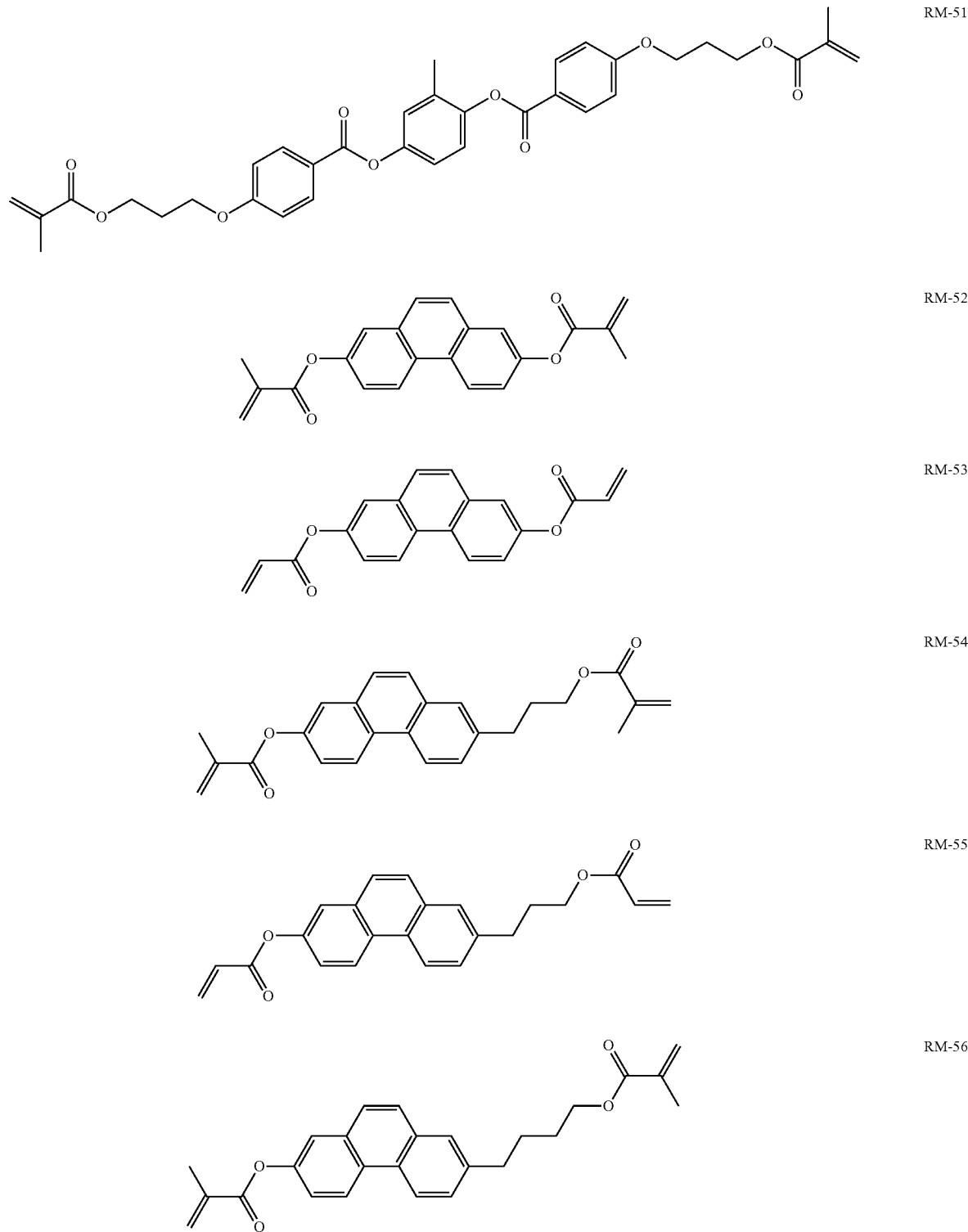

TABLE D-continued
Table D shows illustrative reactive mesogenic compounds which can be used in the LC media in accordance with the present invention.
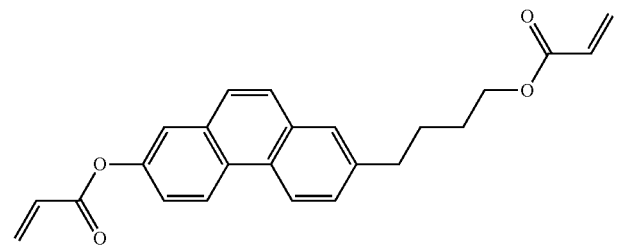 [SMILES: C=CC(=O)OCCCCc1ccc2c(ccc3cc(OC(=O)C=C)ccc32)c1] RM-57
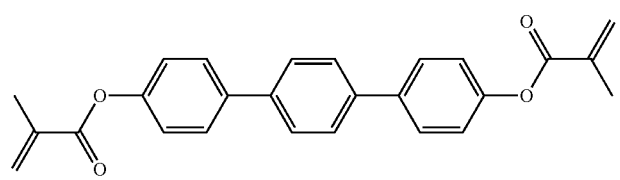 RM-58
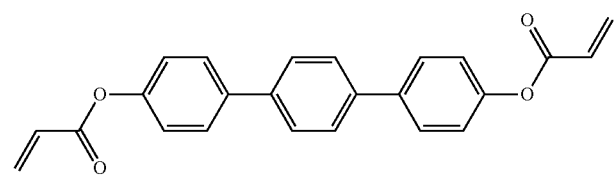 [SMILES: C=CC(=O)Oc1ccc(-c2ccc(-c3ccc(OC(=O)C=C)cc3)cc2)cc1] RM-59
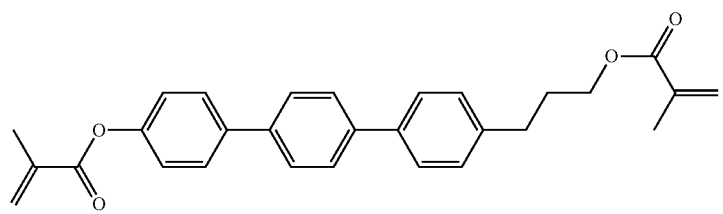 [SMILES: C=C(C)C(=O)OCCCc1ccc(-c2ccc(-c3ccc(OC(=O)C(=C)C)cc3)cc2)cc1] RM-60
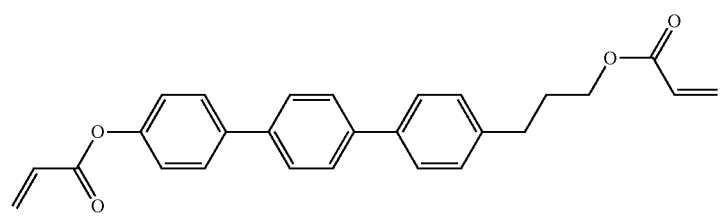 [SMILES: C=CC(=O)OCCCc1ccc(-c2ccc(-c3ccc(OC(=O)C=C)cc3)cc2)cc1] RM-61
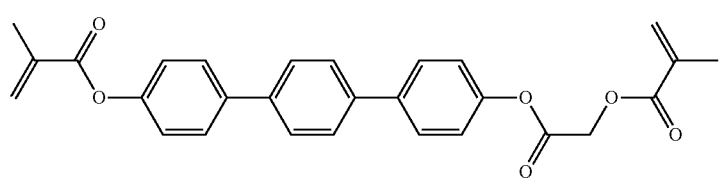 [SMILES: C=C(C)C(=O)OCC(=O)Oc1ccc(-c2ccc(-c3ccc(OC(=O)C(=C)C)cc3)cc2)cc1] RM-62
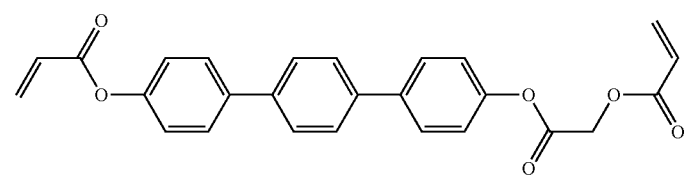 [SMILES: C=CC(=O)OCC(=O)Oc1ccc(-c2ccc(-c3ccc(OC(=O)C=C)cc3)cc2)cc1] RM-63

TABLE D-continued
Table D shows illustrative reactive mesogenic compounds which can be used in the LC media in accordance with the present invention.
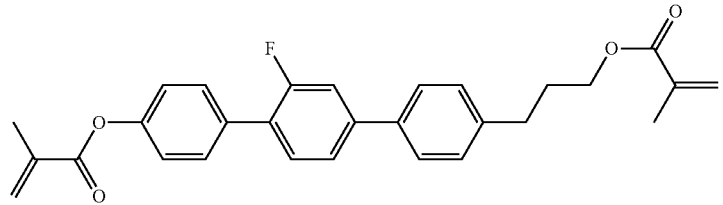 [SMILES: C=C(C)C(=O)OCCCc1ccc(-c2ccc(-c3ccc(OC(=O)C(=C)C)cc3)c(F)c2)cc1] RM-64
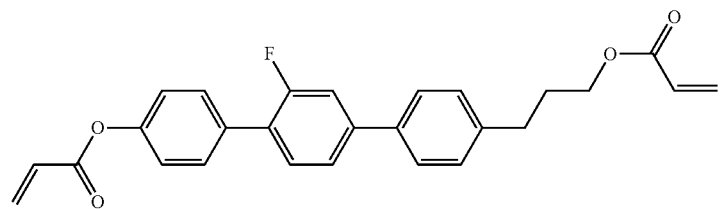 [SMILES: C=CC(=O)OCCCc1ccc(-c2ccc(-c3ccc(OC(=O)C=C)cc3)c(F)c2)cc1] RM-65
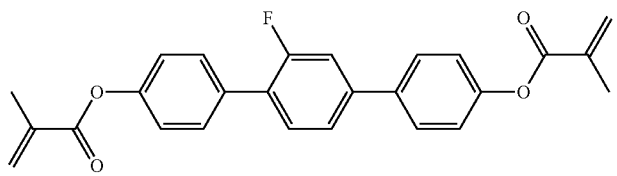 [SMILES: C=C(C)C(=O)Oc1ccc(-c2ccc(-c3ccc(OC(=O)C(=C)C)cc3)c(F)c2)cc1] RM-66
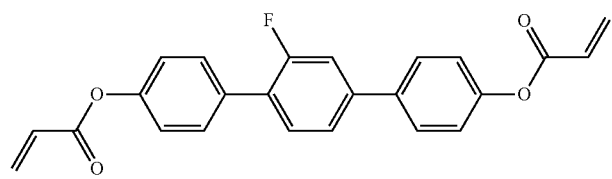 [SMILES: C=CC(=O)Oc1ccc(-c2ccc(-c3ccc(OC(=O)C=C)cc3)c(F)c2)cc1] RM-67
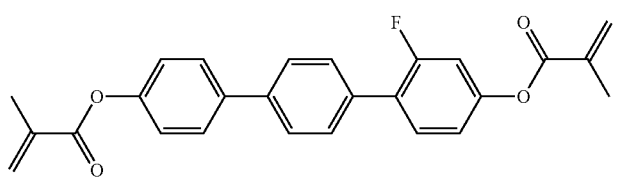 RM-68
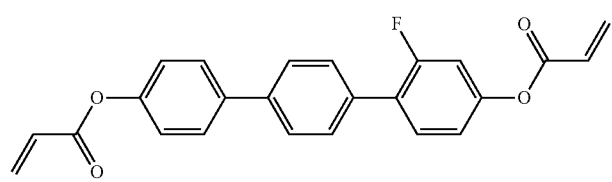 RM-69
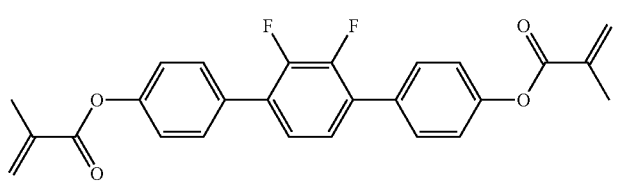 [SMILES: C=C(C)C(=O)Oc1ccc(-c2ccc(-c3ccc(OC(=O)C(=C)C)cc3)c(F)c2F)cc1] RM-70
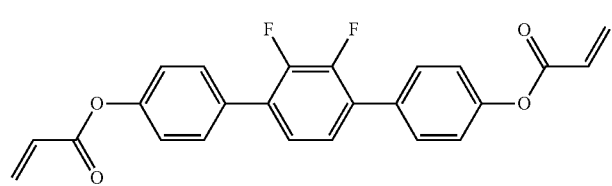 RM-71

TABLE D-continued
Table D shows illustrative reactive mesogenic compounds which can be used in the LC media in accordance with the present invention.
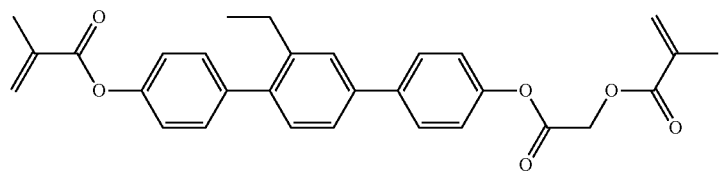 [SMILES: C=C(C)C(=O)OCC(=O)Oc1ccc(-c2ccc(-c3ccc(OC(=O)C(=C)C)cc3)c(CC)c2)cc1] RM-72
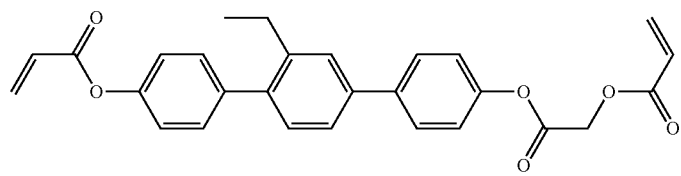 [SMILES: C=CC(=O)OCC(=O)Oc1ccc(-c2ccc(-c3ccc(OC(=O)C=C)cc3)c(CC)c2)cc1] RM-73
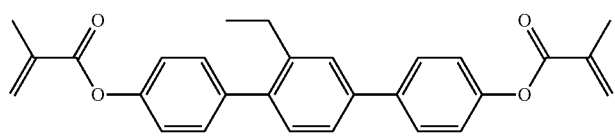 [SMILES: C=C(C)C(=O)Oc1ccc(-c2ccc(-c3ccc(OC(=O)C(=C)C)cc3)c(CC)c2)cc1] RM-74
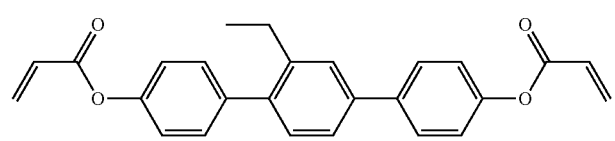 [SMILES: C=CC(=O)Oc1ccc(-c2ccc(-c3ccc(OC(=O)C=C)cc3)c(CC)c2)cc1] RM-75
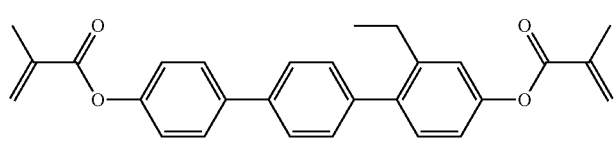 RM-76
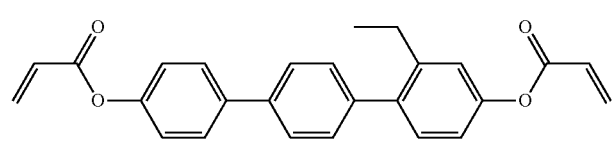 [SMILES: C=CC(=O)Oc1ccc(-c2ccc(-c3ccc(OC(=O)C=C)cc3CC)cc2)cc1] RM-77
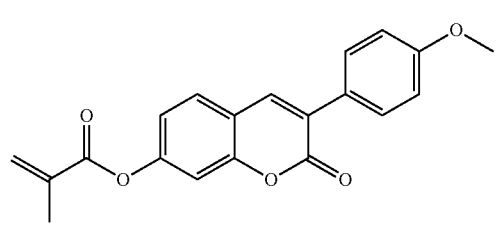 [SMILES: C=C(C)C(=O)Oc1ccc2cc(-c3ccc(OC)cc3)c(=O)oc2c1] RM-78
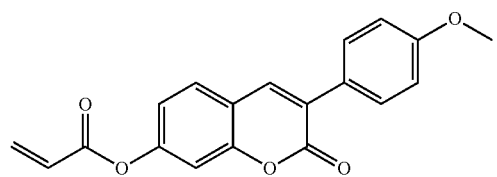 [SMILES: C=CC(=O)Oc1ccc2cc(-c3ccc(OC)cc3)c(=O)oc2c1] RM-79
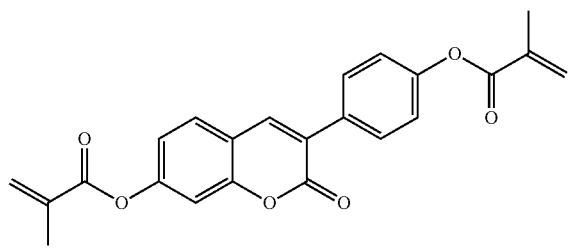 [SMILES: C=C(C)C(=O)Oc1ccc(-c2cc3ccc(OC(=O)C(=C)C)cc3oc2=O)cc1] RM-80

TABLE D-continued
Table D shows illustrative reactive mesogenic compounds which can be used in the LC media in accordance with the present invention.
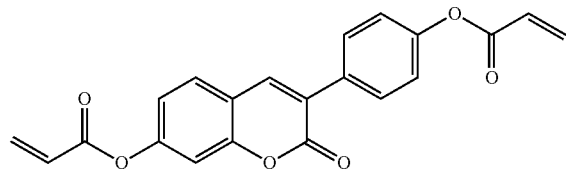 [SMILES: C=CC(=O)Oc1ccc(-c2cc3ccc(OC(=O)C=C)cc3oc2=O)cc1] RM-81
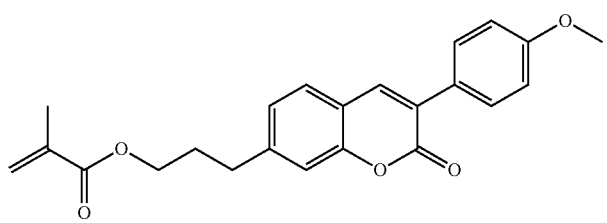 [SMILES: C=C(C)C(=O)OCCCc1ccc2cc(-c3ccc(OC)cc3)c(=O)oc2c1] RM-82
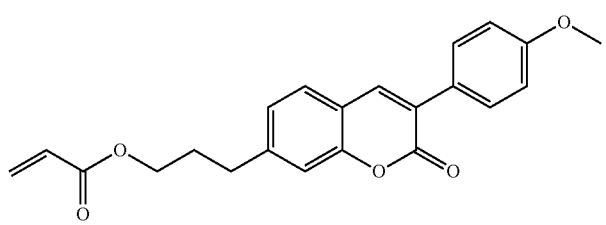 [SMILES: C=CC(=O)OCCCc1ccc2cc(-c3ccc(OC)cc3)c(=O)oc2c1] RM-83
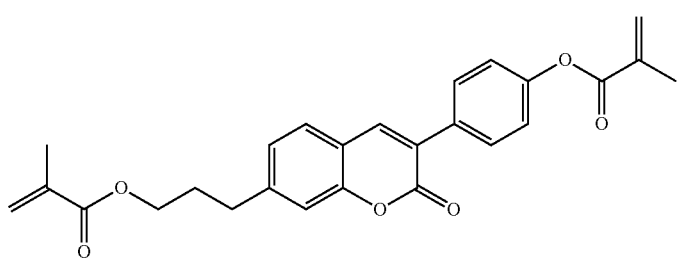 [SMILES: C=C(C)C(=O)OCCCc1ccc2cc(-c3ccc(OC(=O)C(=C)C)cc3)c(=O)oc2c1] RM-84
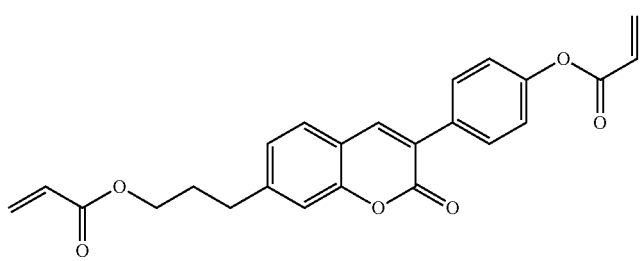 [SMILES: C=CC(=O)OCCCc1ccc2cc(-c3ccc(OC(=O)C=C)cc3)c(=O)oc2c1] RM-85
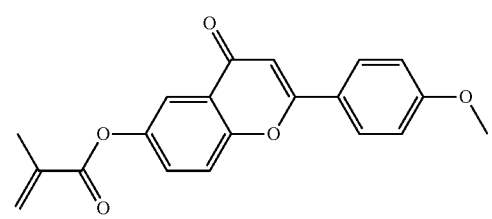 [SMILES: C=C(C)C(=O)Oc1ccc2oc(-c3ccc(OC)cc3)cc(=O)c2c1] RM-86

TABLE D-continued
Table D shows illustrative reactive mesogenic compounds which can be used
in the LC media in accordance with the present invention.
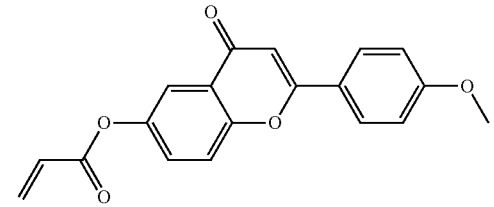 [SMILES: C=CC(=O)Oc1ccc2oc(-c3ccc(OC)cc3)cc(=O)c2c1]
RM-87
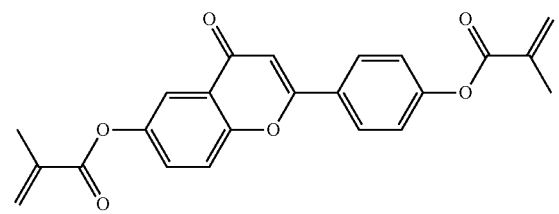 [SMILES: C=C(C)C(=O)Oc1ccc(-c2cc(=O)c3cc(OC(=O)C(=C)C)ccc3o2)cc1]
RM-88
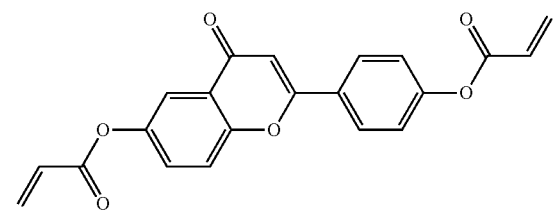 [SMILES: C=CC(=O)Oc1ccc(-c2cc(=O)c3cc(OC(=O)C=C)ccc3o2)cc1]
RM-89
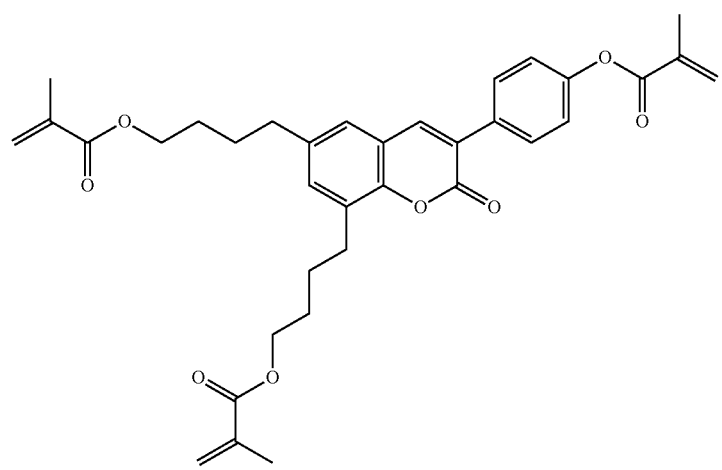 [SMILES: C=C(C)C(=O)OCCCCc1cc(CCCCOC(=O)C(=C)C)c2oc(=O)c(-c3ccc(OC(=O)C(=C)C)cc3)cc2c1]
RM-90
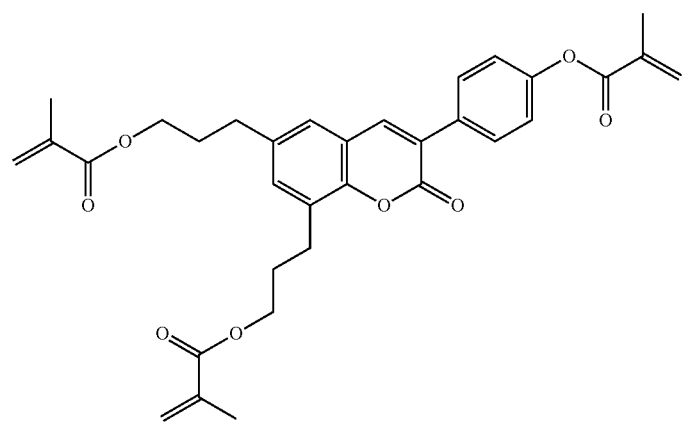 [SMILES: C=C(C)C(=O)OCCCc1cc(CCCOC(=O)C(=C)C)c2oc(=O)c(-c3ccc(OC(=O)C(=C)C)cc3)cc2c1]
RM-91

TABLE D-continued
Table D shows illustrative reactive mesogenic compounds which can be used in the LC media in accordance with the present invention.
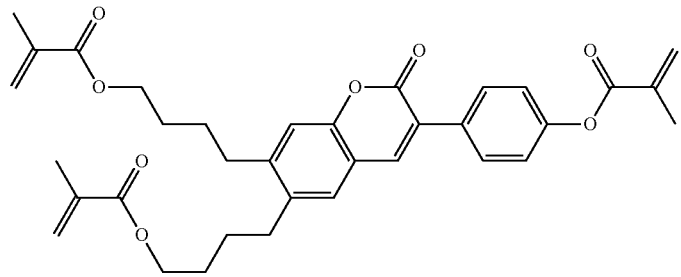 [SMILES: C=C(C)C(=O)OCCCCc1cc2cc(-c3ccc(OC(=O)C(=C)C)cc3)c(=O)oc2cc1CCCCOC(=O)C(=C)C] RM-92
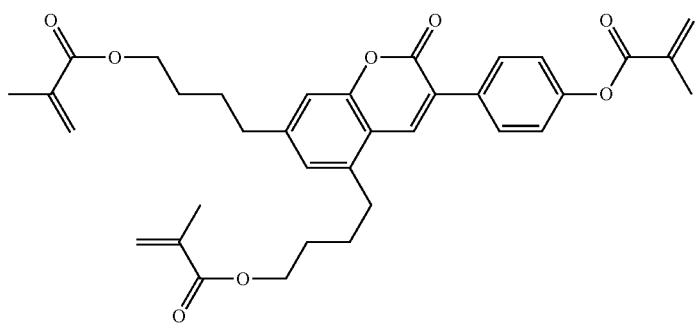 [SMILES: C=C(C)C(=O)OCCCCc1cc(CCCCOC(=O)C(=C)C)c2cc(-c3ccc(OC(=O)C(=C)C)cc3)c(=O)oc2c1] RM-93
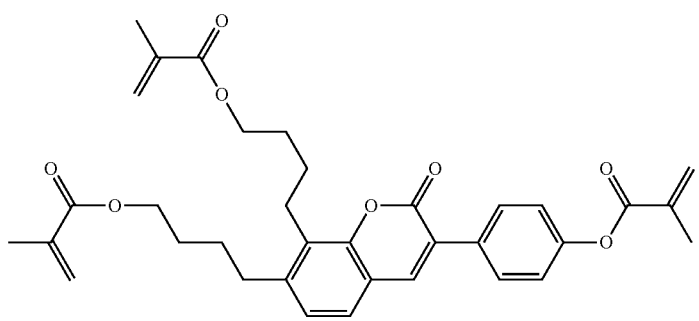 [SMILES: C=C(C)C(=O)OCCCCc1ccc2cc(-c3ccc(OC(=O)C(=C)C)cc3)c(=O)oc2c1CCCCOC(=O)C(=C)C] RM-94
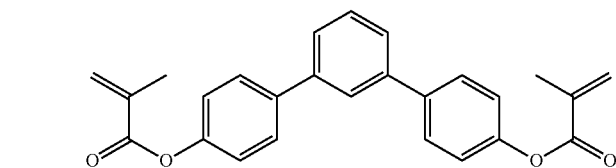 [SMILES: C=C(C)C(=O)Oc1ccc(-c2cccc(-c3ccc(OC(=O)C(=C)C)cc3)c2)cc1] RM-95
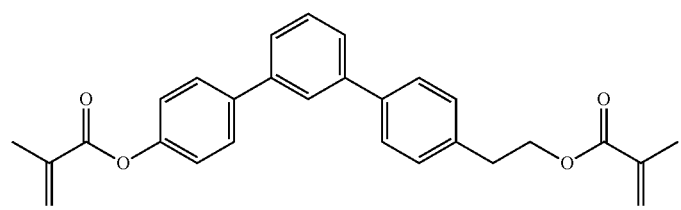 [SMILES: C=C(C)C(=O)OCCc1ccc(-c2cccc(-c3ccc(OC(=O)C(=C)C)cc3)c2)cc1] RM-96
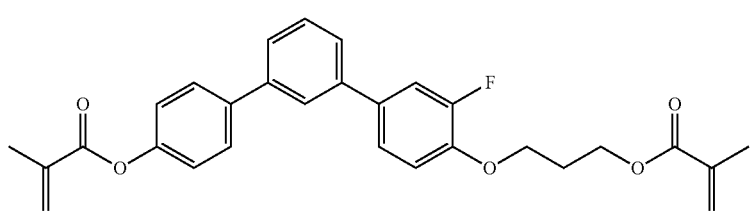 [SMILES: C=C(C)C(=O)OCCCOc1ccc(-c2cccc(-c3ccc(OC(=O)C(=C)C)cc3)c2)cc1F] RM-97

TABLE D-continued
Table D shows illustrative reactive mesogenic compounds which can be used
in the LC media in accordance with the present invention.
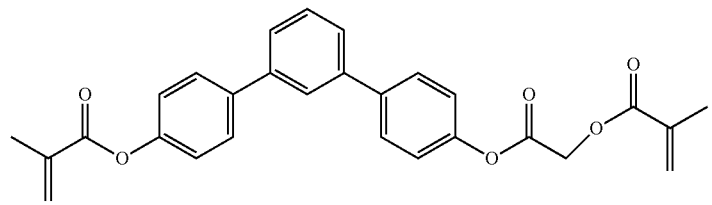 [SMILES: C=C(C)C(=O)OCC(=O)Oc1ccc(-c2cccc(-c3ccc(OC(=O)C(=C)C)cc3)c2)cc1]
RM-98
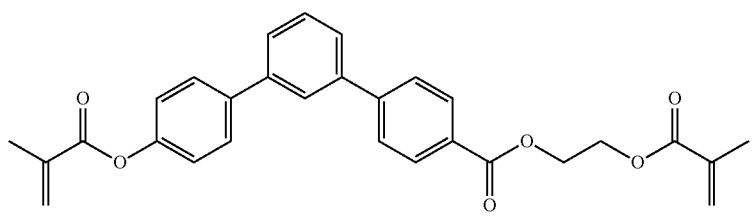 [SMILES: C=C(C)C(=O)OCCOC(=O)c1ccc(-c2cccc(-c3ccc(OC(=O)C(=C)C)cc3)c2)cc1]
RM-99
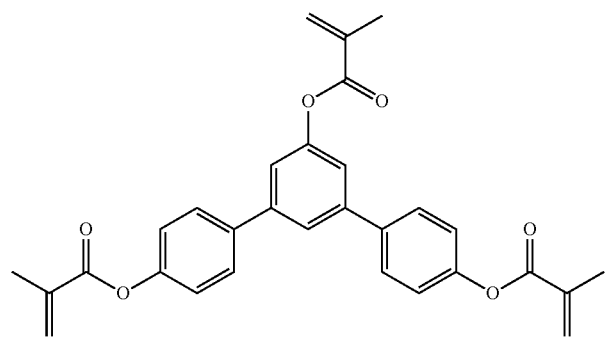 [SMILES: C=C(C)C(=O)Oc1ccc(-c2cc(OC(=O)C(=C)C)cc(-c3ccc(OC(=O)C(=C)C)cc3)c2)cc1]
RM-100
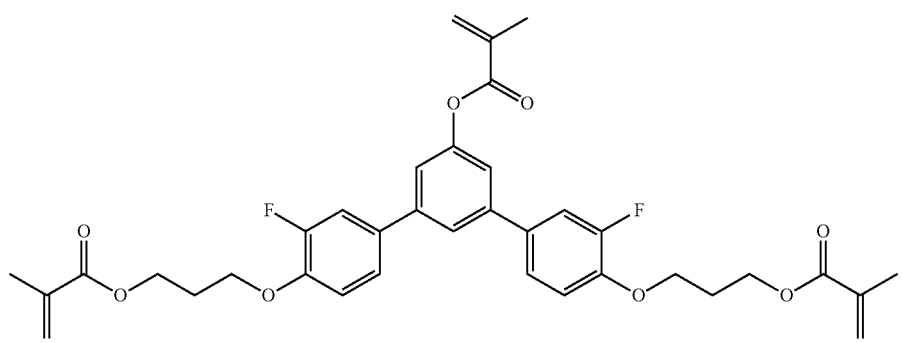 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101
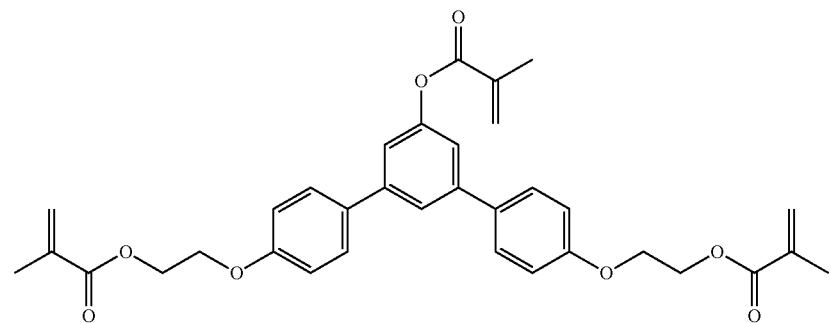 [SMILES: C=C(C)C(=O)OCCOc1ccc(-c2cc(OC(=O)C(=C)C)cc(-c3ccc(OCCOC(=O)C(=C)C)cc3)c2)cc1]
RM-102

TABLE D-continued
Table D shows illustrative reactive mesogenic compounds which can be used in the LC media in accordance with the present invention.
RM-103
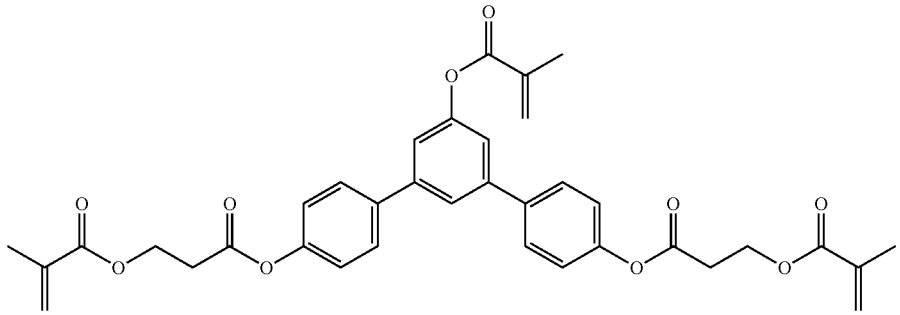 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-104
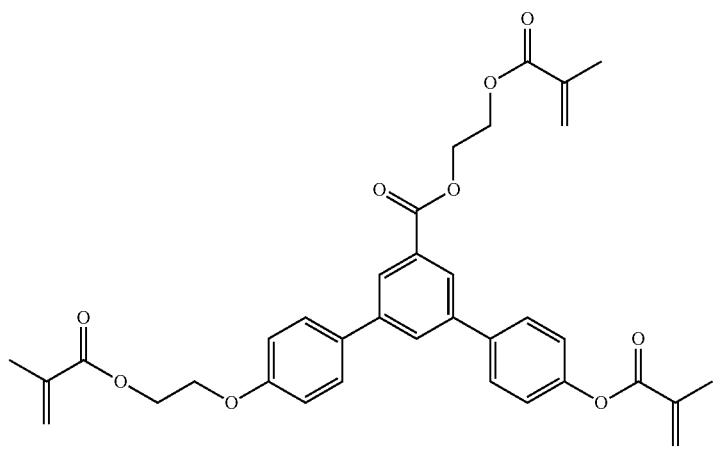 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
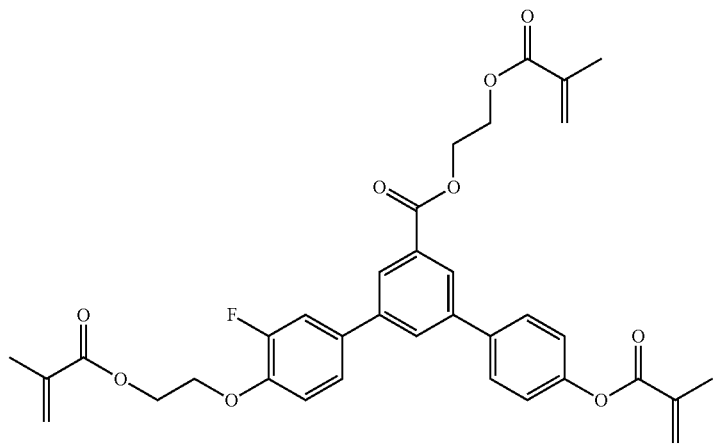 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-106
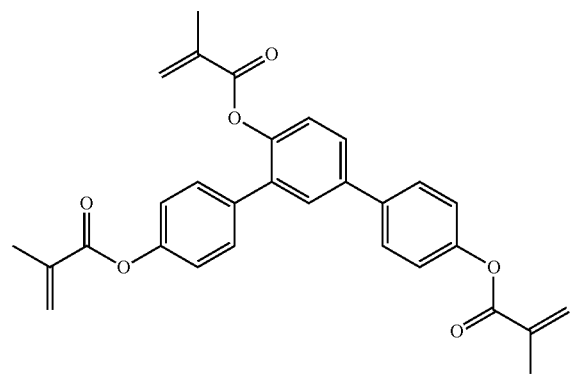 [SMILES: C=C(C)C(=O)Oc1ccc(-c2ccc(OC(=O)C(=C)C)c(-c3ccc(OC(=O)C(=C)C)cc3)c2)cc1]

TABLE D-continued
Table D shows illustrative reactive mesogenic compounds which can be used in the LC media in accordance with the present invention.
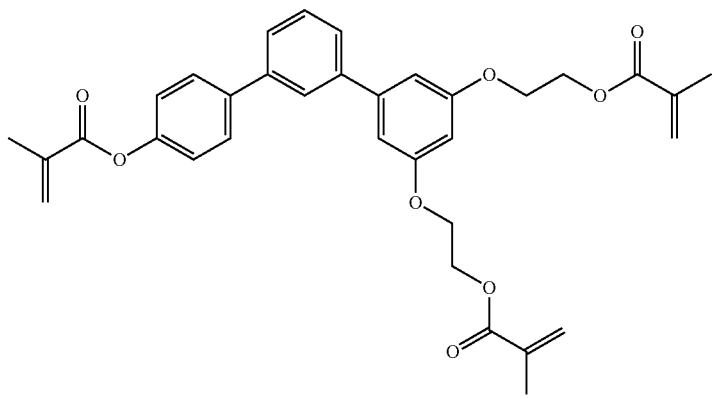 [SMILES: C=C(C)C(=O)OCCOc1cc(OCCOC(=O)C(=C)C)cc(-c2cccc(-c3ccc(OC(=O)C(=C)C)cc3)c2)c1]
RM-107
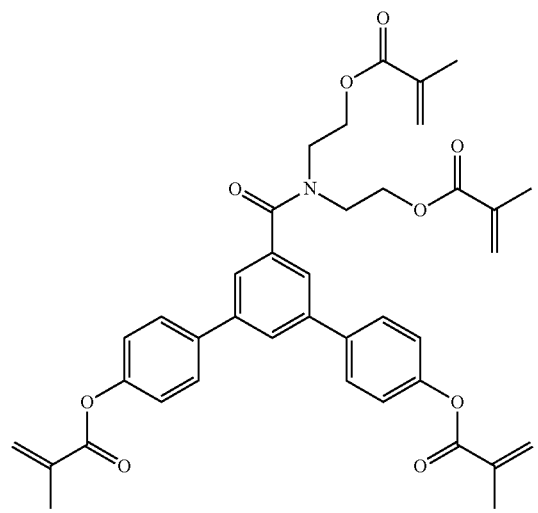 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-108
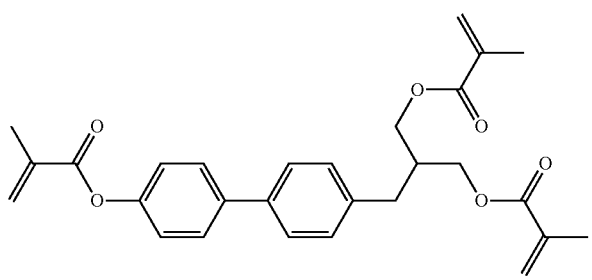 [SMILES: C=C(C)C(=O)OCC(COC(=O)C(=C)C)Cc1ccc(-c2ccc(OC(=O)C(=C)C)cc2)cc1]
RM-109
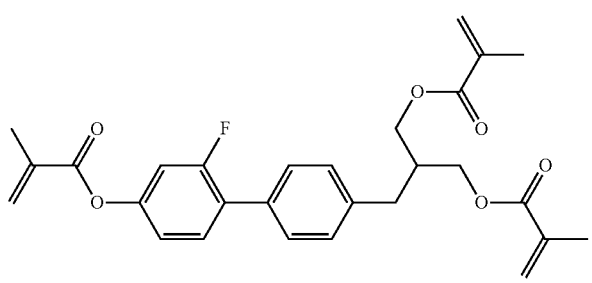 [SMILES: C=C(C)C(=O)OCC(COC(=O)C(=C)C)Cc1ccc(-c2ccc(OC(=O)C(=C)C)cc2F)cc1]
RM-110

TABLE D-continued
Table D shows illustrative reactive mesogenic compounds which can be used
in the LC media in accordance with the present invention.
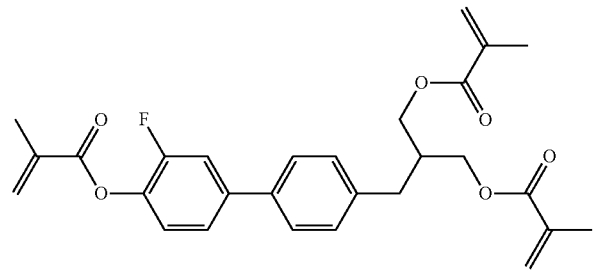 [SMILES: C=C(C)C(=O)OCC(COC(=O)C(=C)C)Cc1ccc(-c2ccc(OC(=O)C(=C)C)c(F)c2)cc1]
RM-111
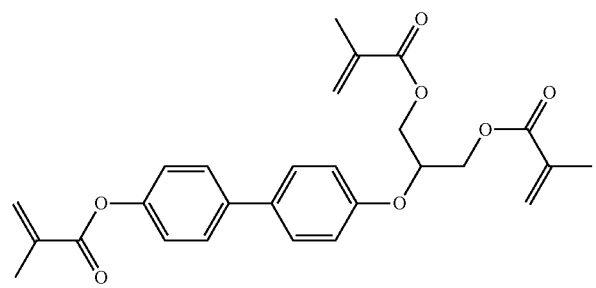 [SMILES: C=C(C)C(=O)OCC(COC(=O)C(=C)C)Oc1ccc(-c2ccc(OC(=O)C(=C)C)cc2)cc1]
RM-112
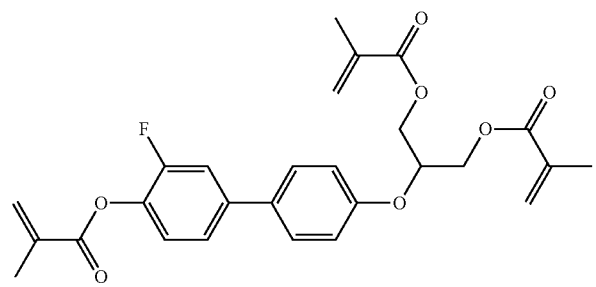 [SMILES: C=C(C)C(=O)OCC(COC(=O)C(=C)C)Oc1ccc(-c2ccc(OC(=O)C(=C)C)c(F)c2)cc1]
RM-113
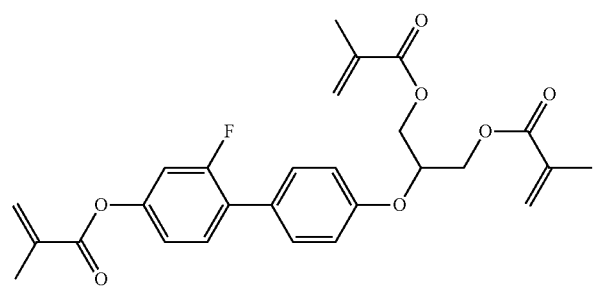 [SMILES: C=C(C)C(=O)OCC(COC(=O)C(=C)C)Oc1ccc(-c2ccc(OC(=O)C(=C)C)cc2F)cc1]
RM-114
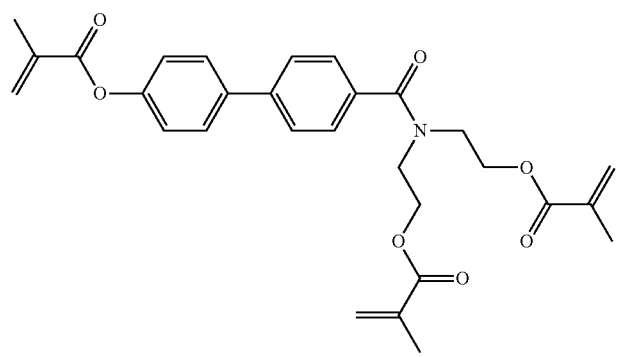 [SMILES: C=C(C)C(=O)OCCN(CCOC(=O)C(=C)C)C(=O)c1ccc(-c2ccc(OC(=O)C(=C)C)cc2)cc1]
RM-115

TABLE D-continued
Table D shows illustrative reactive mesogenic compounds which can be used
in the LC media in accordance with the present invention.
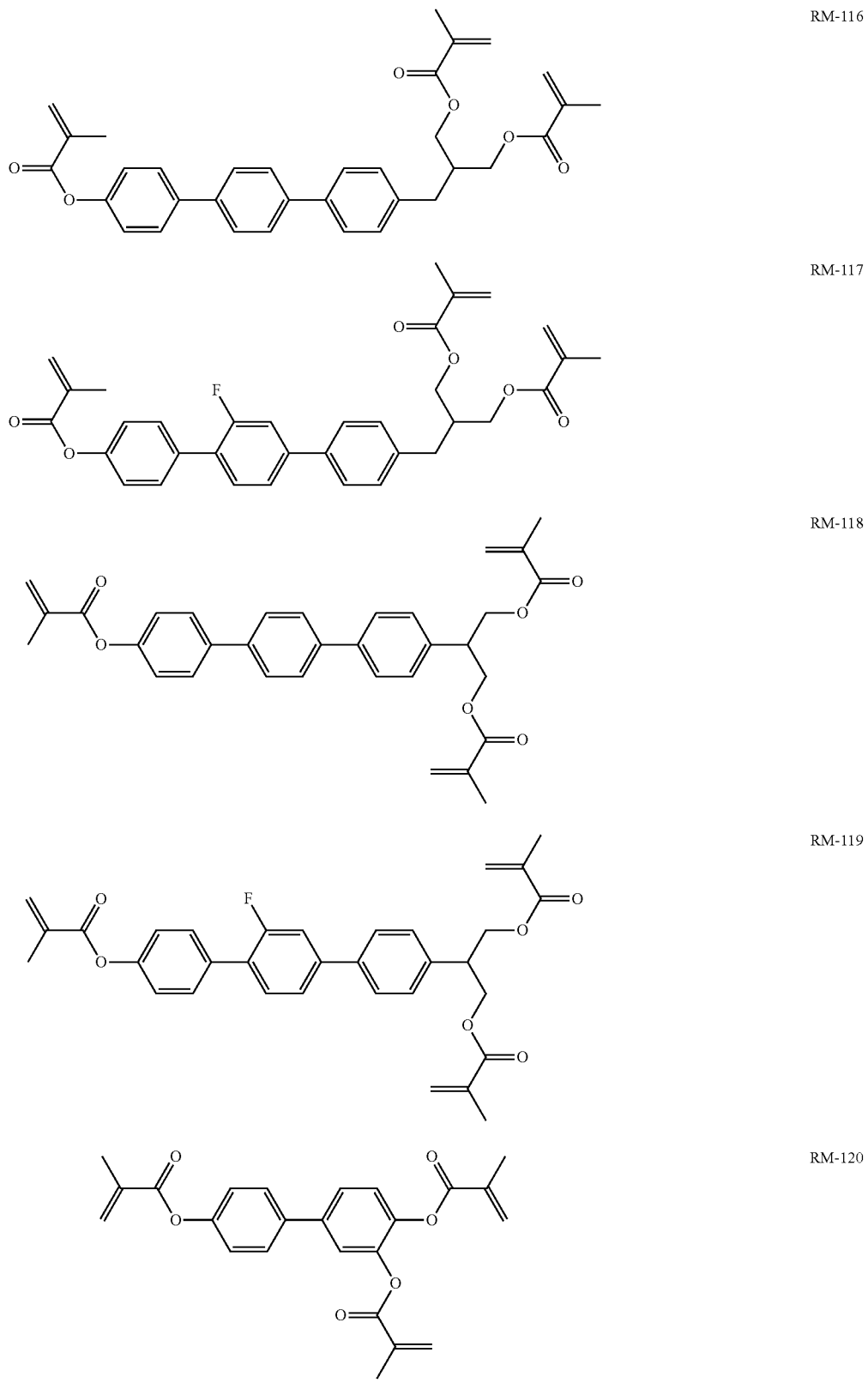
RM-116
RM-117
RM-118
RM-119
RM-120

TABLE D-continued
Table D shows illustrative reactive mesogenic compounds which can be used
in the LC media in accordance with the present invention.
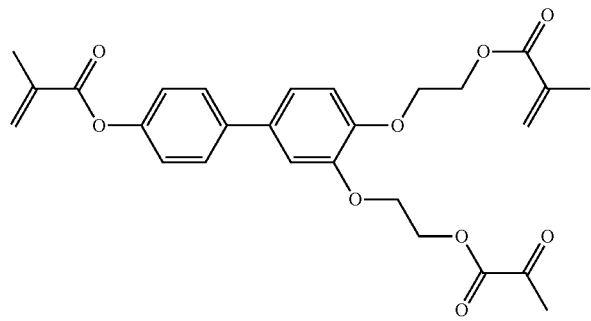 [SMILES: C=C(C)C(=O)OCCOc1ccc(-c2ccc(OC(=O)C(=C)C)cc2)cc1OCCOC(=O)C(C)=O]
RM-121
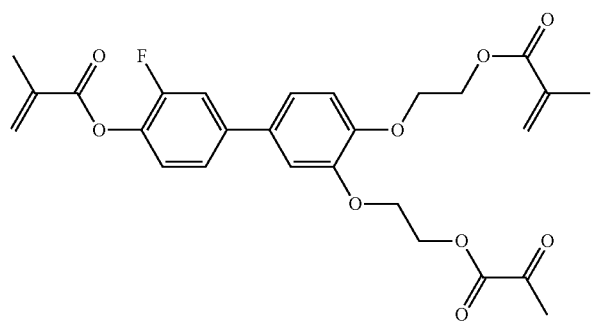 [SMILES: C=C(C)C(=O)OCCOc1ccc(-c2ccc(OC(=O)C(=C)C)c(F)c2)cc1OCCOC(=O)C(C)=O]
RM-122
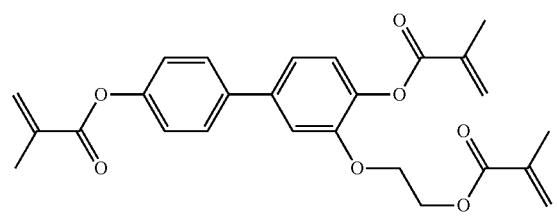 [SMILES: C=C(C)C(=O)OCCOc1cc(-c2ccc(OC(=O)C(=C)C)cc2)ccc1OC(=O)C(=C)C]
RM-123
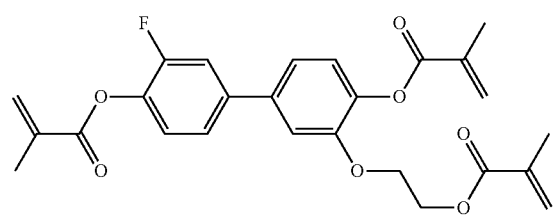 [SMILES: C=C(C)C(=O)OCCOc1cc(-c2ccc(OC(=O)C(=C)C)c(F)c2)ccc1OC(=O)C(=C)C]
RM-124
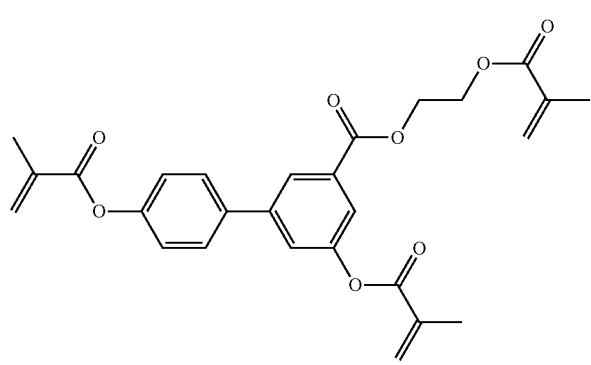 [SMILES: C=C(C)C(=O)OCCOC(=O)c1cc(OC(=O)C(=C)C)cc(-c2ccc(OC(=O)C(=C)C)cc2)c1]
RM-125

TABLE D-continued
Table D shows illustrative reactive mesogenic compounds which can be used
in the LC media in accordance with the present invention.
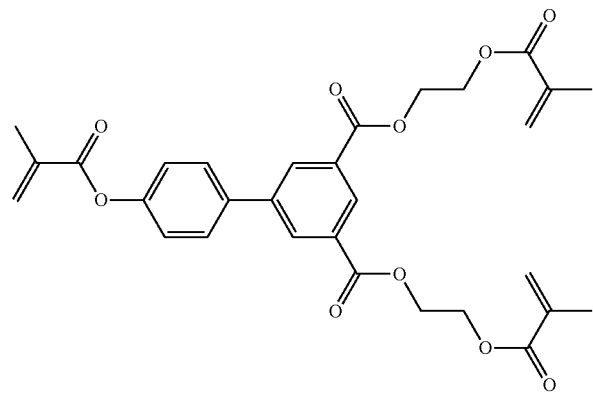 [SMILES: C=C(C)C(=O)OCCOC(=O)c1cc(C(=O)OCCOC(=O)C(=C)C)cc(-c2ccc(OC(=O)C(=C)C)cc2)c1]
RM-126
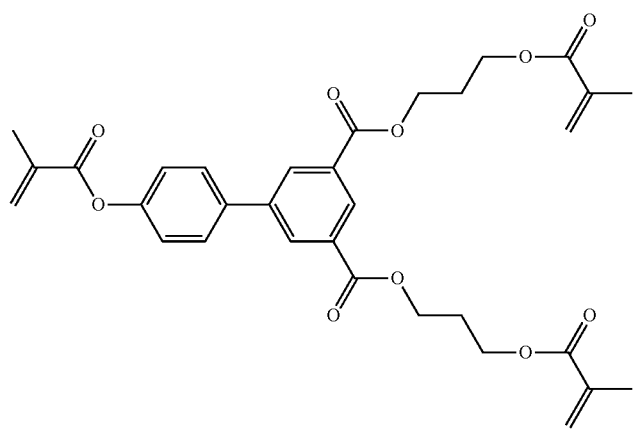 [SMILES: C=C(C)C(=O)OCCCOC(=O)c1cc(C(=O)OCCCOC(=O)C(=C)C)cc(-c2ccc(OC(=O)C(=C)C)cc2)c1]
RM-127
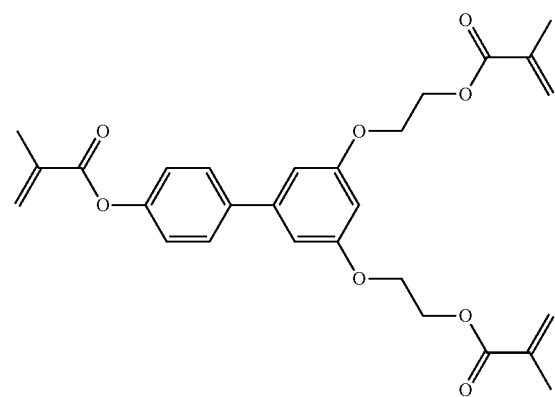 [SMILES: C=C(C)C(=O)OCCOc1cc(OCCOC(=O)C(=C)C)cc(-c2ccc(OC(=O)C(=C)C)cc2)c1]
RM-128

TABLE D-continued
Table D shows illustrative reactive mesogenic compounds which can be used
in the LC media in accordance with the present invention.
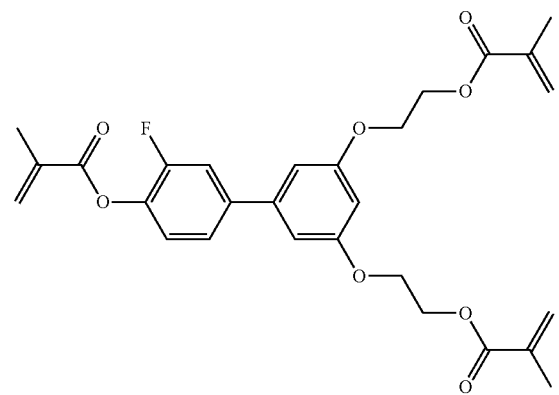 [SMILES: C=C(C)C(=O)OCCOc1cc(OCCOC(=O)C(=C)C)cc(-c2ccc(OC(=O)C(=C)C)c(F)c2)c1]
RM-129
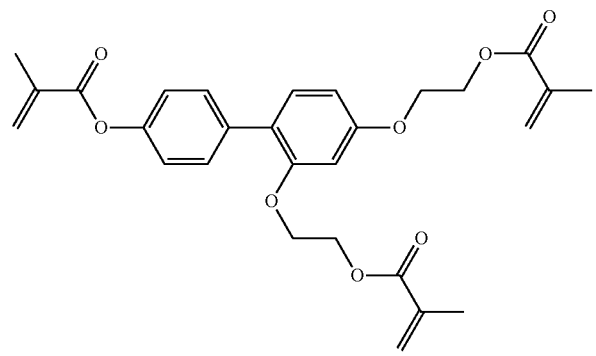 [SMILES: C=C(C)C(=O)OCCOc1ccc(-c2ccc(OC(=O)C(=C)C)cc2)c(OCCOC(=O)C(=C)C)c1]
RM-130
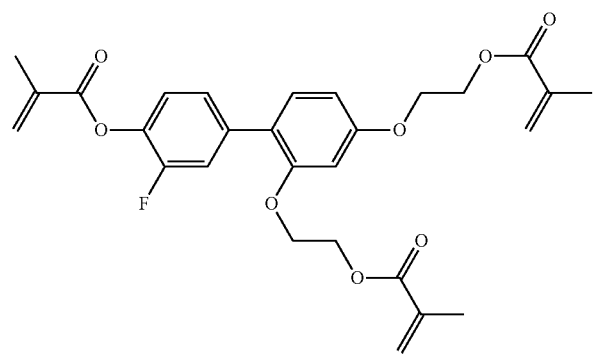 [SMILES: C=C(C)C(=O)OCCOc1ccc(-c2ccc(OC(=O)C(=C)C)c(F)c2)c(OCCOC(=O)C(=C)C)c1]
RM-131
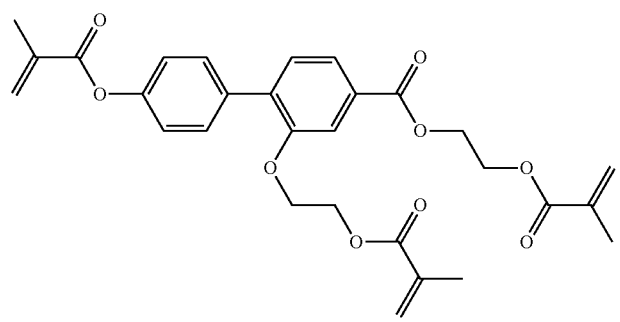 [SMILES: C=C(C)C(=O)OCCOC(=O)c1ccc(-c2ccc(OC(=O)C(=C)C)cc2)c(OCCOC(=O)C(=C)C)c1]
RM-132

TABLE D-continued
Table D shows illustrative reactive mesogenic compounds which can be used
in the LC media in accordance with the present invention.
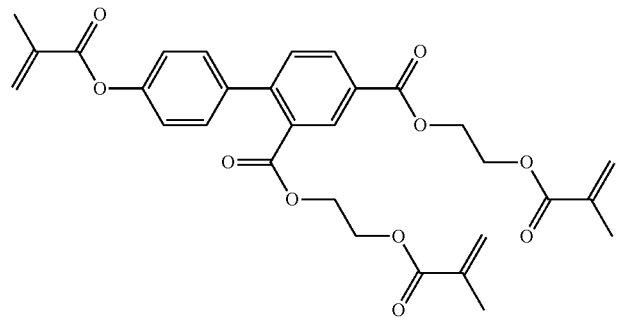 [SMILES: C=C(C)C(=O)OCCOC(=O)c1ccc(-c2ccc(OC(=O)C(=C)C)cc2)c(C(=O)OCCOC(=O)C(=C)C)c1]
RM-133
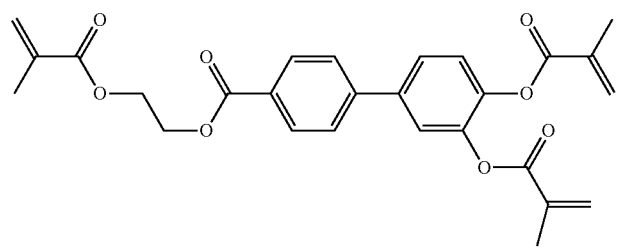 [SMILES: C=C(C)C(=O)OCCOC(=O)c1ccc(-c2ccc(OC(=O)C(=C)C)c(OC(=O)C(=C)C)c2)cc1]
RM-134
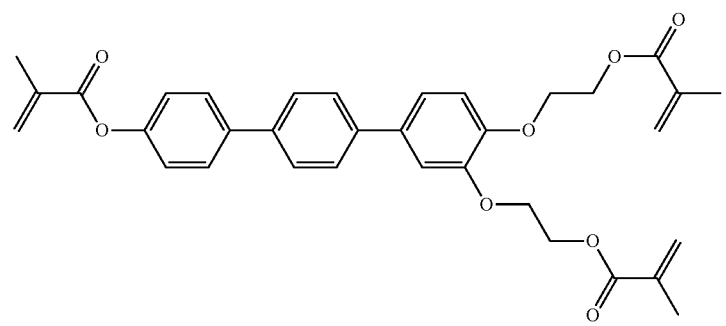 [SMILES: C=C(C)C(=O)OCCOc1ccc(-c2ccc(-c3ccc(OC(=O)C(=C)C)cc3)cc2)cc1OCCOC(=O)C(=C)C]
RM-135
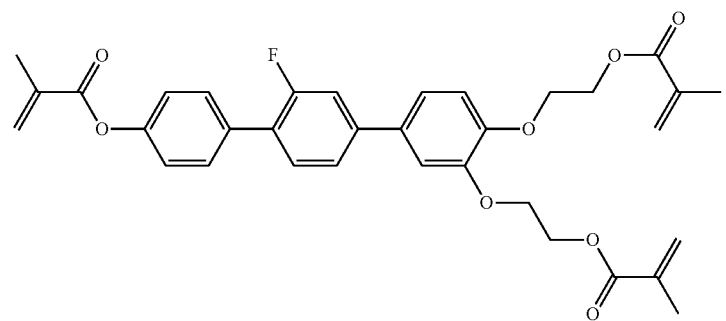 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136

TABLE D-continued
Table D shows illustrative reactive mesogenic compounds which can be used in the LC media in accordance with the present invention.
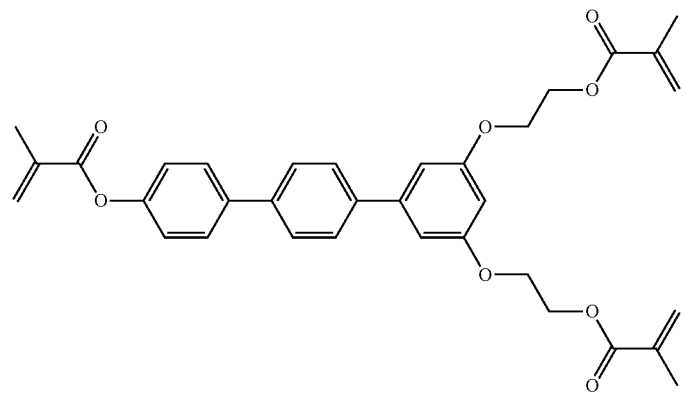 [SMILES: C=C(C)C(=O)OCCOc1cc(OCCOC(=O)C(=C)C)cc(-c2ccc(-c3ccc(OC(=O)C(=C)C)cc3)cc2)c1]
RM-137
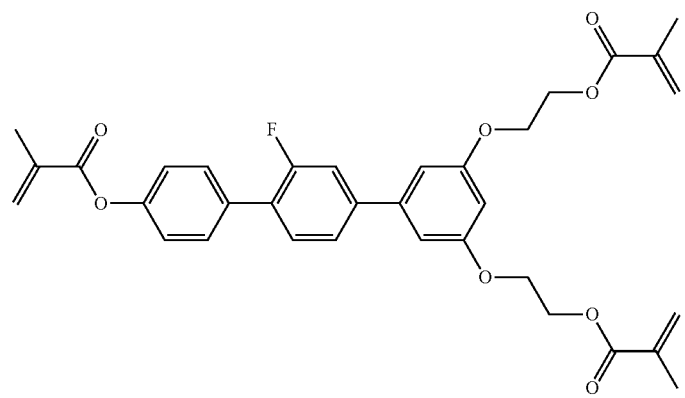 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-138
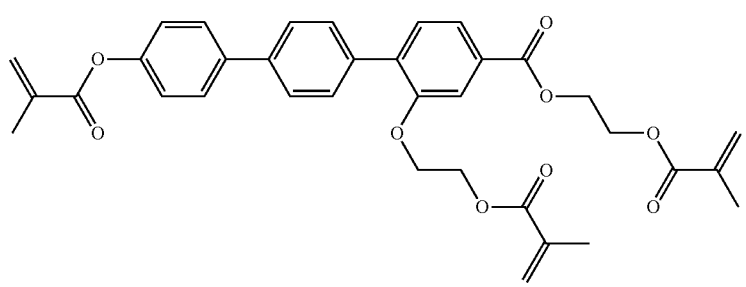 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-139
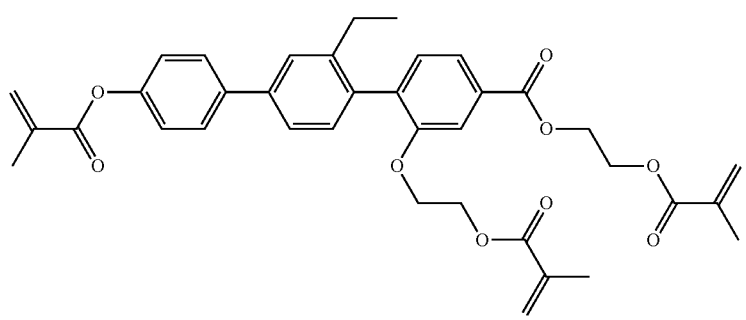 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-140

TABLE D-continued
Table D shows illustrative reactive mesogenic compounds which can be used in the LC media in accordance with the present invention.
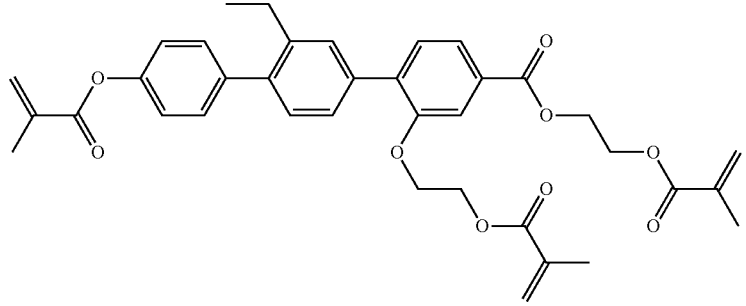 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1] RM-141
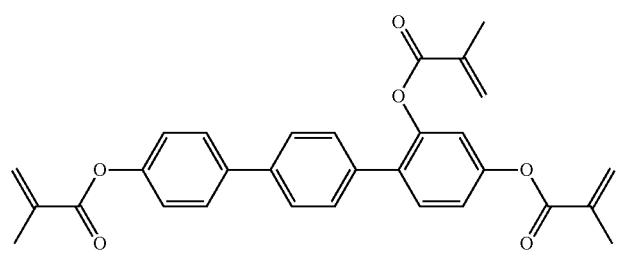 [SMILES: C=C(C)C(=O)Oc1ccc(-c2ccc(-c3ccc(OC(=O)C(=C)C)cc3OC(=O)C(=C)C)cc2)cc1] RM-142
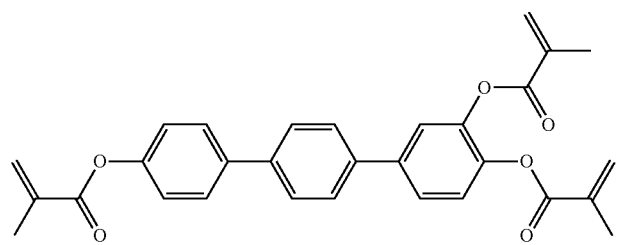 [SMILES: C=C(C)C(=O)Oc1ccc(-c2ccc(-c3ccc(OC(=O)C(=C)C)c(OC(=O)C(=C)C)c3)cc2)cc1] RM-143
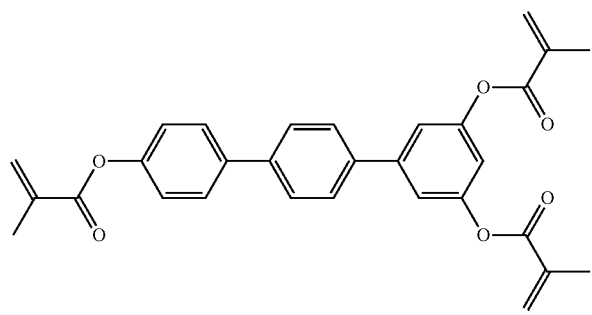 [SMILES: C=C(C)C(=O)Oc1ccc(-c2ccc(-c3cc(OC(=O)C(=C)C)cc(OC(=O)C(=C)C)c3)cc2)cc1] RM-144
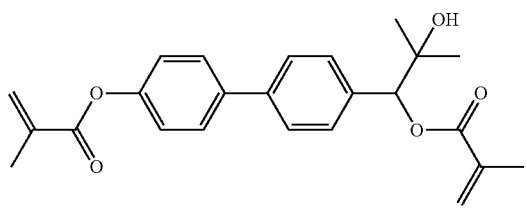 [SMILES: C=C(C)C(=O)Oc1ccc(-c2ccc(C(OC(=O)C(=C)C)C(C)(C)O)cc2)cc1] RM-145
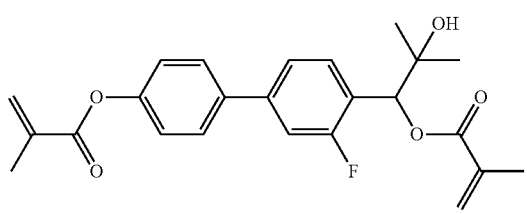 [SMILES: C=C(C)C(=O)Oc1ccc(-c2ccc(C(OC(=O)C(=C)C)C(C)(C)O)c(F)c2)cc1] RM-146

TABLE D-continued
Table D shows illustrative reactive mesogenic compounds which can be used in the LC media in accordance with the present invention.
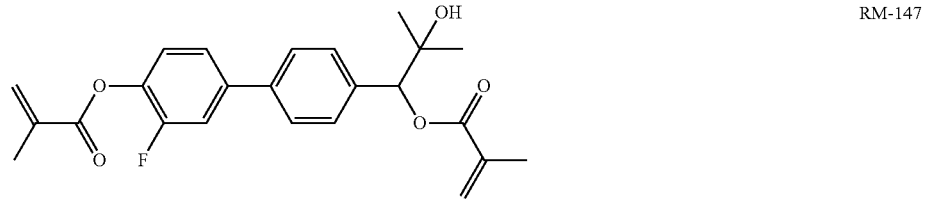 RM-147
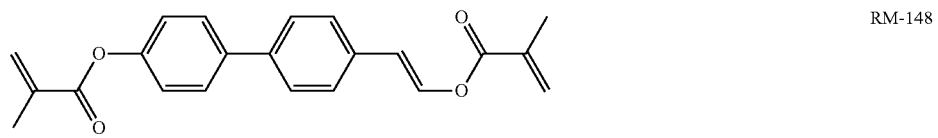 RM-148
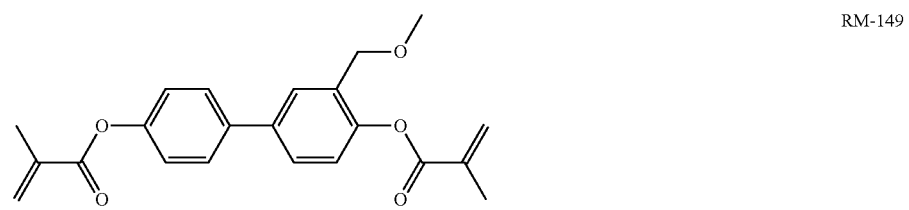 RM-149
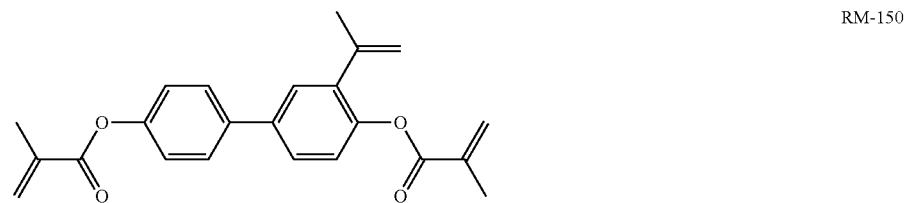 RM-150
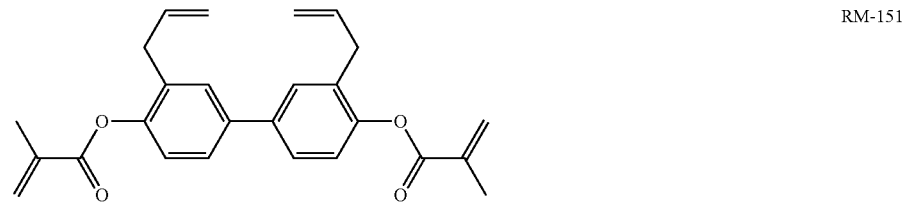 RM-151
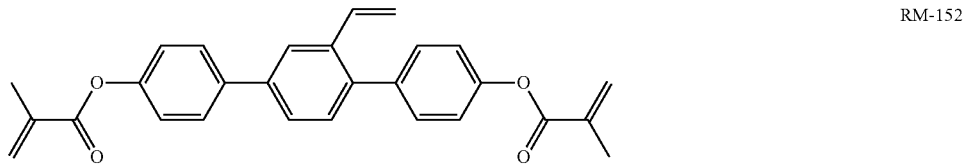 RM-152
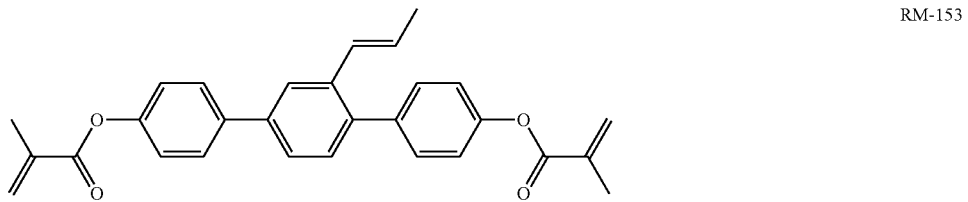 RM-153
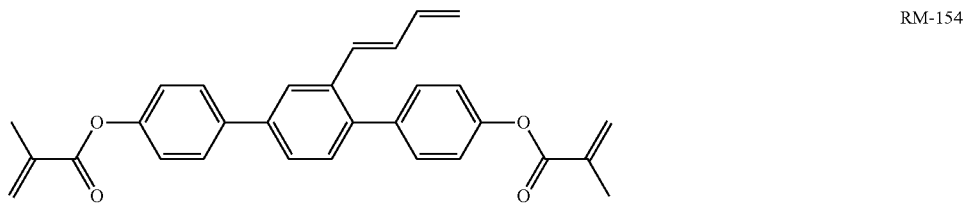 RM-154

TABLE D-continued
Table D shows illustrative reactive mesogenic compounds which can be used in the LC media in accordance with the present invention.
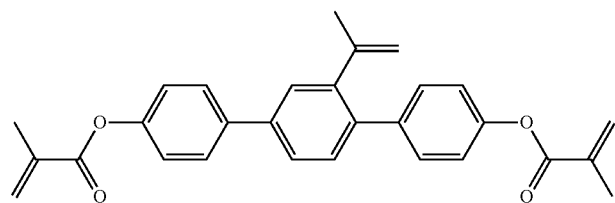 [SMILES: C=C(C)C(=O)Oc1ccc(-c2ccc(-c3ccc(OC(=O)C(=C)C)cc3)c(C(=C)C)c2)cc1]
RM-155
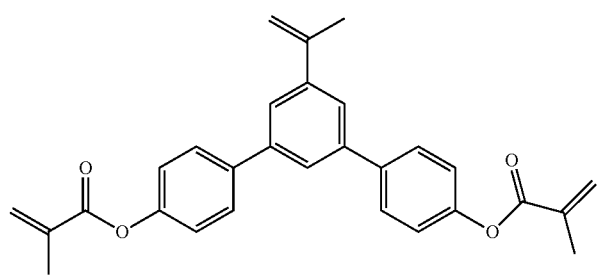 [SMILES: C=C(C)C(=O)Oc1ccc(-c2cc(C(=C)C)cc(-c3ccc(OC(=O)C(=C)C)cc3)c2)cc1]
RM-156
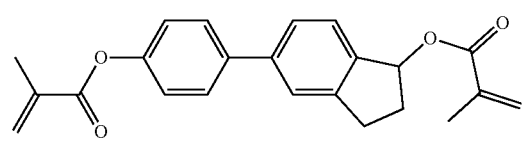 [SMILES: C=C(C)C(=O)Oc1ccc(-c2ccc3c(c2)CCC3OC(=O)C(=C)C)cc1]
RM-157
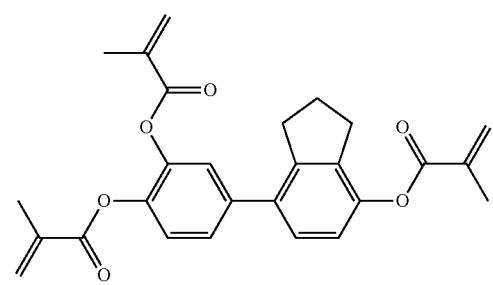 [SMILES: C=C(C)C(=O)Oc1ccc(-c2ccc(OC(=O)C(=C)C)c3c2CCC3)cc1OC(=O)C(=C)C]
RM-158
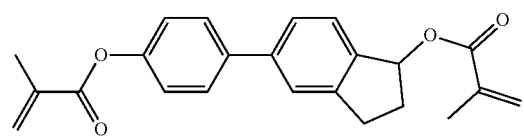 [SMILES: C=C(C)C(=O)Oc1ccc(-c2ccc3c(c2)CCC3OC(=O)C(=C)C)cc1]
RM-159
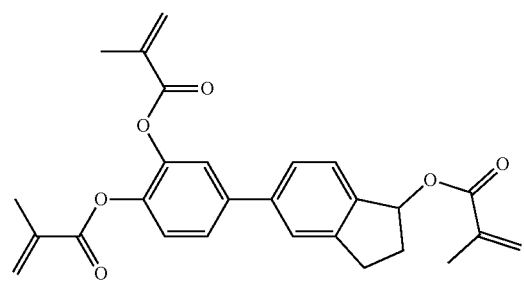 [SMILES: C=C(C)C(=O)Oc1ccc(-c2ccc3c(c2)CCC3OC(=O)C(=C)C)cc1OC(=O)C(=C)C]
RM-160
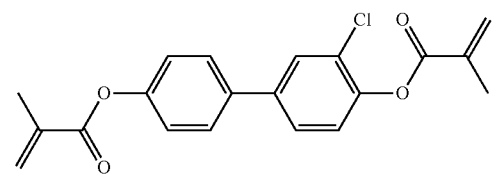 [SMILES: C=C(C)C(=O)Oc1ccc(-c2ccc(OC(=O)C(=C)C)c(Cl)c2)cc1]
RM-161

TABLE D-continued
Table D shows illustrative reactive mesogenic compounds which can be used
in the LC media in accordance with the present invention.
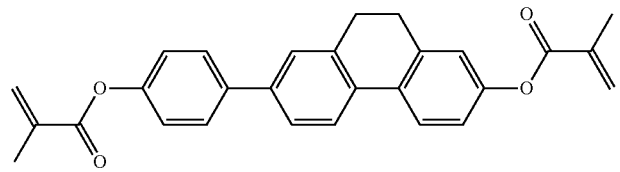
RM-162
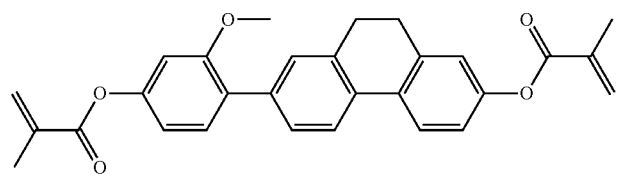 [SMILES: C=C(C)C(=O)Oc1ccc2c(c1)CCc1cc(-c3ccc(OC(=O)C(=C)C)cc3OC)ccc1-2]
RM-163
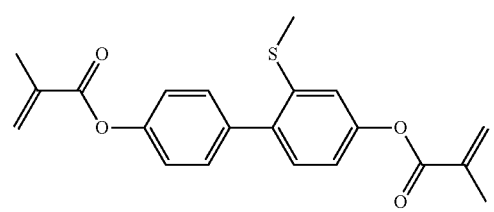 [SMILES: C=C(C)C(=O)Oc1ccc(-c2ccc(OC(=O)C(=C)C)cc2SC)cc1]
RM-164
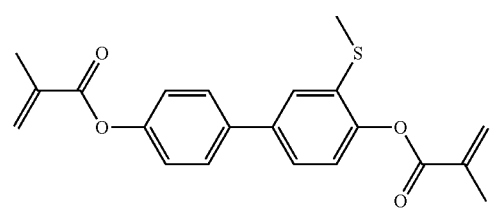 [SMILES: C=C(C)C(=O)Oc1ccc(-c2ccc(OC(=O)C(=C)C)c(SC)c2)cc1]
RM-165
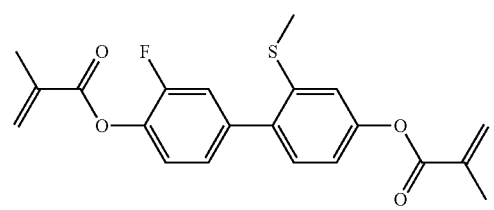 [SMILES: C=C(C)C(=O)Oc1ccc(-c2ccc(OC(=O)C(=C)C)c(F)c2)c(SC)c1]
RM-166
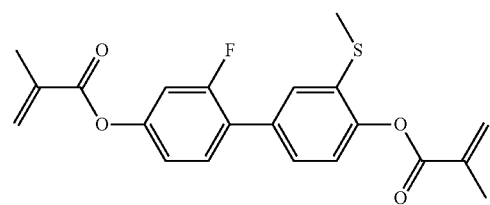 [SMILES: C=C(C)C(=O)Oc1ccc(-c2ccc(OC(=O)C(=C)C)c(SC)c2)c(F)c1]
RM-167
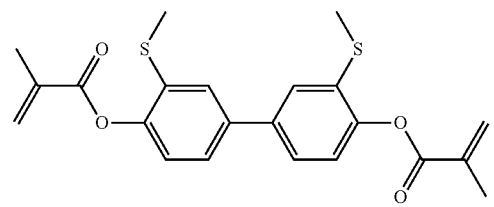 [SMILES: C=C(C)C(=O)Oc1ccc(-c2ccc(OC(=O)C(=C)C)c(SC)c2)cc1SC]
RM-168

TABLE D-continued
Table D shows illustrative reactive mesogenic compounds which can be used
in the LC media in accordance with the present invention.
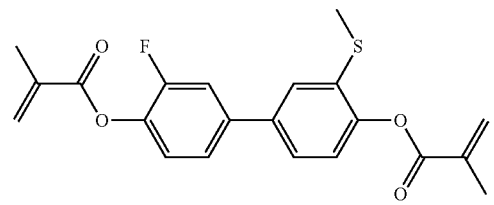 [SMILES: C=C(C)C(=O)Oc1ccc(-c2ccc(OC(=O)C(=C)C)c(SC)c2)cc1F]
RM-169
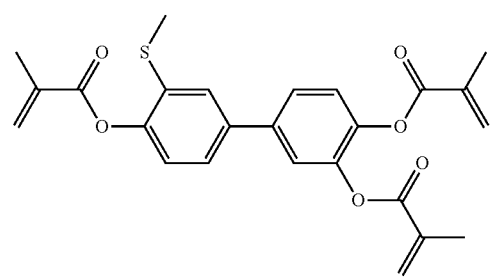 [SMILES: C=C(C)C(=O)Oc1ccc(-c2ccc(OC(=O)C(=C)C)c(SC)c2)cc1OC(=O)C(=C)C]
RM-170
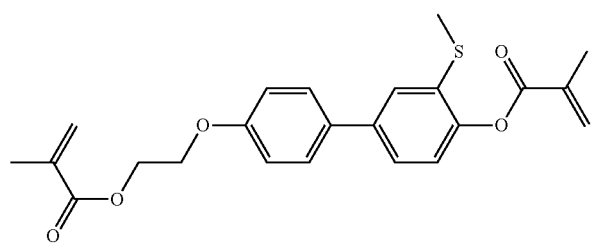 [SMILES: C=C(C)C(=O)OCCOc1ccc(-c2ccc(OC(=O)C(=C)C)c(SC)c2)cc1]
RM-171
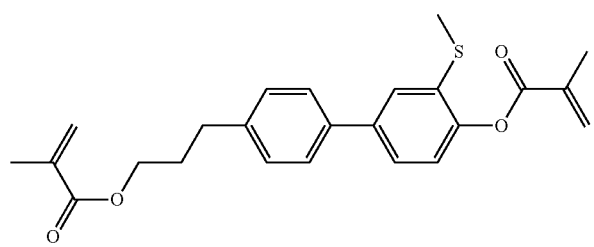 [SMILES: C=C(C)C(=O)OCCCc1ccc(-c2ccc(OC(=O)C(=C)C)c(SC)c2)cc1]
RM-172
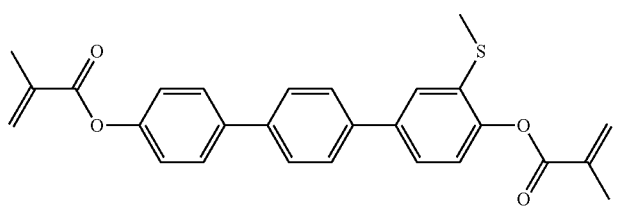 [SMILES: C=C(C)C(=O)Oc1ccc(-c2ccc(-c3ccc(OC(=O)C(=C)C)c(SC)c3)cc2)cc1]
RM-173
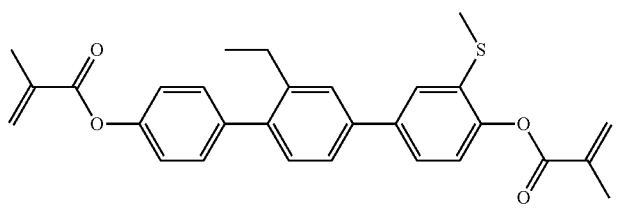 [SMILES: C=C(C)C(=O)Oc1ccc(-c2ccc(-c3ccc(OC(=O)C(=C)C)c(SC)c3)cc2CC)cc1]
RM-174

TABLE D-continued

Table D shows illustrative reactive mesogenic compounds which can be used
in the LC media in accordance with the present invention.

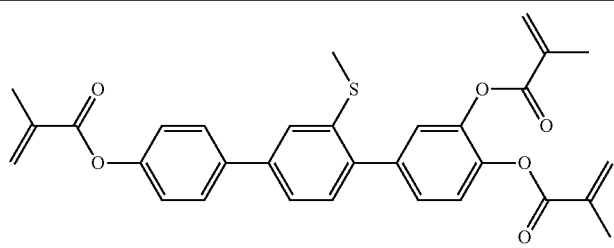
RM-175

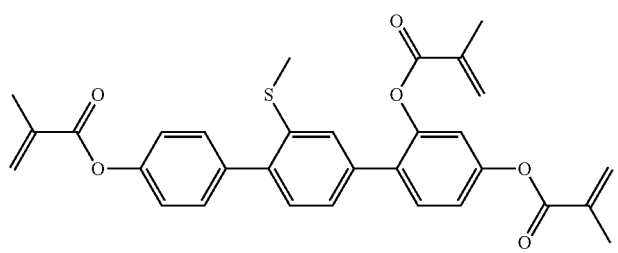 [SMILES: C=C(C)C(=O)Oc1ccc(-c2ccc(-c3ccc(OC(=O)C(=C)C)cc3OC(=O)C(=C)C)cc2SC)cc1]
RM-176

In a preferred embodiment, the mixtures according to the invention comprise one or more polymerizable compounds, preferably selected from the polymerizable compounds of the formulae RM-1 to RM-176. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122, R-139, RM-142, RM-143, RM-148 to RM-156, RM-162, RM-163 and RM-164 to RM-176 are particularly preferred.

TABLE E

Table E shows self-alignment additives for vertical alignment which can be used in LC media for SA-VA and SA-FFS displays according to the present invention together with the polymerizable compounds of formula M:

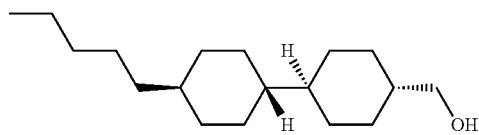 [SMILES: CCCCC[C@H]1CC[C@H]([C@H]2CC[C@H](CO)CC2)CC1]
SA-1

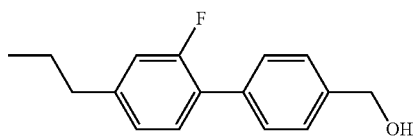 [SMILES: CCCc1ccc(-c2ccc(CO)cc2)c(F)c1]
SA-2

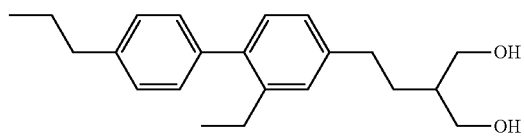
SA-3

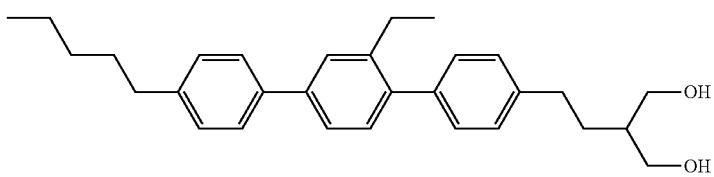 [SMILES: CCCCCc1ccc(-c2ccc(-c3ccc(CCC(CO)CO)cc3)c(CC)c2)cc1]
SA-4

TABLE E-continued
Table E shows self-alignment additives for vertical alignment which can be used in LC media for SA-VA and SA-FFS displays according to the present invention together with the polymerizable compounds of formula M:
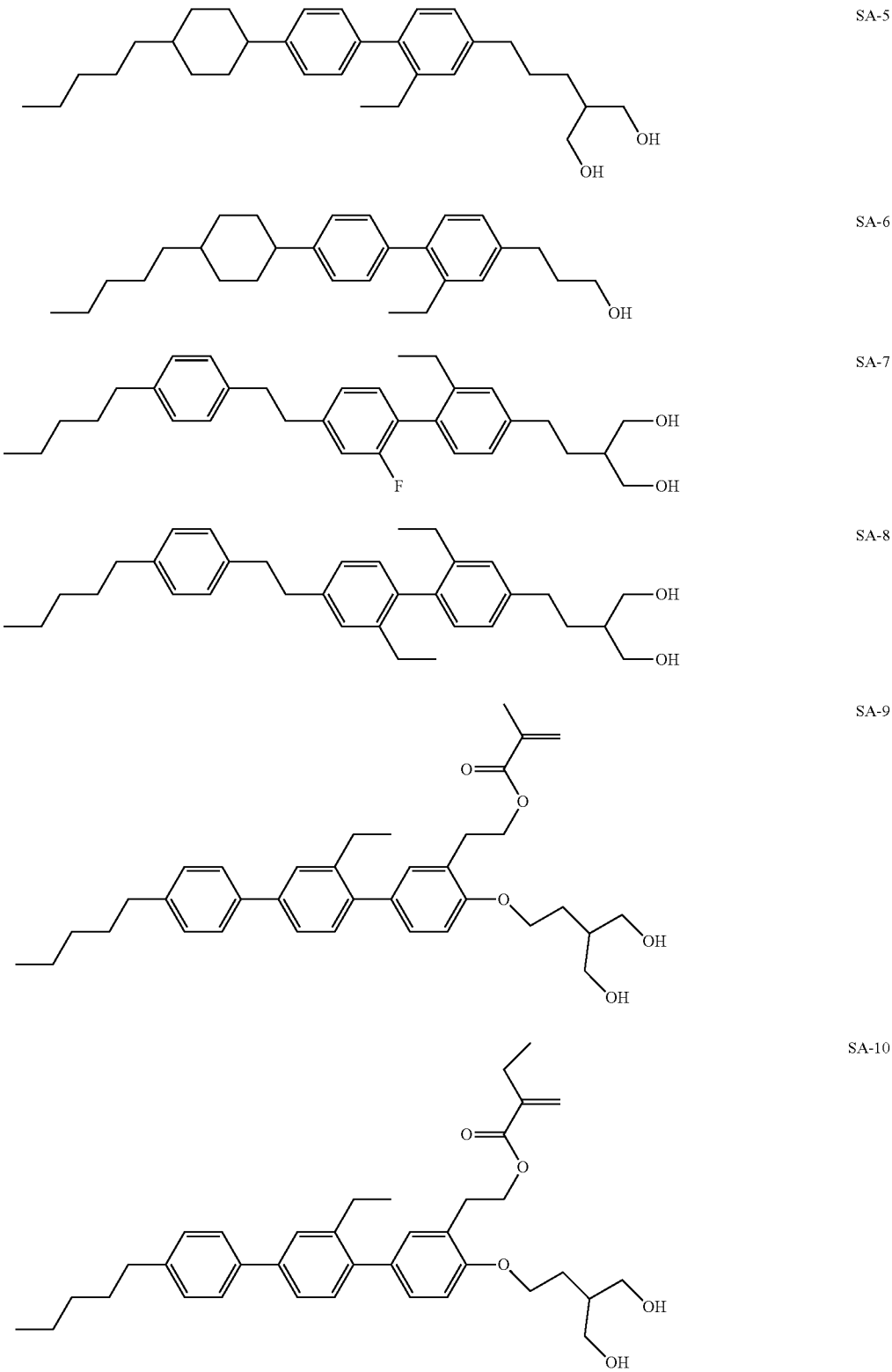
SA-5
SA-6
SA-7
SA-8
SA-9
SA-10

TABLE E-continued
Table E shows self-alignment additives for vertical alignment which can be used in LC media for SA-VA and SA-FFS displays according to the present invention together with the polymerizable compounds of formula M:
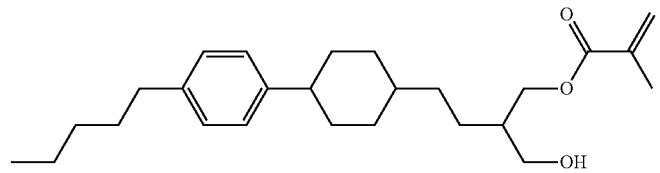 [SMILES: C=C(C)C(=O)OCC(CO)CCC1CCC(c2ccc(CCCCC)cc2)CC1]
SA-11
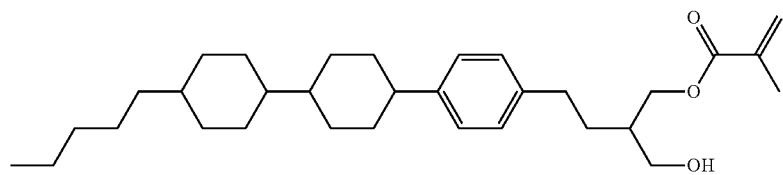 [SMILES: C=C(C)C(=O)OCC(CO)CCc1ccc(C2CCC(C3CCC(CCCCC)CC3)CC2)cc1]
SA-12
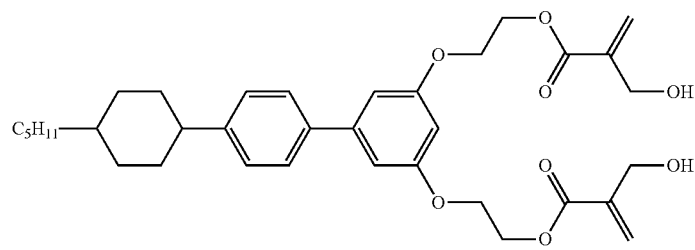
SA-13
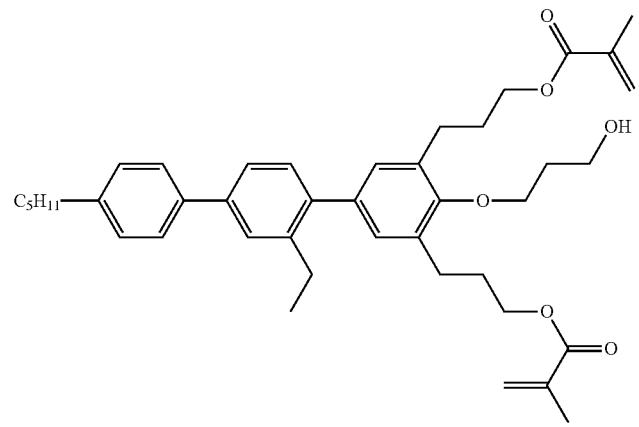
SA-14
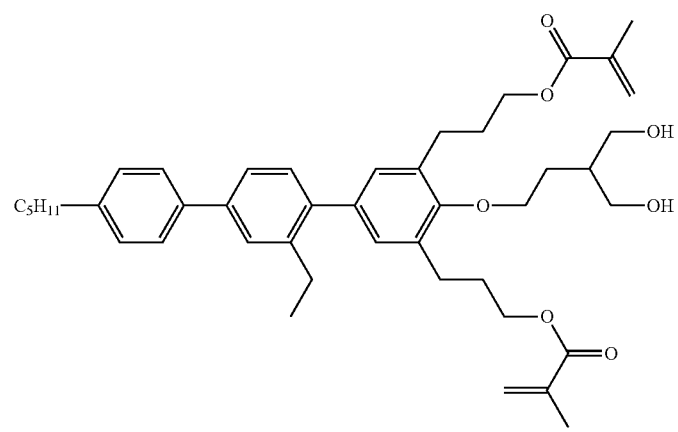
SA-15

TABLE E-continued
Table E shows self-alignment additives for vertical alignment which can be used in LC media for SA-VA and SA-FFS displays according to the present invention together with the polymerizable compounds of formula M:
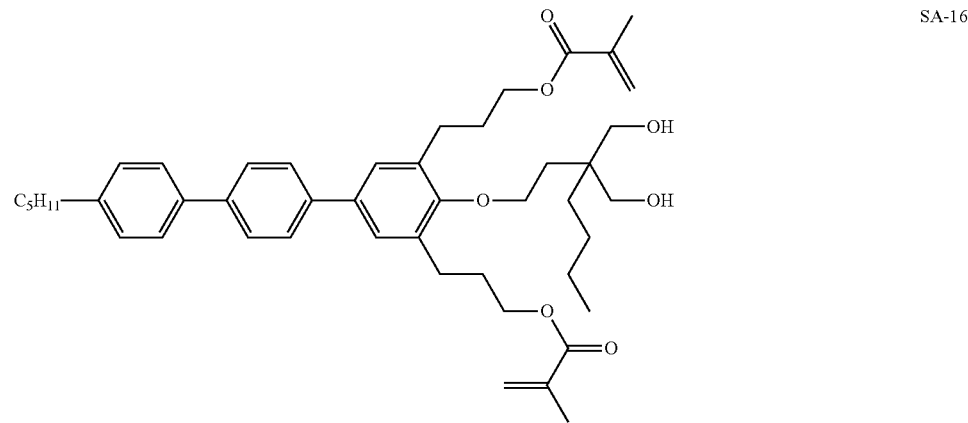
SA-16
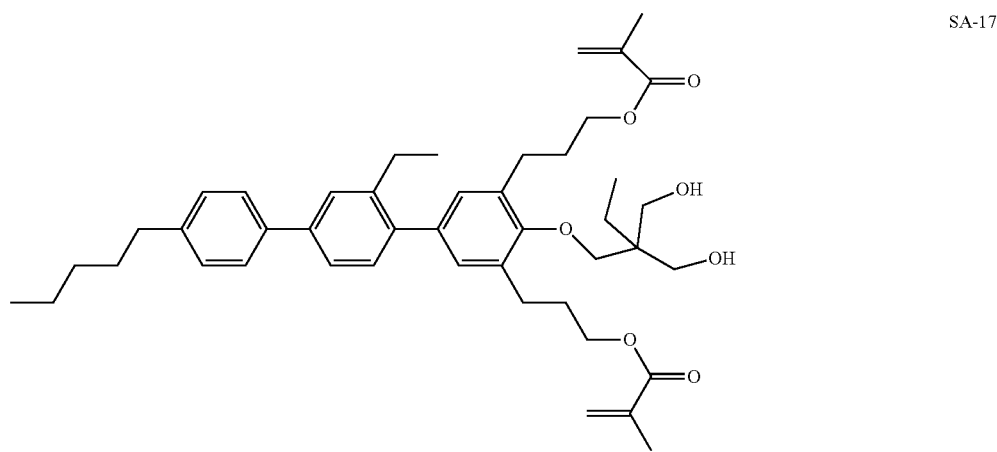
SA-17
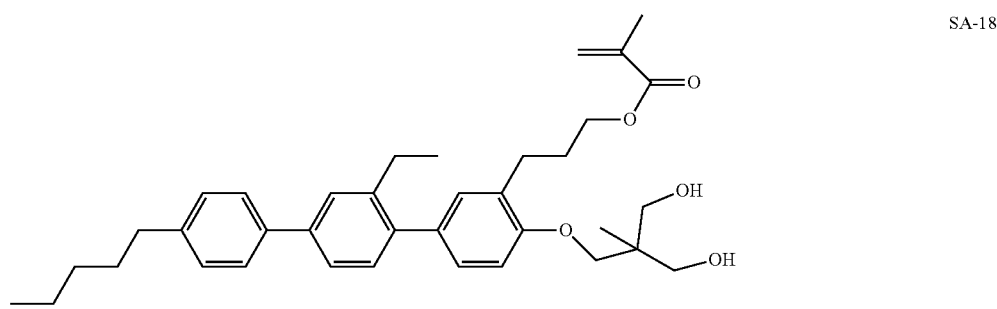
SA-18

TABLE E-continued
Table E shows self-alignment additives for vertical alignment which can be used in LC media for SA-VA and SA-FFS displays according to the present invention together with the polymerizable compounds of formula M:
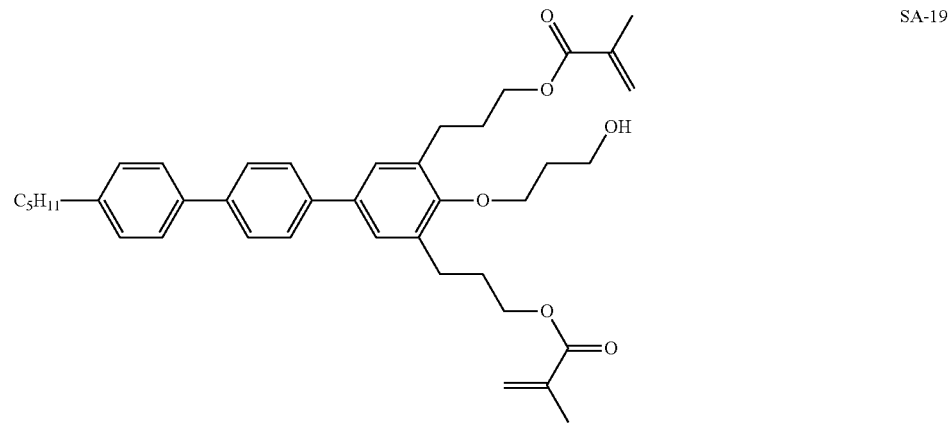
SA-19
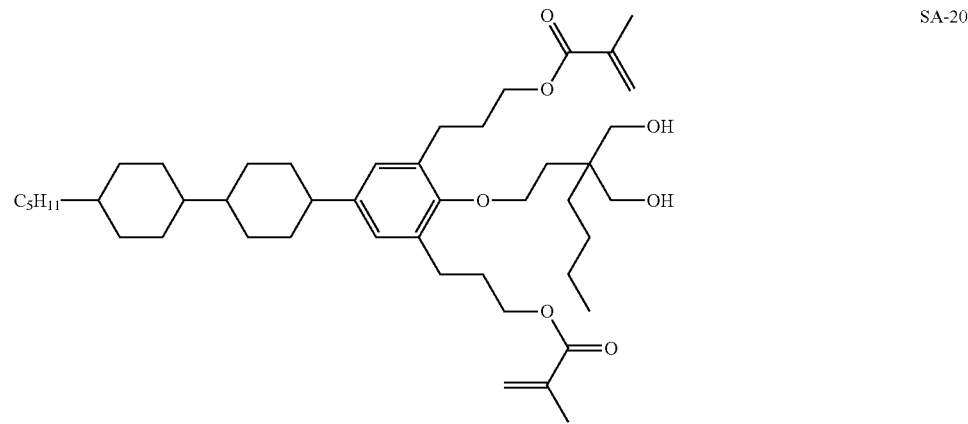
SA-20
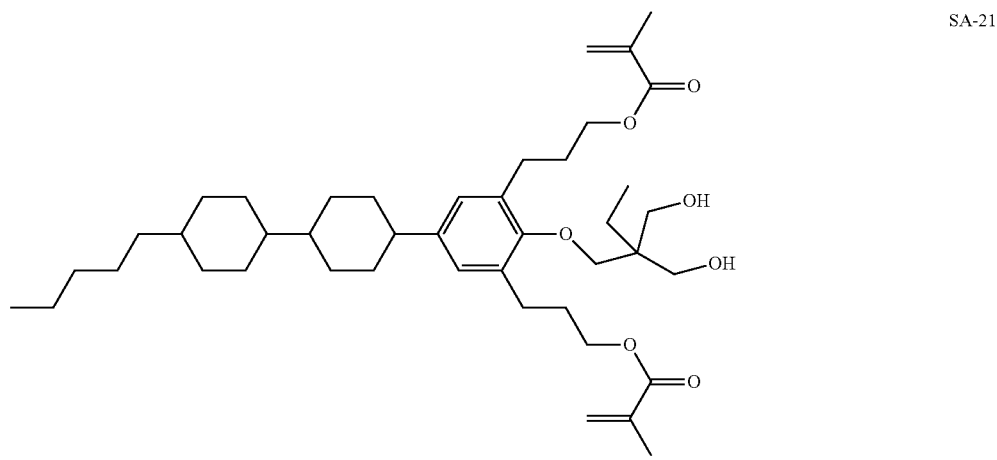
SA-21

TABLE E-continued
Table E shows self-alignment additives for vertical alignment which can be used in LC media for SA-VA and SA-FFS displays according to the present invention together with the polymerizable compounds of formula M:
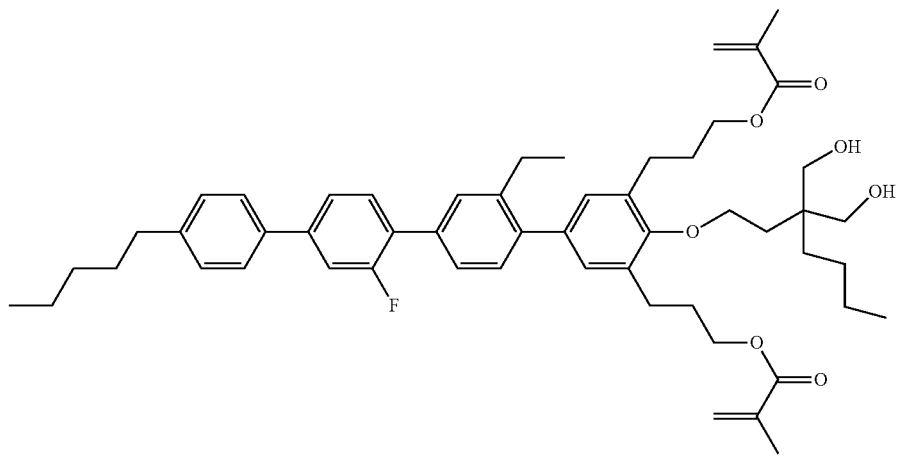 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-22
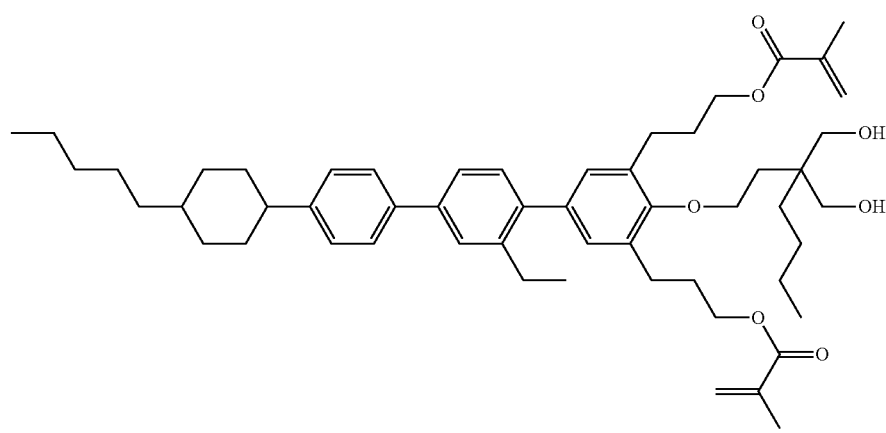 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-23
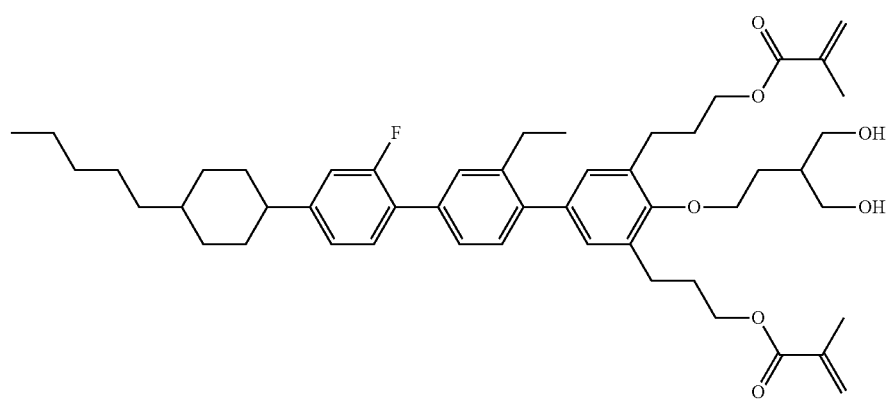 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-24

TABLE E-continued
Table E shows self-alignment additives for vertical alignment which can be used in LC media for SA-VA and SA-FFS displays according to the present invention together with the polymerizable compounds of formula M:
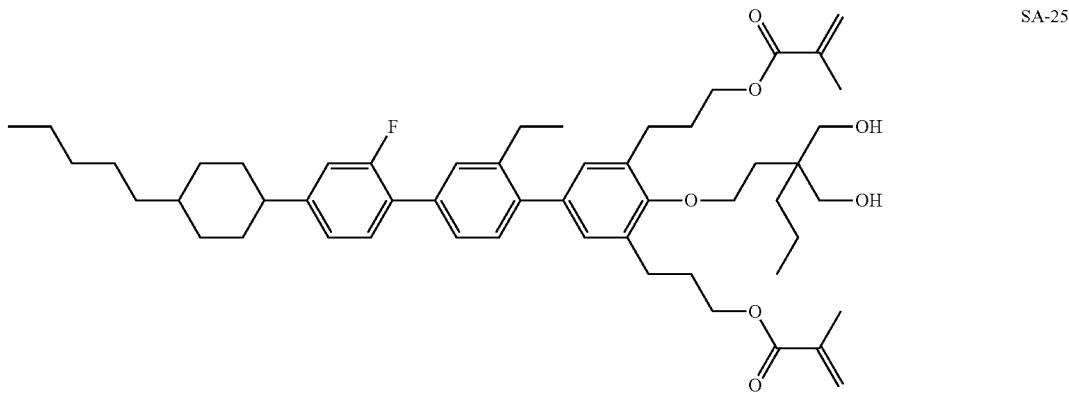
SA-25
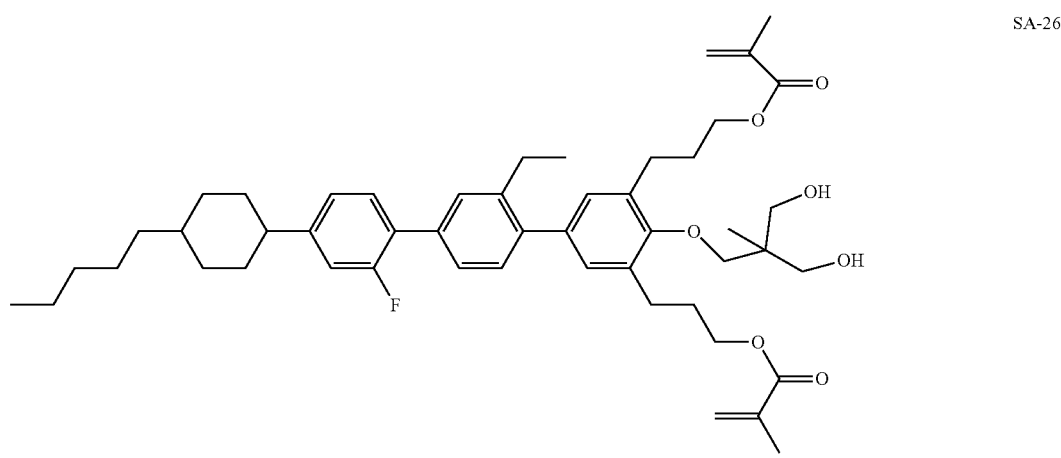
SA-26
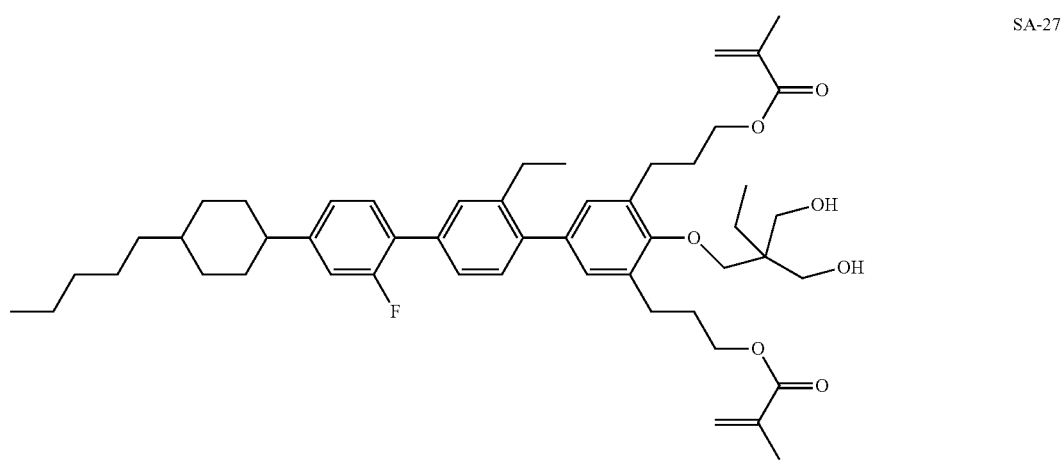
SA-27

TABLE E-continued
Table E shows self-alignment additives for vertical alignment which can be used in LC media for SA-VA and SA-FFS displays according to the present invention together with the polymerizable compounds of formula M:
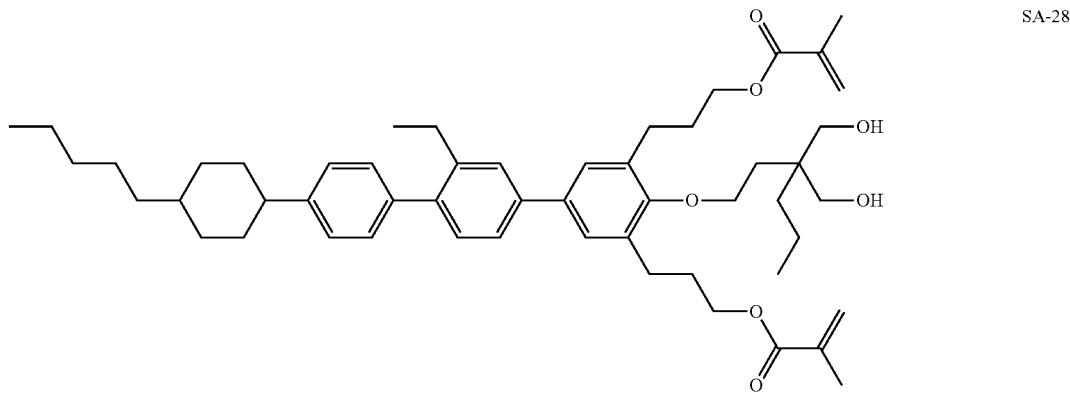
SA-28
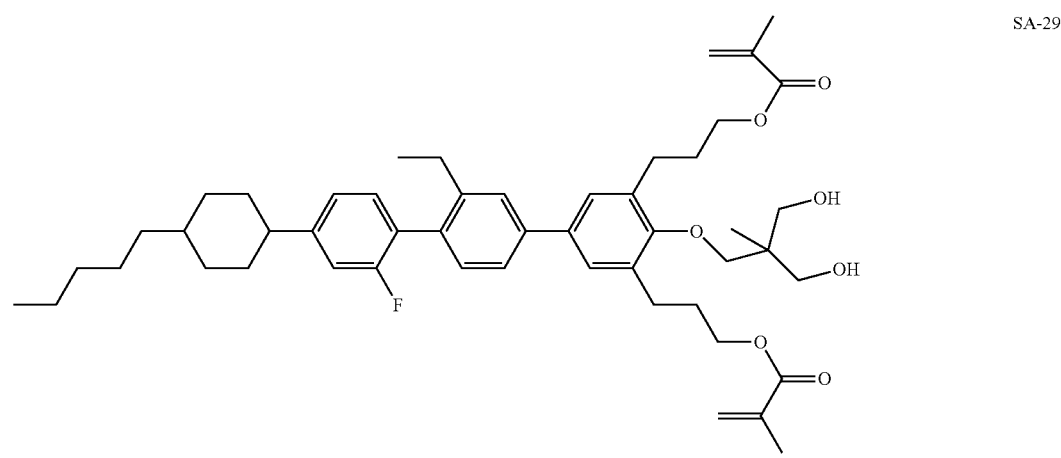
SA-29
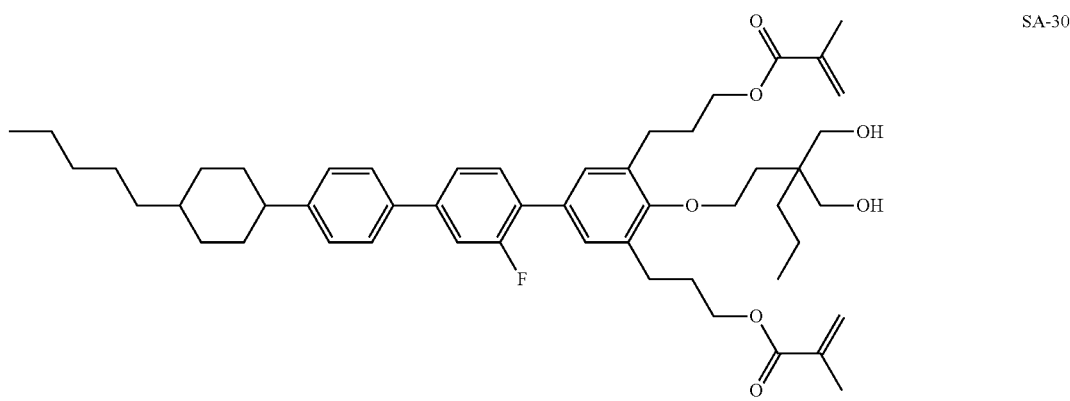
SA-30

TABLE E-continued
Table E shows self-alignment additives for vertical alignment which can be used in LC media for SA-VA and SA-FFS displays according to the present invention together with the polymerizable compounds of formula M:
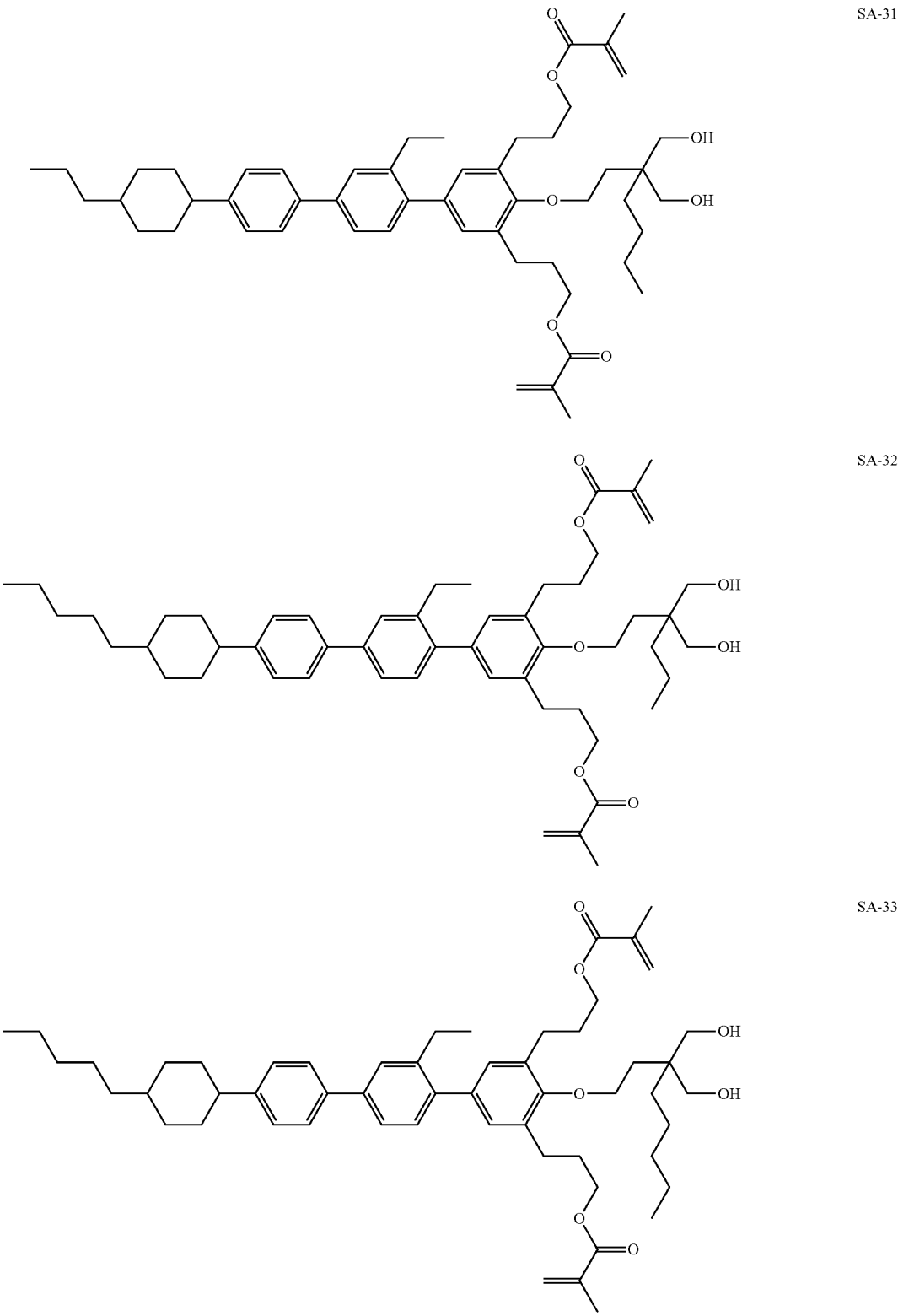
SA-31
SA-32
SA-33

TABLE E-continued
Table E shows self-alignment additives for vertical alignment which can be used in LC media for SA-VA and SA-FFS displays according to the present invention together with the polymerizable compounds of formula M:
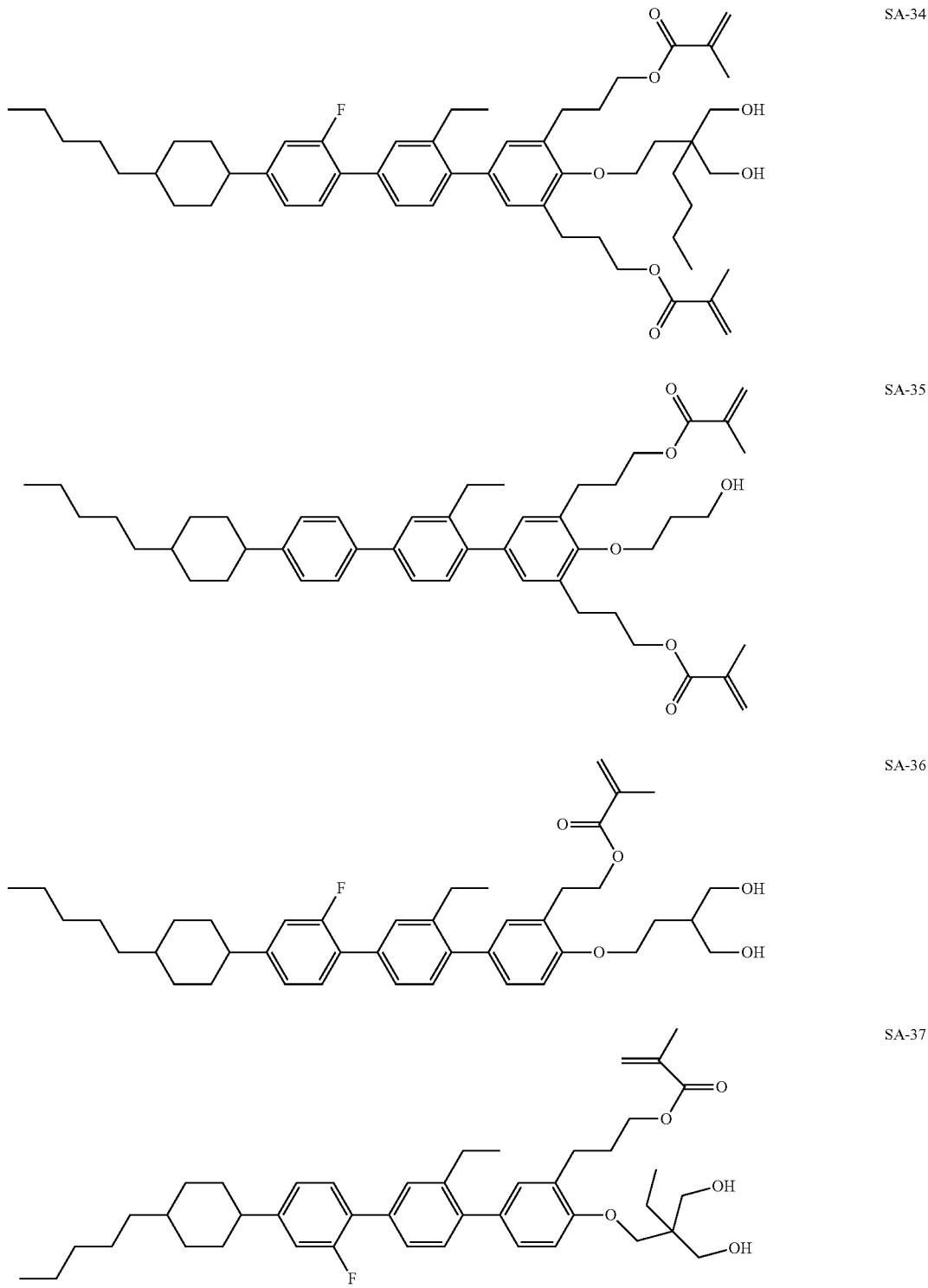
SA-34
SA-35
SA-36
SA-37

TABLE E-continued
Table E shows self-alignment additives for vertical alignment which can be used in LC media for SA-VA and SA-FFS displays according to the present invention together with the polymerizable compounds of formula M:
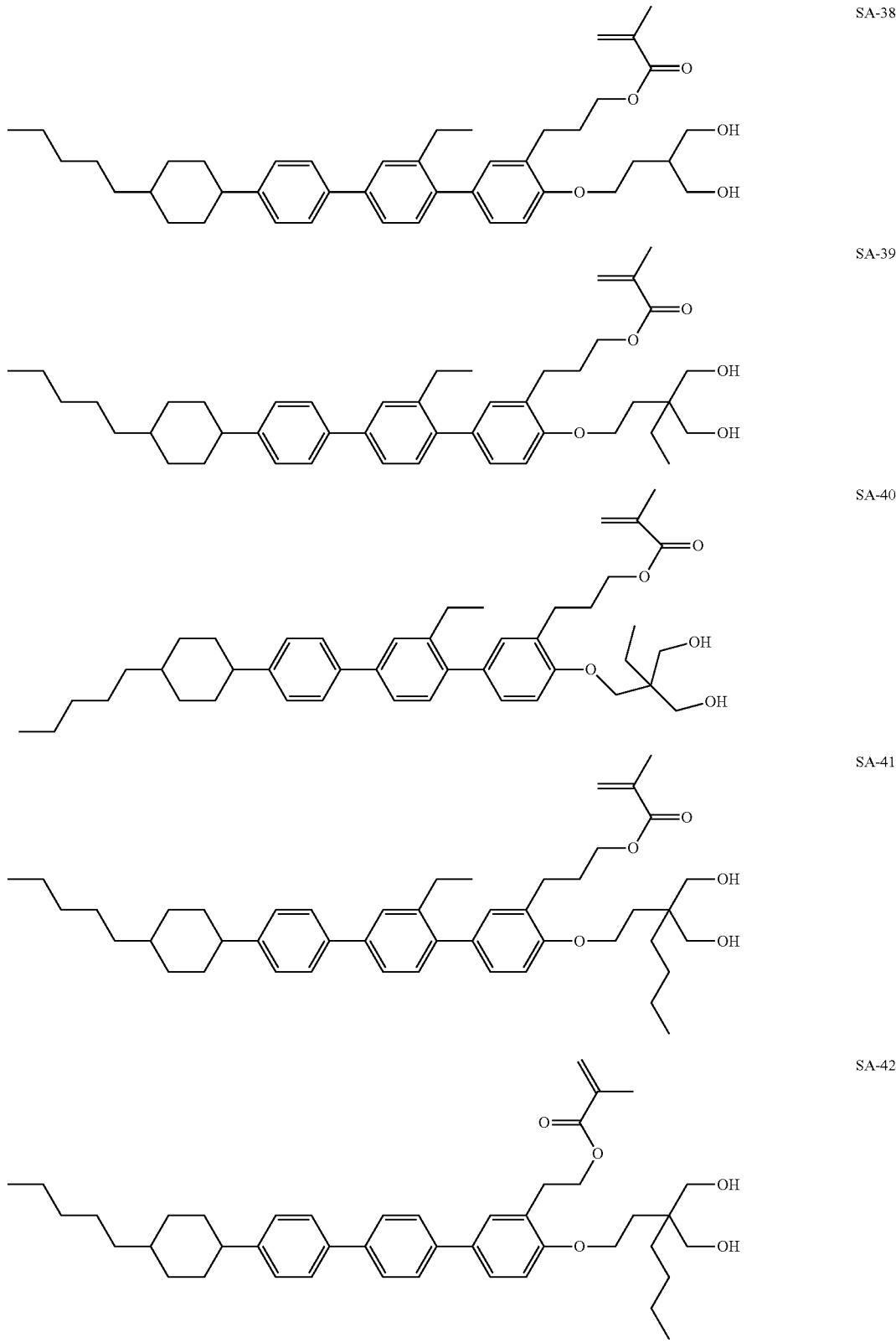
SA-38
SA-39
SA-40
SA-41
SA-42

TABLE E-continued
Table E shows self-alignment additives for vertical alignment which can be used in LC media for SA-VA and SA-FFS displays according to the present invention together with the polymerizable compounds of formula M:
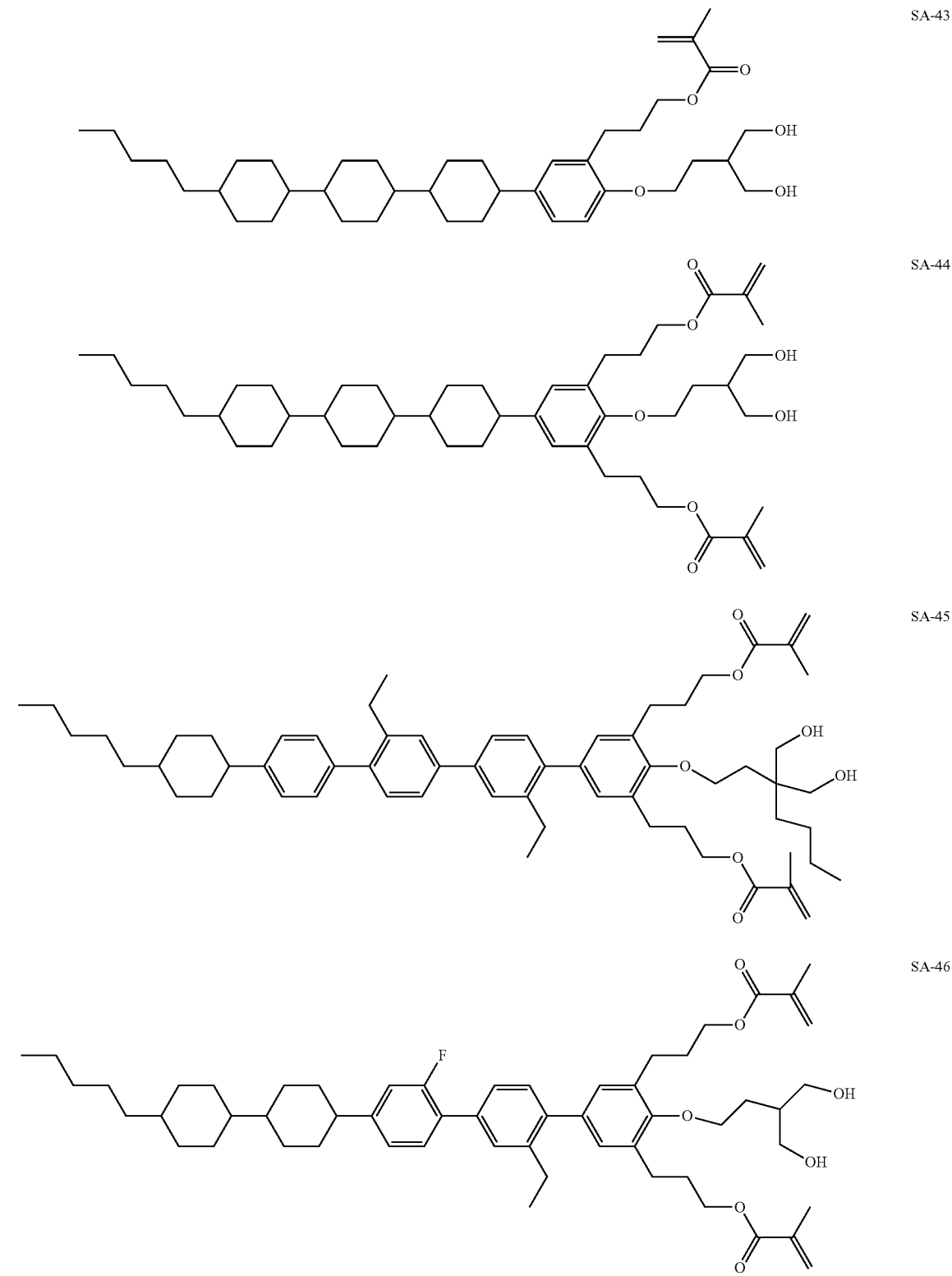
SA-43
SA-44
SA-45
SA-46

TABLE E-continued

Table E shows self-alignment additives for vertical alignment which can be used in LC media for SA-VA and SA-FFS displays according to the present invention together with the polymerizable compounds of formula M:

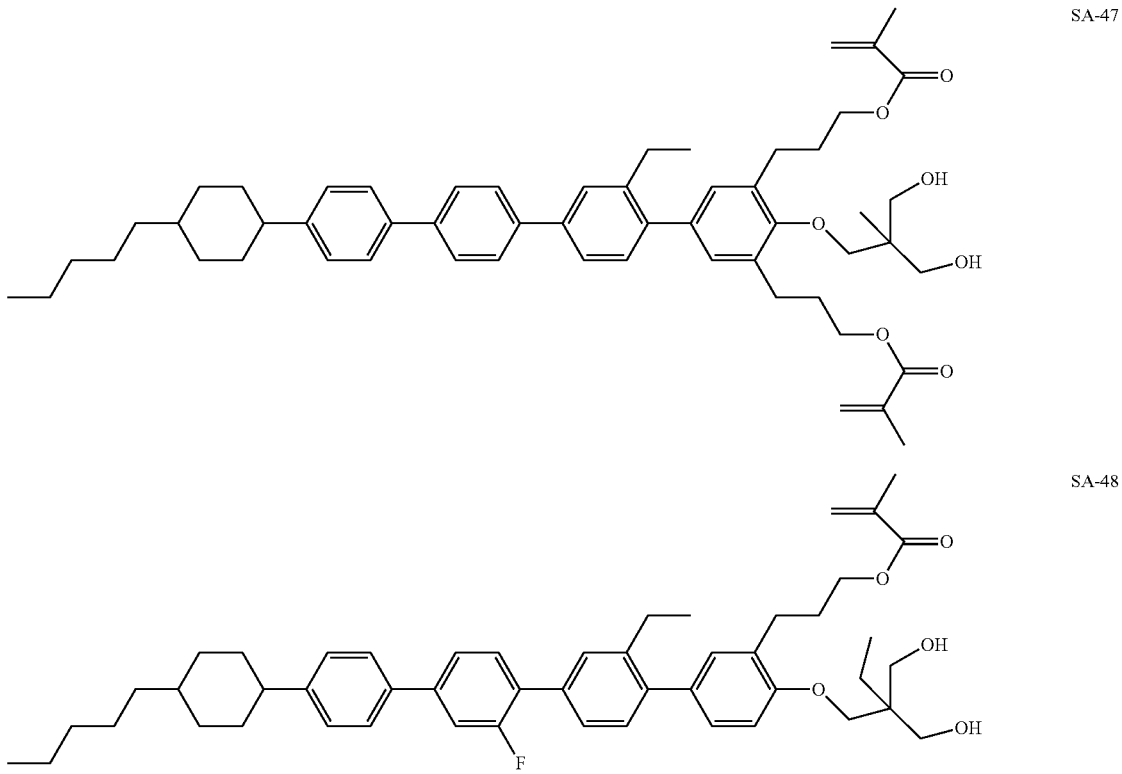

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, in combination with one or more RMs of formula M.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 21204105.7, filed Oct. 22, 2021, are incorporated by reference herein.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Fredericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid-crystal molecules.

The PSVA display or PSVA test cell used for measurement of the tilt angles consists of two plane-parallel glass outer plates at a separation of 4 μm unless stated otherwise, each of which has on the inside an electrode layer and a polyimide alignment layer on top, where the two polyimide layers are rubbed antiparallel to one another and effect a homeotropic edge alignment of the liquid-crystal molecules. The SAVA display or test cell has the same structure but wherein one or both polyimide layers are omitted.

The polymerizable compounds are polymerized in the display or test cell by irradiation with UV light of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm² is used for polymerization. The intensity is measured using a standard meter (Hoenle UV-meter high end with UV sensor).

The tilt angle is determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Comparison Example 1

The nematic LC host mixture C1 is formulated as follows

| | | | |
|---|---|---|---|
| B(S)-2O-O4 | 4.00% | cl.p. | 74.6° C. |
| B(S)-2O-O5 | 5.00% | Δn | 0.1052 |
| CCP-3-1 | 8.50% | Δε | −3.4 |
| CCY-3-O2 | 8.00% | $\varepsilon_\parallel$ | 3.6 |
| CLY-3-O2 | 1.00% | $\gamma_1$ | 98 mPa·s |
| CPY-3-O2 | 6.00% | $K_1$ | 15.9 |
| CC-3-V1 | 8.00% | $K_3$ | 16.2 |
| CC-4-V1 | 16.00% | $K_3/K_1$ | 1.02 |
| CCH-34 | 8.00% | $V_0$ | 2.30 V |
| CCH-35 | 7.50% | | |
| CY-3-O2 | 6.50% | | |
| PCH-302 | 5.00% | | |
| PY-1-O2 | 8.00% | | |
| PY-2-O2 | 8.50% | | |

The mixture contains 1% of compound CLY-3-O2 of formula IB, but does not contain a compound of formula IA.

Comparison Example 2

The nematic LC host mixture C2 is formulated as follows

| | | | |
|---|---|---|---|
| COB(S)-2-O4 | 9.00% | cl.p. | 74.5° C. |
| CCP-3-1 | 4.00% | Δn | 0.1056 |
| CCY-3-O2 | 11.00% | Δε | −3.4 |
| CPY-3-O2 | 4.50% | $\varepsilon_\parallel$ | 3.6 |
| CC-3-V1 | 8.00% | $\gamma_1$ | 103 mPa·s |
| CC-4-V1 | 16.00% | $K_1$ | 15.2 |
| CCH-34 | 6.50% | $K_3$ | 15.8 |
| CCH-35 | 9.00% | $K_3/K_1$ | 1.05 |
| CY-3-O2 | 4.50% | $V_0$ | 2.26 V |
| PCH-302 | 7.50% | | |
| PY-1-O2 | 11.00% | | |
| PY-2-O2 | 9.00% | | |

The mixture contains 9% of compound COB(S)-2-O4 of formula IA but does not contain a compound of formula IB.

Example 1

The nematic LC host mixture N1 is formulated as follows

| | | | |
|---|---|---|---|
| B(S)-2O-O4 | 4.00% | cl.p. | 75.0° C. |
| COB(S)-2-O4 | 5.00% | Δn | 0.1057 |
| CCP-3-1 | 8.00% | Δε | −3.4 |
| CCY-3-O2 | 10.50% | $\varepsilon_\parallel$ | 3.6 |
| CLY-3-O2 | 1.00% | $\gamma_1$ | 99 mPa·s |
| CPY-3-O2 | 2.00% | $K_1$ | 15.7 |
| CC-3-V1 | 8.00% | $K_3$ | 16.2 |
| CC-4-V1 | 16.00% | $K_3/K_1$ | 1.03 |
| CCH-34 | 7.00% | $V_0$ | 2.30 V |
| CCH-35 | 9.00% | | |
| CY-3-O2 | 4.00% | | |
| PCH-302 | 4.50% | | |
| PY-1-O2 | 11.00% | | |
| PY-2-O2 | 10.00% | | |

The mixture contains 5% of compound COB(S)-2-O4 of formula IA and 1% of compound CLY-3-O2 of formula IB.

Example 2

The nematic LC host mixture N2 is formulated as follows

| | | | |
|---|---|---|---|
| B(S)-2O-O5 | 4.00% | cl.p. | 74.6° C. |
| COB(S)-2-O4 | 5.00% | Δn | 0.1058 |
| CCP-3-1 | 7.00% | Δε | −3.4 |
| CCY-3-O2 | 10.50% | $\varepsilon_\parallel$ | 3.6 |
| CLY-3-O2 | 1.00% | $\gamma_1$ | 100 mPa·s |
| CPY-3-O2 | 3.00% | $K_1$ | 15.6 |
| CC-3-V1 | 8.00% | $K_3$ | 15.9 |

| | | | |
|---|---|---|---|
| CC-4-V1 | 16.00% | $K_3/K_1$ | 1.02 |
| CCH-34 | 7.00% | $V_0$ | 2.27 V |
| CCH-35 | 9.00% | | |
| CY-3-O2 | 4.00% | | |
| PCH-302 | 4.50% | | |
| PY-1-O2 | 11.00% | | |
| PY-2-O2 | 10.00% | | |

The mixture contains 5% of compound COB(S)-2-O4 of formula IA and 1% of compound CLY-3-O2 of formula IB.

Example 3

The nematic LC host mixture N3 is formulated as follows

| | | | |
|---|---|---|---|
| B(S)-2O-O6 | 4.00% | cl.p. | 74.1° C. |
| COB(S)-2-O4 | 5.00% | $\Delta n$ | 0.1061 |
| CCP-3-1 | 7.00% | $\Delta\varepsilon$ | −3.4 |
| CCY-3-O2 | 10.50% | $\varepsilon_\parallel$ | 3.6 |
| CLY-3-O2 | 1.00% | $\gamma_1$ | 99 mPa · s |
| CPY-3-O2 | 3.00% | $K_1$ | 15.7 |
| CC-3-V1 | 8.00% | $K_3$ | 16.0 |
| CC-4-V1 | 16.00% | $K_3/K_1$ | 1.02 |
| CCH-34 | 7.00% | $V_0$ | 2.28 V |
| CCH-35 | 9.00% | | |
| CY-3-O2 | 4.00% | | |
| PCH-302 | 4.50% | | |
| PY-1-O2 | 11.00% | | |
| PY-2-O2 | 10.00% | | |

The mixture contains 5% of compound COB(S)-2-O4 of formula IA and 1% of compound CLY-3-O2 of formula IB.

Example 4

The nematic LC host mixture N4 is formulated as follows

| | | | |
|---|---|---|---|
| COB(S)-2-O4 | 9.00% | cl.p. | 74.5° C. |
| CCP-3-1 | 5.00% | $\Delta n$ | 0.1059 |
| CCY-3-O2 | 11.00% | $\Delta\varepsilon$ | −3.4 |
| CLY-3-O2 | 1.00% | $\varepsilon_\parallel$ | 3.6 |
| CPY-3-O2 | 3.00% | $\gamma_1$ | 101 mPa · s |
| CC-3-V1 | 8.00% | $K_1$ | 15.2 |
| CC-4-V1 | 16.00% | $K_3$ | 15.9 |
| CCH-34 | 5.50% | $K_3/K_1$ | 1.05 |
| CCH-35 | 9.00% | $V_0$ | 2.26 V |
| CY-3-O2 | 4.00% | | |
| PCH-302 | 7.50% | | |
| PY-1-O2 | 11.00% | | |
| PY-2-O2 | 10.00% | | |

The mixture contains 9% of compound COB(S)-2-O4 of formula IA and 1% of compound CLY-3-O2 of formula IB.

Polymerizable Mixtures

Polymerizable comparison mixtures PC1 and PC2 are prepared by adding 0.3% of the polymerizable compound M1 and 0.015% of the stabiliser S1 to the nematic LC host mixture C1 or C2, respectively.

Polymerizable mixtures P1 to P4 according to the invention are prepared by adding 0.3% of the polymerizable compound M1 and 0.015% of the stabiliser S1 to the nematic LC host mixtures N1 to N4, respectively.

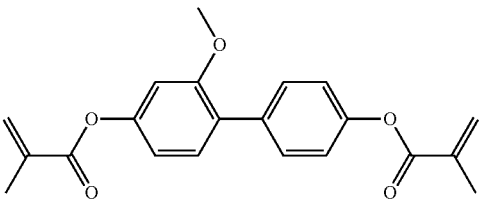

M1

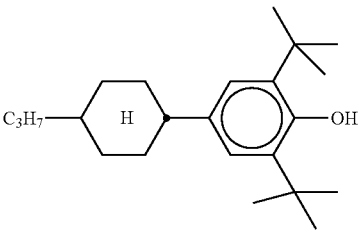

S1

VHR

The VHR of the polymerizable mixtures was measured with a TOYO 6254 equipment at 60° C. in VA-VHR test cells before and after UV exposure for 40, 80 and 120 min at RT using a fluorescent UV lamp type C. The measurement cells had a thickness of approximately 3 μm and two substrates with unrubbed polyimide layers JSR AL64101.

Light stress usually causes the decrease of VHR in LC mixtures, therefore the smaller the absolute decrease of VHR value after stress, the better performance for display applications. The results are shown in Table 1.

TABLE 1

| | VHR | | | |
|---|---|---|---|---|
| Mixture | VHR (%) Initial | VHR (%) 40 min UV load | VHR (%) 80 min UV load | VHR (%) 120 min UV load |
| PC1 | 99.4 | 96.5 | 94.4 | 89.7 |
| PC2 | 99.5 | 94.7 | 84.1 | 72.9 |
| P1 | 99.4 | 96.9 | 95.0 | 91.3 |
| P2 | 99.4 | 96.9 | 95.0 | 91.2 |
| P3 | 99.4 | 97.0 | 95.1 | 91.3 |
| P4 | 99.4 | 97.4 | 95.9 | 93.2 |

From Table 1 it can be seen that the VHR values of the polymerizable mixtures P1 to P4 according to the invention are significantly higher compared to the polymerizable reference mixtures PC1 and PC2, which contain only one of the compounds of formula IA and formula IB.

Tilt Angle

The UV photopolymerization was carried out at RT by UV exposure of 6J with 50 mW/cm2 at RT using a high pressure Hg lamp in VA-tilt test cells having a cell thickness of approximately 4 m and two substrates with anti-parallel rubbed polyimide layers (JALS-2096-R1).

The test cells were given at least 12 hours to relax before the final tilt angle was measured and calculated with an Axometrics AxoScan®. The results are shown in Table 2.

TABLE 2

| Mixture | PC1 | PC2 | P1 | P2 | P3 | P4 |
|---|---|---|---|---|---|---|
| Tilt Angle/° | 87.4 | 86.7 | 87.3 | 87.5 | 87.5 | 87.4 |

It can be seen that the tilt angles generated in the polymerizable mixtures P1 to P4 according to the invention are as good as in the polymerizable reference mixtures PC1 and PC2.

Residual RM

The residual content of unpolymerized RM (in % by weight) in the mixture was determined after UV photopolymerization. The smaller the residual RM content after a given time interval, the faster the polymerization. For this purpose the polymerizable mixtures were filled in test cells and polymerized by UV exposure for 80 min at RT using a fluorescent UV lamp type C. After photopolymerization the test cells were opened, and the mixture was dissolved and rinsed out of the test cell with methyl ethyl ketone and analyzed by Ultra Performance Liquid Chromatography (UPLC).

The results are shown in Table 3.

TABLE 3

Residual RM

| Mixture | PC1 | PC2 | P1 | P2 | P3 | P4 |
|---|---|---|---|---|---|---|
| RM % Initial | 0.3000 | 0.3000 | 0.3000 | 0.3000 | 0.3000 | 0.3000 |
| RM % 80 min | 0.0046 | 0.0037 | 0.0043 | 0.0045 | 0.0054 | 0.0067 |

It can be seen that the residual RM content after polymerization in the polymerizable mixtures P1 to P4 according to the invention is as good as in the polymerizable reference mixtures PC1 and PC2.

In conclusion, the polymerizable mixtures P1 to P4 according to the invention which contain a compound of formula IA and IB enable a significant increase of the VHR after UV exposure and the reliability, without showing an adverse effect on other properties like tilt generation or completeness of polymerization. This can be achieved even when using only a small amount of 1% of the compound of formula IB. These mixtures are therefore especially suitable for use in PS-VA-displays.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An LC medium having negative dielectric anisotropy and comprising one or more polymerizable compounds, one or more compounds of formula IA, and one or more compounds of formula IB

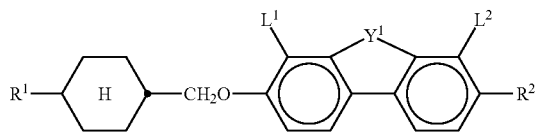

IA

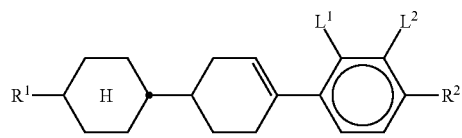

IB in which the individual radicals, on each occurrence identically or differently, and each, independently of one another, have the following meaning:

$R^1$, $R^2$ are each, independently, straight chain alkyl having 1 to 25 C atoms, branched alkyl having 3 to 25 C atoms, or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^o$=$CR^{oo}$—, —C≡C—,

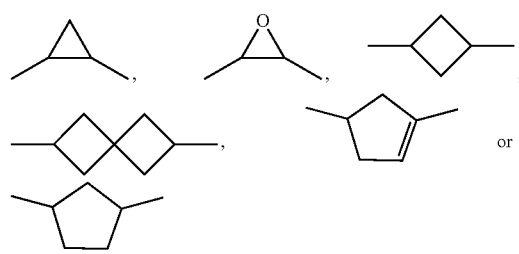

in such a manner that O- and/or S-atoms are not directly connected with each other, and wherein one or more H atoms are each optionally replaced by F or Cl, $R^o$, $R^{oo}$ are each, independently, H or alkyl having 1 to 12 C atoms, $Y^1$ is S, and $L^1$, $L^2$ are each, independently, F or Cl, wherein the total proportion of the compounds of formula IB in the LC medium is from 0.5% to 1.5% by weight.

2. The LC medium according to claim 1, wherein compounds of formula IA are selected from formulae IA-1 to IA-10:

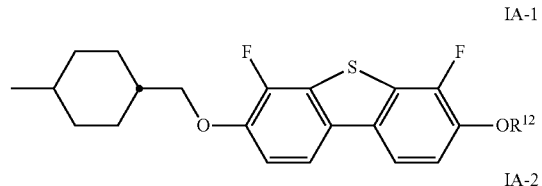

IA-1

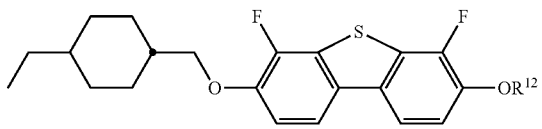

IA-2

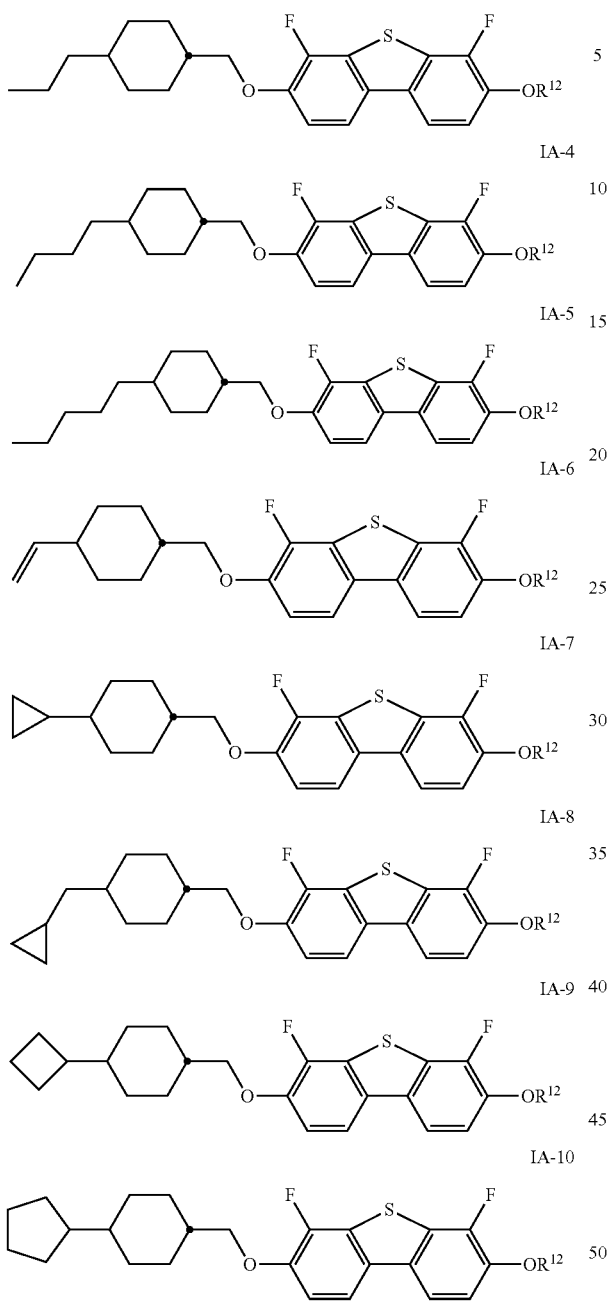

in which R¹² denotes alkyl having 1 to 7 C-atoms.

3. The LC medium according to claim 1, wherein compounds of formula IB are selected from the following subformulae:

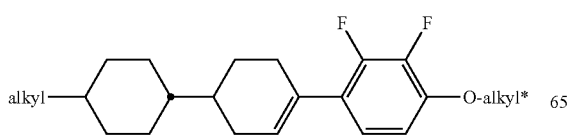

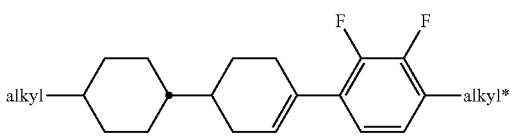

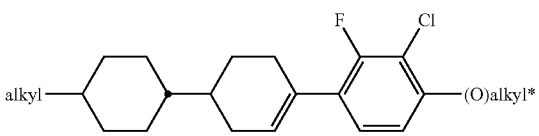

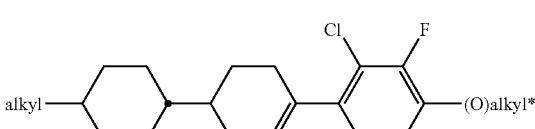

in which alkyl and alkyl* independently of each other denote a straight-chain alkyl radical having 1-6 C atoms and (O) denotes an oxygen atom or a single bond.

4. The LC medium according to claim 1, further comprising one or more compounds of formula II

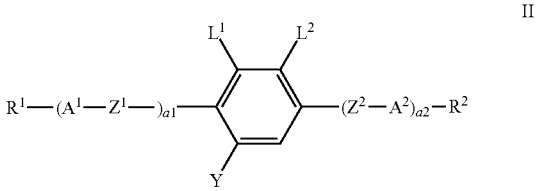

wherein the individual radicals, independently of each other and on each occurrence identically or differently, have the following meanings $R^1$ and $R^2$ straight chain alkyl having 1 to 25 C atoms, branched alkyl having 3 to 25 C atoms, or cyclic alkyl having 3 to 25 C atoms, wherein one or more non-adjacent CH₂-groups are optionally replaced by —O—, —S—, —CO—, —CO—O—, —O—CO—, —O—CO—O—, CR⁰=CR⁰⁰—, —C≡C—,

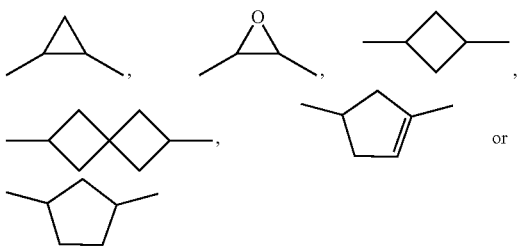

in such a manner that O- and/or S-atoms are not directly connected with each other, and wherein one or more H atoms are each optionally replaced by F or Cl, $R^O$, $R^{OO}$ H or alkyl having 1 to 12 C atoms, $A^1$ and $A^2$ a group selected from the following formulae A1 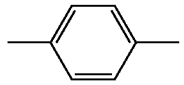

A2 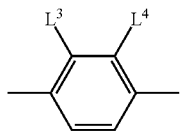

A3 

A4 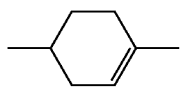

A5 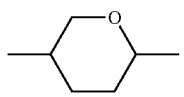

A6 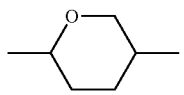

A7 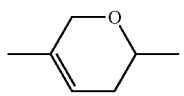

A8 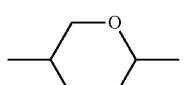

A9 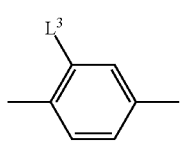

A10 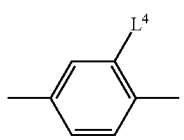

A11 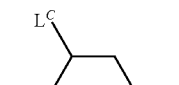

A12 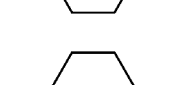

-continued

A13 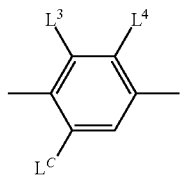

A14 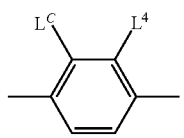

A15 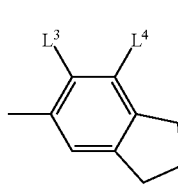

A16 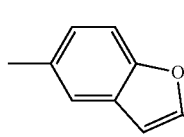

$Z^1$ and $Z^2$ —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, $L^1$, $L^2$, $L^3$ and $L^4$ F, Cl, OCF$_3$, CF$_3$, CH$_3$, CH$_2$F or CHF$_2$, Y H, F, Cl, CF$_3$, CHF$_2$ or CH$_3$, $L^C$ CH$_3$ or OCH$_3$, a1 1 or 2, a2 0 or 1.

5. The LC medium according to claim 4, wherein compounds of formula II are selected from compounds of formulae IIA, IIB, IIC and IID IIA
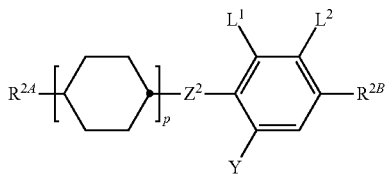

IIB
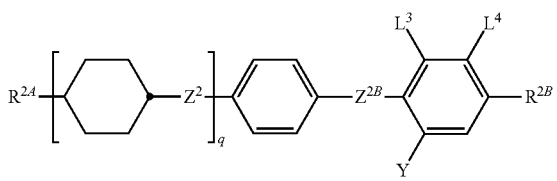

IIC
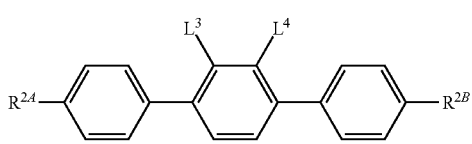

-continued

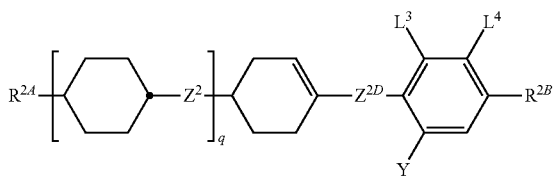

in which
$R^{2A}$ and $R^{2B}$ each, independently of one another, denote H, an alkyl having 1 to 15 C atoms, or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

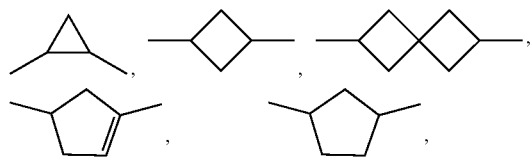

—C≡C—, —$CF_2$O—, —O$CF_2$—, —OC—O—, or —O—CO— in such a way that O atoms are not linked directly to one another,
$L^1$ to $L^4$ each, independently of one another, denote F, Cl, $CF_3$ or $CHF_2$,
Y denotes H, F, Cl, $CF_3$, $CHF_2$ or $CH_3$,
$Z^2$, $Z^{2B}$, $Z^{2D}$ each, independently of one another, denote a single bond, —$CH_2CH_2$—, —CH=CH—, —$CF_2$O—, —O$CF_2$—, —$CH_2$O—, —O$CH_2$—, —COO—, —OCO—, —$C_2F_4$—, —CF=CF—, —CH=CH$CH_2$O—,
p denotes 0, 1 or 2, and
q on each occurrence, identically or differently, denotes 0 or 1.

6. The LC medium according to claim 1, further comprising one or more compounds of formula III

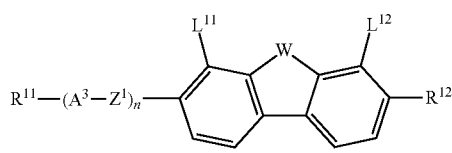

in which
$R^{11}$ and $R^{12}$ each, independently of one another, denote H, an alkyl or alkoxy radical having 1 to 15 C atoms, where one or more $CH_2$ groups in these radicals may each be replaced, independently of one another, by

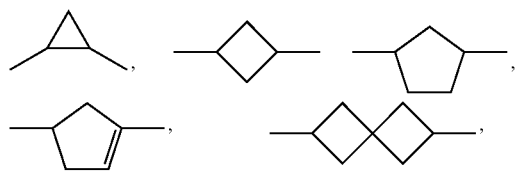

—C≡C—, —$CF_2$O—, —O$CF_2$—, —CH=CH—, by —O—, —CO—O—, or —O—CO— in such a way that O atoms are not linked directly to one another, and in which, in addition, one or more H atoms may each be replaced by halogen,
$A^3$ on each occurrence, independently of one another, denotes
  a) 1,4-cyclohexenylene or 1,4-cyclohexylene radical, in which one or two non-adjacent $CH_2$ groups may each be replaced by —O— or —S—,
  b) a 1,4-phenylene radical, in which one or two CH groups may each be replaced by N, or
  c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
wherein the radicals a), b) and c) may be mono- or polysubstituted by halogen atoms,
n denotes 0, 1 or 2,
$Z^1$ on each occurrence independently of one another denotes —CO—O—, —O—CO—, —$CF_2$O—, —O$CF_2$—, —$CH_2$O—, —O$CH_2$—, —$CH_2$—, —$CH_2CH_2$—, —$(CH_2)_4$—, —CH=CH—$CH_2$O—, —$C_2F_4$—, —$CH_2CF_2$—, —$CF_2CH_2$—, —CF=CF—, —CH=CF—, —CF=CH—, —CH=CH—, —C≡C— or a single bond,
$L^{11}$ and $L^{12}$ each, independently of one another, denote F, Cl, $CF_3$ or $CHF_2$, and
W denotes O or S.

7. The LC medium according to claim 1, further comprising one or more compounds of formula IV

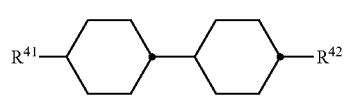

in which
$R^{41}$ denotes an unsubstituted alkyl radical having 1 to 7 C atoms or an unsubstituted alkenyl radical having 2 to 7 C atoms, and
$R^{42}$ denotes an unsubstituted alkyl radical having 1 to 7 C atoms or an unsubstituted alkoxy radical having 1 to 6 C atoms, an unsubstituted alkenyl radical having 2 to 7 C atoms.

8. The LC medium according to claim 1, further comprising one or more compounds of formula V

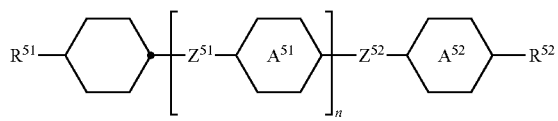

in which
$R^{51}$ and $R^{52}$ independently of one another, denote alkyl having 1 to 7 C atoms, alkoxy having 1 to 7 C atoms, or alkoxyalkyl, alkenyl, or alkenyloxy having 2 to 7 C atoms,

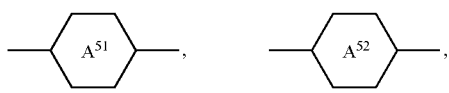

identically or differently, denote

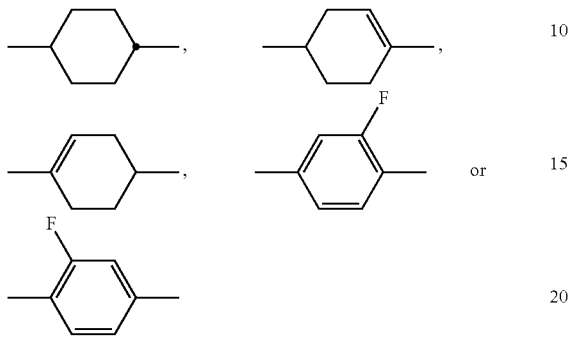

in which $Z^{51}$, $Z^{52}$ each, independently of one another, denote —CH$_2$—CH$_2$—, —CH$_2$—O—, —CH=CH—, —C≡C—, —COO—, or a single bond, and n is 1 or 2.

9. The LC medium according to claim 1, further comprising one or more additives selected from the group consisting of stabilizers, chiral dopants, polymerization initiators, and self alignment additives.

10. The LC medium according to claim 1, wherein the one or more polymerizable compounds are selected from formula M

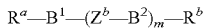   M in which the individual radicals, on each occurrence identically or differently, and each, independently of one another, have the following meaning:

$R^a$ and $R^b$ P, P-Sp-, H, F, Cl, Br, I, —CN, —NO$_2$, —NCO, —NCS, —OCN, —SCN, SF$_5$, or straight-chain alkyl having 1 to 25 C atoms or branched alkyl having 3 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, or —O—CO—O— in such a way that o and/or S atoms are not linked directly to one another, and in which, in addition, one or more H atoms may each be replaced by F, Cl, Br, I, CN, P or P-Sp-, where, if B$^1$ and/or B$^2$ contain a saturated C atom, R$^a$ and/or R$^b$ may also denote a radical which is spiro-linked to this saturated C atom, wherein at least one of the radicals R$^a$ and R$^b$ denotes or contains a group P or P-Sp-, P a polymerizable group, Sp a spacer group or a single bond, B$^1$ and B$^2$ an aromatic, heteroaromatic, alicyclic or heterocyclic group, having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$, or a single bond, $R^0$ and $R^{00}$ H or alkyl having 1 to 12 C atoms, m 0, 1, 2, 3 or 4, n1 1, 2, 3 or 4, L P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, straight-chain alkyl- or alkoxy having 1 to 25 C atoms, branched alkyl or alkoxy having 3 to 25 C atoms, straight chain alkylcarbonyl, alkoxycarbonyl, alkylcarbonyloxy or alkoxycarbonyloxy having 2 to 25 C atoms, or branched alkylcarbonyl, alkoxycarbonyl, alkylcarbonyloxy or alkoxy-carbonyloxy having 4 to 25 C atoms, in which, in addition, one or more H atoms may each be replaced by F, Cl, P or P-Sp-, Y$^1$ halogen, R$^x$ P, P-Sp-, H, halogen, straight-chain alkyl having 1 to 25 C atoms, branched alkyl having 3 to 25 C atoms, or cyclic alkyl having 3 to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P-Sp-, an optionally substituted aryl or aryloxy group having 6 to 40 C atoms, or an optionally substituted heteroaryl or heteroaryloxy group having 2 to 40 C atoms.

11. The LC medium according to claim 1, wherein the one or more polymerizable compounds are selected from the following formulae:

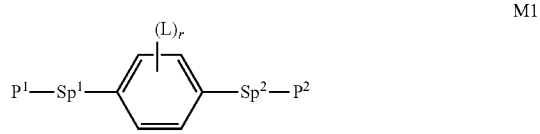

M1

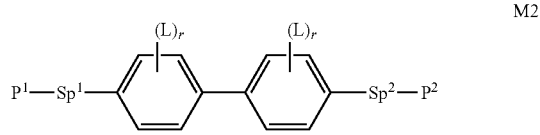

M2

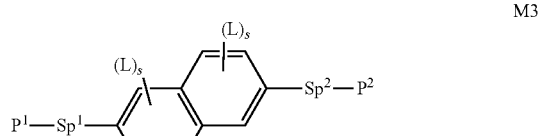

M3

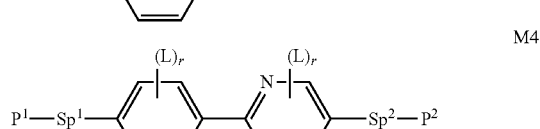

M4

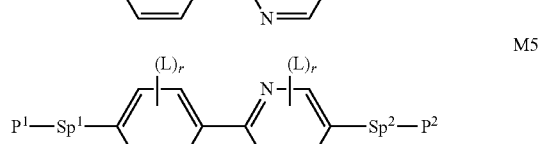

M5

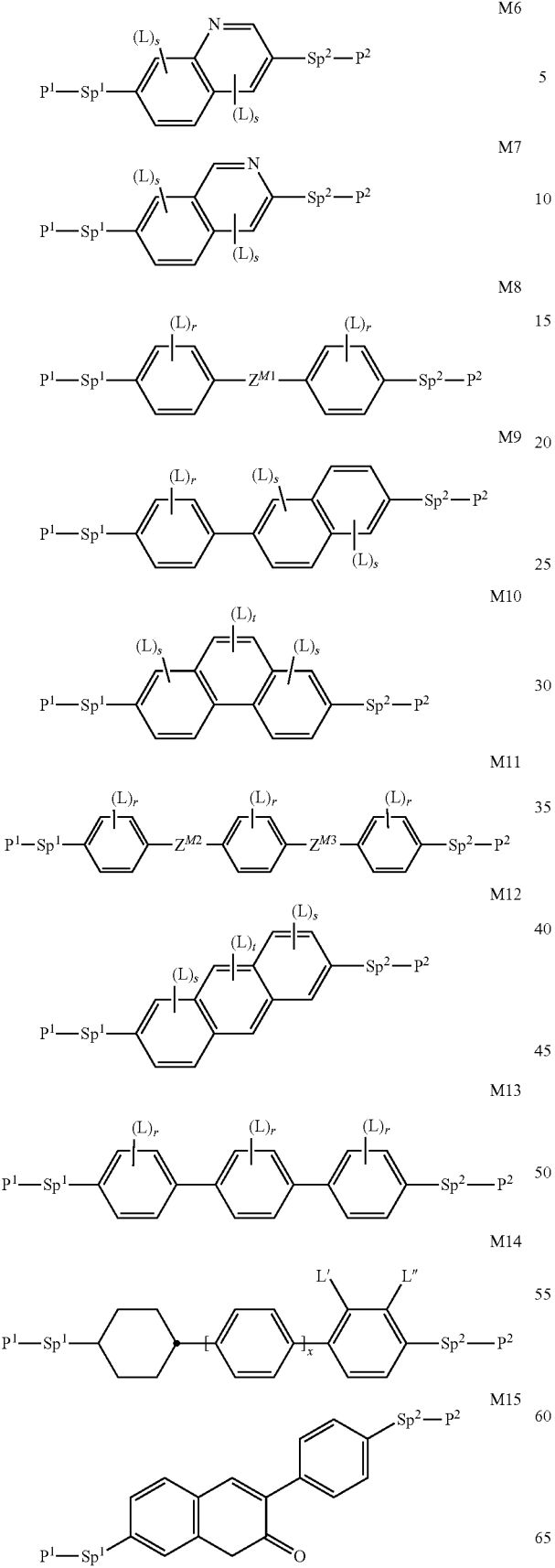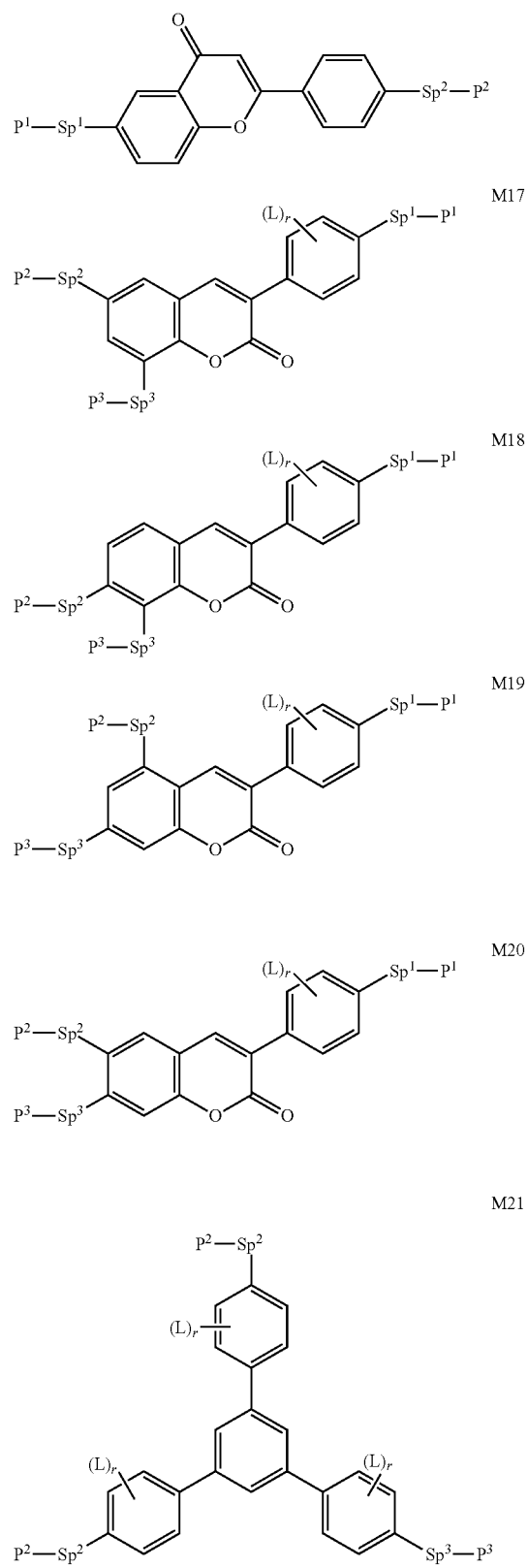

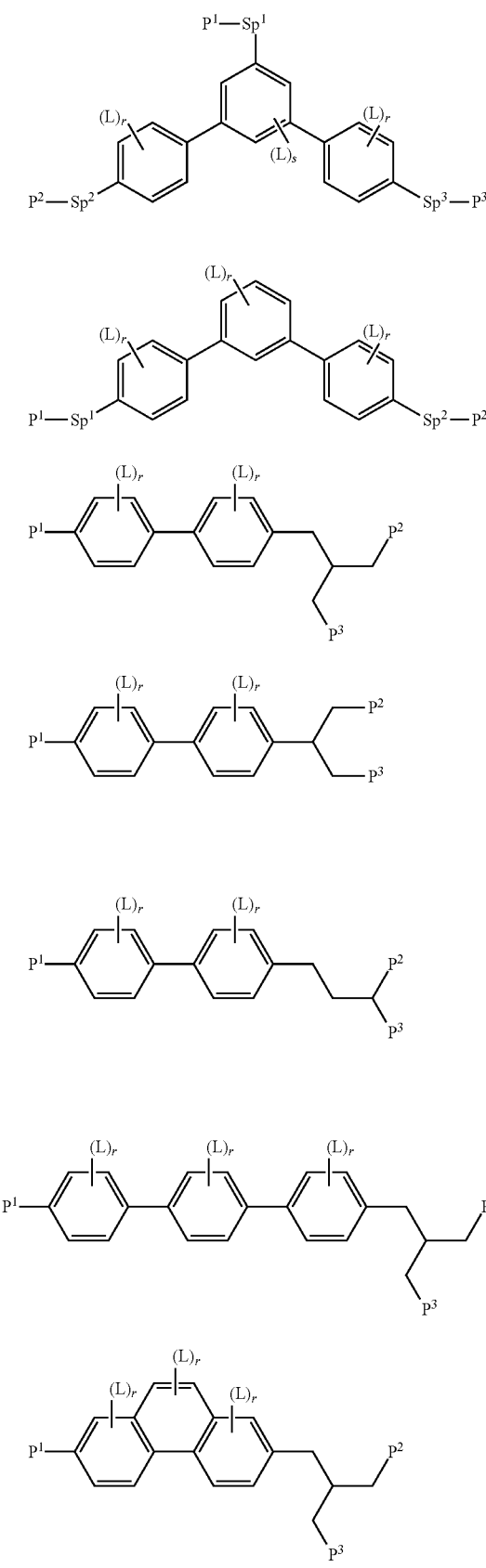
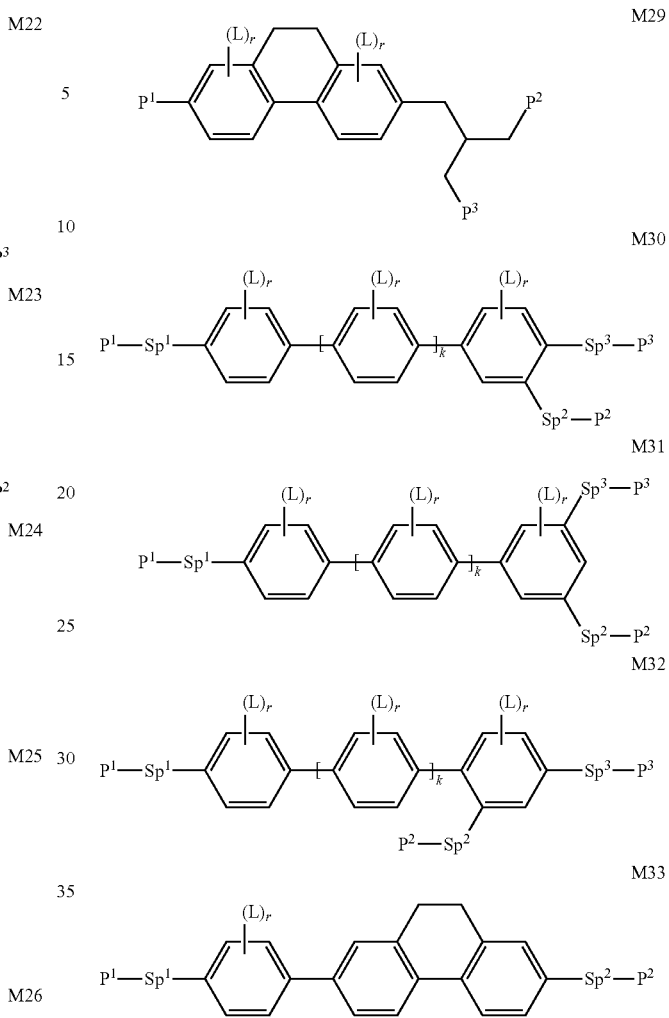

in which the individual radicals, on each occurrence identically or differently, and each, independently of one another, have the following meaning:

$P^1$, $P^2$, $P^3$ a vinyloxy, acrylate, methacrylate, fluoro-acrylate, chloro-acrylate, oxetane or epoxy group, $Sp^1$, $Sp^2$, $Sp^3$ a single bond or a spacer group where, in addition, one or more of the radicals $P^1$-$Sp^1$-, $P^2$-$Sp^2$- and $P^3$-$Sp^3$- may also denote $R^{aa}$, with the proviso that at least one of the radicals $P^1$-$Sp^1$-, $P^2$—$Sp^2$ and $P^3$—$Sp^3$- present is different from $R^{aa}$, $R^{aa}$ H, F, Cl, CN, or straight-chain alkyl having 1 to 25 C atoms or branched alkyl having 3 to 25 C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, CN or $P^1$—$Sp^1$-, $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^1$ —O—, —CO—, —C($R^y R^z$)— or —$CF_2CF_2$—, $Z^2$, $Z^3$ —CO—O—, —O—CO—, —CH$_2$O—, —OCH$_2$—, —CF$_2$O—, —OCF$_2$— or —(CH$_2$)$_n$—, where n is 2, 3 or 4, L F, Cl, CN, or straight-chain alkyl or alkoxy having 1 to 12 C atoms, or branched alkyl or alkoxy having 3 to 12 C atoms, straight chain alkenyl, alkynyl, alkylcarbonyl, alkoxycarbonyl, alkylcarbonyloxy or alkoxycarbonyloxy having 2 to 12 C atoms, or branched alkenyl, alkynyl, alkylcarbonyl, alkoxycarbonyl, alkylcarbonyloxy or alkoxycarbonyloxy having 4 to 12 C atoms, in each case optionally mono- or polyfluorinated, L', L" H, F or Cl, r 0, 1, 2, 3 or 4, s 0, 1, 2 or 3, t 0, 1 or 2, x 0 or 1.

12. The LC medium according to claim 1, wherein the polymerizable compounds are present in polymerized form.

13. A process of preparing an LC medium according to claim 1, comprising the steps of mixing one or more one or more compounds of formula IA, and one or more one or more compounds of formula IB, with one or more polymerizable compounds and optionally with one or more further liquid-crystalline compounds and/or additives, and optionally polymerizing the polymerizable compounds.

14. An LC display comprising an LC medium as defined claim 1.

15. The LC display of claim 14, wherein the display is a PS-VA, PS-IPS, PS-FFS or SA-VA display.

16. The LC display of claim 14, wherein said display further comprises two substrates, at least one of which is transparent to light, an electrode provided on each substrate or two electrodes provided on only one of the substrates, and located between the substrates a layer of the LC medium, wherein the polymerizable compounds are polymerized between the substrates of the display by UV photopolymerization.

17. A process for the production of an LC display according to claim 16, comprising: providing the LC medium between the substrates of the display, and polymerizing the polymerizable compounds by irradiation with UV light.

18. The LC medium according to claim 4, wherein groups $A^1$ and $A^2$ are each selected from formulae A1, A2, A3, A4, A5, A6, A9 and A10.

19. The LC medium according to claim 4, wherein groups $A^1$ and $A^2$ are each selected from formulae A1, A2, A3, A4, A5, A9 and A10.

20. The LC medium according to claim 2, wherein $R^{12}$ denotes ethyl, n-propyl, n-butyl, cyclopropylmethyl, cyclobutylmethyl, or cyclopentylmethyl.

21. The LC medium according to claim 1, wherein $R^1$ and $R^2$ are each, independently, alkyl or alkoxy having 1 to 6 C atoms.

22. The LC medium according to claim 4, wherein, in formula II, $R^1$ and $R^2$ are each, independently, alkyl or alkoxy having 1 to 6 C atoms.

* * * * *